United States Patent
Yamamoto et al.

(10) Patent No.: US 8,208,683 B2
(45) Date of Patent: Jun. 26, 2012

(54) DIGITAL WATERMARK EMBEDDING METHOD, APPARATUS AND STORAGE MEDIUM FOR REDUCING IMAGE QUALITY DETERIORATION AND INCREASING DETECTION RELIABILITY

(75) Inventors: Susumu Yamamoto, Yokosuka (JP); Takao Nakamura, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 882 days.

(21) Appl. No.: 12/282,062

(22) PCT Filed: Mar. 1, 2007

(86) PCT No.: PCT/JP2007/053953
§ 371 (c)(1),
(2), (4) Date: Sep. 8, 2008

(87) PCT Pub. No.: WO2007/102403
PCT Pub. Date: Sep. 13, 2007

(65) Prior Publication Data
US 2009/0074242 A1    Mar. 19, 2009

(30) Foreign Application Priority Data
Mar. 7, 2006  (JP) .................................. 2006-061745

(51) Int. Cl.
*G06K 9/00*  (2006.01)
(52) U.S. Cl. ..................................................... 382/100
(58) Field of Classification Search .................. 382/100, 382/232–253; 380/200–242; 358/426.01–426.16; 354/555; 348/384.1–440.1; 375/122, 240.01–240.29
See application file for complete search history.

(56) References Cited

U.S. PATENT DOCUMENTS

| | | | |
|---|---|---|---|
| 5,386,240 | A | 1/1995 | Hori |
| 5,930,369 | A | 7/1999 | Cox et al. |
| 6,370,272 | B1 | 4/2002 | Shimizu |
| 6,785,398 | B1 | 8/2004 | Shimizu et al. |
| 6,792,130 | B1 | 9/2004 | Jones et al. |
| 2006/0193491 | A1 | 8/2006 | Nakamura et al. |

(Continued)

FOREIGN PATENT DOCUMENTS
JP        6 46392       2/1994
(Continued)

OTHER PUBLICATIONS
U.S. Appl. No. 13/105,367, filed May 11, 2011, Nakamura, et al.
(Continued)

*Primary Examiner* — Atiba O Fitzpatrick
(74) *Attorney, Agent, or Firm* — Oblon, Spivak, McClelland, Maier & Neustat, L.L.P.

(57) ABSTRACT

A digital watermark embedding apparatus for embedding embedding information, as digital watermark, into an input signal having dimensions equal to or greater than N (N is an integer equal to or greater than 2) and a digital watermark detection apparatus for detecting the digital watermark are disclosed. The digital watermark embedding apparatus generates an embedding sequence based on embedding information, generates a N−1-dimensional pattern based on the embedding sequence, generates N-dimensional embedding pattern by modulating a periodic signal according to a value on the N−1-dimensional pattern, and superimposing the embedding pattern in the input signal and outputs it. The digital watermark detection apparatus measures a component of a predetermined periodic signal in a direction of a dimension of the input signal to obtain a N−1-dimensional pattern, obtains a detection sequence from values of the N−1 dimensional pattern, and detects embedded digital watermark based on a size of correlation value between the detection sequence and an embedding sequence.

11 Claims, 70 Drawing Sheets

U.S. PATENT DOCUMENTS

| | | |
|---|---|---|
| 2006/0204032 A1 | 9/2006 | Nakamura et al. |
| 2008/0089552 A1 | 4/2008 | Nakamura et al. |

FOREIGN PATENT DOCUMENTS

| | | |
|---|---|---|
| JP | 9 191394 | 7/1997 |
| JP | 10 285562 | 10/1998 |
| JP | 11 341452 | 12/1999 |
| JP | 2000 287073 | 10/2000 |
| JP | 2001-292302 | 10/2001 |
| JP | 2002-112210 | 4/2002 |
| JP | 2002 290936 | 10/2002 |
| JP | 2003 219148 | 7/2003 |
| JP | 2004 172758 | 6/2004 |
| JP | 2005-012405 | 1/2005 |
| JP | 2006-005527 | 1/2006 |
| JP | 2006-180034 | 7/2006 |
| JP | 2009-515371 | 4/2009 |
| WO | WO 2005/079072 | 8/2005 |

OTHER PUBLICATIONS

Yamamoto S et al., "Consideration on evaluation of detectability for frame-based video watermarking", FIT 2005 ($4^{TH}$ Information Science Technical Forum), pp. 243 to 244, (2005) (with English translation).

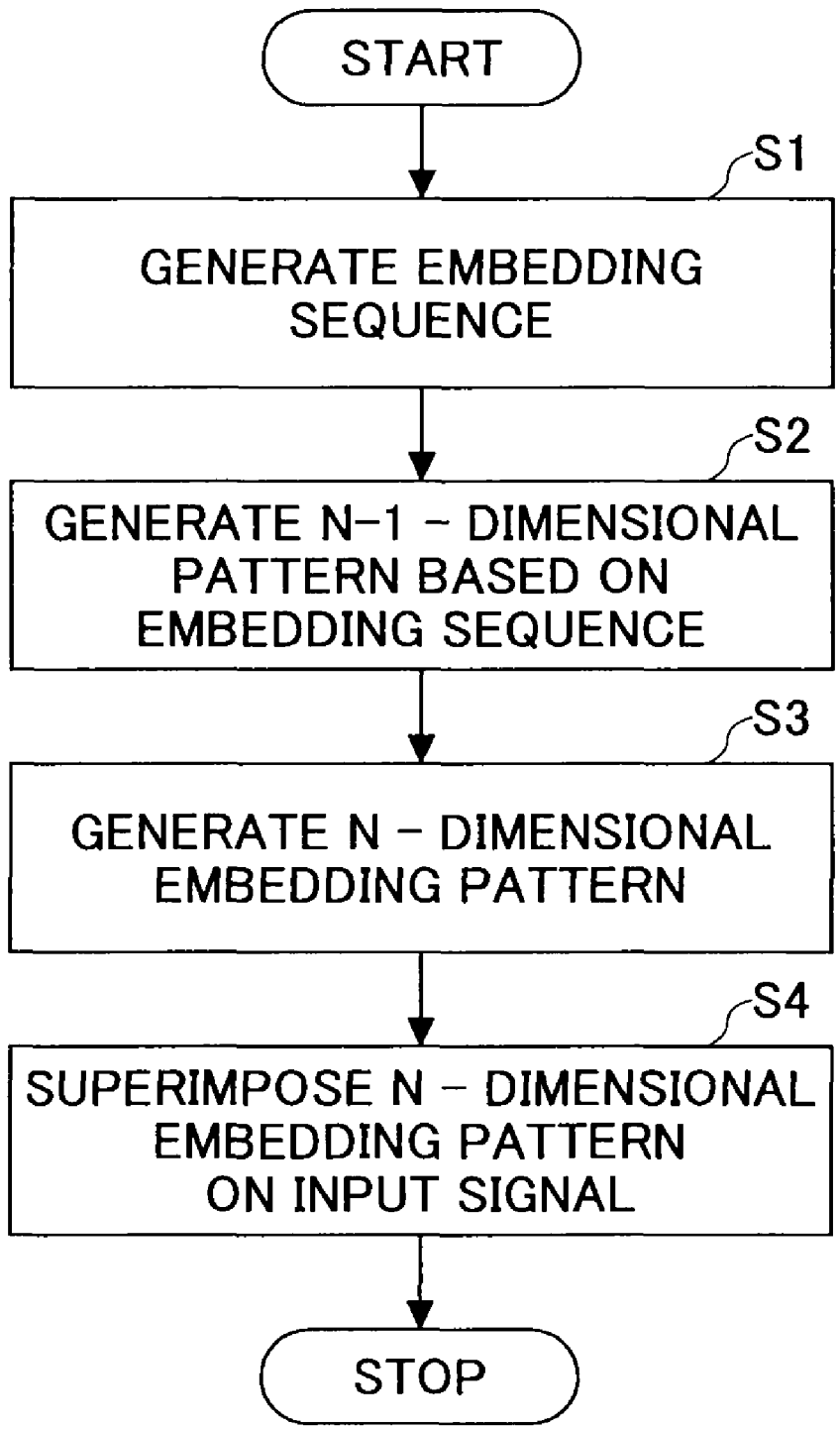

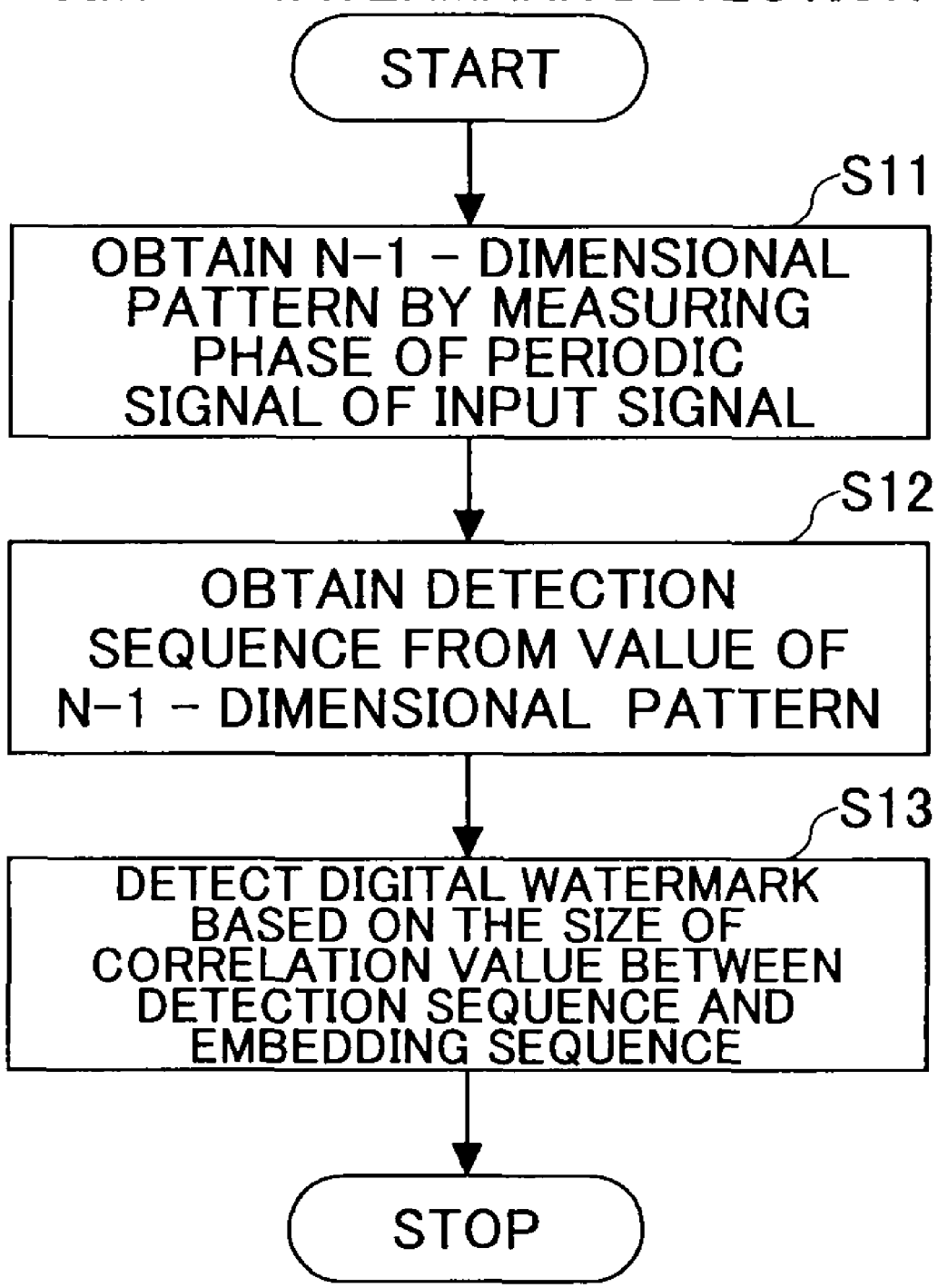

(a) SINE WAVE (b) TRIANGULAR WAVE (c) RECTANGULAR WAVE (a) AUTOCORRELATION FUNCTION OF SINE WAVE (b) AUTOCORRELATION FUNCTION OF TRIANGULAR WAVE (c) AUTOCORRELATION FUNCTION OF RECTANGULAR WAVE (a) WHEN PERIODIC SIGNAL IS SINE WAVE (b) WHEN TRIANGULAR WAVE (c) WHEN PERIODIC SIGNAL IS RECTANGULAR WAVE $f_1(t)$: RECTANGULAR WAVE $f_2(t)$: TRIANGULAR WAVE $G_1(t)$: NO DESYNCHRONIZATION $G_2(t)$: THERE IS DESYNCHRONIZATION

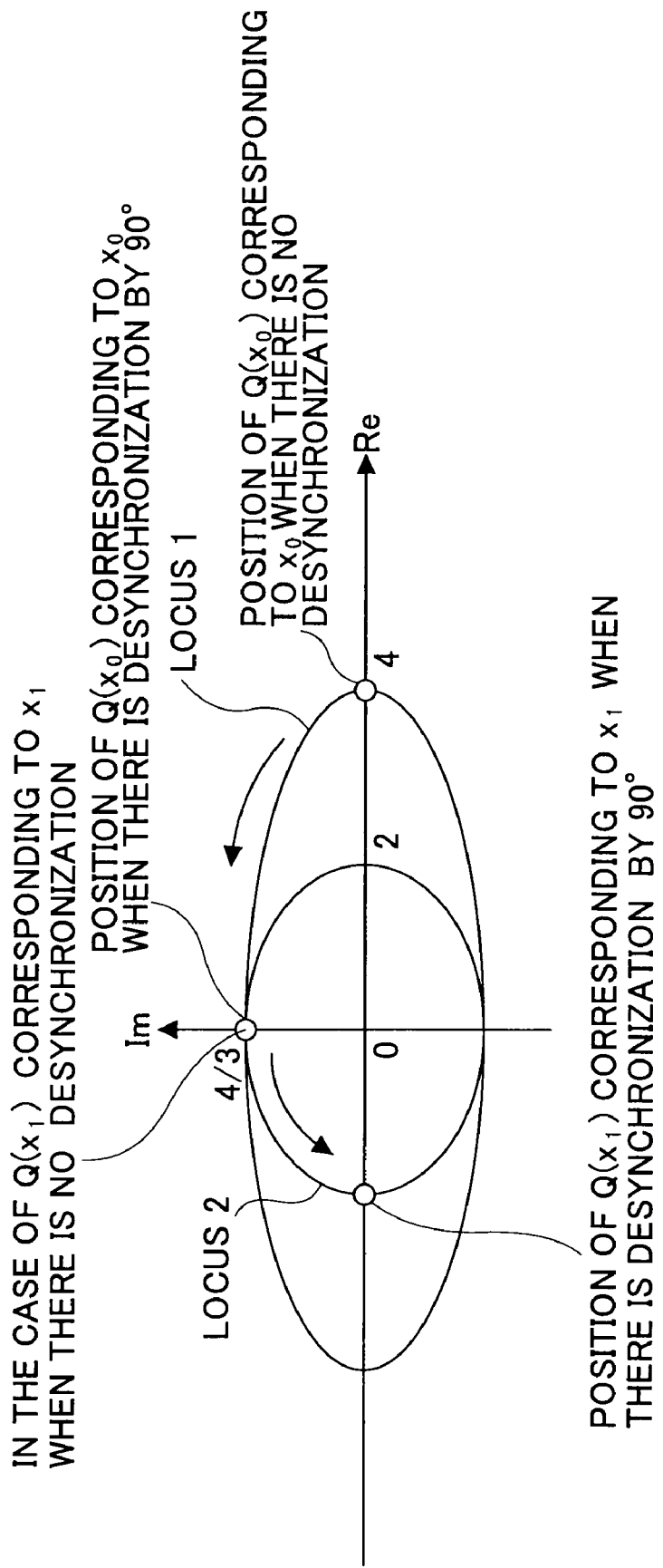

FIG.21
TILE SAME PATTERN REPEATEDLY
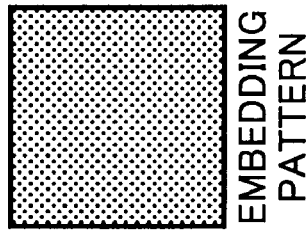
EMBEDDING PATTERN

DIGITAL WATERMARK EMBEDDING METHOD, APPARATUS AND STORAGE MEDIUM FOR REDUCING IMAGE QUALITY DETERIORATION AND INCREASING DETECTION RELIABILITY

TECHNICAL FIELD

The present invention relates to a digital watermark embedding method, apparatus and program, and a digital watermark detection method, apparatus and program. More particularly, the present invention relates to a digital watermark embedding method, apparatus and program, and a digital watermark detection method, apparatus and program for embedding separate sub-information into an input signal such as a video signal such that it is imperceptible, and for reading the sub-information from a signal into which the sub-information is embedded.

BACKGROUND ART

As a conventional technique, there is a technique for protecting copyright of digital content by embedding digital watermark into the digital content. In addition, there is a technique to refer to meta data such as copyright information on digital content. Further, there is a technique for taking a photograph of digital content, using a digital camera, via analog medium such as a printed matter as an advertisement so as to obtain information related to the advertisement by reading digital watermark.

As a method for embedding digital watermark into a still image, a digital watermarking scheme of spectrum spreading type is disclosed, the scheme being for embedding an embedding sequence that is generated using a pseudo-random number into a real part and an imaginary part of an orthogonal transformation region (Fourier transform region, for example) of the image, and performing detection using correlation between the embedding sequence and a detection sequence (refer to patent document 1, for example).

Also as to a video signal, generally, since the video signal is recorded as a sequence of frame images each being a still image, embedding of digital watermark becomes available by applying the digital watermark scheme for the still image. For example, digital watermark for the video signal can be realized by embedding digital watermark common to each frame image of the video signal by using the digital watermark method described in the patent document 1.

When the still image in which digital watermark is embedded is illegally used, it can be considered that a part of an image is cropped and it is used. In the case of the part of the image that is cropped, it cannot be ascertained which part of the original image corresponds to the cropped part in digital watermark detection that does not use the original image. This means that the embedded digital watermark pattern appears to be translated by an arbitrary amount. That is, this means a state in which the digital watermark pattern is desynchronized in a space direction. This is called "spatial synchronization of digital watermark", and it is necessary to maintain spatial synchronization using a method for clarifying the translation amount and the like for detecting the digital watermark (generally, although spatial synchronization of digital watermark may include correction of geometrical deformation such as affine transformation, the present invention is targeted for correction of translation).

Generally, the video signal is treated as a set of a plurality of still images (frames) continuing in a time direction. In a digital watermark scheme for moving images, it is desired to be able to detect digital watermark from a set of a part of continuing frames in the set of the frames. For example, even when only one scene is cut away from distributed video content and it is used invalidly, by being able to detect digital watermark only from the invalidly used scene, effect of invalid use suppression can be expected. In addition, for example, in the case when detecting digital watermark from a re-taken video that is obtained by taking video content being projected in a movie theater using a video camera, a start point of the video when embedding digital watermark and a start point of the re-taken video are shifted inevitably. It is desired to be able to detect digital watermark also in such a case. In addition, for example, an application can be considered for detecting digital watermark from a video that is obtained by taking a scene currently being displayed in video content using a camera of a portable terminal and the like so as to obtain related information. In these examples, since it cannot be ascertained beforehand which part in the video in which digital watermark is embedded is cut away, it is necessary, when performing digital watermark detection, to know a subject part for detection corresponds to which position in the signal embedded as digital watermark. This is called temporal synchronization of digital watermark.

The spatial synchronization and the temporal synchronization in the conventional digital watermark scheme are broadly classified as follows.

(1) Exhaustive search: exhaustively trying detection of digital watermark successively for each of all amounts of desynchronization that can be considered;

(2) Embedding a signal for synchronization: embedding a signal for synchronization separately from digital watermark and detecting it for synchronization.

For example, in the digital watermarking method described in the patent document 1, a signal for detecting a spatial translation amount of digital watermark is embedded together with embedding information, and exhaustive search for amounts of desynchronization of the signal is efficiently performed using discrete Fourier transform so as to perform spatial synchronization. [Patent document 1] Japanese Laid Open Patent Application 2003-219148

DISCLOSURE OF THE INVENTION

Problem to be Solved by the Invention

However, there are following problems in the conventional digital watermark embedding method for video.

Problem of Robustness to High Compression and Re-Taking:

For example, there is a case in which detection becomes difficult when applying (high compression) moving image irreversible coding of high compression ratio such as MPEG1/2/4, WMV (Windows (registered trademark) Media Video), DiVX and H.264/AVC, or when taking (re-taking), again, a video output on a display device such as a screen and a display using a video camera or a camera mounted in a cellular phone or the like.

In addition, it becomes necessary to embed digital watermark strongly in order to be able to perform detection even when the high compression or re-taking is performed, so that image quality of the video is lowered as a result.

Contrary, for giving adequate robustness to the high compression and the re-taking and the like while maintaining adequate image quality, it is necessary to shorten the information length embedded in the video.

Problem of Spread Sequence Length:

In a document, Susumu Yamamoto, Takao Nakamura, Youichi Takashima, Atsushi Katayama, Ryo Kitahara, Takashi Miyatake, "Consideration on evaluation of detectability for frame-based video watermarking", Forum on information technology, FIT2005, J-029, 2005, it is described that, in a digital watermark scheme using spectrum spreading and correlation calculation, reliability of detection of digital watermark increases by increasing the spread sequence length of spectrum spreading. In the digital watermark scheme in the before-mentioned patent document 1, the number of frequency coefficient positions in the orthogonal transformation region in which the embedding sequence can be embedded is limited due to restriction of symmetry of Fourier coefficient for obtaining real values by reverse transform. That is, due to restriction that Fourier coefficients in symmetric positions are conjugate complex numbers, the frequency coefficients to which an embedding sequence can be embedded are substantially limited to half the whole frequency coefficients, so that it was difficult to increase the spread sequence length in the spectrum spreading.

Problem of Synchronization

In addition, in the conventional methods for spatial synchronization and temporal synchronization in digital watermarking, there are following problems.

First, as to the method by exhaustive search, since it takes much time to search all of the desynchronization amounts, it is not realistic.

In addition, in the method embedding the signal for synchronization, modification amount for the signal is increased by the signal for the synchronization, so that the quality of the signal is decreased as a whole. For example, as for a video, it leads to deteriorating the quality of the video. In addition, the signal for synchronization itself contributes as a noise component against detection of embedding information, so that there is a possibility that detection capability deteriorates. In addition, a distinctive signal for synchronization can be easily predicted, and there is a possibility that the signal itself becomes a subject of attack so that security is deteriorated.

Especially, there is a following problem in temporal synchronization for a video.

When a video displayed on a screen or a TV is taken by a video camera or a camera of a cellular phone or the like, re-sampling occurs in sub-frames since a frame rate of reproduction and a frame rate for video taking are not synchronized with each other, so that synchronization is further difficult. In addition, when using a processor of low performance such as the cellular phone, there is a case in which the frame rate for video taking is not stable so that timing of sampling is slightly shifted, and it is also a factor for making the synchronization difficult.

The present invention is contrive in view of the above-mentioned points, and an object is to provide a digital watermark embedding technique and a digital watermark detection technique in which robustness is high for high compression and re-taking, the spread sequence length can be increased, and temporal synchronization/space synchronization become unnecessary or temporal synchronization/space synchronization can be achieved easily.

Means for Solving the Problem

The present invention can be configured as a digital watermark embedding method for embedding embedding information, as digital watermark, into an input signal having dimensions equal to or greater than N (N is an integer equal to or greater than 2) such that it is imperceptible to human senses in a digital watermark embedding apparatus including embedding sequence generation means, array generation means, modulation means, storage means, and embedding pattern superimposing means, wherein, the embedding sequence generation means generates an embedding sequence based on the embedding information to store it in first storage means;

the array generation means generates a N−1-dimensional pattern based on the embedding sequence in the first storage means;

the modulation means modulates the periodic signal according to a value on the N−1-dimensional pattern to generate a N-dimensional embedding pattern and store it in a second storage means; and the embedding pattern superimposing means obtains the N-dimensional embedding pattern stored in the second storage means to superimpose the embedding pattern on the input signal so as to embed it.

The present invention can be also configured as a digital watermark embedding method for embedding embedding information, as digital watermark, into an input signal having dimensions equal to or greater than N (N is an integer equal to or greater than 2) such that it is imperceptible to human senses in a digital watermark embedding apparatus including embedding sequence generation means, array generation means, transform means, storage means, embedding pattern superimposing means, and inverse transform means, wherein, the embedding sequence generation means generates an embedding sequence based on the embedding information to store it in first storage means;

the array generation means generates a N−1-dimensional pattern based on the embedding sequence stored in the first storage means to stored it in second storage means;

the transform means orthogonal transforms the input signal to obtain a transformed signal;

the embedding pattern superimposing means superimposes the N−1-dimensional pattern stored in the second storage means on a N−1 dimensional plane that is a part of the transformed signal to obtain before-inverse transform signal; and the inverse transform means orthogonal inverse transforms the before inverse transform signal to obtain an embedded signal.

The present invention can be also configured as a digital watermark detecting method for detecting digital watermark that is embedded beforehand into an input signal having dimensions equal to or greater than N (N is an integer equal to or greater than 2) such that it is imperceptible to human senses in a digital watermark detection apparatus including demodulation means, detection sequence extraction means, correlation value calculation means, and storage means, wherein, the demodulation means measures a component of a predetermined periodic signal in a direction of a dimension in the input signal to obtain a N−1-dimensional pattern;

the detection sequence extraction means obtains a detection sequence from values of the N−1-dimensional pattern to store the detection sequence in storage means; and the correlation value calculation means detects the embedded digital watermark based on a size of a correlation value between the detection sequence stored in the storage means and an embedding sequence.

In addition, the present invention can be also configured as an apparatus applicable for carrying out each of the above-mentioned methods, and as a program for causing a computer to execute the process procedures of each of the above-mentioned methods.

Effect of the Invention

According to the present invention, a technique for embedding information having long information length as digital watermark in which there is sufficient robustness and quality deterioration is suppressed can be realized even when large modification is applied to a digital watermark embedded signal like a video signal to which moving image irreversible coding of high compression is applied or which is re-taken from a video output on a display device. In addition, a technique for performing digital watermark detection in which synchronization is not necessary or synchronization can be performed easily and at high speed can be realized. That is, according to the present invention, fast digital watermark embedding/detection in which increase of process time due to synchronization processing and signal deterioration due to synchronization signal embedding are prevented, robustness and detection performance are high, and quality deterioration is small become possible.

BRIEF DESCRIPTION OF THE DRAWINGS

FIG. 1A is a flowchart showing an outline of a digital watermark embedding method in an embodiment of the present invention;

FIG. 1B is a flowchart showing an outline of a digital watermark detection method in an embodiment of the present invention;

FIG. 9 is an example of a locus of Q(x) by desynchronization;

FIG. 21 is an example for superimposing an embedding pattern by tiling it vertically and horizontally in the first embodiment of the present invention;

DESCRIPTION OF REFERENCE SIGNS

Figure 2:
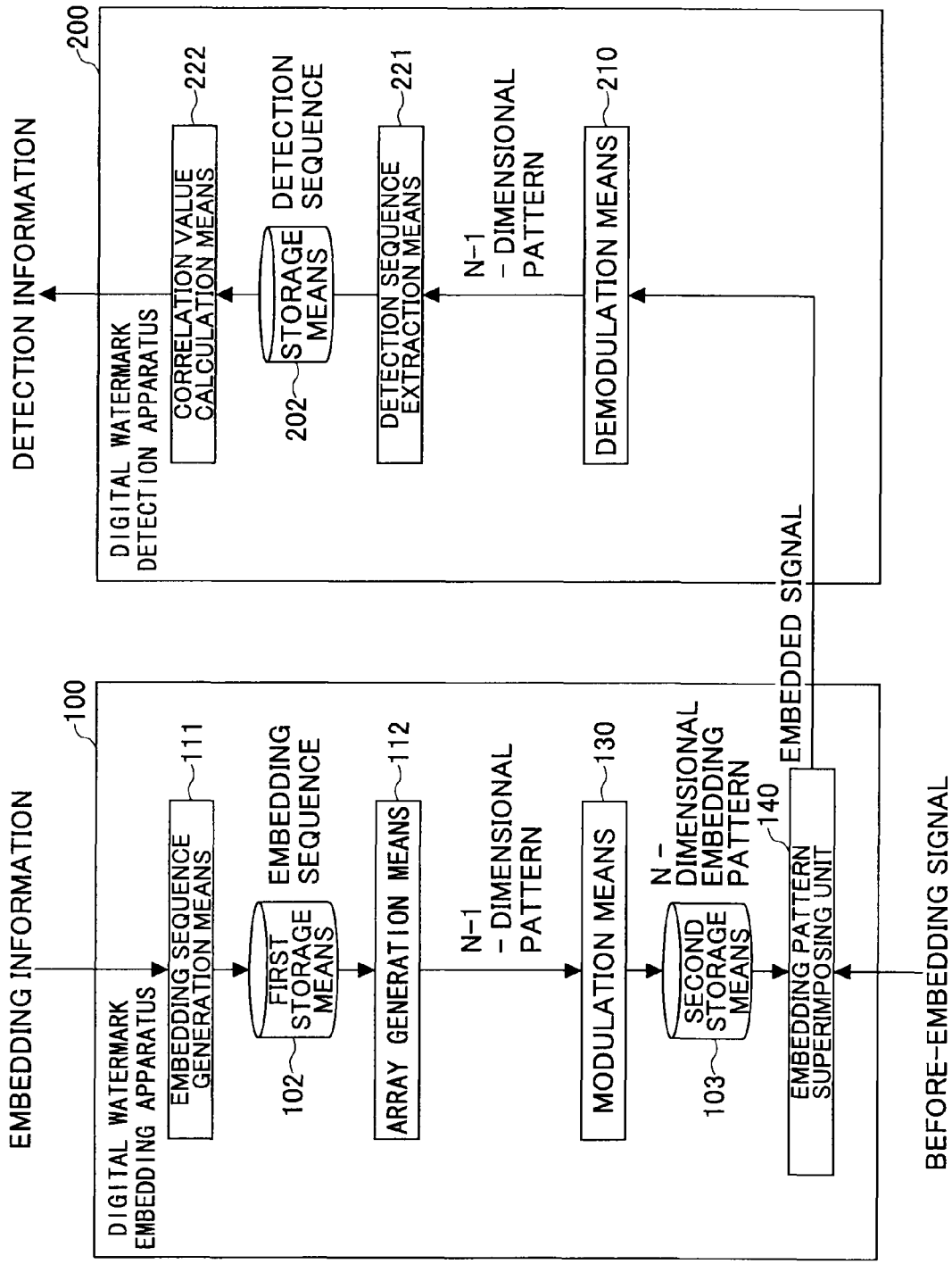
FIG. 2 is a diagram showing a schematic configuration of a digital watermark embedding apparatus and a digital watermark detection apparatus in an embodiment of the present invention.

102 first storage means
103 second storage means
100 digital watermark embedding apparatus
110 complex pattern generation unit
111 embedding sequence generation means, embedding sequence generation unit
112 array generation means, array generation unit
113 N−1-dimensional inverse Fourier transform unit
114 embedding information dividing unit
115 synchronization sequence generation unit
116 complex array generation unit
117 embedding sequence generation unit
120 array generation unit
130 modulation means, temporal modulation unit
131 frequency signal generation unit
132 modulation unit 133 adding unit
134 one-dimensional inverse Fourier transform unit
136 modulation unit
140 embedding pattern superimposing means, embedding pattern superimposing unit
150 first storage unit
160 second storage unit
200 digital watermark detection apparatus
202 storage means
210 demodulation means, temporal demodulation unit
211 periodic signal generation unit
212 demodulation unit
213 complex pattern configuration unit
214 one-dimensional Fourier transform unit
215 signal differentiation unit
216 one-dimensional Fourier transform unit
220 detection information extraction unit
221 detection sequence extraction means, detection sequence extraction unit
222 correlation value calculation means, correlation value calculation unit
223 maximum value determination unit
224 detection information reconfiguration unit
225 N−1-dimensional Fourier transform unit
226 complex correlation value calculation unit
227 absolute value calculation unit
250 pattern storage unit
300 digital watermark detection apparatus
310 temporal demodulation unit
320 synchronization detection unit
321 complex detection sequence extraction unit
322 complex correlation value calculation unit
323 absolute value calculation unit
324 synchronization detection maximum value determination unit
325 phase calculation unit
330 detection information extraction unit
331 detection sequence extraction unit
332 correlation value calculation unit
333 maximum value determination unit
334 detection information reconfiguration unit
500 digital watermark embedding apparatus
510 complex pattern generation unit
511 embedding sequence generation unit
512 complex array generation unit
520 temporal modulation unit
530 embedding pattern superimposing unit
600 digital watermark detection apparatus
610 temporal demodulation unit
620 synchronization detection unit
630 detection information extraction unit
631 detection sequence extraction unit
632 correlation value calculation unit
633 maximum value determination unit
634 detection information reconfiguration unit
700 digital watermark detection apparatus
710 embedded signal dividing unit
720 synchronization temporal demodulation unit
730 synchronization detection unit
740 synchronized signal dividing unit
750 temporal demodulation unit
760 detection information extraction unit
761 detection sequence extraction unit
762 correlation value calculation unit
763 maximum value determination unit
764 detection information re-configuration unit
765 detection information connecting unit
800 digital watermark embedding apparatus
810 complex pattern generation unit
820 embedding pattern superimposing unit
830 before-embedding signal transform unit
840 embedded signal inverse transform unit
850 first storage unit
904 intermediate complex pattern
911 embedding information
912 before-embedding signal
913 embedding sequence
914 detection information
917 synchronization sequence
921 embedding complex pattern
923 embedded signal
961 detection complex pattern
1113 detection sequence
1114 correlation value
1115 detection complex array
1116 complex correlation value
1117 absolute value
1118 detection complex number sequence
1501 detection complex pattern
1502 synchronization displacement amount
1511 detection complex sequence
1512 complex correlation value
1513 absolute value
1521 detection sequence
1522 correlation value
3111 embedding information
3112 before-embedding signal
3113 embedded signal
3114 detection information
3121 embedding complex pattern
3122 embedding pattern
3161 detection complex pattern
3162 synchronization displacement amount
3213 embedding sequence
3313 detection sequence
3314 correlation value
3613 detection sequence
3314 correlation value
3613 detection sequence
3614 correlation value
3615 partial detection information
3812 detection information
3813 synchronization complex pattern
3814 synchronization displacement amount
3815 detection complex pattern
3816 partial embedded signal
3817 synchronized partial signal
4021 embedding complex pattern
4022 transformed before-embedding signal
4023 before inverse transform embedded signal

PREFERRED EMBODIMENTS FOR CARRYING OUT THE INVENTION

First, an outline of embodiments of the present invention is described. FIG. 1A is a flowchart showing an outline of a digital watermark embedding method in an embodiment of the present invention.

The digital watermark embedding method is a digital watermark embedding method for embedding embedding information, as digital watermark, into an input signal having dimensions equal to or greater than N (N is an integer equal to or greater than 2) such that it is imperceptible to human senses in a digital watermark embedding apparatus including embedding sequence generation means, array generation means, modulation means, storage means, and embedding pattern superimposing means. This method includes: an embedding sequence generation step (step 1) in which the embedding sequence generation means generates an embedding sequence based on the embedding information to store it in first storage means, an array generation step (step 2) in which the array generation means generates a N−1-dimensional pattern based on the embedding sequence in the first storage means, a modulation step (step 3) in which the modulation means modulates a periodic signal according to a value on the N−1-dimensional pattern to generate a N-dimensional embedding pattern and store it in a second storage means, and an embedding pattern superimposing step (step 4) in which the embedding pattern superimposing means obtains the N-dimensional embedding pattern stored in the second storage means to superimpose the embedding pattern on the input signal so as to embed it.

FIG. 1B is a flowchart showing an outline of a digital watermark detection method in an embodiment of the present invention. The digital watermark detection method is a digital watermark detection method for detecting digital watermark that is embedded into an input signal having dimensions equal to or greater than N such that it is imperceptible to human senses in a digital watermark detection apparatus including demodulation means, detection sequence extraction means, correlation value calculation means, and storage means.

This method includes: a demodulation step (step 11) in which the demodulation means measures a component of a predetermined periodic signal in a direction of a dimension in the input signal to obtain a N−1-dimensional pattern, a detection sequence extraction step (step 12) in which the detection sequence extraction means obtains a detection sequence from values of the N−1-dimensional pattern to store the detection sequence in storage means, and a correlation value calculation step (step 13) in which the correlation value calculation means detects the embedded digital watermark based on a size of a correlation value between the detection sequence stored in the storage means and an embedding sequence.

FIG. 2 is a diagram showing schematic configurations of a digital watermark embedding apparatus and a digital watermark detection apparatus in an embodiment of the present invention.

The digital watermark embedding apparatus of the present embodiment is a digital watermark embedding apparatus 100 for embedding embedding information, as digital watermark, into an input signal having dimensions equal to or greater than N (N is an integer equal to or greater than 2) such that it is imperceptible to human senses, including: embedding sequence generation means 111 configured to generate an embedding sequence based on the embedding information to store it in first storage means 102; array generation means 112 configured to generate a N−1-dimensional pattern based on the embedding sequence in the first storage means 102; modulation means 130 configured to modulate a periodic signal according to a value on the N−1-dimensional pattern to generate a N-dimensional embedding pattern and store it in second storage means 103; and embedding pattern superimposing means 140 configured to obtain the N-dimensional embedding pattern stored in the second storage means 103 to superimpose the embedding pattern on the input signal so as to embed it.

The digital watermark detection apparatus of the present embodiment is a digital watermark detection apparatus 200 for detecting digital watermark that is embedded into an input signal having dimensions equal to or greater than N such that it is imperceptible to human senses, including: demodulation means 210 configured to measure a component of a predetermined periodic signal in a direction of a dimension in the input signal to obtain a N−1-dimensional pattern; detection sequence extraction means 221 configured to obtain a detection sequence from values of the N−1-dimensional pattern to store the detection sequence in storage means 202; and correlation value calculation means 222 configured to detect the embedded digital watermark based on a size of a correlation value between the detection sequence stored in the storage means 250 and an embedding sequence.

In the following, embodiments of the present invention are described in detail with reference to figures.

In the following, first, basic concept that is a principle of the present invention and the examples are described, and after that, concrete embodiments of the digital watermark embedding apparatus, the digital watermark detection apparatus and the methods are described.

[Basic Concept]

First, a basic concept that is a principle of the present embodiment is shown in the following.

(1) Digital Watermarking Model Based on Complex Correlation:

In the following, correlation using type digital watermarking that uses a complex number sequence is shown.

By the way, it is needless to say that a part using a complex number in the present specification in the following can be replaced with a two-dimensional vector as a same concept.

Embedding) A signal sequence i that is a subject for embedding and a digital watermark sequence w are defined as follows.

$$i=\{i_1,i_2,\ldots i_L\}\in C^L \quad (1)$$

$$w=\{w_1,w_2,\ldots,w_L\}\in C^L \quad (2)$$

In the definitions, C is a set of the whole complex numbers, and w is a pseudo-random number sequence of an average 0.

An embedded signal sequence i' is obtained by embedding w into i.

$$i'=i+w \quad (3)$$

Detection) Considering i" in which the phase of i' is shifted by $\Delta\theta$ due to desynchronization, $$i''=i'e^{j\Delta\theta} \quad (4)$$

wherein j is the imaginary unit.

A correlation value between i" and w is calculated using the following equation to detect digital watermark, $$\rho=i''\cdot w^* \quad (5)$$

wherein "w*" is a number sequence including conjugate complex numbers of each element of w, "·" indicates inner product calculation in which the sequence is regarded as a vector. By the way, such correlation calculation between complex number sequences is called complex correlation.

$$\begin{aligned}\rho &= i''\cdot w^* \\ &= (i+w)e^{j\Delta\theta}\cdot w^* \\ &= e^{j\Delta\theta}(i\cdot w^* + w\cdot w^*) \\ &= e^{j\Delta\theta}\left(\sum_{k=1}^{L}i_k w_k^* + \sum_{k=1}^{L}w_k w_k^*\right)\end{aligned} \quad (6)$$

$$= e^{j\Delta\theta}\left(\sum_{k=1}^{L} i_k w_k^* + \sum_{k=1}^{L} |w_k|^2\right)$$

In the equation, "$w^*_k$" indicates a conjugate complex number of $w_k$.

When i and w are independent and when L is sufficiently large, an expected value of $\Sigma i_k w^*_k$ is 0, and $$\rho \sim \left(\sum_{k=1}^{L} |w_k|^2\right) e^{j\Delta\theta} \quad (7)$$

therefore,

Detection becomes available irrespective of the phase shift amount $\Delta\theta$ by obtaining an embedding value by which an absolute value of $\rho$ becomes maximum. That is, detection becomes possible without synchronization.

The phase shift amount $\Delta\theta$ can be calculated by obtaining the argument of $\rho$.

Following two selection methods can be considered for $w_k$.

1) For example, a case in which it is selected only from real numbers such as selecting a value from among $\{+1, -1\}$.

2) For example, a case in which it is selected such that it is distributed over the complex number space such as selecting a value from among following complex numbers.

$$\{\pm\sqrt{1/2} \pm j\sqrt{1/2}\}$$

In the case of 1), the phases of watermark pattern components w on the embedded signal sequence i' are aligned. In the case of 2), the phases are dispersed. In either case, the expected value of $\Sigma i_k w^*_k$ becomes 0 so that detection of digital watermark becomes possible. But, under a condition in which dispersion of $|w_k|$ is equalized to align energy of the digital watermark components, when 1) and 2) are compared, dispersion of $|\Sigma i_k w^*_k|$ in 2) becomes smaller. This means that effect of noise component provided by the signal sequence i of the embedding subject to the value of $\rho$ becomes small, so that detection of higher reliability becomes possible.

(2) Temporal Synchronization Unnecessary Digital Watermarking by Temporal Direction Single Frequency Embedding:

As an example of digital watermarking in which the phase is shifted by $\Delta\theta$ due to desynchronization, an example for performing embedding to a single frequency in temporal direction is shown.

More particularly, for example, an example for modulating a complex number pattern that is configured in the spatial direction of the video and embedding it into a single frequency in a temporal direction is shown.

Embedding) N-1-dimensional complex pattern P(x) is embedded into a N-dimensional signal sequence, wherein x is a vector representing a position in a N-1-dimensional space as follows.

$$x=(x_1, x_2, \ldots, x_{N-1}) \quad (8)$$

N-th dimension is regarded as a time axis, and a periodic complex function f(t) is prepared.
For example, $$f(t) = e^{j\omega t} \quad (9)$$
$$= \cos\omega t + j\sin\omega t$$

wherein j is the imaginary unit, $\omega$ is angular velocity representing the period of f(t).

N-dimensional real number signal W(x,t) is obtained in which the real part and the imaginary part of P(x) are AM modulated and combined by the real part and the imaginary part of f(t) respectively as follows, $$W(x, t) = \Re[P(x)]\cos\omega t + \Im[P(x)]\sin\omega t \quad (10)$$
$$= \Re[P(x) \times f^*(t)]$$
$$= \Re[P(x)e^{-j\omega t}]$$

wherein f*(t) is a complex function for obtaining a conjugate complex number of f(t).

Figure 3:
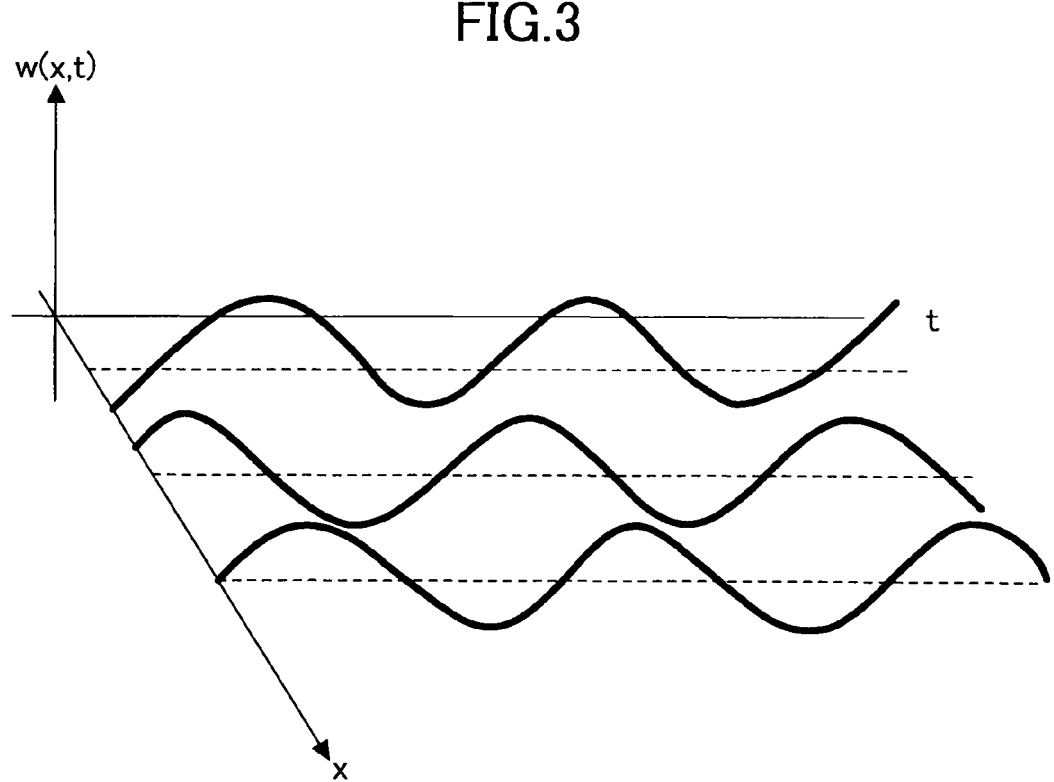
FIG. 3 is an example of an embedding signal after modulation when N=2.

FIG. 3 shows an example of W(x,t) when N=2. In the figure, the thick lines indicate the values of w(x,t) which is represented as a periodic signal, in the t axis direction, in which the phase is shifted for each position x.

By such modulation, phase and amplitude of f(t) are modulated by an argument and an absolute value of the complex number value of P(x).

By embedding W(x,t) into an embedding subject signal I(x,t) to obtain an embedded signal I'(x,t).

$$I'(x,t)=I(x,t)+W(x,t) \quad (11)$$

Detection) Considering a signal I''(x,t) in which I'(x,t) is shifted by $\Delta t$ due to desynchronization.

$$I''(x, t) = I'(x, t + \Delta t) \quad (12)$$
$$= I(x, t + \Delta t) + W(x, t + \Delta t)$$
$$= I(x, t + \Delta t) + \Re[P(x)e^{-j\omega(t+\Delta t)}]$$

For example, considering a video signal and the like, the amount of desynchronization in the temporal direction becomes constant normally even though positions in the space are different when re-taking by a video camera or analog transformation is performed. (When temporal direction desynchronization which is different in each spatial position is added as an attack to digital watermark, since image quality is remarkably deteriorated so that the value as video content is damaged, the desynchronization cannot be done as an attack) Therefore, it can be considered that the amount $\Delta t$ of desynchronization is constant irrespective of the position x as mentioned above.

In addition, for example, considering an image signal, when only translation of the image is added, although the position x of the lateral direction of the image signal is different, the amount of translation applied in the longitudinal direction becomes constant. Also in this case, it can be considered that the amount $\Delta t$ of desynchronization in the longitudinal direction (t direction) is constant irrespective of the position x in the lateral direction.

Now, the following integration is calculated for demodulating I''(x,t), provided in a section $0 \leq t \leq T$ (T is an integral multiple of the period of f(t)), by f(t).

$$Q(x) = \int_0^T I''(x,\tau) f^*(\tau) d\tau \qquad (13)$$

$$= \int_0^T I''(x,\tau) e^{-j\omega\tau} d\tau$$

$$= \int_0^T I(x, \tau + \Delta t) e^{-j\omega\tau} + R[P(x) e^{-j\omega(\tau+\Delta t)}] e^{-j\omega\tau} d\tau$$

$$= N(x, \Delta t) + \frac{T e^{j\omega\Delta t}}{2} P(x)$$

In the equation, $$N(x, \Delta t) = \int_0^T I(x, \tau + \Delta t) e^{-j\omega\tau} d\tau$$

and the following relationship is used.

$$\int_0^T R[(a+jb) e^{-j\omega(\tau+\Delta t)}] e^{-j\omega\tau} d\tau = \qquad (14)$$

$$\int_0^T \left( a \frac{e^{-j\omega(\tau+\Delta t)} + e^{j\omega(\tau+\Delta t)}}{2} + b \frac{e^{-j\omega(\tau+\Delta t)} - e^{j\omega(\tau+\Delta t)}}{2j} \right) e^{-j\omega\tau} d\tau =$$

$$\int_0^T a \frac{e^{-j\omega(2\tau+\Delta t)} + e^{j\omega\Delta t}}{2} + b \frac{e^{-j\omega(2\tau+\Delta t)} - e^{j\omega\Delta t}}{2j} d\tau =$$

$$e^{j\omega\Delta t} \int_0^T \frac{a}{2} - \frac{b}{2j} d\tau = \frac{T e^{j\omega\Delta t}}{2} (a+jb)$$

Thus, $$\int_0^T R[P(x) e^{-j\omega(\tau+\Delta t)}] e^{-j\omega\tau} d\tau = \frac{T e^{j\omega\Delta t}}{2} P(x) \qquad (15)$$

By the way, in this example, although an example is described for a case in which the signal I''(x,t) is obtained as a continuous signal, also when the signal I''(x,t) is obtained as a discrete signal, similar processing is available using product-sum operation instead of integration. That is, $$\sum_{\tau=0}^{T-1} R[(a+jb) e^{-j\omega(\tau+\Delta t)}] e^{-j\omega\tau} = e^{j\omega\Delta t} \sum_{\tau=0}^{T-1} \frac{a}{2} - \frac{b}{2j} \qquad (16)$$

$$= \frac{T e^{j\omega\Delta t}}{2} (a+jb)$$

thus, $$\sum_{\tau=0}^{T-1} R[P(x) e^{-j\omega(\tau+\Delta t)}] e^{-j\omega\tau} = \frac{T e^{j\omega\Delta t}}{2} P(x) \qquad (17)$$

$$Q(x) = \sum_{\tau=0}^{T-1} I''(x, \tau) f^*(\tau) \qquad (18)$$

$$= \sum_{\tau=0}^{T-1} I''(x, \tau) e^{-j\omega\tau}$$

$$= \sum_{\tau=0}^{T-1} I(x, \tau + \Delta t) e^{-j\omega\tau} + R[P(x) e^{-j\omega(\tau+\Delta t)}] e^{-j\omega\tau}$$

$$= N(x, \Delta t) + \frac{T e^{j\omega\Delta t}}{2} P(x)$$

$$N(x, \Delta t) = \sum_{\tau=0}^{T-1} I(x, \tau + \Delta t) e^{-j\omega\tau}$$

In the case when linear transform Trans and reverse transform Trans$^{-1}$ are defined between the watermark sequence $w\{w_1, \ldots, w_L\} \in C^L$ and P(x), when embedding digital watermark, P(x) is generated by $$P(x) = \text{Trans}(w) \qquad (19)$$

and, when detecting digital watermark, $$w' = \text{Trans}^{-1}(Q(x)) \qquad (20)$$

is calculated, so that $$w' = n + \frac{T e^{j\omega\Delta t}}{2} w \qquad (21)$$

is obtained, wherein $n = \text{Trans}^{-1}(N(x, \Delta t))$.

As examples of linear transform Trans, for example, it may be a transform for simply arranging each value of w on the N−1-dimensional space sequentially, or it may be a transform for performing orthogonal transform such as inverse Fourier transform and the like after arranging each value of w on the N−1-dimensional space sequentially.

By calculating complex correlation by applying arguments of preceding paragraphs, digital watermark detection and calculation of the amount $\Delta t$ of desynchronization are available from the following equation.

$$\rho = w' \cdot \omega^* \qquad (22)$$

$$= \left( n + \frac{T e^{j\omega\Delta t}}{2} \omega \right) \cdot \omega^*$$

$$\sim \left( \frac{T}{2} \sum_{k=1}^{L} |w_k|^2 \right) e^{j\omega\Delta t}$$

(3) Detection by Difference (Differentiation) Correlation

In the above-mentioned detection scheme, instead of the calculation for obtaining Q(x), demodulation may be performed using f(t) based on the difference or the differentiation of I''(x,t).

That is, when the signal is discrete, and assuming $\Delta I''(x,\tau) = I''(x,\tau+1) - I''(x,\tau)$, $$Q(x) = \sum_{\tau=0}^{T-1} \Delta I''(x, \tau) f^*(\tau) \qquad (23)$$

$$= \sum_{\tau=0}^{T-1} \{I''(x, \tau+1) - I''(x, \tau)\} f^*(\tau)$$

-continued $$= \left(N_1(x, \Delta t) + \frac{Te^{j\omega(\Delta t+1)}}{2}P(x)\right) -$$

$$\left(N_0(x, \Delta t) + \frac{Te^{j\omega\Delta t}}{2}P(x)\right)$$

$$= (N_1(x, \Delta t) - N_0(x, \Delta t)) + \frac{Te^{j\omega\Delta t}}{2}P(x)(e^{j\omega} - 1)$$

In the equation, $$N_0(x, \Delta t) = \sum_{\tau=0}^{T-1} I(x, \tau + \Delta t)e^{-j\omega\tau},$$

$$N_1(x, \Delta t) = \sum_{\tau=1}^{T} I(x, \tau + \Delta t)e^{-j\omega\tau}$$

and since $$e^{j\omega} - 1$$

is known, similar detection is available.

In addition, for example, when the signal is continuous, similar detection is available by similar calculation using differentiation $$\frac{dI''(x, \tau)}{d\tau}.$$

For example, when considering a video signal and the like, it is known that correlation between frames of the signal is large. Since the shorter the time interval between two frames is, the higher correlation between the frames is, when difference between frames is calculated as mentioned above, original image components are largely canceled by equal to or greater than the amount of cancellation by the periodic signal, and an absolute value of the term $N_1(x,\Delta t)-N_0(x,\Delta t)$ becomes very small, so that there is an advantage that energy of digital watermark relatively increases and detection becomes easy.

(4) Temporal Synchronization Unnecessary Digital Watermark When Using Arbitrary Periodic Signal:

Next, a case is considered in which arbitrary function f(t) is used as a periodic signal and digital watermark is embedded by changing the phase of the function. In this example, it is assumed that f(t) is a real function.

Embedding) A N-dimensional real number signal W(x,t) in which amplitude and phase of f(t) are modulated by the absolute value and the argument of P(x) is obtained.

For example, $$W(x,t)=|P(x)|f(t+s(x)) \quad (24)$$

is obtained. In this equation, $$s(x) = \frac{T}{2\pi}\text{Arg}[P(x)]$$

in which T is the period of f(t).

By embedding W(x,t) into a signal I(x,t) that is an embedding subject, an embedded signal I'(x,t) is obtained.

$$I'(x,t)=I(x,t)+W(x,t) \quad (25)$$

Detection) Considering a signal I''(x,t) in which I'(x,t) is shifted by $\Delta t$ due to desynchronization.

$$I''(x, t) = I'(x, t + \Delta t) \quad (26)$$

$$= I(x, t + \Delta t) + W(x, t + \Delta t)$$

$$= I(x, t + \Delta t) + |P(x)|f(t + \Delta t + s(x))$$

For I''(x,t) provided in a section $0 \leq t \leq T$, following integration is calculated for performing demodulation using f(t) and $f(t-\pi/4)$ in which phase of f(t) is displaced by $\pi/4$.

$$Q(x) = \int_0^T I''(x, \tau)\{f(\tau) + jf(\tau - \frac{\pi}{4})\}d\tau \quad (27)$$

$$= \int_0^T I(x, \tau + \Delta t)\{f(\tau) + jf(\tau - \frac{\pi}{4})\}$$

$$+ |P(x)|f(\tau + \Delta t + s(x))\{f(\tau) + jf(\tau - \frac{\pi}{4})\}d\tau$$

$$= N(x, \Delta t) + |P(x)|\int_0^T \{f(\tau + \Delta t + s(x))f(\tau) +$$

$$jf(\tau + \Delta t + s(x))f(\tau - \frac{\pi}{4})\}d\tau$$

In this equation, $$N(x, \Delta t) = \int_0^T I(x, \tau + \Delta t)\{f(\tau) + jf(\tau - \frac{\pi}{4})\}d\tau.$$

This integration calculation is similar to calculation for obtaining autocorrelation of f( ), and following representation can be obtained assuming that an autocorrelation function of f(t) is g(t).

$$\int_0^T f(\tau + \Delta t + s(x))f(\tau)d\tau = g(\Delta t + s(x)) \quad (28)$$

$$\int_0^T f(\tau + \Delta t + s(x))f(\tau - \frac{\pi}{4})d\tau = g(\Delta t + s(x) + \frac{\pi}{4}) \quad (29)$$

Now, assuming $$h(x, \Delta t) = g(\Delta t + s(x)) + jg(\Delta t + s(x) + \frac{\pi}{4}) \quad (30)$$

$$Q(x) = N(x, \Delta t) + |P(x)|h(x, \Delta t) \quad (31)$$

is obtained. In order to be able to perform digital watermark detection similar to the before-mentioned example using a sine wave, it is only necessary that argument $\text{Arg}[h(x,\Delta t)]$ of $h(x,\Delta t)$ is a value close to the phase of the embedded signal $$\frac{2\pi}{T}(\Delta t + s(x)).$$

That is, it is only necessary to use a function h such that $\Delta\psi$ becomes small enough in $$\text{Arg}[h(x, \Delta t)] = \frac{2\pi}{T}(\Delta t + s(x)) + \Delta\varphi \quad (32)$$

At this time, product operation in complex correlation is represented as follows.

$$|P(x)||h(x, \Delta t)|e^{j\frac{2\pi}{T}(\Delta t - s(x) + \Delta\varphi)}P*(x) = |P(x)|e^{j\frac{2\pi}{T}s(x)}P*(x)|h(x, \Delta t)|e^{j\frac{2\pi}{T}\Delta t + \Delta\varphi} \quad (33)$$

$$= |P(x)|^2|h(x, \Delta t)|e^{j\frac{2\pi}{T}\Delta t + \Delta\varphi}$$

A total sum of this is obtained as a complex correlation value, and it can be obtained within a range of an error according to the amount $\Delta t$ of desynchronization and $\Delta\psi$ from the argument of the complex correlation value.

In the calculation, $$P*(x) = |P(x)|e^{j\frac{2\pi}{T}s(x)}$$

is used. In addition, for the sake of easy understanding, an example was shown in which linear transform Trans is omitted and correlation operation is directly performed by P(x).

The above discussions indicate that $\Delta\psi=0$ holds true when the periodic signal is the sine wave, and on the other hand, $\Delta\psi\neq0$ holds true when the periodic signal is other than the sine wave, which means that error occurs in measurement of the amount $\Delta t$ of desynchronization.

(5) Examples of Periodic Signals

As the periodic signal, it is only necessary to use a periodic function having following characteristics.

1) Result of integrating the periodic function for one period becomes 0.

2) Autocorrelation function does not have a sharp peak.

The condition of 1) may be expressed as follows, for example.

$$\int_0^T f(t)dt = 0 \quad (34)$$

In the equation, T is a period of the periodic function.

As the condition of 2), a condition "a value of second-order derivative in the vicinity of the vertex of the autocorrelation function does not agree with a sign of the vertex".

Figure 4A:
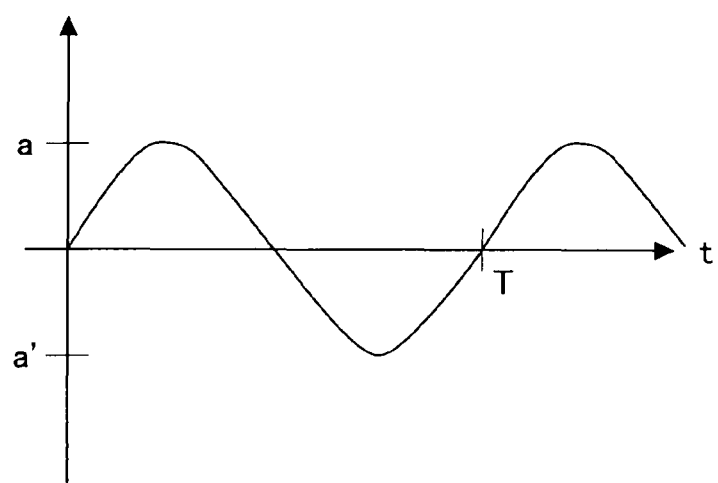
FIG. 4A is a configuration example 1 of a periodic signal.
Figure 4B:
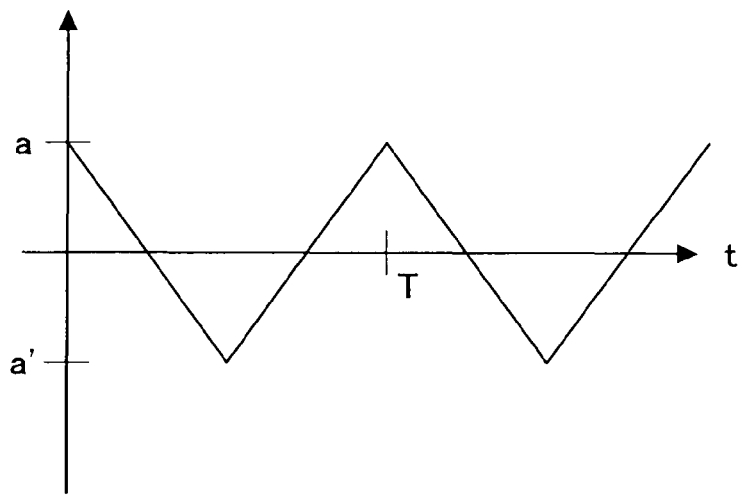
FIG. 4B is a configuration example 2 of a periodic signal.
Figure 4C:
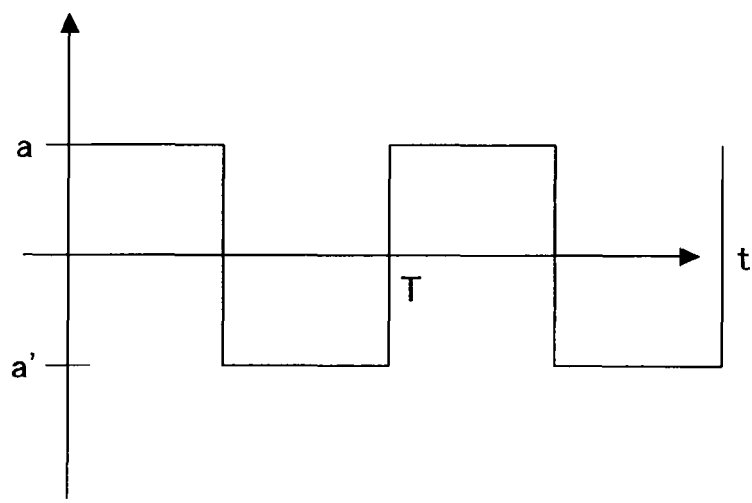
FIG. 4C is a configuration example 3 of a periodic signal.

FIGS. 4A-C show examples of periodic signals. The periodic signals shown in the figures are (FIG. 4A) (a) sine wave, (FIG. 4B) (b) triangular wave, and (FIG. 4c) (c) rectangular wave, and each signal can be represented by equations as follows in a range of $0 \leq t < T$ (T is a period of the signal). By the way, the periodic signal is not limited to these examples, and it is needless to say that any periodic signal having the above-mentioned characteristics can be used.

$$y = a\sin\omega t \quad (a)$$

$$y = \begin{cases} -\frac{4a}{T}t + a & \left(0 \leq t < \frac{T}{2}\right) \\ \frac{4a}{T}t - 3a & \left(\frac{T}{2} \leq t < T\right) \end{cases} \quad (b)$$

$$y = \begin{cases} a & \left(0 \leq t < \frac{T}{2}\right) \\ -a & \left(\frac{T}{2} \leq t < T\right) \end{cases} \quad (c)$$

The condition of 1) indicates that direct current component of t direction of I"(x,t) can be canceled as a result of integration when detection.

Meaning of the condition of 2) is described as follows.

Figure 5A:
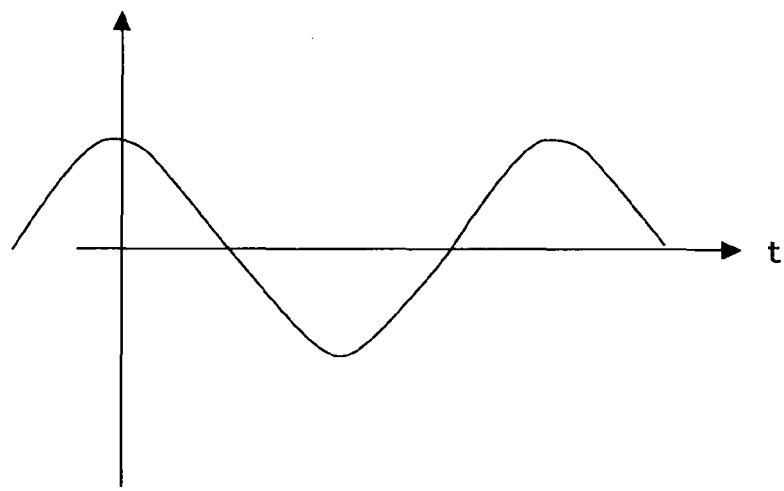
FIG. 5A is an example 1 of autocorrelation function of a periodic signal.
Figure 5B:
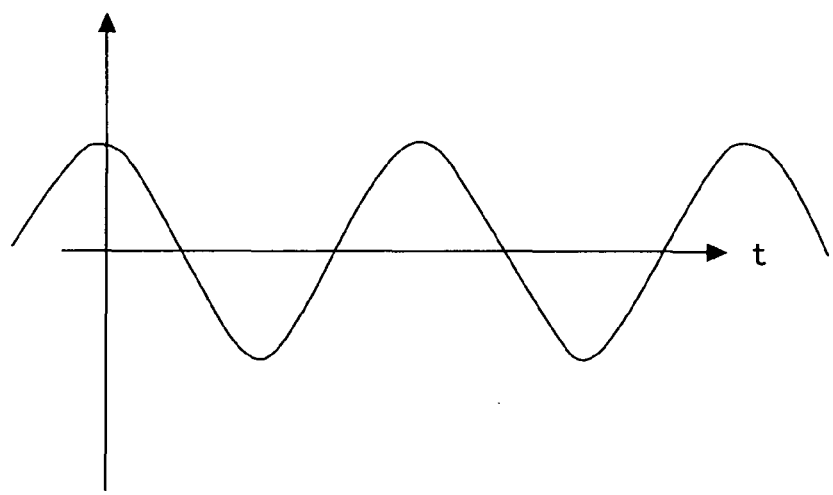
FIG. 5B is an example 2 of autocorrelation function of a periodic signal.
Figure 5C:
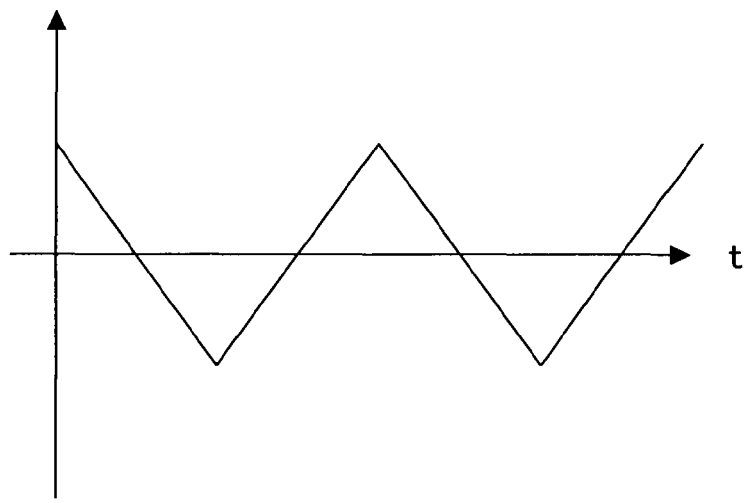
FIG. 5C is an example 3 of autocorrelation function of a periodic signal.
Figure 6A:
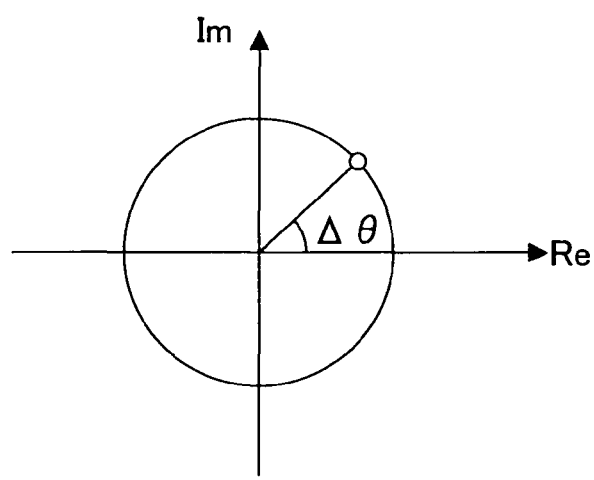
FIG. 6A is a locus 1 of a function h0 corresponding to a periodic signal on a complex plane.
Figure 6B:
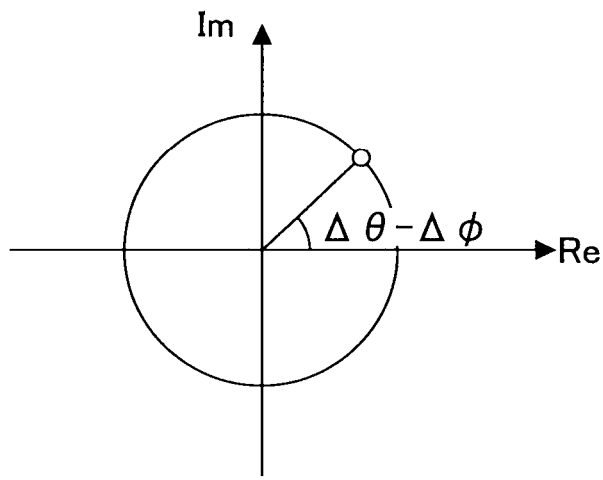
FIG. 6B is a locus 2 of a function h0 corresponding to a periodic signal on a complex plane.
Figure 6C:
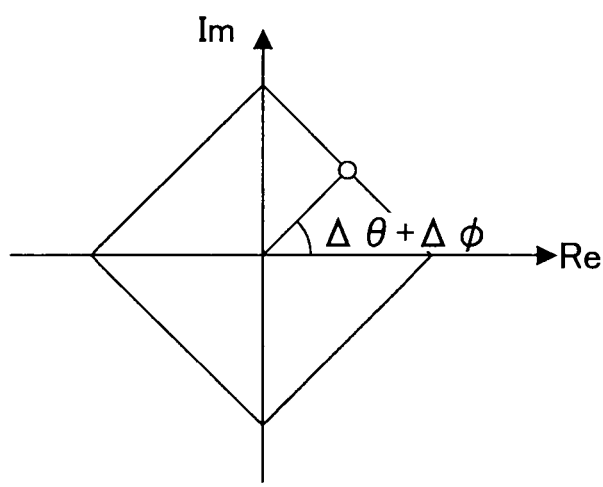
FIG. 6C is a locus 3 of a function h0 corresponding to a periodic signal on a complex plane.

FIGS. 5A-C shows autocorrelation functions of each periodic signal of FIGS. 4A-C. In addition, FIGS. 6A-C show locus of the complex function h( ) on the complex plane for each periodic signal.

(FIG. 5A, FIG. 6A) In the example of sine wave, the autocorrelation function changes smoothly, so that the locus of h( ) becomes a circle. In this case, $\Delta\omega=0$ holds true, and this means that the amount $\Delta t$ of desynchronization can be obtained with high accuracy.

(FIG. 5B, FIG. 6B) In the example of triangular wave, autocorrelation function change smoothly in the same way, and the value of second-order derivative in the vicinity of the vertex is different from the sign of the vertex (a value of second-order derivative in the vicinity of the vertex whose sing is plus is minus and the signs are not the same), and it is an autocorrelation function that does not have a sharp peak. As a result, the locus of h( ) becomes almost the same as a circle, and $\Delta\psi$ becomes small enough, so that it means that the amount $\Delta t$ of desynchronization can be obtained with high accuracy.

(FIG. 5C, FIG. 6C) In the example of the rectangular wave, although the autocorrelation function is not smooth, the value of second-order derivative in the vicinity of the vertex is different from the sign of the vertex (the value of the second-order derivative in the vicinity of the vertex whose sign is plus is 0, so the signs are not the same). Thus, the autocorrelation function has no sharp peak in the same way. As a result, the locus of h( ) does not becomes a circle, but becomes a rhombus, and $\Delta\psi$ becomes a relatively small value, which means that the amount $\Delta t$ of desynchronization can be obtained with high accuracy to some extent.

Generally, since calculation for the value of the rectangular wave or the triangular wave can be performed at higher speed compared with the calculation for the value of the sine wave, high speed digital watermark detection becomes possible as a whole at the sacrifice of some error of the amount of desynchronization by using a periodic function, instead of the sine wave, that satisfies the above conditions such as the triangular wave and the rectangular wave. For example, it is especially effective when performing digital watermark detection using very limited computational resources like digital watermark detection using a portable terminal such as a cellular phone, and when high speed processing is required in the case of performing large amount of digital watermark detection.

(6) Temporal Synchronization Unnecessary Digital Watermark Detection when Using Orthogonal Two Periodic Functions:

Next, a case is considered in which two orthogonal periodic functions $f_1(t)$ and $f_2(t)$ having a same basic frequency are used as the periodic signal.

This case corresponds to a case in which $f(t)=f_1(t)+jf_2(t)$ is used as the periodic complex function $f(t)$ in the above-mentioned description of temporal synchronization unnecessary digital watermark based on temporal direction single frequency embedding.

Figure 7A:
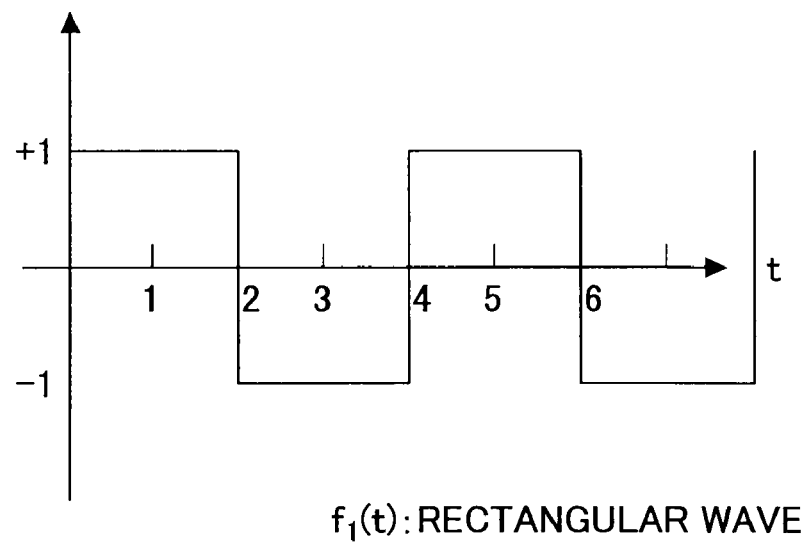
FIG. 7A is an example 1 of two periodic signals that are orthogonal.

For example, assuming that $f_1(t)$ is a rectangular wave of period 4 and $f_2(t)$ is a triangular wave of period 4, and that they are defined as signals shown in FIGS. 7A and B, respectively.

At this time, each of $f_1(t)$ and $f_2(t)$ has a basic frequency ¼, and integration for one period is as follows, $$\int_0^T f_1(t)f_2(t)dt=0 \tag{35}$$

which indicates they are orthogonal, wherein T is a signal period, and it is T=4 in this example.

In this case, for example, when $P(x_0)=1+0_j$ for $x=x_0$, corresponding $W(x_0,t)$ becomes the same as $f_1(t)$ in FIG. 7A.

Figure 8A:
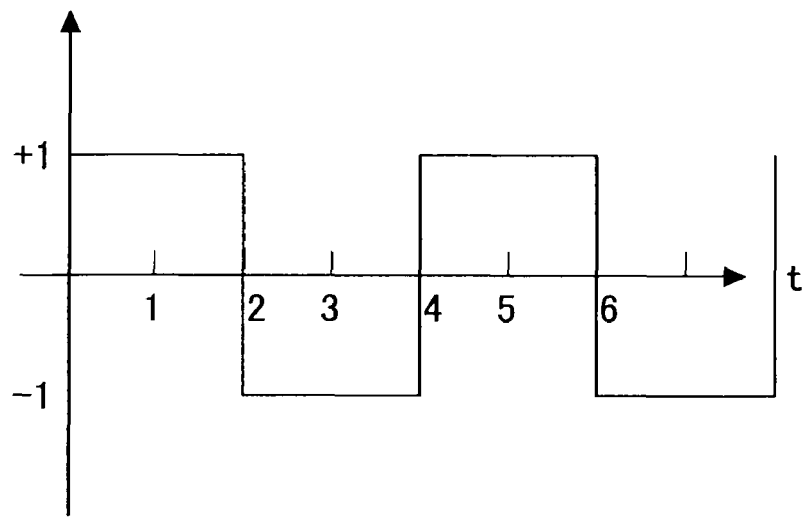
FIG. 8A is an example 1 of a signal after being desynchronized.

When there is no desynchronization, a signal $G_1(t)$ shown in FIG. 8A which is described by removing original image components is obtained when performing detection. As a result of correlation calculation between this and $f_1(t)$, $f_2(t)$, $$\int_0^T G_1(t)f_1(t)dt=4 \tag{36}$$

$$\int_0^T G_1(t)f_2(t)dt=0 \tag{37}$$

hold true, and $Q(x_0)=4+0_j$.

Figure 8B:
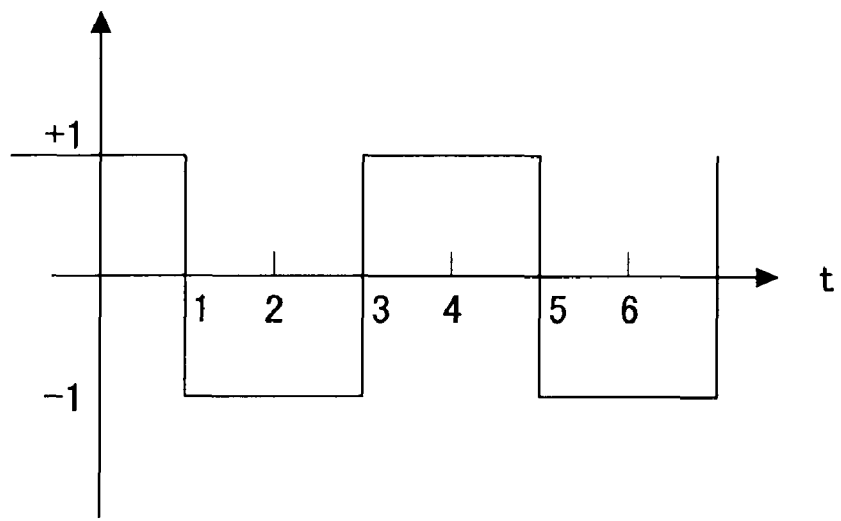
FIG. 8B is an example 2 of a signal after being desynchronized.

When the phase is shifted by 90 degrees due to desynchronization, a signal $G_2(t)$ shown in FIG. 8B which is described by removing original image components is obtained when performing detection. As a result of correlation calculation between this and $f_1(t)$, $f_2(t)$, $$\int_0^T G_2(t)f_1(t)dt = 0 \tag{38}$$

$$\int_0^T G_2(t)f_2(t)dt = \frac{4}{3} \tag{39}$$

are obtained, and $$Q(x_0) = 0 + \frac{4}{3}j$$

is obtained.

Similarly considering, according to the size of desynchronization, $Q(x_0)$ changes following a locus 1 on the complex plane shown in FIG. 9.

Figure 7B:
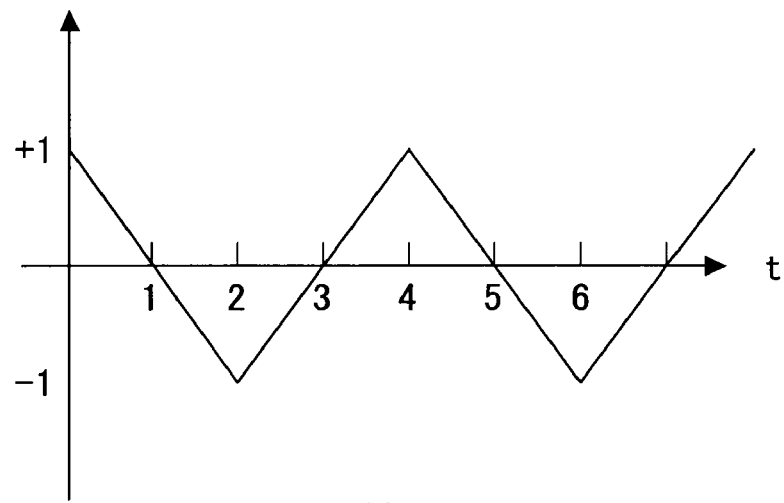
FIG. 7B is an example 2 of two periodic signals that are orthogonal.

In addition, for example, when $P(x_1)=0+1_j$ for $x=x_1$, corresponding $W(x_1,t)$ becomes the same as $f_2(t)$ shown in FIG. 7B. And, based on the similar consideration, according to the size of desynchronization, $Q(x_1)$ changes following a locus 2 on the complex plane shown in FIG. 9.

The argument of Q(x) can be obtained by calculation similar to before-mentioned calculation of the complex correlation value, and the amount Δt of desynchronization can be obtained, from the argument of the complex correlation value, within a range of error determined by calculation.

As mentioned above, also when using orthogonal two periodic functions $f_1(t)$ and $f_2(t)$ having a same basic frequency as the periodic function, the amount of desynchronization can be obtained as a whole at the sacrifice of some error.

First Embodiment

Figure 10:
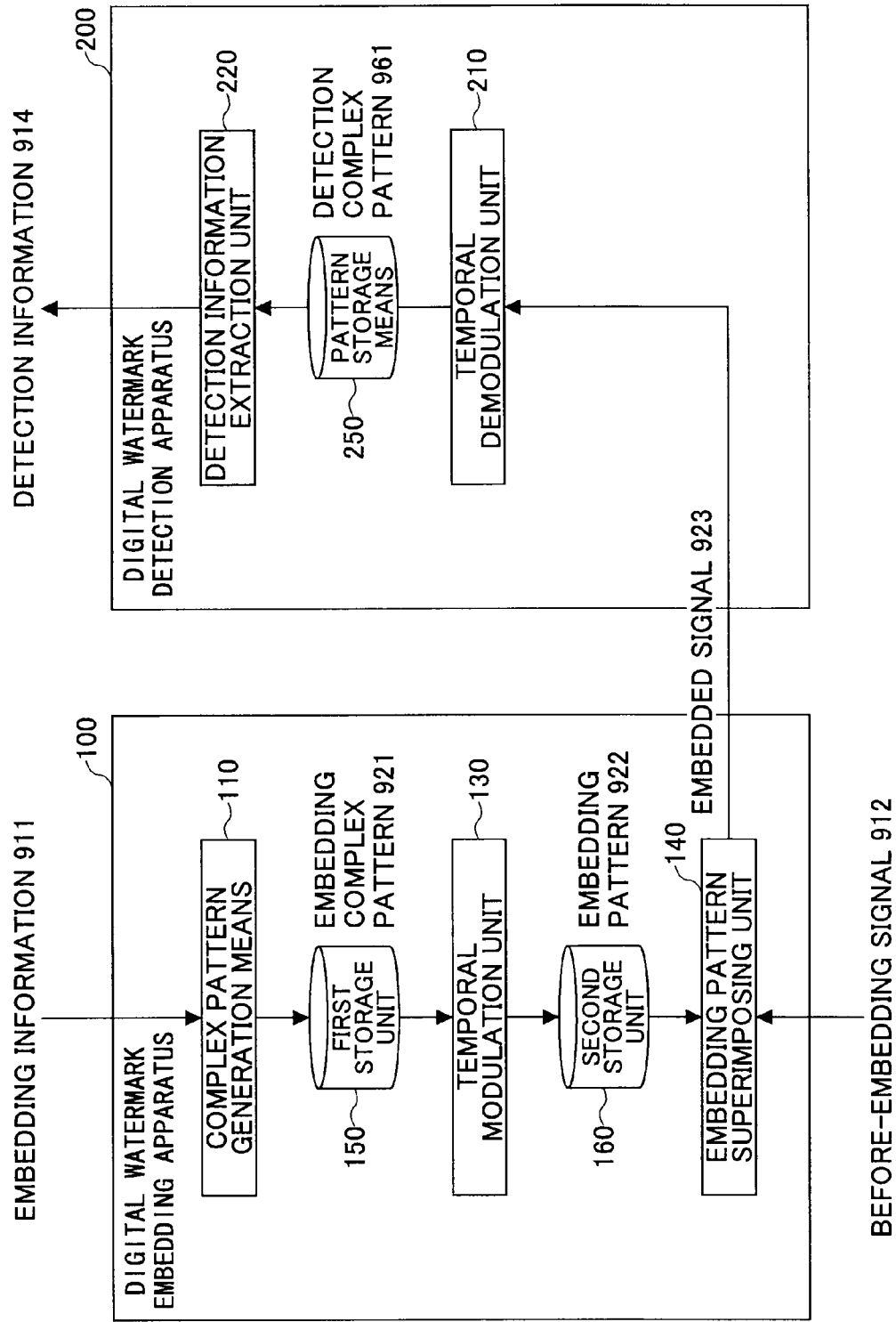
FIG. 10 shows configuration examples of a digital watermark embedding apparatus and a digital watermark detection apparatus according to a first embodiment of the present invention.

FIG. 10 shows configurations of a digital watermark embedding apparatus and a digital watermark detection apparatus according to a first embodiment of the present invention.

<Digital Watermark Embedding Apparatus>

First, the digital watermark embedding apparatus is described.

The digital watermark embedding apparatus 100 includes a complex pattern generation unit 110, a temporal modulation unit 130, an embedding pattern superimposing unit 140, a first storage unit 150, and a second storage unit, and the apparatus receives embedding information 911 and before-embedding signal 912, and outputs embedded signal 923.

In the following, operation of the digital watermark embedding apparatus 100 is described.

Figure 11:
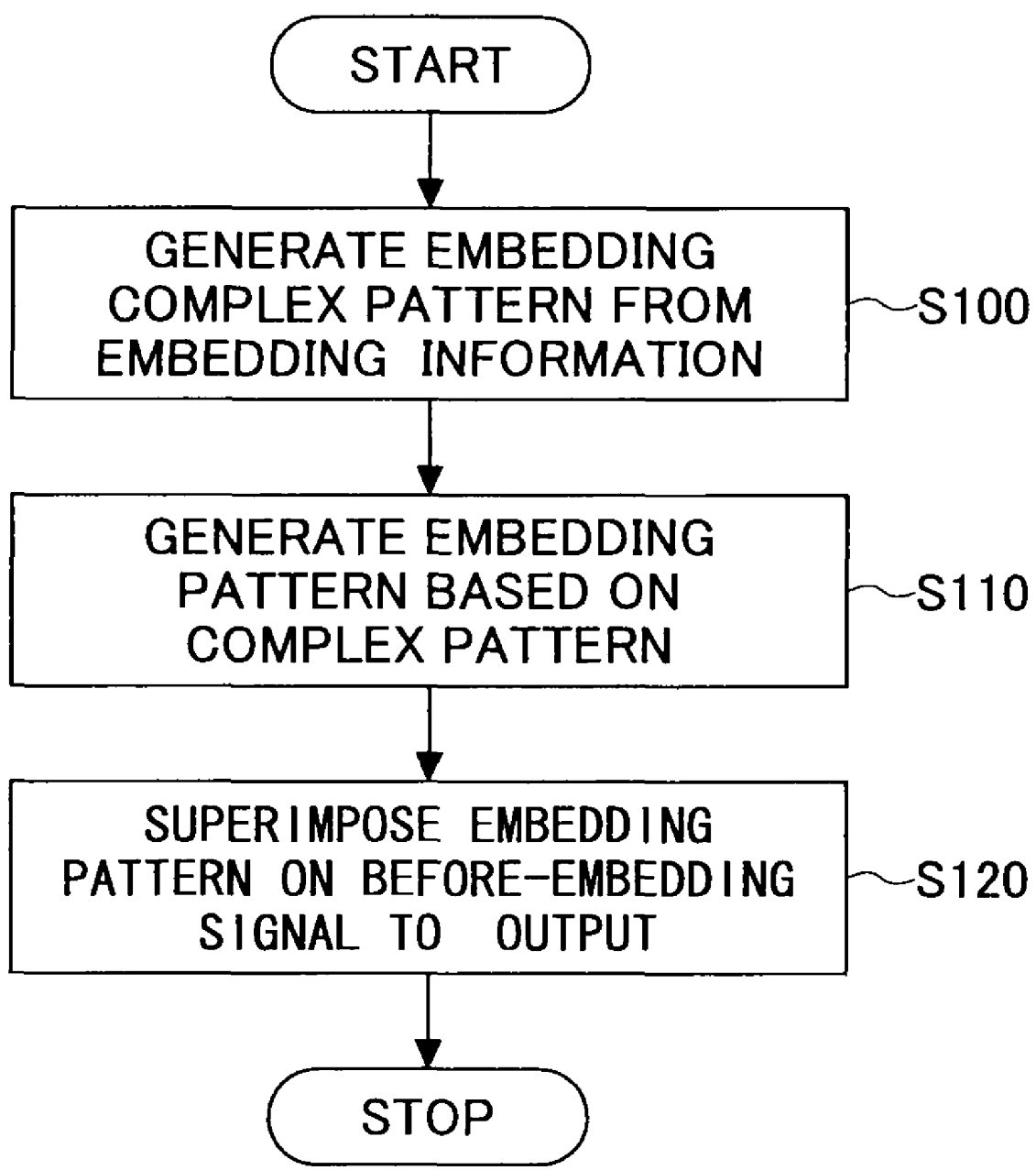
FIG. 11 is a flowchart showing operation of the digital watermark embedding apparatus according to a first embodiment of the present invention.

FIG. 11 is a flowchart showing operation of the digital watermark embedding apparatus according to a first embodiment of the present invention. Digital watermark embedding processing by the digital watermark embedding apparatus 100 is performed by the following procedure.

Step 100) The complex pattern generation unit 110 generates an embedding complex pattern 921 based on received embedding information 911, and stores it into the first storage unit 150 such as a memory.

The embedding complex pattern 921 is a N−1-dimensional pattern composed of complex numbers, and represents content of embedding information. Details of operation of the complex pattern generation unit 110 are described later with reference to FIG. 12.

By the way, as shown in after-mentioned other method for embedding into complex numbers, it is possible to configure the N−1-dimensional pattern as a pattern of real number values depending on processing of the temporal modulation unit 130.

Step 110) The temporal modulation unit 130 generates an embedding pattern 922 based on the embedding complex pattern that is generated by the complex pattern generation unit 110 and is stored in the first storage unit 150, and stores the embedding patter 922 into the second storage unit 160 such as a memory. The embedding pattern 922 is generated as N-dimensional pattern, that is configured by real number values, by performing modulation in time axis direction on the embedding complex pattern 921.

Details of operation of the temporal modulation unit 130 is described later.

Step 120) The embedding pattern superimposing unit 140 superimposes the embedding pattern 922, that is generated by the temporal modulation unit 130 and that is stored in the second storage unit 160, on the input before-embedding signal 912, and outputs an embedded signal 923.

Details of operation of the embedding pattern superimposing unit 140 are described later.

<Digital Watermark Embedding Apparatus—Complex Pattern Generation Unit>

Figure 12:
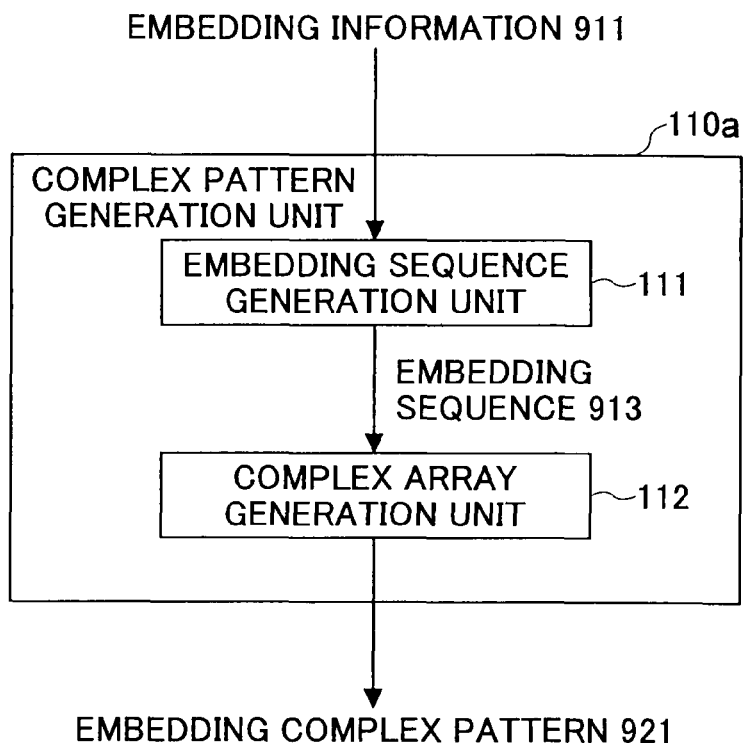
FIG. 12 is a configuration example of a complex pattern generation unit according to a first embodiment of the present invention.

FIG. 12 shows a configuration example of the complex pattern generation unit of the first embodiment of the present invention.

The complex pattern generation unit 110a includes an embedding sequence generation unit 111 and a complex array generation unit 112, and the unit receives the embedding information 911 and outputs the embedding complex pattern 921.

Processing of generation of the embedding complex pattern by the complex pattern generation unit 110a is performed by the following procedure.

Figure 13:
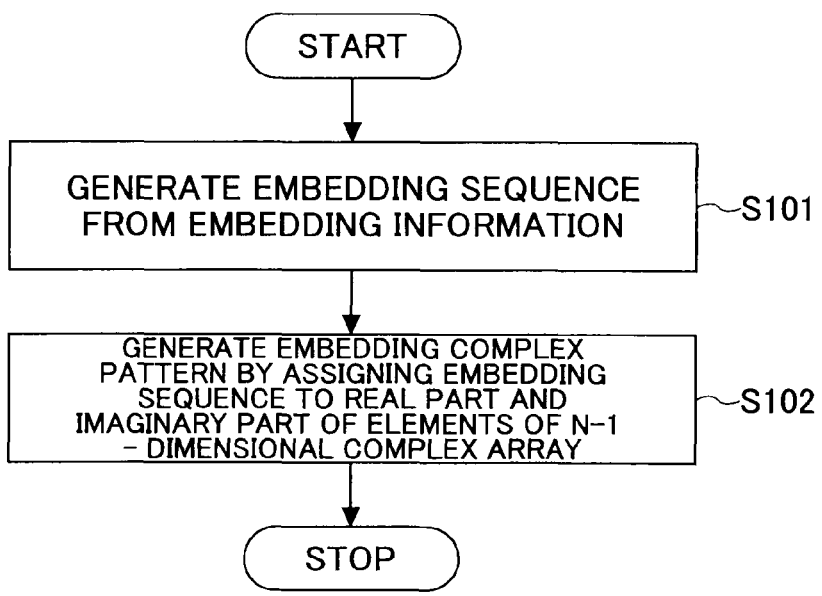
FIG. 13 is a flowchart showing processes of the complex pattern generation unit of the first embodiment of the present invention.

FIG. 13 is a flowchart showing processes of the complex pattern generation unit of the first embodiment of the present invention.

Step 101) The embedding sequence generation unit 111 generates an embedding sequence 913 that is a sequence of numbers indicating embedding information based on received embedding information 911. Details of operation of the embedding sequence generation unit 111 are described later.

Step 102) The complex array generation unit 112 assigns the embedding sequence 913 generated by the embedding sequence generation unit 111 to a real part and an imaginary part of each elements of a N−1-dimensional complex array to generate the embedding complex pattern 921 and stores it to the first storage unit 150. Details of the complex array generation unit 112 are described later.

<Digital Watermark Embedding Apparatus—Embedding Sequence Generation Unit>

The embedding sequence generation unit 111 generates the embedding sequence 913 according to the following processes.

Generation of the embedding sequence 913 can be performed by a method similar to a configuration method for an embedding sequence shown in the patent document 1, —Takao Nakamura, Hiroshi Ogawa, Atsuki Tomioka, Youichi Takashima, "An Improvement of Watermark Robustness against. Moving and/or cropping the area of the Image", The 1999 Symposium on Cryptography and Information Security, SCIS99-W3-2.1, pp. 193-198, 1999—, or —Takao Nakamura, Atsushi Katayama, Masashi Yamamuro, Noboru Sonehara, "Fast Watermark Detection Scheme from Analog Image for Camera-equipped Cellular Phone", IEICE Transactions D-II, Vol. j87-D-II, No. 12, pp. 2145-2155, 2004—.

In the following, as an example of embedding information 911,

An example indicating only a fact that digital watermark is embedded;
An example of information of 1 bit;
A first example of information of n bits;
A second example of information of n bits;

are described. By the way, the method is not limited to these examples, and other methods for generating embedding sequence may be used.

Example 1

When the embedding information 911 indicates only a fact that "digital watermark is embedded", the embedding sequence 913 may be calculated as a number sequence represented using a pseudo-random number sequence. That is, assuming that a pseudo-random number sequence of average 0 is $PN=\{PN_1, PN_2, \ldots, PN_L\}$ (L indicates a length of the sequence), the embedding sequence $w=\{w_1, w_2, \ldots, w_L\}$ may be determined as $$w = PN = \{PN_1, PN_2, \ldots, PN_L\} \quad (40).$$

In addition, as the pseudo-random number sequence, M sequences or GOLD sequences may be used.

Example 2

When the embedding information 911 is information of 1 bit, the embedding sequence 913 may be calculated as a number sequence obtained by performing spectrum spreading on the information of 1 bit using a pseudo-random number sequence. That is, assuming that the embedding information is b and that the pseudo-random number sequence is $PN=\{PN_1, PN_2, \ldots, PN_L\}$ (L is a length of the sequence), the embedding sequence $w=\{w_1, w_2, \ldots, w_L\}$ may be determined as follows.

$$w = \begin{cases} PN = \{PN_1, PN_2, \ldots, PN_L\} & (\text{if } b = 1) \\ -PN = \{-PN_1, -PN_2, \ldots, -PN_L\} & (\text{if } b = 0) \end{cases} \quad (41)$$

In addition, as the pseudo-random number sequence, M sequences or GOLD sequences may be used, for example.

Example 3

When the embedding information 911 is information composed of n bits, the embedding sequence 913 may be calculated by multiplexing number sequences obtained by performing spectrum spreading by using the pseudo-random sequence on each symbol that is obtained by dividing information of n bits into groups of m bits, for example. That is, following procedure may be performed.

Figure 14:
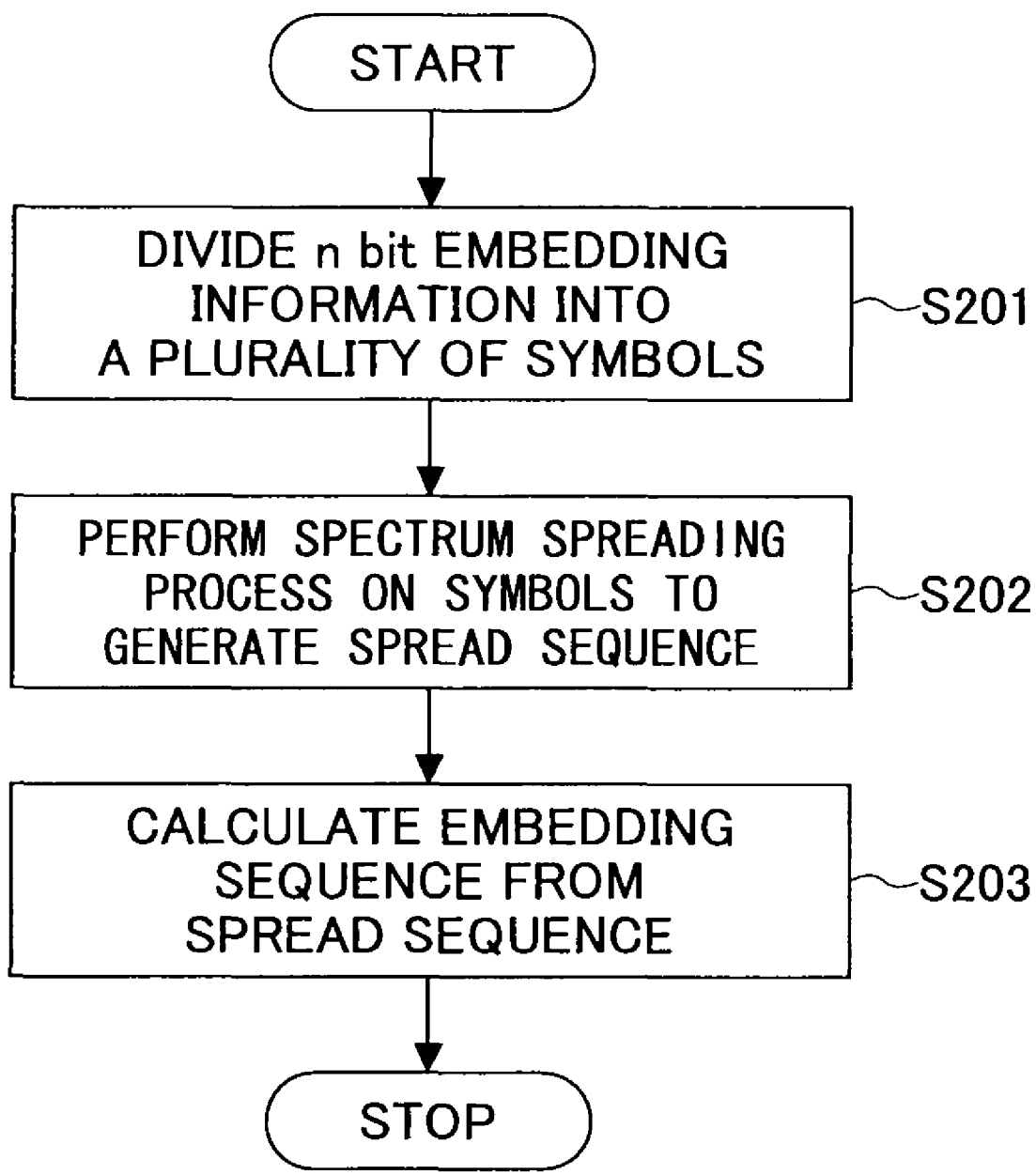
FIG. 14 is a flowchart of detailed operation of an embedding sequence generation unit in the first embodiment of the present invention.

FIG. 14 is a flowchart of detailed operation of the embedding sequence generation unit of the first embodiment of the present invention.

Step 201) The embedding information 911 of n bits are divided into a plurality of symbols $S_1, S_2, \ldots, S_k$. Every symbol may be the same m bits, or each symbol may represent information of different number of bits.

Figure 15:
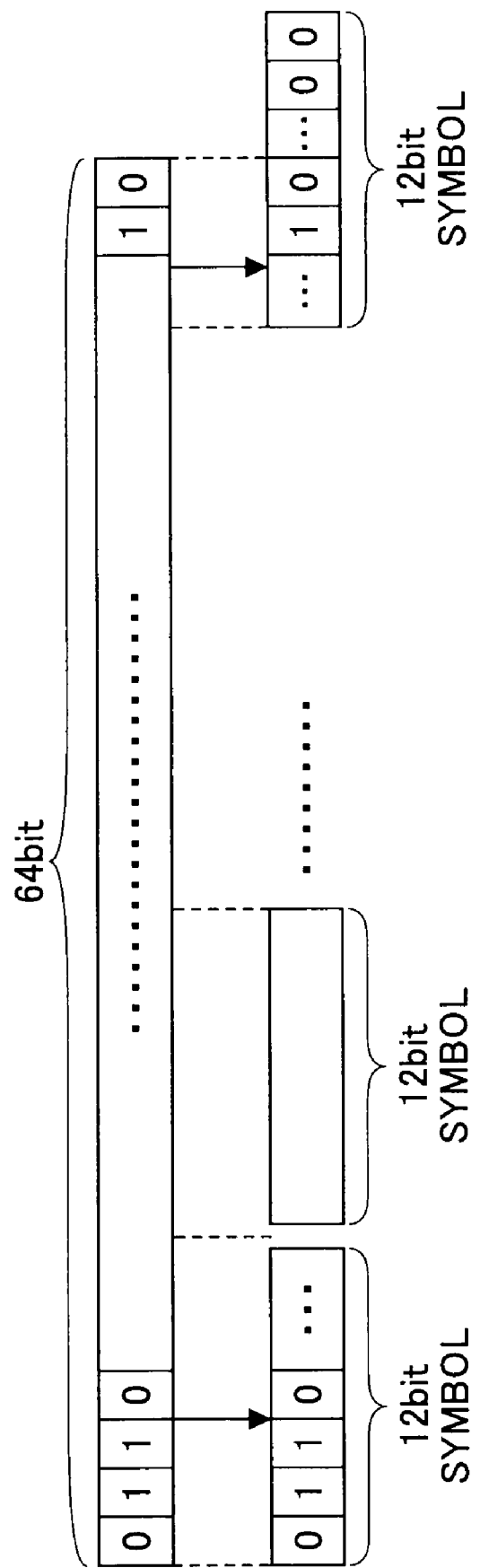
FIG. 15 is a configuration example of symbols in the first embodiment of the present invention.

In this process, each "symbol" represents a part of embedding information, and is information that is a unit for actual digital watermark processing. For example, when the embedding information 911 is provided as a binary number of 64 bits length, it may be divided into pieces of information each having 12 bits so that each of 12 bits information may be the symbol as shown in FIG. 15. Alternatively, one symbol may represents information of 1 bit. Like the example shown in FIG. 15, when the length of the embedding information 911 (64 bits in this example) cannot be divided by the length (12 bits) of each symbol, a part of bits in a part (last symbol in this example) of symbols may be padded with fixed values (0 in this example).

Step 202) Spectrum spreading is performed on each symbol obtained in step 201 to generate a spread sequence $P_1, \ldots, P_k$ corresponding to each symbol.

As a method for spectrum spreading, there is a following method, for example.

For example, when one symbol represents information of 1 bit, k PN sequences $PN_1=(pn_{11}, pn_{12}, \ldots,), \ldots PN_k=(pn_{k1}, pn_{k2}, \ldots)$ each having a value of $\{1, -1\}$ are generated for each symbol $S_1, \ldots, S_k$, and when the value of the symbol for symbol i represents bit 1, $PN_i$ may be used as the spread sequence $P_i$, and when the value of the symbol represents bit 0, $-PN_i$ may be used as the spread sequence $P_i$.

In addition, when one symbol represents information of 12 bits, 4096 PN sequences $PN_{(1, 0)}, \ldots, PN_{(1, 4095)}, PN_{(2, 0)}, \ldots, PN_{(k, 4095)}$ may be prepared for each symbol, and when the value of symbol i indicates an integer value x by the 12 bits, $PN_{(i,x)}$ may be used as spread sequence $P_i$.

In addition, as PN sequence (pseudo-random number sequence), M sequences or GOLD sequences may be used.

Step 203) The embedding sequence w is calculated from the spread sequence $P_i$ as follows.

$$w = \frac{1}{\sqrt{L}} \sum_{i=1}^{k} P_i \quad (42)$$

For example, in the latter example in step 202, w is represented as follows.

$$w = \left\{ \frac{1}{\sqrt{L}} \sum_{i=1}^{k} PN_{(1,S_i)}, \frac{1}{\sqrt{L}} \sum_{i=1}^{k} PN_{(2,S_i)}, \ldots, \frac{1}{\sqrt{L}} \sum_{i=1}^{k} PN_{(L,S_i)} \right\} \quad (43)$$

In the above equation, the reason for using $$\frac{1}{\sqrt{L}}$$

for multiplication is that a standard deviation of each element of the sequence becomes 1, but, it is not necessary to multiply $$\frac{1}{\sqrt{L}}$$

when embedding strength is properly controlled in calculations after that.

Example 4

When the embedding information 911 is information configured by n bits, the embedding sequence 913 may be calculated by directory performing spectrum spreading using the pseudo-random number into three times length of the n bits information. That is, the calculation may be performed based on the following procedure.

1) Assuming that n bits embedding information 911 is $b_0$, $b_1, b_2, \ldots, b_n$, a sequence S is obtained by repeating each bit m times, wherein each bit $b_i$ is a value of +1 or −1.

$$S = \underbrace{b_0 b_0 \ldots b_0}_{m} \underbrace{b_1 b_1 \ldots b_1}_{m} \underbrace{b_2 b_2 \ldots b_2}_{m} b_3 \ldots \underbrace{b_{n-1} b_n b_n \ldots b_n}_{m} \quad (44)$$

2) S is spread using a pseudo-random number sequence $PN = \{PN_1, PN_2, \ldots, PN_{mn}\}$ having $\{+1, -1\}$ to obtain the embedding sequence w. That is, when $w = \{w_1, w_2, \ldots, W_{mn}\}$, $$w_1 = b_0 PN_1 b_0 PN_2 \ldots b_0 PN_m \quad (45)$$

(representing that first bit is $b_0 \times PN_1$, second bit is $b_0 \times PN_1 \ldots$, and so forth)

$$w_2 = b_1 PN_{m+1} b_1 PN_{m+2} \ldots b_1 PN_{2m}$$

.

$$w_{mn} = b_n PN_{(m-1)n+1} b_n PN_{(m-1)n+2} \ldots b_n PN_{mn}$$

Such a method for generating the embedding sequence is also described in Takao Nakamura, Atsushi Katayama, Masashi Yamamuro, Noboru Sonehara, "Fast Watermark Detection Scheme from Analog Image for Camera-equipped Cellular Phone", IEICE Transactions D-II, Vol. j87-D-II, No. 12, pp. 2145-2155, 2004.

<Digital Watermark Embedding Apparatus—Complex Array Generation Unit>

The complex array generation unit 112 in the embedding complex pattern generation unit 110a generates a complex pattern 921 by the following processes.

Operation of the complex array generation unit 112 of the complex pattern generation unit 110a is shown in the following.

Figure 16:
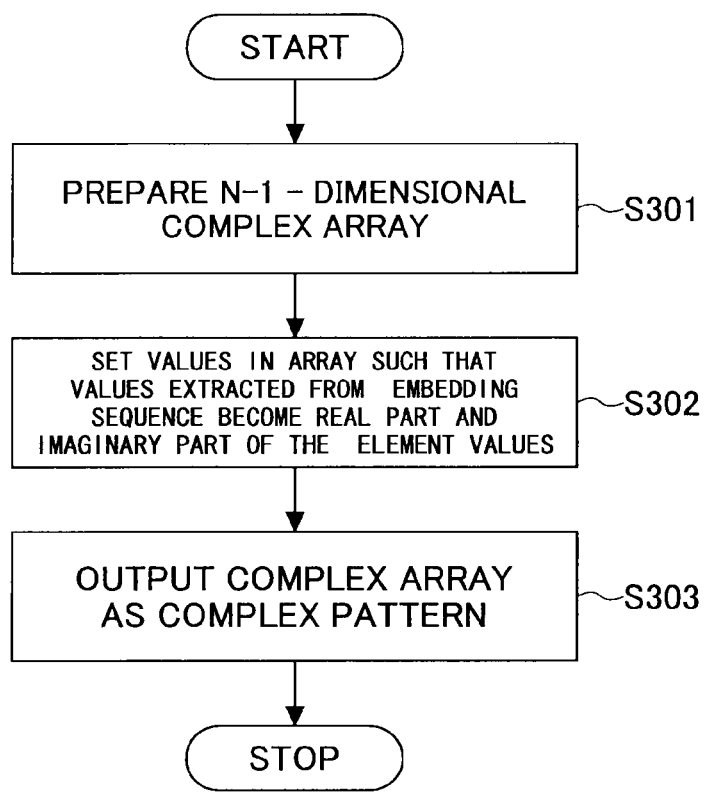
FIG. 16 is a flowchart of operation of a complex array generation unit in the first embodiment of the present invention.

FIG. 16 is a flowchart of the operation of the complex array generation unit in the first embodiment of the present invention.

Step 301) N−1-dimensional complex array, having a size $M_1 \times M_2 \times \ldots M_{N-1}$, in which every element value is 0 is prepared, wherein $M_1, M_2, \ldots, M_{N-1}$ are predetermined element numbers.

Step 302) Values are extracted from the embedding sequence 913 two by two in sequence, then, from a position $(0, 0, \ldots, 0)$ of the array prepared in step 301 in sequence, the extracted values are set in the array such that the extracted values become the real part and the imaginary part of the element value. That is, when the complex array is represented as $A[p_1, p_2, \ldots, p_{N-1}]$ $(p_n \geq 0)$ and the embedding sequence 913 is represented as $w_1, w_2, \ldots, w_L$, $$A[0,0,\ldots,0] = w_1 + j w_2$$

$$A[1,0,\ldots,0] = w_3 + j w_4 \quad (46)$$

wherein j represents the imaginary unit.

Figure 17:
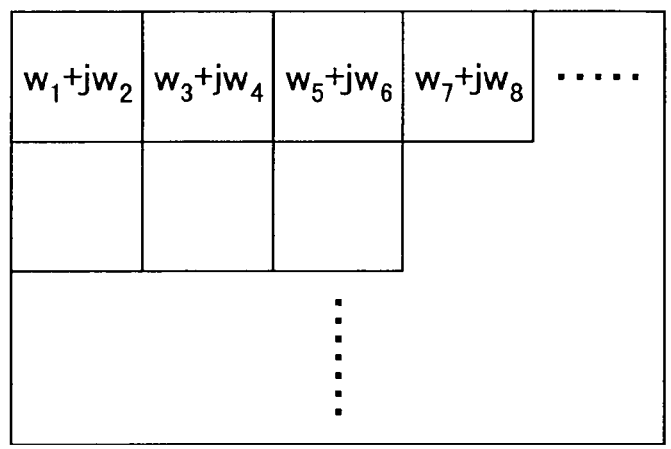
FIG. 17 is a configuration example of a complex array in the first embodiment of the present invention.

FIG. 17 shows this manner. FIG. 17 shows an example of two dimensional complex array.

Step 303) The complex array generated in step 302 is output as the embedding complex pattern 921.

Accordingly, by generating the N−1-dimensional embedding complex pattern 921 as a complex array based on the embedding sequence 913 that is generated using pseudo-random number sequence, each element value of the embedding complex pattern 921 is determined such that it extends over the complex number space. As a result, phases in the embedding pattern 922 that is obtained as a result of after mentioned temporal modulation are spread such that they are different according to positions on the N−1-dimensional space, so that the size of nose components that appear due to the before-embedding signal 912 when detecting digital watermark becomes smaller.

In addition, before performing the procedure of step 302, order of the embedding sequence 913 may be permuted to random order using a pseudo-random number. By doing this, attacks such as invalid analysis of embedded information and rewriting become difficult, and in addition to that, it has effects as interleave coding, which contributes to preventing locally imbalance of robustness. In that case, a value of a seed of the pseudo-random number that is used for permuting the order is provided as a key for digital watermark embedding, so that the same key is used for digital watermark detection.

In addition, instead of permuting the order on the embedding sequence 913, elements of the complex array obtained in step 302 may be permuted.

<Digital Watermark Embedding Apparatus—Temporal Modulation Unit>

In the following, operation of the temporal modulation unit 130 is described in detail.

Figure 18:
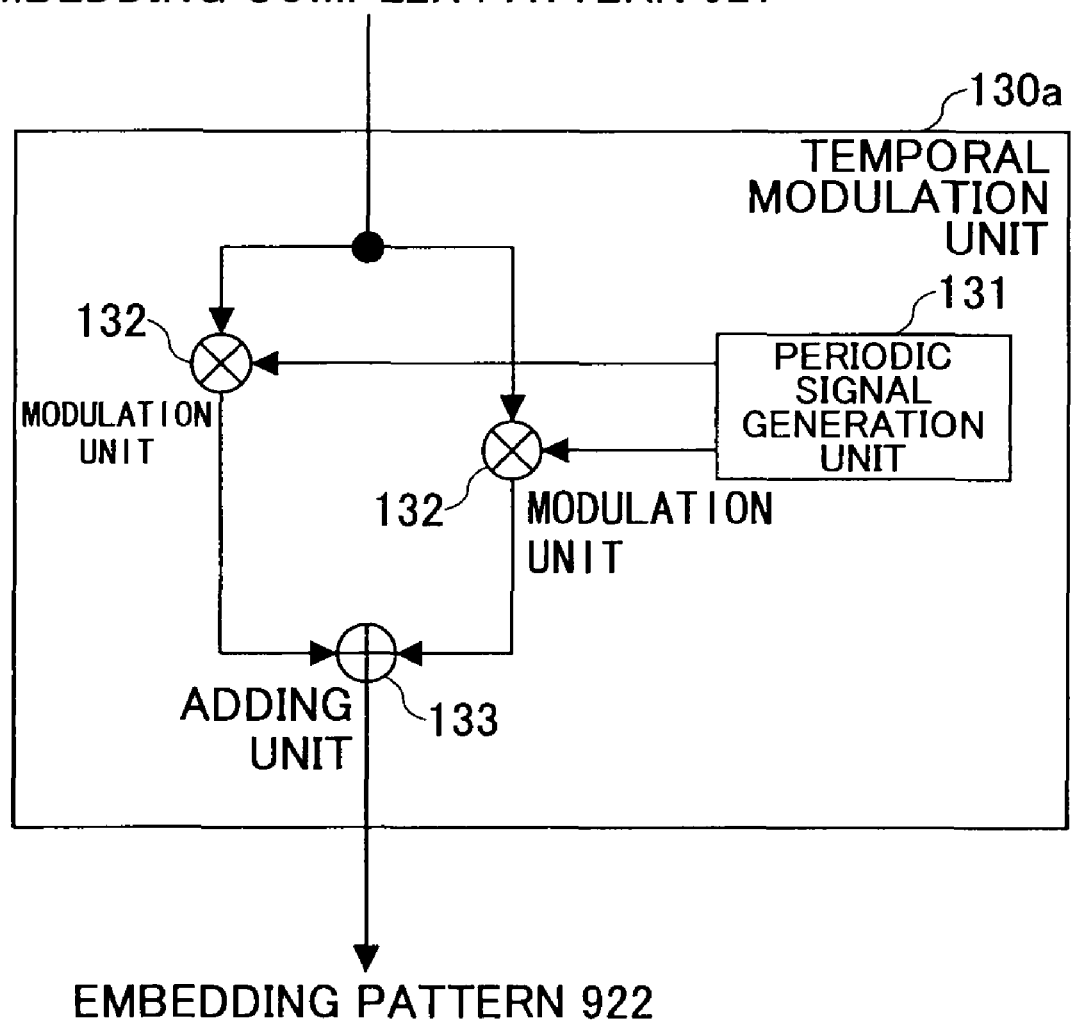
FIG. 18 is a configuration example of a temporal modulation unit in the first embodiment of the present invention.

FIG. 18 is a configuration example of the temporal modulation unit in the first embodiment of the present invention.

A temporal modulation unit 130a includes a periodic signal generation unit 131, modulation units 132, and an adding unit 133, and it receives an embedding complex pattern 921 and outputs an embedding pattern 922.

Processes for generating the embedding pattern 922 by the temporal modulation unit 130a are performed according to the following procedure.

Figure 19:
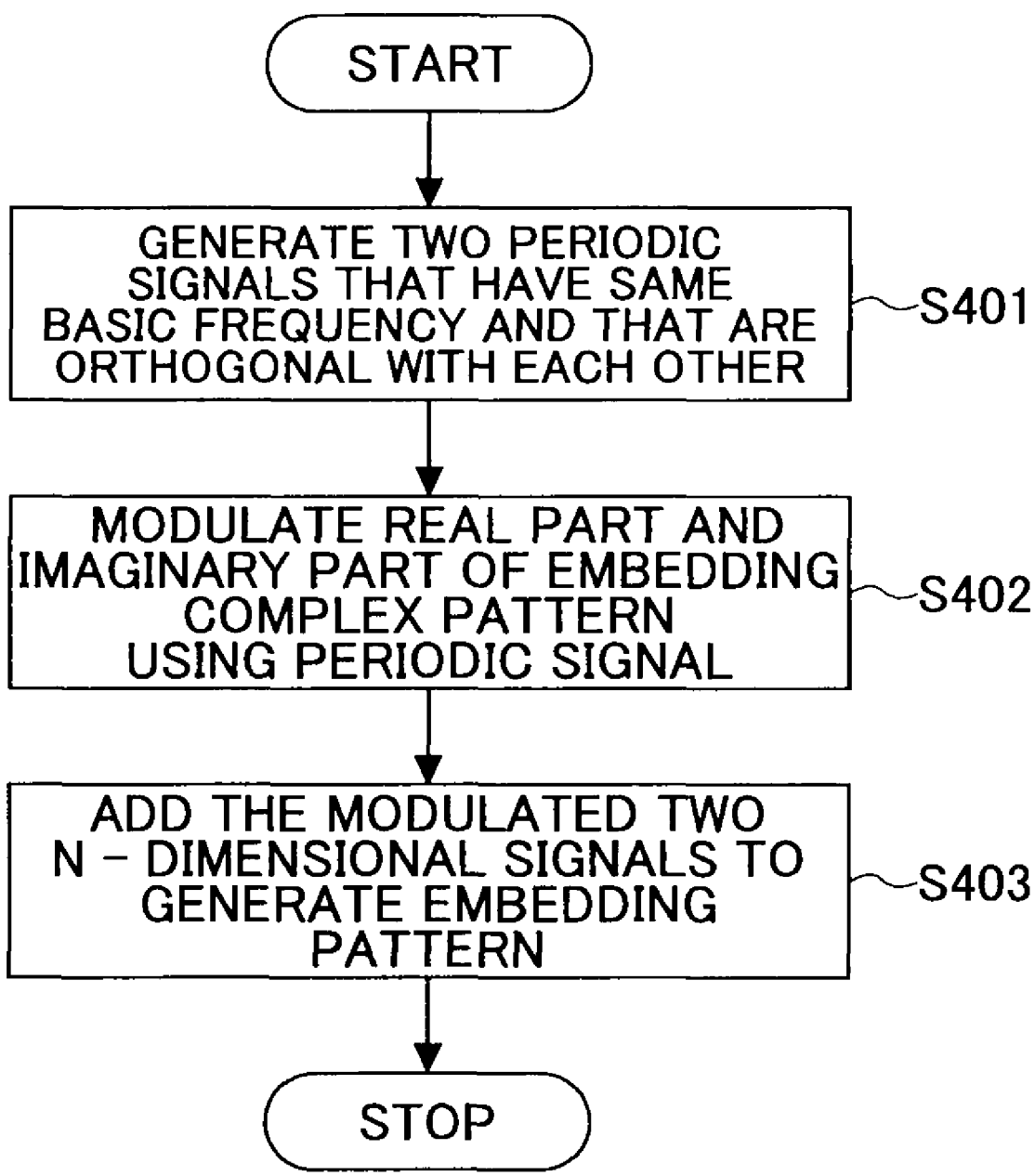
FIG. 19 is a flowchart of operation of the temporal modulation unit in the first embodiment of the present invention.

FIG. 19 is a flowchart of operation of the temporal modulation unit in the first embodiment of the present invention.

Step 401) The periodic signal generation unit 131 generates two periodic signals that have the same basic frequency and that are orthogonal. For example, two periodic signals may be generated based on one periodic signal such that the periods are different by 90 degrees, that is, ¼ period. Examples of periodic signals to be generated are described later.

Step 402) The modulation units 132 modulates each of the real part and the imaginary part of the received embedding complex pattern 921 in the temporal direction using the two periodic signals generated in step 401. Concrete examples for modulation are described later.

Step 403) The adding unit 133 adds the two N-dimensional signals modulated in the modulation units 132 to obtain the embedding pattern 922 and stores it into the second storage unit 160.

Examples of the periodic signals generated in step 401 are described.

The periodic signal generated by the periodic signal generation unit 131 is (FIG. 4A) (a) sine wave, (FIG. 4B) (b) triangular wave, or (FIG. 4C) (C) rectangular wave, and each signal is represented by an equation in a range of $0 \leq t < T$ (T is a period of the signal) as follows.

$$y = a\sin\omega t \quad (a)$$

$$y = \begin{cases} -\frac{4a}{T}t + a & \left(0 \leq t < \frac{T}{2}\right) \\ \frac{4a}{T}t - 3a & \left(\frac{T}{2} \leq t < T\right) \end{cases} \quad (b)$$

$$y = \begin{cases} a & \left(0 \leq t < \frac{T}{2}\right) \\ -a & \left(\frac{T}{2} \leq t < T\right) \end{cases} \quad (c)$$

Details of the periodic signals were as described before.

Next, modulation in the modulation unit 132 is performed by performing AM modulation on the periodic signals, as carriers, generated by the periodic signal generation unit 131 using the values of the real part and the imaginary part of the value of each position of the N−1-dimensional complex pattern 921 so that the periodic signals are converted to N-dimensional pattern.

That is, more specifically, following processes are performed, for example.

Assuming that N−1 dimensional complex pattern is represented as $P(x_1, x_2, \ldots, x_{N-1})$. When the real part and the imaginary part are represented as $P_r$ and $P_i$ respectively, and the pattern is represented as $$P(x_1, x_2, \ldots, x_{N-1}) = P_r(x_1, x_2, \ldots, x_{N-1}) + j \cdot P_i(x_1, x_2, \ldots, x_{N-1}) \quad (47)$$

wherein j is the imaginary unit.

Assuming that two periodic signals $f_r(t)$ and $f_i(t)$ are generated by the periodic signal generation unit 131. In this example, it is assumed that $f_r$ and $f_i$ are generated from a same periodic signal such that the phase is different by 90 degrees, as shown in $$f_i(t) = f_r(t - T/4) \quad (48),$$

wherein T is a period of the periodic signal.

N-dimensional patterns $W_r$ and $W_i$ are obtained by modulating $P_r$ and $P_i$ using $f_r(t)$ and $f_i(t)$ respectively as shown in the following equation.

$$W_r(x_1, x_2, \ldots, x_{N-1}, t) = P_r(x_1, x_2, \ldots, x_{N-1}) \times f_r(t) \quad (49)$$

$$W_i(x_1, x_2, \ldots, x_{N-1}, t) = P_i(x_1, x_2, \ldots, x_{N-1}) \times f_i(t) \quad (50)$$

In step 403, these $W_r$ and $W_i$ are added so that following N-dimensional signal w is obtained as the embedding pattern 922.

$$W(x_1, x_2, \ldots, x_{N-1}, t) = W_r(x_1, x_2, \ldots, x_{N-1}, t) + W_i(x_1, x_2, \ldots, x_{N-1}, t) \quad (51)$$

In the following, an example is shown in which a sine wave is used as the periodic signal for an video signal of N=3.

Assuming that, $$f_r(t) = \cos \omega t \quad (52)$$

$$f_i(t) = \sin \omega t \quad (53)$$

$$W(x, y, t) = P_r(x, y)\cos \omega t + P_i(x, y)\sin \omega t \quad (54)$$

is obtained, wherein ω is angular velocity for the period T, that is, $\omega = 2\pi/T$.

It is needless to say that these calculations can be performed as follows using a complex function $f(t) = e^{j\omega t} = \cos \omega t + j \sin \omega t$.

$$W(x, y, t) = \Re[P(x, y) \times f^{(*)}(t)] = \Re[P(x, y)e^{-e\omega t}] \quad (55)$$

In the equation, $f^{(*)}(t)$ is a conjugate complex number of f(t), and $$\Re[C]$$

is calculation for extracting the real part of C.

<Digital Watermark Embedding Apparatus—Embedding Pattern Superimposing Unit>

In the following, operation of the embedding pattern superimposing unit 140 is described in detail.

The embedding pattern superimposing unit 140 adds the N-dimensional embedding pattern 922 that is generated by the temporal modulation unit 130a and that is stored in the second storage unit 160 to the N-dimensional signal received as the before-embedding signal 912 so as to superimpose the N-dimensional embedding pattern 922 on the N-dimensional signal, and outputs the N-dimensional signal that is a result of the superimposing as an embedded signal 923.

Embedding strength) When adding the embedding pattern 922, it may be embedded by being strengthened using a predetermined strength parameter a. That is, assuming that N-dimensional before-embedding signal 912 is $I(x_1, x_2, \ldots, x_{N-1}, t)$ and that the embedding pattern 922 is $W(x_1, x_2, \ldots, x_{-1}, t)$, the embedded signal 923 $I'(x_1, x_2, \ldots, x_{N-1}, t)$ is obtained by $$I'(x_1, x_2, \ldots, x_{N-1}, t) = I(x_1, x_2, \ldots, x_{N-1}, t) + \alpha \cdot W(x_1, x_2, \ldots, x_{N-1}, t) \quad (56).$$

The strength parameter α maybe configured so as to change according to characteristics amount calculated from the whole of the before-embedding signal 912 or from a part that is a subject for calculation in the before-embedding signal 912. For example, when the before-embedding signal 912 is the video signal, it may be configured such that embedding is performed strongly (that is, such that α is a large value) for a part, in which the added embedding pattern is hardly prominent, such as a texture region or heavy movement region in a frame image, and such that embedding is performed weekly (that is, such that α is a small value) for a part, in which the added embedding pattern becomes prominent, such as a flat region or a slow and even movement region in a frame image.

Repetition of embedding pattern) When superimposing the embedding pattern, when the size of the before-embedding signal 912 is greater than the size of the embedding pattern 922, the embedding pattern 922 may be added by repeating it.

Following are examples of the case in which the size of the before-embedding signal 912 is greater than the size of the embedding pattern 922.

Figure 20:
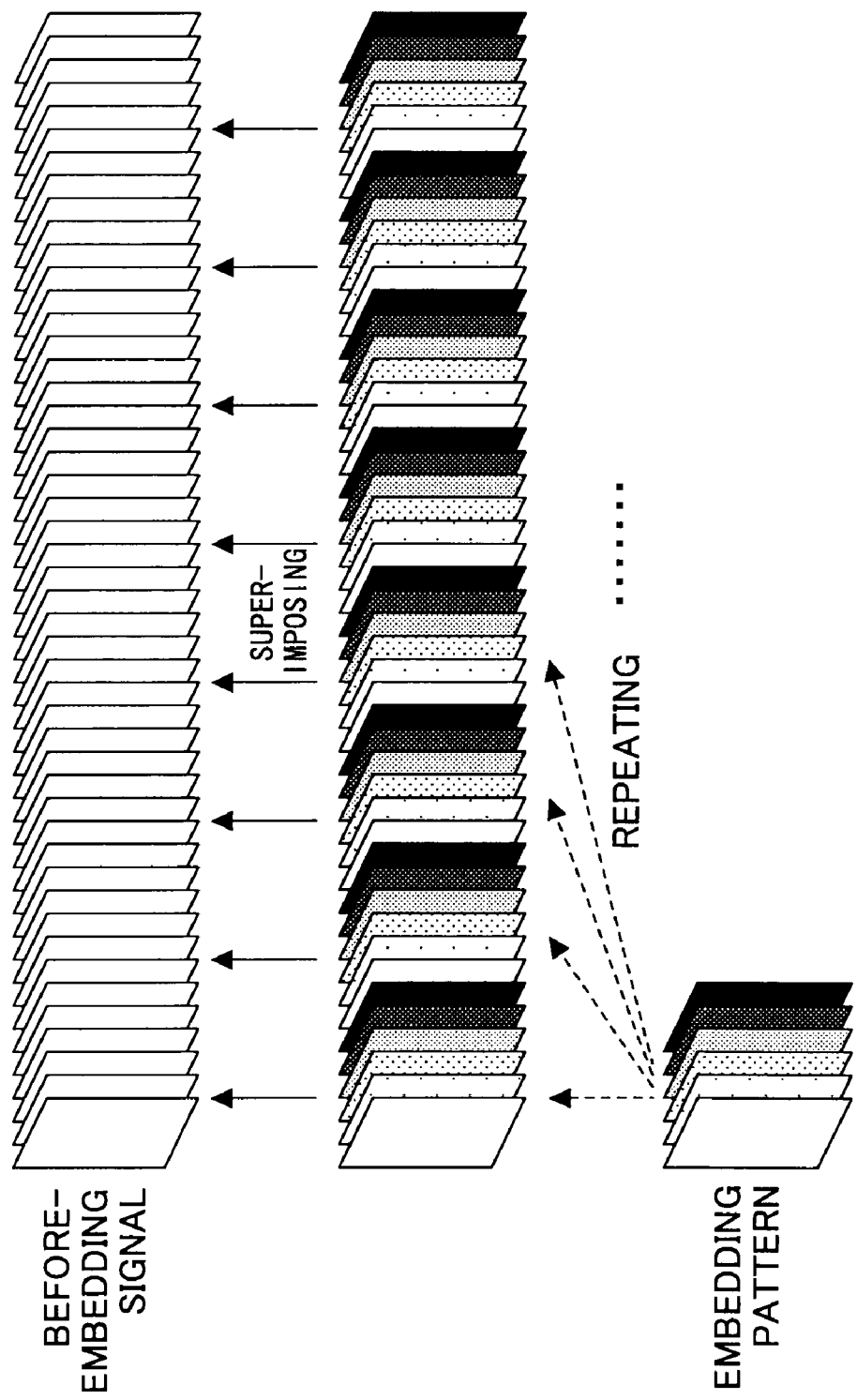
FIG. 20 is an example for repeatedly embedding an embedding pattern in a time direction in the first embodiment of the present invention.

1) When the before-embedding signal 912 is a video signal, when the length (number of frames) of the before-embedding signal 912 in the time direction is longer than the time length of the embedding pattern, the embedding pattern 922 may be repeated a plurality of times as shown in FIG. 20.

2) When the before-embedding signal 912 is a video signal, when the size of the frame image (angle of view) of the before-embedding signal 912 is greater than the size of the frame image (angle of view) of the embedding pattern 922, the embedding pattern 922 may be added such that it is paved like tiles vertically and horizontally as shown in FIG. 21.

Figure 22:
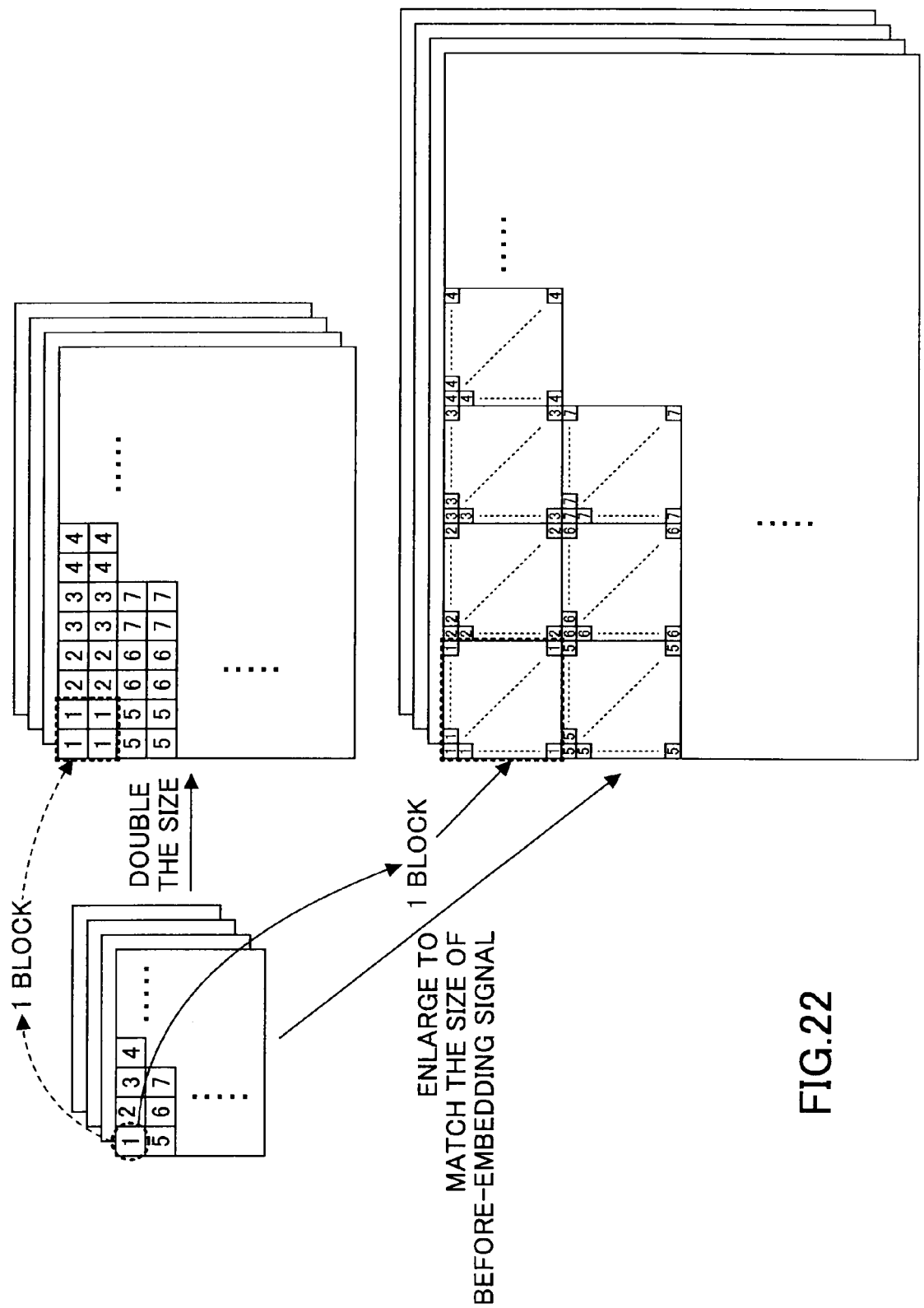
FIG. 22 is an example for superimposing an embedding pattern by enlarging it in the first embodiment of the present invention.

Enlargement of embedding pattern) In addition, before superimposing the embedding pattern, the embedding pattern 922 may be enlarged into an arbitrary size, or enlarged such that the size becomes equal to the size of the before-embedding signal 912. FIG. 22 shows the example. In FIG. 22, an example of two times enlargement, and an example in which the pattern is enlarged to fit the size of the before-embedding signal 912 are shown. But, it is needless to say that it may be enlarged to a size other than those.

Any algorithm may be used for enlargement. As shown in FIG. 22, enlargement may be performed such that enlarged one block corresponds to one value and the block after enlargement is made to include all same values, or a known interpolation method such as linear interpolation and bi-cubic may be used.

In FIG. 22, when the before-embedding signal 912 is a video signal, although an example is shown in which enlargement is performed in space direction in units of frame images, it is needless to say that enlargement may be performed also in the time direction.

Embedding into characteristics amount) In addition, when superimposing the embedding pattern 922 on the before-embedding signal 912, instead of directly adding values of the embedding pattern 922 to the signal values of the before-embedding signal 912, superimposing may be performed by changing the before-embedding signal 912 such that predetermined characteristics amount of the before-embedding signal 912 is changed by the value of the embedding pattern 922 or by scalar times of the embedding pattern 922.

As an example of the characteristics amount, there are signal values of the before-embedding signal 912 or the average value of signal values for each block. When the before-embedding signal 912 is the video signal or the image signal, brightness, color difference, and color signal value of RGB of the pixel of the video or image may be used.

<Digital Watermark Detection Apparatus>

The digital watermark detection apparatus 200 shown in FIG. 10 includes a temporal demodulation unit 210, a detection information extraction unit 220 and a pattern storage unit 250, and it receives the embedded signal 923 and outputs detection information 914.

In the following, operation of the digital watermark detection apparatus 200 is described.

Figure 23:
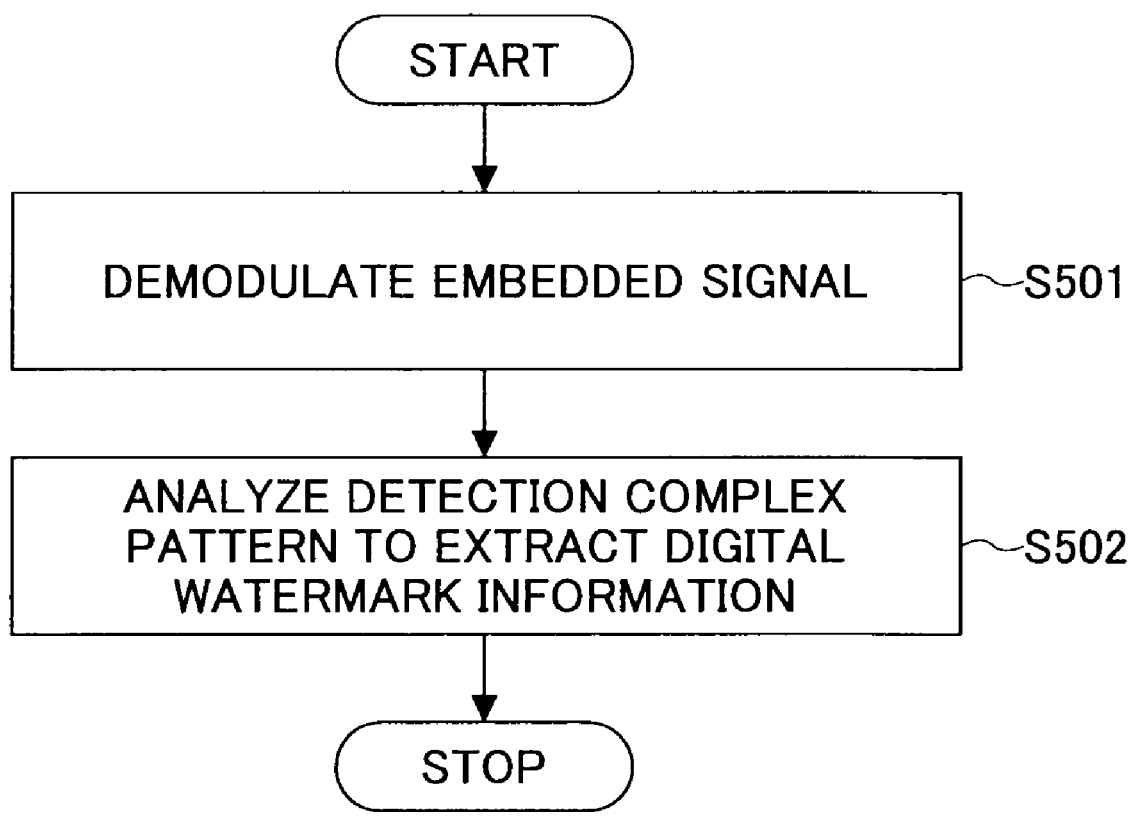
FIG. 23 is a flowchart of operation of a digital watermark detection apparatus in the first embodiment of the present invention.

FIG. 23 is a flowchart of operation of the digital watermark detection apparatus in the first embodiment of the present invention.

Step 501) The temporal demodulation unit 210 performs demodulation in the time axis direction based on the input embedded signal 923 to obtain a detection complex pattern 961, and stores it into the pattern storage unit 250. The detection complex pattern 961 is a N−1-dimensional pattern comprised of complex numbers. Details of operation of the temporal demodulation unit 210 are described later.

By the way, before performing temporal demodulation processing by the temporal demodulation unit 210, processes such as geometrical deformation correction, nose removal, filtering, block superimposing, and block dividing may be performed by pre-processing for the embedded signal 923. These examples are described later.

Step 502) The detection information extraction unit 220 analyzes the detection complex pattern 961 that is obtained by the temporal demodulation unit 210 and is stored in the pattern storage unit 250, extracts digital watermark information embedded by the digital watermark embedding apparatus 100 to output it as detection information 914.

Details of operation of the detection information extraction unit 220 are described later.

By the way, before performing detection information extraction processing by the detection information extraction unit 220, processes such as geometrical deformation correction, nose removal, filtering, block superimposing, and block dividing in N−1-dimensional space, for example, may be performed by pre-processing for the detection complex pattern 961. These examples are described later.

<Pre-Processing for Embedded Signal>

In the following, examples of pre-processing for the embedded signal 923 in the digital watermark detection apparatus 200 is described.

Geometric deformation correction) In the case when geometrical deformation such as enlargement, compression, rotation, translation, aspect ratio change and projective transformation is applied to the embedded signal 923 in which digital watermark is embedded in the digital watermark embedding apparatus 100, there is a case in which detection of digital watermark becomes difficult without modification. Thus, pre-processing may be performed for correcting this.

As for the geometric deformation correction, as shown in a document—Csurka, G., Deguillaume, F., Ruanaidh, J. J. K. O, and Pun, T., "A Bayesian Approach to Affine Transformation Resistant Image and Video Watermarking," Information Hiding, Proceedings Lecture Notes in Computer Science 1768, pp. 270-285, Springer-Verlag (2000)—, for example, a signal for performing geometric correction is embedded in the signal separately from digital watermark information, and degree of change applied to the signal is estimated by detecting this, so that correction may be performed by performing reverse conversion of the estimated change for the signal. In addition, for example, as shown in a document—Honsinger, C., "Data Embedding using Phase Dispersion, "IEE Seminar on Secure Images and Image Authentication (Ref. No. 2000/039), pp. 5/1-5/7 (2000)—, a periodic pattern having repetition may be used as the embedding pattern itself that has embedding information as digital watermark, enlargement/compression ratio is calculated by observing change of the period based on autocorrelation function when performing detection, so that correction may be performed by performing reverse conversion of the change based on the obtained enlargement/compression ratio. In addition, for example, when the subject signal is an image or a video, a rectangular area in the image may be extracted, and geometric correction may be performed as if digital watermark is embedded in the area using a method like one shown in—Atsushi KATAYAMA, Takao NAKAMURA, Masashi YAMAMURO, Noboru SONEHARA, "A New High-Speed Corner Detection Method: Side Trace Algorithm (STA) for i-appli to Detect Watermarks" IEICE Transactions D-II, Vol. j88-D-II, No. 6, pp. 1035-1046, 2005—.

Filter processing) When noise is added to the embedded signal 923 in which digital watermark is embedded, filter processing for removing the noise may be applied, and filter processing that can remove components of original before-embedding signal while reserving signal components of digital watermark.

Block superimposing) In the digital watermark embedding apparatus 100, when the embedding pattern superimposing unit 140 adds the embedding pattern 922 such that it is repeated when the size of the before-embedding signal 912 is greater than the size of the embedding pattern 922, block superimposing processing may be performed so as to divide the embedded signal 923 into each part of the repeated pattern, superimpose and add these to bring together them into one block.

Change to block) In the digital watermark embedding apparatus 100, when the embedding pattern superimposing unit 140 enlarges the embedding pattern 922 when the size of the before-embedding signal 912 is greater than the size of the embedding pattern 922, digital watermark detection may be performed after contracting the embedded signal 923.

Detection from characteristics amount) In the digital watermark embedding apparatus 100, when superimposing the embedding pattern on the before-embedding signal 912, when superimposing is performed by changing the before-embedding signal 912 such that the predetermined characteristic amount of the before-embedding signal 912 is changed by the value of the embedding pattern 922 or by scalar times, digital watermark detection may be performed based on information obtained by calculating a predetermined characteristic amount from the embedded signal 923.

Figure 24:
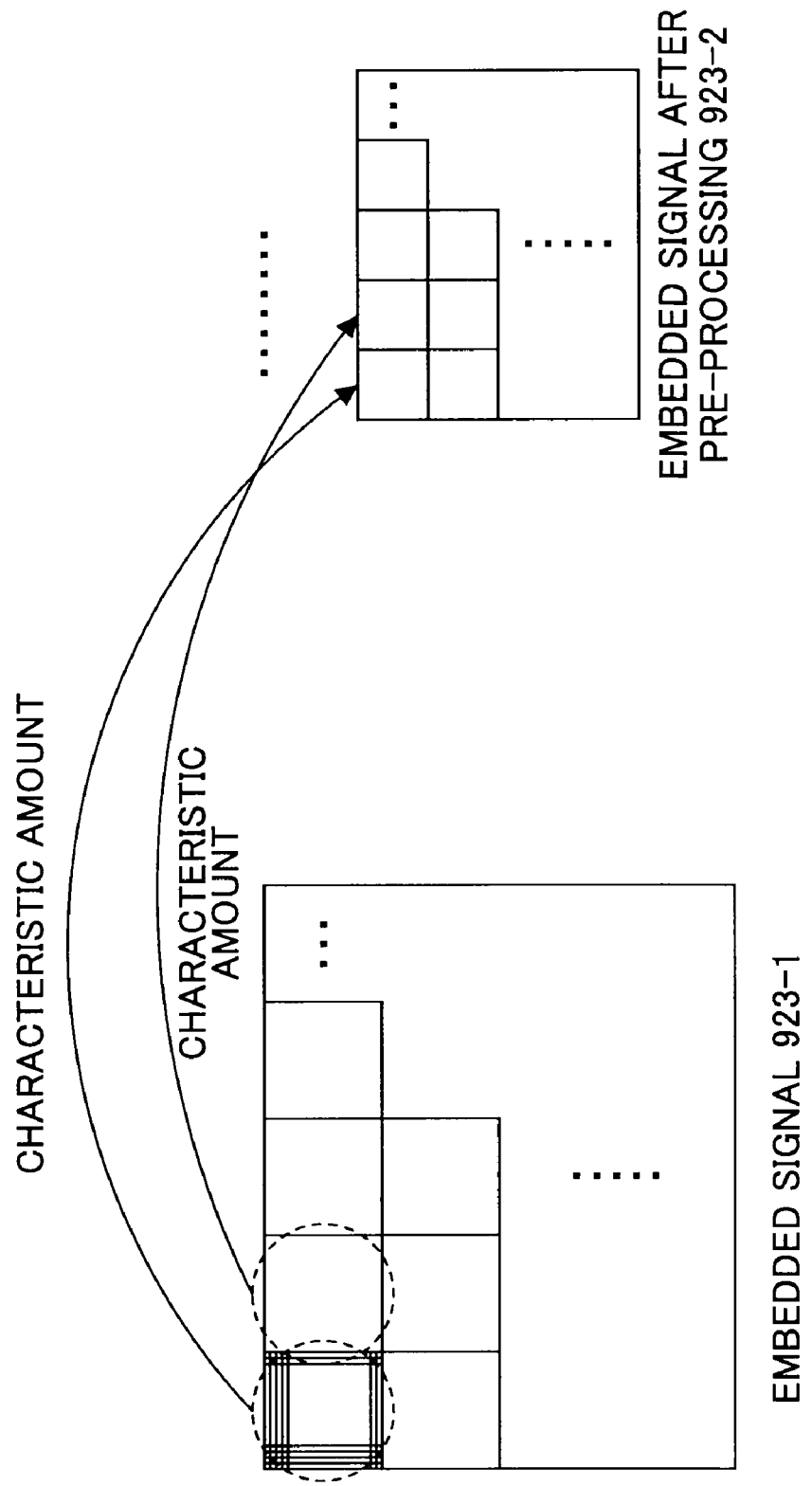
FIG. 24 is an example for calculating a characteristic amount of an embedded signal to extract it in the first embodiment of the present invention.

For example, as shown in FIG. 24, the embedded signal 923-1 may be divided into blocks so as to configure lines of characteristic amount by calculating characteristic amount of each block so that digital watermark may be detected from this. As an example of the characteristic amount, an average of signal values in the block may be used, for example. In addition, when the signal is a video signal or an image signal, brightness or color difference of the pixel of the video or the image, or color signal value of RGB may be used.

Pre-processing described in these examples may be performed on the detection complex pattern 961 as pre-processing of the detection information extraction processing in the detection information extraction unit 220. Especially, as to the geometric deformation correction, when the axis of N-th dimension is time in the video signal, by correcting expansion and contraction in the time direction as pre-processing for the embedded signal 923, and by performing geometric deformation correction in the space direction for the detection complex pattern 961, spatial geometric deformation correction can be performed efficiently and accurately.

<Digital Watermark Detection Apparatus—Temporal Demodulation Unit>

In the following, details of operation of the temporal demodulation unit 210 are described.

Figure 25:
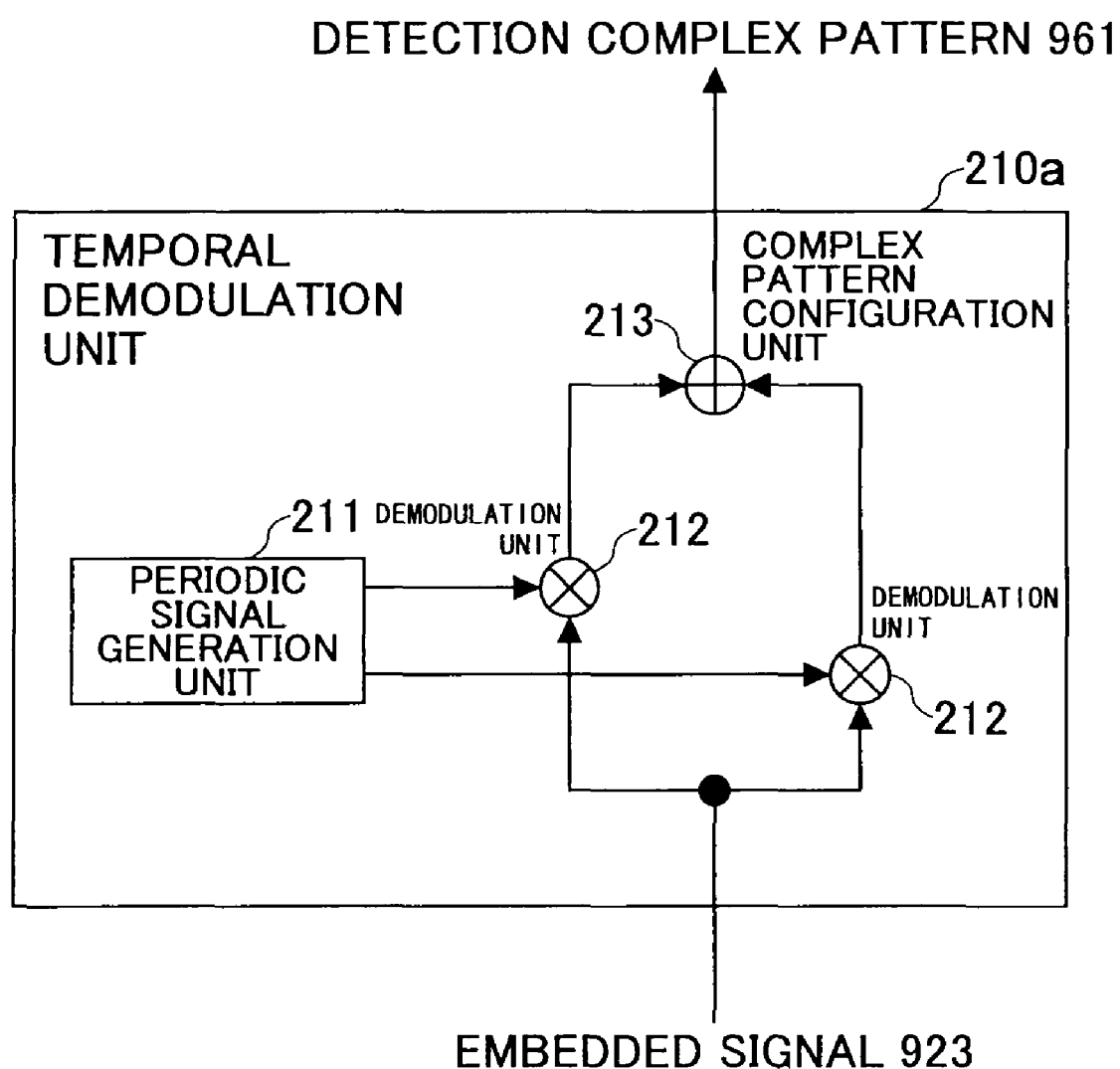
FIG. 25 shows a configuration example of a temporal demodulation unit in the first embodiment of the present invention.

FIG. 25 shows a configuration example of the temporal demodulation unit in the first embodiment of the present invention.

The temporal demodulation unit 210 shown in the figure includes a periodic signal generation unit 211, demodulation units 212, and a complex pattern configuration unit 213, and it receives the embedded signal 923 and outputs the detection complex pattern 961.

By the way, in FIG. 25, please note that the configuration is shown such that information flows from the bottom to the top to facilitate understanding of correspondence to FIG. 18.

Demodulation processes of the embedded signal 923 by the temporal demodulation unit 210 is performed in the following procedure.

Figure 26:
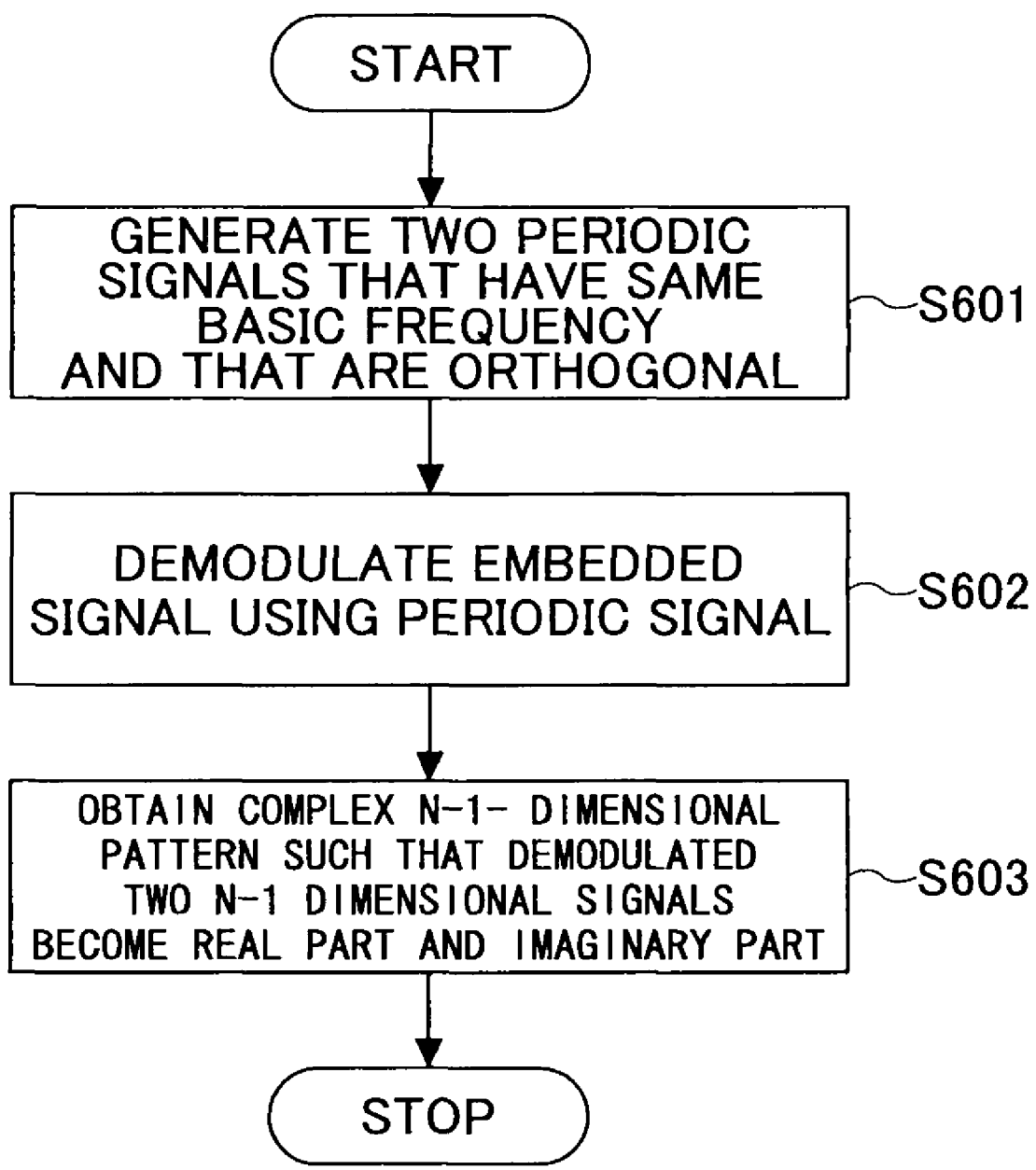
FIG. 26 is a flowchart of operation of the temporal demodulation unit in the first embodiment of the present invention.

FIG. 26 is a flowchart of operation of the temporal demodulation unit in the first embodiment of the present invention.

Step 601) The periodic signal generation unit 211 generates two periodic signals that have the same basic frequency and that are orthogonal. For example, two periodic signals may be generated based on one periodic signal such that the phases are different with each other by 90 degrees, that is, ¼ period. The periodic signal to be generated corresponds to the periodic signal generation unit 131 included in the temporal modulation unit 130a in the before-mentioned digital watermark embedding apparatus 100. Examples of the periodic signals are as described before.

Step 602) The demodulation unit 212 performs demodulation by each of the two periodic signals generated in step 601 based on the time direction component of the received embedded signal 923, so as to obtain two N−1-dimensional signals. Concrete examples of demodulation are described later.

Step 603) The complex pattern configuration unit 213 obtains the detection complex pattern 961 that is a N−1 dimensional pattern of complex numbers in which the real part and the imaginary part become the two N−1-dimensional signals demodulated in the demodulation unit 212 respectively.

More particularly, assuming that the two N−1-dimensional signals are $Q_r(x_1, x_2, \ldots x_{N-1})$ and $Q_i(x_1, x_2, \ldots x_{N-1})$ respectively, and that the detection complex pattern 961 is $Q(x_1, x_2, \ldots x_{N-1})$, it is obtained as follows, wherein j is the imaginary unit.

$$Q(x_1, x_2, \ldots x_{N-1}) = Q_r(x_1, x_2, \ldots x_{N-1}) + jQ_i(x_1, x_2, \ldots x_{N-1}) \quad (57)$$

In the following, concrete examples of temporal demodulation are described.

Demodulation in the demodulation units 212 is performed by obtaining the phases of the periodic signals generated by the periodic signal generation unit 211 of the N-dimensional embedded signal 923. Especially, by obtaining the size of components of the two periodic signals as described below, the phases of the periodic signals can be easily measured.

That is, more particularly, following processes are performed, for example.

In the following, it is assumed that the N-dimensional embedded signal 923 is represented as $I''(x_1, x_2, \ldots, x_{N-1}, t)$.

In addition, it is assumed that two periodic signals $f_r(t)$ and $f_i(t)$ are generated in the periodic signal generation unit 211. Here, an example is taken in which $f_r$ and $f_i$ are generated based on a same periodic signal such that the phases are different by 90 degrees as follows.

$$f_i(t) = f_r(t - T/4) \quad (58)$$

I" is demodulated by $f_r(t)$ and $f_i(t)$, so that two N−1-dimensional signals $Q_r(x_1,x_2,\ldots,x_{N-1})$ and $Q_i(x_1,x_2,\ldots,x_{N-1},t)$ are obtained by the following equations $$Q_r(x_1, x_2, \ldots, x_{N-1}) = \int_{t_1}^{t_2} I''(x_1, x_2, \ldots, x_{N-1}, \tau) f_r(\tau) d\tau \quad (59)$$

$$Q_i(x_1, x_2, \ldots, x_{N-1}) = \int_{t_1}^{t_2} I''(x_1, x_2, \ldots, x_{N-1}, \tau) f_i(\tau) d\tau, \quad (60)$$

wherein $t_1$ and $t_2$ are a start point and an end point in a section that is a target for detection in the embedded signal 923. For example, $t_1=-\infty$ and $t_2=\infty$ may be applied such that the whole of the received embedded signal 923 becomes the detection target, or $t_1=0$ and $t_2=nT$ (T is a period of the periodic signal generated in the periodic signal generation unit 211) may be applied so as to extract n periods of the received embedded signal 923.

In addition, when the embedded signal 923 is obtained as a discrete signal, two N−1-dimensional signals $Q_r$ and $Q_i$ may be obtained by the following product sum calculation.

$$Q_r(x_1, x_2, \ldots, x_{N-1}) = \sum_{\tau=t_1}^{t_2} I''(x_1, x_2, \ldots, x_{N-1}, \tau) f_r(\tau) \quad (61)$$

$$Q_i(x_1 \cdot x_2, \ldots, x_{N-1}) = \sum_{\tau=t_1}^{t_3} I''(x_1, x_2, \ldots, x_{N-1}, \tau) f_i(\tau) \quad (62)$$

In addition, for example, in a video signal and the like, when detecting digital watermark from a re-taken video using a low-performance processor such as a cellular phone and the like, there may be a case in which frame rate in video-taking is not stable so that timing of sampling shifts slightly. In such a case, using the detection time $t_1, t_2, \ldots, t_n$ for each of the discretely obtained signals $I''(x_1, x_2, \ldots, x_{N-1}, 1)$, $I''(x_1, x_2, \ldots, x_{N-1}, 2), \ldots, I''(x_1, x_2, \ldots, x_{N-1}, n)$, product sum calculation is performed based on a product of i-th sample and the value $f(t_i)$ of the periodic function at i-th measurement time as follows so that unstable frame rate is corrected and accuracy of calculation result can be maintained.

$$Q_r(x_1, x_2, \ldots, x_{N-1}) = \sum_{i=1}^{n} I''(x_1, x_2, \ldots, x_{N-1}, i) f_r(t_i) \quad (63)$$

$$Q_i(x_1, x_2, \ldots, x_{N-1}) = \sum_{i=1}^{n} I''(x_1, x_2, \ldots, x_{N-1}, i) f_i(t_i) \quad (64)$$

In addition, when a video displayed on a screen or a TV is taken by a video camera or a camera of a cellular phone and the like, information on the frame rate of reproduction and the frame rate of the video taking have been obtained in most cases, and by obtaining $t_i$ by using it, following calculation can be performed for the discretely obtained signals $I''(x_1, x_2, \ldots, x_{N-1}, 1), I''(x_1, x_2, \ldots, x_{N-1}, 2), \ldots, I''(x_1, x_2, \ldots, x_{N-1}, n)$, $$t_i = \frac{i}{F} \quad (65)$$

$$Q_r(x_1, x_2, \ldots, x_{N-1}) = \sum_{i=1}^{n} I''(x_1, x_2, \ldots, x_{N-1}, i) f_r(t_i) \quad (66)$$

wherein F indicates a frame rate when taking the video.

Next, temporal demodulation using difference/differentiation is described. Instead of the above-mentioned method, demodulation may be performed using difference or differentiation of the embedded signal 923 $I''(x_1, x_2, \ldots, x_{N-1}, t)$ in t axis direction. A configuration example of such temporal demodulation unit 310 is shown in FIG. 27.

Figure 27:
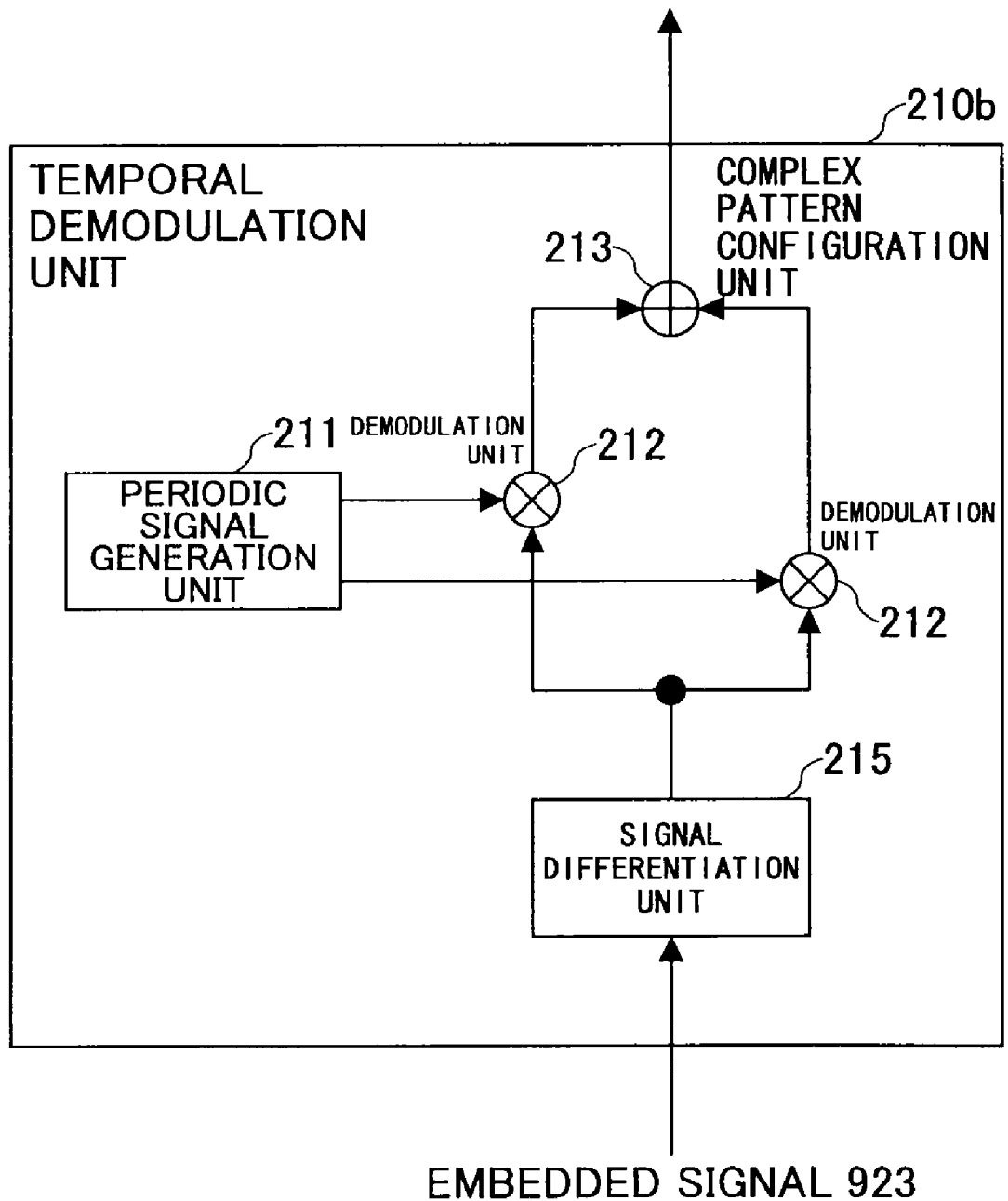
FIG. 27 is a configuration example using difference/differentiation of the temporal demodulation unit in the first embodiment of the present invention.

The temporal demodulation unit 210*b* shown in FIG. 27 has a configuration almost same as that of the temporal demodulation unit 210*a* shown in FIG. 25, and temporal demodulation unit 210*b* is different in that it is configured such that the embedded signal 923 is supplied to the demodulation units 212 after it is supplied to the signal differentiation unit 215.

The signal differentiation unit 215 is configured to calculate difference or differentiation in an axis of N-th dimension, that is, in at axis direction for the received embedded signal 923 so as to output difference or differentiation to the demodulation units 212.

For example, considering video signals and the like, it is known that correlation between frames of the signal is large. Since the shorter the time interval between two frames is, the higher the correlation between frames is, when difference or differentiation values between frames are calculated, original image component is canceled by an amount equal to or greater than the canceled amount by the periodic signal, so that energy of the digital watermark relatively increases. Thus, detection of digital watermark becomes easy by performing demodulation from the difference value or differentiation value, so that there is an advantage that detection accuracy improves. Inversely, since detection performance of similar extent can be maintained even though weaker digital watermark is embedded, digital watermark embedding in which deterioration of signal is smaller becomes possible.

<Digital Watermark Detection Apparatus—Detection Information Extraction Unit>

Next, the detection information extraction unit 220 is described in detail.

Figure 28:
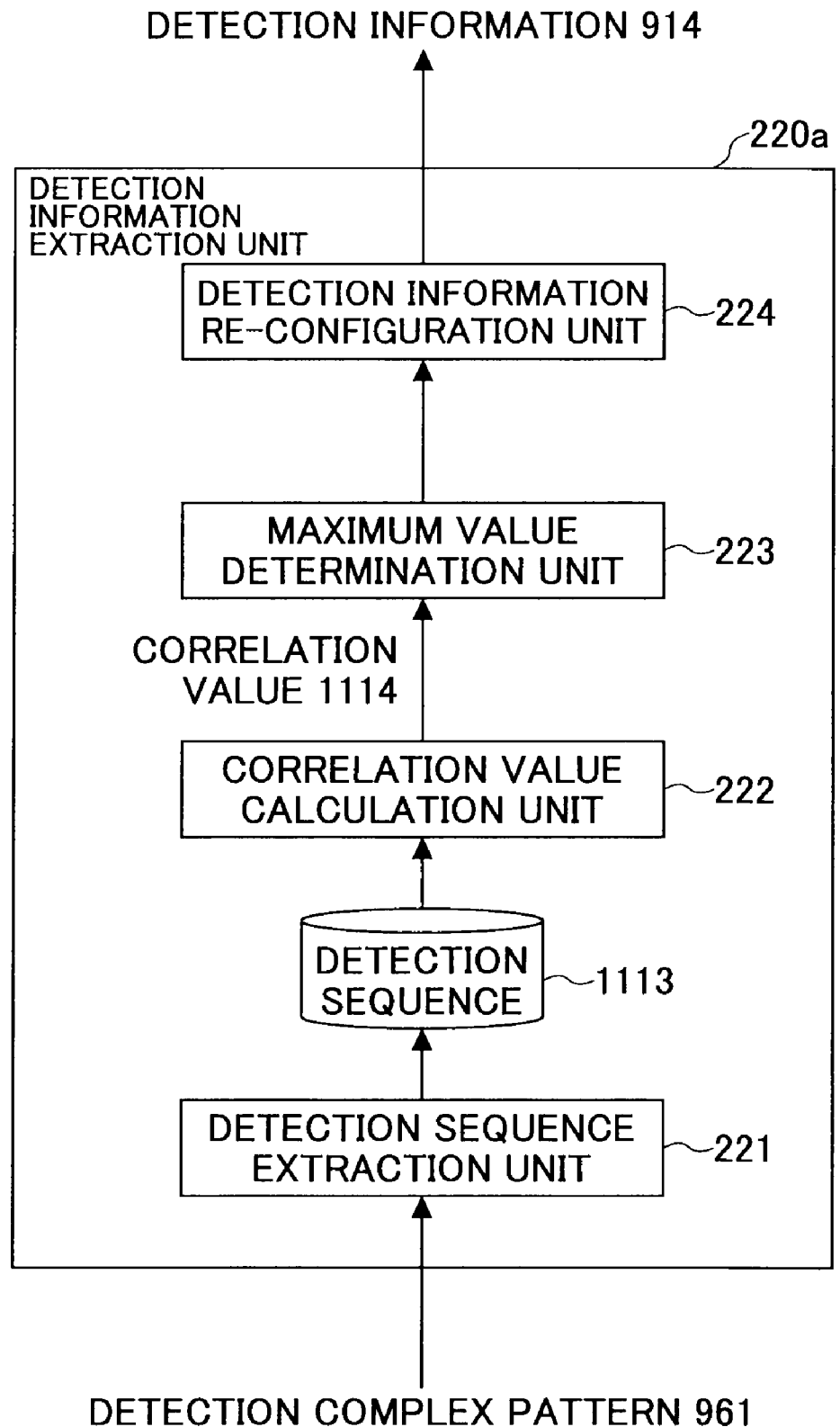
FIG. 28 is a configuration example of a detection information extraction unit in the first embodiment of the present invention.

FIG. 28 shows a configuration example of the detection information extraction unit in the first embodiment of the present invention.

The detection information extraction unit 220*a* includes a detection sequence extraction unit 221, a correlation value calculation unit 222, a maximum value determination unit 223, and a detection information reconfiguration unit 224, and receives the detection complex pattern 961 from the pattern storage unit 250 and outputs detection information 914.

By the way, in FIG. 28, please note that the configuration is described such that information flows from the bottom to the top to facilitate understanding of correspondence to FIG. 12.

Detection information extraction processes by the detection information extraction unit 220*a* are performed according to the following procedure.

Figure 29:
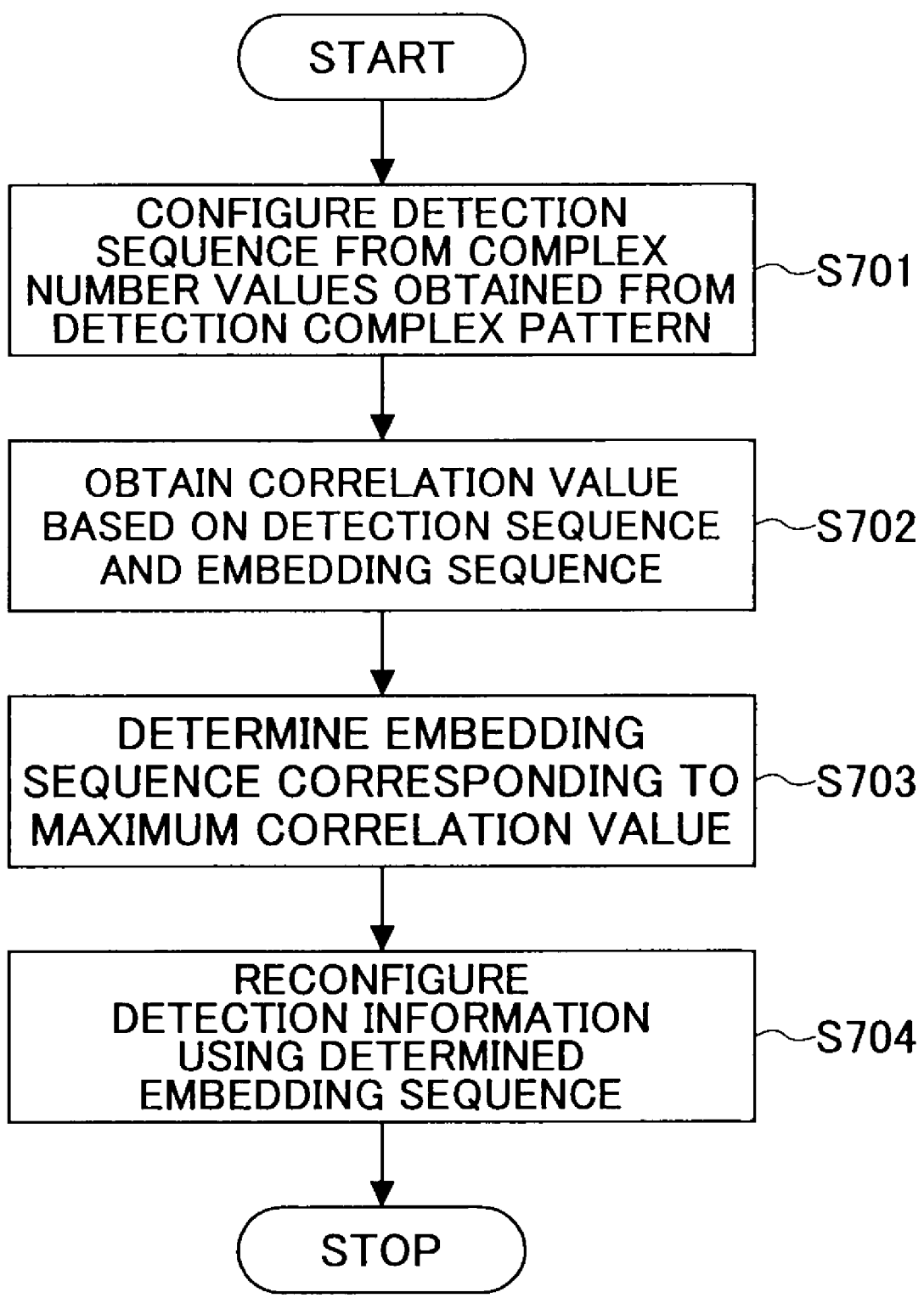
FIG. 29 is a flowchart of operation of the detection information extraction unit in the first embodiment of the present invention.

FIG. 29 is a flowchart of operation of the detection information extraction unit in the first embodiment of the present invention.

Step 701) The detection sequence extraction unit 221 configures a detection sequence 1113 by extracting values of the real part and the imaginary part from complex number values obtained from the received detection complex pattern 961 and arranging the values. Details of the detection sequence extraction unit 221 are described later.

Step 702) The correlation value calculation unit 222 calculates correlation between the detection sequence 1113 configured by the detection sequence extraction unit 221 and an embedding sequence configured based on an assumed embedding sequence to obtain a correlation value 1114.

When different values are embedded according to the kind of the embedding sequence, correlations are calculated for each of a plurality of embedding sequences configured based on a plurality of conceivable embedding sequences so as to obtain corresponding correlation values 1114. Details of the operation of the correlation value calculation unit 222 are described later.

Step 703) The maximum value determination unit 223 finds maximum one of correlation values 1114 obtained by the correlation value calculation unit 222 so as to determine an embedding sequence used for correlation calculation in the correlation value calculation unit 222 corresponding to the maximum correlation value 1114.

By the way, depending on the configuration method of the embedding sequence in the digital watermark embedding apparatus 100, the determination may be performed by other methods instead of determining the maximum value by the maximum value determination unit 223.

Details of operation of the maximum value determination unit 223, and details of other alternative methods are described later.

Step 704) The detection information reconfiguration unit 224 reconfigures detection information that is determined to be actually embedded based on the embedding sequence determined by the maximum value determination unit 223. By the way, details of operation of the detection information reconfiguration unit 224 are described later.

<Digital Watermark Detection Apparatus—Detection Information Extraction Unit—Detection Sequence Extraction Unit>

Next, details of the detection sequence extraction unit 221 are described.

The detection sequence extraction unit 221 is responsible for a function, in the detection side, corresponding to the complex array generation unit 112 in the complex pattern generation unit 110a of the digital watermark embedding apparatus 100, and configures the detection sequence 1113 from the complex number values obtained from the detection complex pattern 961.

Processes in the detection sequence extraction unit 221 are executed according to the following procedure.

Figure 30:
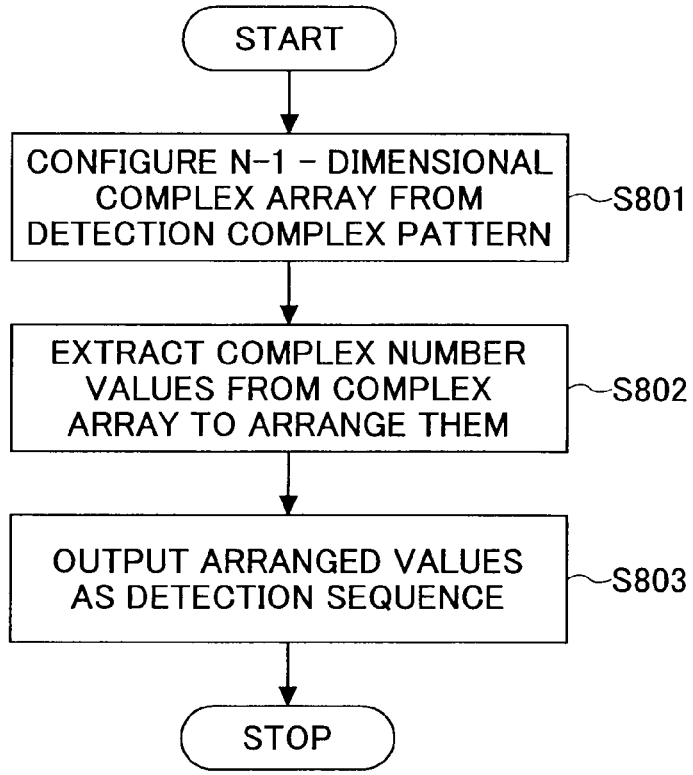
FIG. 30 is a flowchart of detailed operation of the detection sequence extraction unit in the first embodiment of the present invention.

FIG. 30 is a flowchart of detailed operation of the detection sequence extraction unit in the first embodiment of the present invention.

Step 801) The detection sequence extraction unit 221 configures N−1-dimensional complex array of a size of $M_1 \times M_2 \times \ldots \times M_{N-1}$, and stores it in a memory (not shown in the figure). $M_1, M_2, \ldots, M_{N-1}$ are element numbers similar to those used in the complex array generation unit 112 of the digital watermark embedding apparatus 100.

When the detection complex pattern 961 is obtained as a discrete signal, it is regarded as the N−1-dimensional complex array as it is. When the detection complex pattern 961 is obtained as a continuous signal, data obtained by sampling the detection complex pattern 961 using arbitrary sampling means is used as the N−1-dimensional complex array.

Step 802) Complex number values are extracted one by one in sequence from the complex array obtained in step 801 from the memory (not shown in the figure), so that the real part and the imaginary part of the extracted complex number value are regarded as independent real values and arranged. That is, assuming that the complex array is represented as $A[p_1, p_2, \ldots, p_{N-1}]$ ($p_n \geq 0$) and that the detection sequence 1114 is represented as $i''_1, i''_2, \ldots, i''_L$, $$i''_1 = \Re[A[0, 0, \ldots, 0]] \quad (68)$$
$$i''_2 = \Im[A[0, 0, \ldots, 0]]$$
$$i''_3 = \Re[A[1, 0, \ldots, 0]]$$
$$i''_4 = \Im[A[1, 0, \ldots, 0]]$$
$$\vdots$$

wherein, $\Re, \Im$ indicates calculation for extracting each of the real part and the imaginary part of the complex number.

This process is a symmetric process with respect to generation process in the complex array generation unit 112 of the digital watermark embedding apparatus 100.

Step 803) The obtained $i''_1, i''_2, \ldots, i''_L$ are output as the detection sequence 1113. In addition, in the case when the order of the embedding sequence 913 is permuted to random order using pseudo-random numbers for embedding before the complex array is configured in the complex array generation unit 112 of the digital watermark embedding apparatus 100, the order of the detection sequence 1113 is permuted inversely with respect to the process by the complex array generation unit 112 using the pseudo-random number before step 803, so that the order is restored to an order that can be associated with the embedding sequence 913. In this case, as a value of the seed of the pseudo-random number used for permuting the order, a key same as one used when digital watermark embedding is provided as a key for digital watermark detection.

When the complex array generation unit 112 of the digital watermark embedding apparatus 100 performs order permutation by permuting elements of the obtained complex array instead of permuting the embedding sequence 913, the order may be restored by permuting the order of elements of the complex array configured in step 801 inversely with respect to the process in the complex array generation unit 112 before the step 802.

<Digital Watermark Detection Apparatus—Detection Information Extraction Unit—Correlation Value Calculation Unit>

Next, detailed operation of the correlation value calculation unit 222 of the detection information extraction unit 220a is described.

Correlation value calculation processes in the correlation value calculation unit 222 are performed according to the following procedure.

1) The correlation value calculation unit 222 generates conceivable embedding sequences $w^{(1)}, w^{(2)}, \ldots$ by a procedure similar to that in the embedding sequence generation unit 111 of the digital watermark embedding apparatus 100.

The conceivable embedding sequences are all embedding sequences that may be embedded, and they can be determined according to generation of the embedding sequence in the embedding sequence generation unit 111 as follows, for example.

Example 1

For example, when the embedding sequence has been generated according to (example 1) of the embedding sequence generation unit 111, the conceivable embedding sequence is one, and that is as follows.

$$w = PN = \{PN_1, PN_2, \ldots, PN_L\} \quad (69)$$

Example 2

For example, when the embedding sequence has been generated according to (example 2) of the embedding sequence generation unit 111, the conceivable embedding sequences are two, and those are as follows.

$$w^{(1)} = PN = \{PN_1, PN_2, \ldots, PN_L\} \quad (70)$$

$$w^{(2)} = -PN = \{-PN_1, -PN_2, \ldots, -PN_L\} \quad (71)$$

Example 3

For example, when embedding sequence has been generated like the example in which each symbol represents one bit information in (example 3) in the embedding sequence generation unit 111, the conceivable sequences are two, and those are as follows.

$$w^{(i,1)} = PN_i = \{pn_{i1}, pn_{i2}, \ldots, pn_{iL}\} \quad (72)$$

$$w^{(i,2)} = -PN_i = \{-pn_{i1}, -pn_{i2}, \ldots, -pn_{iL}\} \quad (73)$$

In addition, in (example 3) of the embedding sequence generation unit 111, when the embedding sequence has been generated like the example in which each symbol represents 12 bits information, there are 4096 conceivable sequences as follows for each symbol i.

$$\begin{aligned} w^{(i,1)} &= PN_{(i,0)} \\ w^{(i,2)} &= PN_{(i,1)} \\ &\vdots \\ w^{(i,4096)} &= PN_{(i,4095)} \end{aligned} \quad (74)$$

Example 4

For example, when the embedding sequence has been generated like an example in (example 4) of the embedding sequence generation unit 111, there are $2^n$ embedding sequences that can by considered to simply cover all cases. In later correlation calculation, the detection sequence 1113 may be divided into groups of m, so that correlation between the following two kinds of embedding sequences and the divided detection sequence 1113 may be calculated for each one bit $b_i$.

$$w^{(i,1)} = \{+PN_{im+1}, +PN_{im+2}, \ldots, +PN_{im+m}\} \quad (75)$$

$$w^{(i,2)} = \{-PN_{im+1}, +PN_{im+2}, \ldots, -PN_{im+m}\} \quad (76)$$

Such a method is also described in Takao Nakamura, Atsushi Katayama, Masashi Yamamuro, Noboru Sonehara, "Fast Watermark Detection Scheme from Analog Image for Camera-equipped Cellular Phone", IEICE Transactions D-II, Vol. j87-D-II, No. 12, pp. 2145-2155, 2004.

2) Correlation is calculated between the detection sequence 1113 obtained by the detection sequence extraction unit 221 and each of the embedding sequences obtained in the above-mentioned 1).

Correlation calculation is similar to one performed in digital watermark detection shown in patent document 1, and the document—Takao Nakamura, Hiroshi Ogawa, Atsuki Tomioka, Youichi Takashima, "An Improvement of Watermark Robustness against Moving and/or cropping the area of the Image", The 1999 Symposium on Cryptography and Information Security, SCIS99-W3-2.1, pp. 193-198, 1999—, for example, and correlation can be obtained by the following product sum calculation, wherein $\rho^{(j)}$ is a correlation value to be obtained, $i'' = \{i''_1, i''_2, \ldots, i''_L\}$ is the detection sequence 1113, $w^{(j)} = \{w^{(j)}_1, w^{(j)}_2, \ldots, w^{(j)}_L\}$ is the embedding sequence that is a current process, and "·" is product sum operation in which a number sequence is regarded as a vector.

$$\rho^{(j)} = i'' \cdot w^{(j)} = \sum_{k=1}^{L} i''_k w^{(j)}_k \quad (77)$$

For aligning evaluation criteria of detection reliability as described in the before-mentioned document—Takao Nakamura, Atsushi Katayama, Masashi Yamamuro, Noboru Sonehara, "Fast Watermark Detection Scheme from Analog Image for Camera-equipped Cellular Phone", IEICE Transactions D-II, Vol. j87-D-II, No. 12, pp. 2145-2155, 2004—, each element of i'' and $w^{(j)}$ may be normalized beforehand such that the average becomes 0 and that the variance becomes 1 so that calculation may be performed by multiplying by a constant term in the correlation value calculation as follows.

$$\rho^{(j)} = \frac{1}{\sqrt{L}} i'' \cdot w^{(j)} = \frac{1}{\sqrt{L}} \sum_{k=1}^{L} i''_k w^{(j)}_k \quad (78)$$

<Digital Watermark Detection Apparatus—Detection Information Extraction Unit—Maximum Value Determination Unit>

Next, the maximum value determination unit 223 of the detection information extraction unit 220a is described in detail.

Processes in the maximum value determination unit 223 is performed according to the following procedure.

1) The maximum value determination unit 223 finds a maximum correlation value $\rho^{(j)}$ from the correlation values 1114 $\rho^{(1)}, \rho^{(2)}, \ldots$ obtained by the correlation value calculation unit 222 as follows, $$\rho^{(max)} = \text{MAX}(\rho^{(1)}, \rho^{(2)}, \ldots) \quad (79)$$

wherein MAX( ) is an operation for returning a maximum value.

2) An embedding sequence $w^{(max)}$ corresponding to $\rho^{(max)}$ is obtained.

In addition, the maximum value determination unit 223 may determine whether the maximum correlation value $\rho^{(max)}$ exceeds a predetermined threshold to determine that digital watermark is not embedded when the value does not exceed the predetermined threshold.

In the following, alternative operation of the maximum value determination unit 223 is described.

Instead of maximum value determination by the maximum value determination unit 223, the correlation value calculation unit 222 does not calculate correlation for all of the embedding sequences $w^{(1)}, w^{(2)}, \ldots$, but calculates correlation from the embedding sequence $w^{(1)}$ sequentially, performs determination based on whether the obtained correlation value exceeds a predetermined threshold, and determines an embedding sequence by which the correlation value exceeds the threshold as $w^{(max)}$ so that the correlation value calculation unit 222 may end correlation calculation at that time.

In addition, when the embedding sequence in the digital embedding apparatus 100 is embedded being configured only by one kind of embedding sequence like one shown in (example 1) of the embedding sequence generation unit 111, maximum value determination by the maximum value determination unit 223 has no meaning since only one correlation value is calculated. Instead, determination may be performed based on whether the obtained correlation value exceeds the predetermined threshold.

In addition, when the embedding sequence in the digital watermark embedding apparatus 100 is embedded by being configured based on difference of plus and minus of one kind of embedding sequence like one shown in (example 23) of the embedding sequence generation unit 111, since correlation values of inverted signs are obtained, the correlation calculation in the correlation value calculation unit 222 may be performed only on one embedding sequence, and embedded value may be determined based on the sign of the obtained correlation value instead of the maximum value determination by the maximum value determination unit 223. In addition, determination may be performed based on whether the absolute value of the obtained correlation value exceeds the predetermined threshold.

In addition, reliability of watermark detection may be evaluated by the size of the correlation value.

<Digital Watermark Detection Apparatus—Detection Information Extraction Unit—Detection Information Reconfiguration Unit>

Next, the detection information reconfiguration unit 224 of the detection information extraction unit 220a is described in detail.

Processes in the detection information reconfiguration unit 223 are performed according to the following procedure.

1) According to the embedding sequence generation method in the embedding sequence generation unit 111 of the digital watermark embedding apparatus 100, values of corresponding embedding information are configured as detection information from the embedding sequence $w^{(max)}$ obtained by the maximum value determination unit 223. For example, when the embedding sequence is configured by spectrum spreading, the detection information is reconfigured such that $w^{(max)}$ is spectrum despread.

Example 1

For example, when the embedding sequence has been generated like (example 1) of the embedding sequence generation unit 111, information indicating whether digital watermark is embedded becomes detection information.

Example 2

For example, when the embedding sequence has been generated like (example 2) of the embedding sequence generation unit 111, when $w^{(max)}$=PN, detection information becomes bit value 1, and when $w^{(max)}$=−PN, detection information becomes bit value 0.

Example 3

For example, when the embedding sequence has been generated like the example in which each symbol represents information of one bit in the (example 3) of the embedding sequence generation unit 111, when $w^{(max)}$=$PN_i$ for symbol i, the symbol value is 1, and when $w^{(max)}$=$-PN_i$, the symbol value becomes 0. This is performed for every symbol so that detection information is obtained by connecting the obtained symbol values.

When the embedding sequence has been generated like the example in which each symbol represents information of 12 bits in the (example 3) of the embedding sequence generation unit 111, when $w^{(max)}$=$PN_{(i,x)}$ for symbol i, the symbol value is x. This is performed for every symbol so that detection information is obtained by connecting the obtained symbol values.

Example 4

For example, when the embedding sequence has been generated like an example in (example 4) of the embedding sequence generation unit 111, when $w^{(max)}$={$+PN_{im+1}, +PN_{im+2}, \ldots, +PN_{im+m}$} for bit $b_i$, the bit value becomes +1, and when $w^{(max)}$={$-PN_{im+1}, -PN_{im+2}, \ldots, -PN_{im+m}$}, the bit value becomes −1. This is performed for every bit and detection information 914 is obtained by connecting the obtained bit values.

2) The detection information 914 obtained in the above-mentioned way is output.

<Other Method for Embedding into Complex Number>

Next, other method for embedding into complex number is described.

In the above-mentioned configuration examples, in the complex array generation unit 112 of the digital watermark embedding apparatus 100, element values of complex array is set from the embedding sequence 913 such that values extracted from the embedding sequence 913 becomes the real part and the imaginary part of the element values. In addition, corresponding to that, when the detection sequence extraction unit 221 of the digital watermark detection apparatus 200 configures the detection sequence 1113 from the detection complex pattern 961, the detection sequence 1113 is configured by extracting the real part and the imaginary part of the complex number values of the detection complex pattern 961 and by arranging them.

In these examples, although the real part and the imaginary part of the complex number are used, the complex number values may be used in different ways as long as operations of the complex array generation unit 112 and the detection sequence extraction unit 221 are associated with each other.

For example, assuming that values extracted from the embedding sequence 913 in the complex array generation unit 112 are $w_1$ and $w_2$, these may be set to be argument and absolute value of the element value of the complex array. In this case, the detection sequence extraction unit 221 may configure the detection sequence 1113 using the argument and the absolute value of the complex number value of the detection complex pattern 961.

In addition, for example, one value $w_1$ extracted from the embedding sequence 913 may be embedded by associating it with an argument of a complex number value. In this case, the absolute value of the complex number value may be fixed to 1, for example. For example, when the value of the embedding sequence takes either one of +1 and −1, arguments of the complex number value may be set to be $\pi/4$ and $3\pi/4$, respectively. In this case, the detection sequence extraction unit 221 may configure the detection sequence 1113 using only the argument of the complex number value of the detection complex pattern 961. In the case when adopting a configuration method like this, instead of calculating the complex array as an array of complex numbers, it may be configured as an array of real numbers representing the values of argument, so that the temporal modulation unit 130 may be configured so as to control the phase of the periodic variable using the values. When such a configuration method is adopted, the length of the embedding sequence becomes half compared with the case when values are set to the real part and the imaginary part of complex number.

In addition, for example, an element value p of a complex array may be determined for $w_1$ and $w_2$ by the following equation, $$p = aw_1 + bw_2 \qquad (79)$$

wherein a and b are arbitrary complex numbers satisfying the following equation.

$$\Im_{a^*b} \neq 0$$

The a and b may be determined to be complex numbers that are orthogonal on the complex plane, that is, they may be determined so as to satisfy the following equation.

$$\Re_{[c1^*c2]} = 0$$

In the equation, * indicates complex conjugate, and $$\Re_{[\,]}, \Im_{[\,]}$$

indicates operation for extracting the real part and the imaginary part of the complex number respectively.

In this case, in the detection sequence extraction unit 221, values $i''_1$ and $i''_2$ of the detection sequence 1113 can be obtained from the complex number q of the detection complex pattern 961 using an inverse transform of the above-mentioned transform.

In addition, for example, points on the complex plane (for example, four points of $$\{\pm\sqrt{1/2} \pm j\sqrt{1/2}\})$$

may be selected like QAM modulation according to the value of one value $w_1$ extracted from the embedding sequence 913, so that complex number values of the selected points may be used.

Characteristics of First Embodiment

The above-mentioned present embodiment include following characteristics.

Deletion of noise component) According to the digital watermark embedding apparatus 100 and the digital watermark detection apparatus 200 of the present embodiment, for digital watermark that is embedded by being modulated by the periodic signal in the temporal modulation unit 130 in digital watermark embedding, detection is performed by performing integral calculation with the periodic signal in the temporal demodulation unit 210 in digital watermark detection. By doing that, variance of the before-embedding signal 912 that becomes noise for digital watermark and noise component applied after that becomes small (this is because the periodic signal is determined such that a value obtained by calculating integral of the periodic signal for one period becomes 0). Especially, as to video signals, it is known that correlation between adjacent frames is relatively high. By the integral calculation with the periodic signal, components in which correlation in the time direction is high within the period are removed. As a result, variance due to the before-embedding signal 912 becomes dramatically small.

According to the before-mentioned document: Susumu Yamamoto, Takao Nakamura, Youichi Takashima, Atsushi Katayama, Ryo Kitahara, Takashi Miyatake, "Consideration on evaluation of detectability for frame-based video watermarking", Forum on information technology, FIT2005, J-029, 2005, in the case of digital watermark using spectrum spreading and correlation calculation, the smaller the variance of the before-embedding signal is, the larger the detection evaluation value indicating reliability of detection in the sense of false positive of digital watermark is. (In the above-equations (3) and (4), the smaller $$\sigma^2_{n_i}$$

included in B and C of the denominator is, the larger the expected value E[ρ] of the detection evaluation value becomes). This means that the smaller the variance of noise component included in i″ is in the correlation calculation in the correlation value calculation unit 222, the higher the reliability for detection becomes, and it means that reliability for detection is high in the digital watermark embedding apparatus and the digital watermark detection apparatus in the present invention.

By generating the N−1-dimensional embedding complex pattern 921 as the complex number array based on the embedding sequence 913 that is generated by using the pseudo-random number and modulating the N−1-dimensional embedding complex pattern 921 by the periodic signals in which phases are different by 90 degrees, the phase of the embedding pattern 922 is spread in the N−1 dimensional space, so that the size of the noise component that appears due to the before-embedding signal 912 when detecting digital watermark becomes small. As a result, more reliable digital watermark embedding and detection become possible, and digital watermark embedding and detection with smaller quality deterioration become possible by maintaining reliability similar to conventional techniques.

Increase of spectrum spread sequence length) In addition, by embedding digital watermark embedding sequence as a N−1-dimensional pattern of complex numbers, spectrum spread sequence two times longer can be used compared with the digital watermark method, in which digital watermark for still images is embedded to each frame repeatedly, like the method disclosed in the before-mentioned document: Takao Nakamura, Hiroshi Ogawa, Atsuki Tomioka, Youichi Takashima, "An Improvement of Watermark Robustness against. Moving and/or cropping the area of the Image", The 1999 Symposium on Cryptography and Information Security, SCIS99-W3-2.1, pp. 193-198, 1999.

According to the before-mentioned document: Susumu Yamamoto, Takao Nakamura, Touichi Takashima, Atsushi Katayama, Ryo Kitahara, Takashi Miyatake, "Consideration on evaluation of detectability for frame-based video watermarking", Forum on information technology, FIT2005, J-029, 2005, as to digital watermark using spectrum spreading and correlation calculation, the detection evaluation value indicating reliability of detection in the sense of false positive of digital watermark increases in proportion to the square root of the sequence length of the spectrum spreading (in the equations (3) and (4) in the document, E[ρ] is in proportion to the numerator √1). This means that, as the spectrum spread sequence increase, highly reliable detection becomes possible by the increase. Thus, compared with conventional schemes, √2 times larger detection evaluation value can be obtained by the digital watermark embedding apparatus and the digital watermark detection apparatus of the present invention, so that it represents that reliability of detection is high.

In addition, in the case when reliability of detection of similar degree of the conventional schemes is necessary, instead of doubling the spectrum spread sequence length, by embedding separate information to each, the embedding information length can be doubled as a whole.

Modulation in the N dimensional direction) The temporal modulation unit 130 modulates the N−1-dimensional embedding pattern, on which spectrum spreading has been performed in the N−1-dimensional space, using the periodic signals in the N-th dimension direction that is orthogonal to the N−1-dimensional embedding pattern, so that it has characteristics that desynchronization applied in the N-th dimension direction exerts common influence in the N−1-dimensional space.

In addition, because of redundancy obtained by spreading embedding information of the N−1-dimensional pattern into the N-dimensional space, there is sufficient tolerance for modification such as high compression and re-taking in the case of video signal, for example, and also when a part of a signal (a part of frames in the case of video signal, for example) is modified, or also when a part of a signal is cropped (in the case of video signal, when a part of a frame section is cut apart, for example), detection of digital watermark becomes possible, and also in these cases, detection of digital watermark can be performed for information of long information length while suppressing quality deterioration.

Prevention of occurrence of weak frame) In addition, the temporal modulation unit 130 uses, as the embedding pattern, a sum of signals modulated using two periodic signals that are orthogonal or have different phases. If modulation is performed using only one periodic signal, in the case of embedding to the video signal, for example, there is a possibility in that every value of the embedding pattern becomes less that a minimum video signal quantization value so that a frame to which digital watermark embedding is not performed actually occurs. In addition, while such a frame is left unchanged, attack for deleting digital watermark becomes possible by changing a frame in which amplitude of watermark component is large so that watermark is sufficiently embedded. By using, as the embedding pattern, the sum of signals modulated by the two periodic signals that are orthogonal or have different phases like the digital watermark embedding apparatus in the preset embodiment, it can be prevented to produce a frame in which digital watermark becomes less than the minimum video signal quantization value so that digital watermark embedding is not performed actually. Thus, the video signal as a transmission route of digital watermark can be used effectively and robustness can be increased for the attack for aiming and changing a frame in which amplitude of digital watermark is large.

Effects of detection from difference/differentiation) In addition, by using the configuration of FIG. 27 as the temporal demodulation unit 210, since demodulation is performed from the difference value or the differentiation value, original image component is canceled by an amount equal to or greater than that canceled by the periodic signals, so that detection of digital watermark becomes easy and detection accuracy improves. Inversely, since detection performance of similar extent can be maintained even though weaker digital watermark is embedded, digital watermark embedding in which deterioration of signal is smaller is available.

Solving of the problem of synchronization) In addition, although not used in the digital watermark detection apparatus of the present embodiment, by using digital watermark detection apparatuses described in the after-mentioned fourth embodiment and the fifth embodiment, the digital watermark embedding apparatus of the present embodiment has characteristics that digital watermark that does not require synchronization or that makes it possible to perform synchronization easily and rapidly can be embedded using the fact that an embedding sequence to which spectrum spreading has been performed in the N−1-dimensional space receives common influence of desynchronization in the N-th dimension direction.

Robustness to time direction scheduling) In addition, in the digital watermark embedding apparatus in the present embodiment, by using a relatively low frequency as a frequency of the periodic signal used in the temporal modulation unit 130, digital watermark detection can be performed with robustness to some extent for attack including expansion and contraction in the time direction such as frame rate conversion, frame drop and frame insertion.

Effects as a whole) In addition, since reliability is high and robustness is increased in digital watermark detection as a whole, less strength is required in digital watermark embedding for obtaining detection reliability and robustness of similar degree of conventional techniques. Thus, quality deterioration of a signal due to digital watermark can be made smaller, so that, when performing embedding into a video signal, for example, image quality of the digital watermark embedded video can be made high.

Second Embodiment

<One Dimensional FFT Temporal Modulation>

In the following, a digital watermark embedding apparatus and a digital watermark detection apparatus in the second embodiment are described.

The digital watermark embedding apparatus and the digital watermark detection apparatus in the present embodiment are examples in which temporal modulation and demodulation processes in the digital watermark embedding apparatus and the digital watermark detection apparatus of the first embodiment are realized by one dimensional Fourier transform processes.

The digital watermark embedding apparatus of the present embodiment has a configuration similar to that of the digital watermark embedding apparatus 100 of the first embodiment, and only the temporal modulation unit 130 has a different configuration.

The digital watermark detection apparatus of the present embodiment has a configuration similar to that of the digital watermark detection apparatus 200 of the first embodiment, and only the temporal demodulation unit 210 has a different configuration.

<Digital Watermark Embedding Apparatus—Temporal Modulation Unit>

Figure 31:
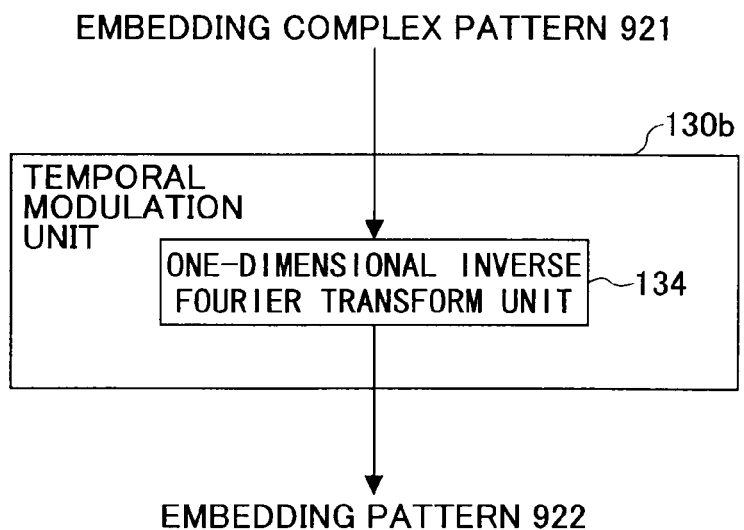
FIG. 31 is a configuration example of a temporal modulation unit in a second embodiment of the present invention.

FIG. 31 shows a configuration example of the temporal modulation unit in the digital watermark embedding apparatus of the second embodiment. The temporal modulation unit 130b shown in the figure includes one dimensional inverse Fourier transform unit 134. The one-dimensional inverse Fourier transform unit 134 receives an embedding complex pattern 921 and outputs an embedding pattern 922.

Generation processes of the embedding pattern 922 by the temporal modulation unit 130b are performed in the one-dimensional inverse Fourier transform unit 134 according to the following procedure.

Figure 32:
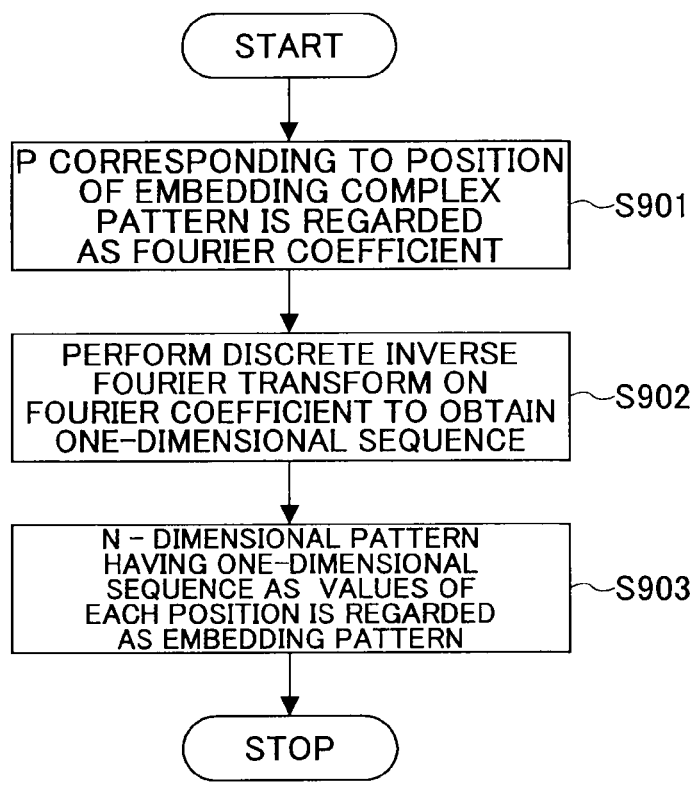
FIG. 32 is a flowchart showing operation of the temporal modulation unit in the second embodiment of the present invention.

FIG. 32 is a flowchart showing operation of the temporal modulation unit in the second embodiment of the present invention.

Step 901) $P(x_1, x_2, \ldots, X_{N-1})$ for the position $(x_1, x_2, \ldots, X_{N-1})$ of the embedding complex pattern 921 is regarded as a Fourier coefficient for a particular frequency in an N-th dimension axis (time axis, for example).

Step 902) Discrete inverse Fourier transform is performed on the Fourier coefficient of step 901 with respect to the N-th dimension axis so as to obtain one-dimensional sequence for the position $(x_1, x_2, \ldots, x_{N-1})$.

Step 903) An N-dimensional pattern including the one-dimensional sequence of step 902 as a value of each position is regarded as the embedding pattern 922.

In the following, these are described more particularly using equations.

Assuming that the embedding complex pattern 921 is $P(x_1, x_2, \ldots, x_{N-1})$. A discrete Fourier coefficient pattern $(x_1, x_2, \ldots, x_{N-1}, U)$ is configured using $P(x_1, x_2, \ldots, x_{N-1})$ as follows, $$\xi\begin{pmatrix} x_1, x_2, \ldots, \\ x_{N-1}, u \end{pmatrix} = \begin{cases} P(x_1, x_2, \ldots, x_{N-1}) & (u = u_0) \\ P^*(x_1, x_2, \ldots, x_{N-1}) & (u = U - u_0) \\ 0 & (u \neq u_0, U - u_0) \end{cases} \quad (81)$$

wherein * indicates complex conjugate, $u_0$ indicates a predetermined frequency, and U indicates a number of frequency samples. The reason for providing the conjugate complex number of P by $u=u_0$ and $u=U-u_0$ is that the signal obtained by performing discrete inverse Fourier transform becomes a real number value.

One-dimensional discrete inverse Fourier transform is performed on $\xi$ with respect to u so as to obtain the embedding pattern $W(x_1, x_2, \ldots, x_{N-1}, t)$.

<Digital Watermark Detection Apparatus—Temporal Demodulation Unit>

Next, the temporal demodulation unit 210 of the digital watermark detection apparatus 200 in the second embodiment is described.

Figure 33:
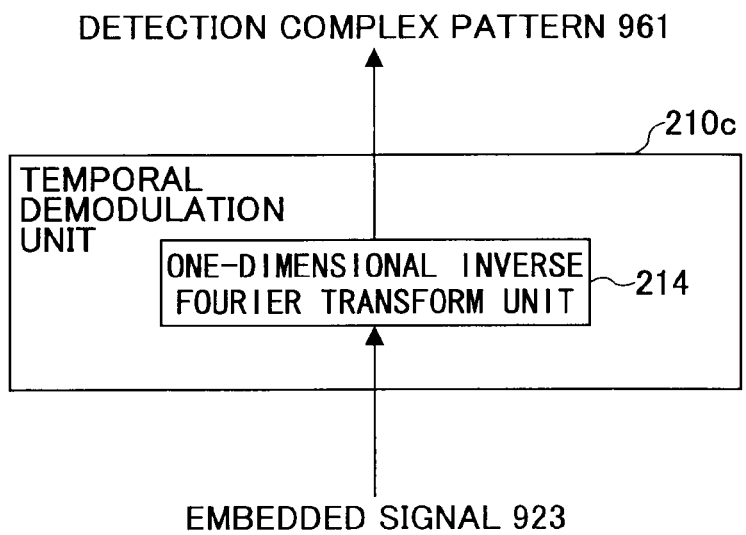
FIG. 33 is a configuration example of the temporal demodulation unit in the second embodiment of the present invention.

FIG. 33 shows a configuration example of the temporal demodulation unit in the second embodiment of the present invention.

The temporal demodulation unit 210c of FIG. 33 includes a one-dimensional Fourier transform unit 214, receives the embedded signal 923, and outputs the detection complex pattern 961.

By the way, in FIG. 33, please note that the configuration is shown such that information flows from the bottom to the top to facilitate understanding of correspondence to FIG. 31.

Demodulation processes for the embedded signal 923 by the temporal demodulation unit 210c are performed according to the following procedure.

Figure 34:
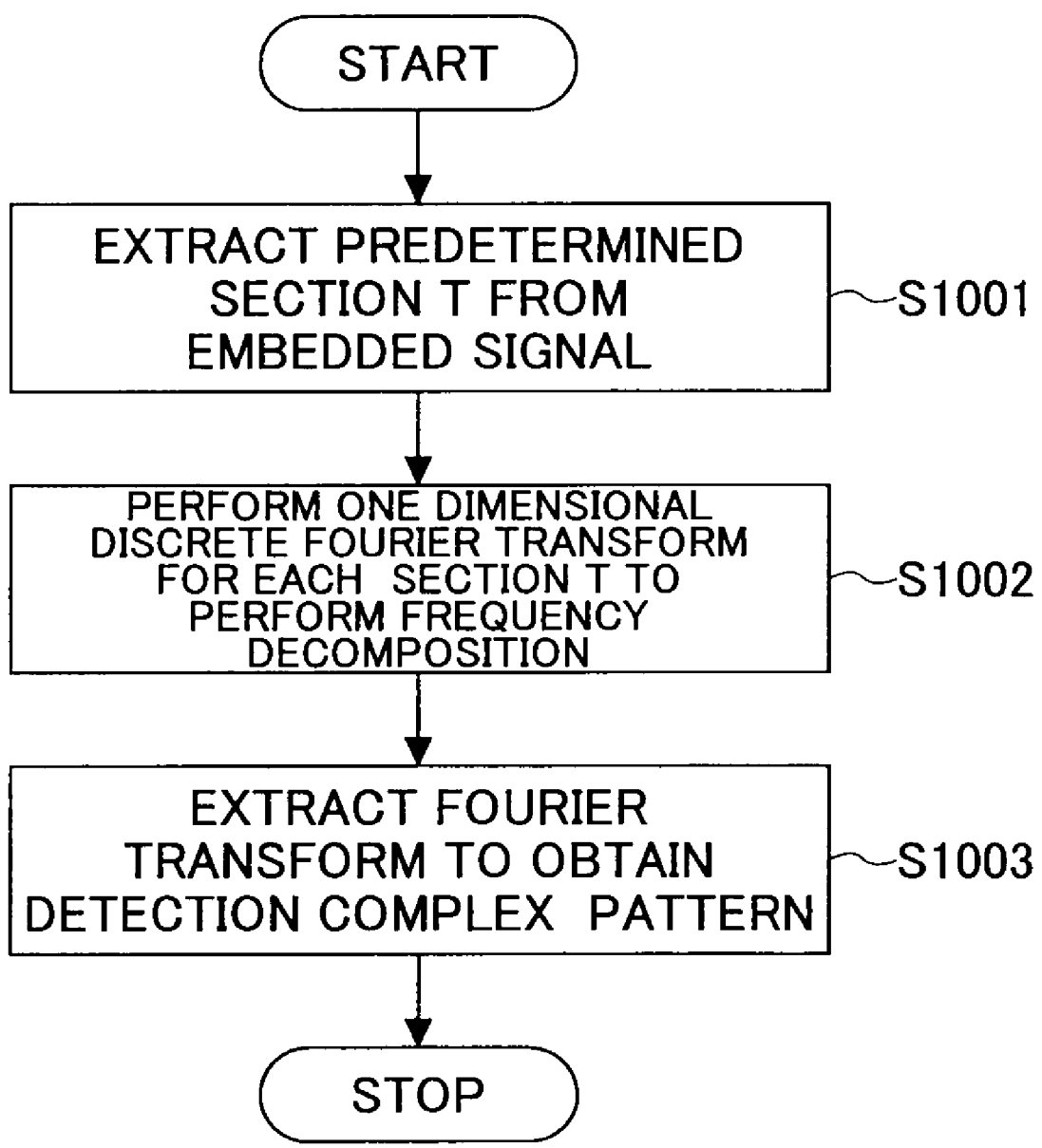
FIG. 34 is a flowchart of operation of a temporal demodulation unit in the second embodiment of the present invention.

FIG. 34 is a flowchart of operation of the temporal demodulation unit in the second embodiment of the present invention.

Step 1001) A predetermined section T is extracted from the received embedded signal 923.

Step 1002) One-dimensional discrete Fourier transform is performed on the section T of step 1001 for each position $(x_1, x_2, \ldots, x_{N-1})$ to perform frequency decomposition.

Step 1003) Fourier coefficients of a predetermined frequency are extracted from the result of step 1002 to obtain the detection complex pattern 961.

These are concretely described in the following using equations.

Assuming that embedded signal 923 is $I''(x_1, x_2, \ldots, x_{N-1}, t)$. One-dimensional discrete Fourier transform is performed on $I''(x_1, x_2, \ldots, x_{N-1}, t)$ as follows to obtain $\eta(x_1, x_2, \ldots, x_{N-1}, u)$, $$\eta\begin{pmatrix} x_1, x_2, \ldots, \\ x_{N-1}, u \end{pmatrix} = \frac{1}{\sqrt{T}} \sum_{t=0}^{T-1} I''(x_1, x_2, \ldots, x_{N-1}, t) e^{-j\frac{2\pi}{T}ut} \quad (82)$$

wherein T is a predetermined number of samples. Assuming that the detection complex pattern 961 is represented as $Q(x_1, x_2, \ldots, x_{N-1})$ so that $Q(x_1, x_2, \ldots, x_{N-1})$ is obtained from $\eta(x_1, x_2, \ldots, x_{N-1}, u)$ as follows, $$Q(x_1, x_2, \ldots, x_{N-1}) = \eta(x_1, x_2, \ldots, x_{N-1}, u_0) \quad (83)$$

wherein, $u_0$ indicates a predetermined frequency.

In the following, temporal demodulation using difference/differentiation is described.

Similar to those shown in the first embodiment, instead of the above-mentioned processes, demodulation may be performed by performing one dimensional discrete Fourier transform on the difference or differentiation in the t axis direction of the embedded signal 923 $I''(x_1, x_2, \ldots, x_{N-1}, t)$. That is, when using the difference, for example, $$J(x_1, x_2, \ldots, x_{N-1}, t) = \quad (84)$$
$$I''(x_1, x_2, \ldots, x_{N-1}, t + \Delta t) - I''(x_1, x_2, \ldots, x_{N-1}, t)$$

$$\eta(x_1, x_2, \ldots, x_{N-1}, u) = \frac{1}{\sqrt{T}} \sum_{t=0}^{T-1} I''(x_1, x_2, \ldots, x_{N-1}, t) e^{-j\frac{2\pi}{T}ut} \quad (85)$$

wherein it is assumed that T is a predetermined number of samples. In addition, $\Delta t$ is a predetermined interval of samples. For example, when $\Delta t=1$, it indicates to calculate the difference at intervals of one sample, and when a video signal is taken as an example, it indicates calculating a difference between adjacent frames. $\Delta t$ may be a number other than 1.

Figure 35:
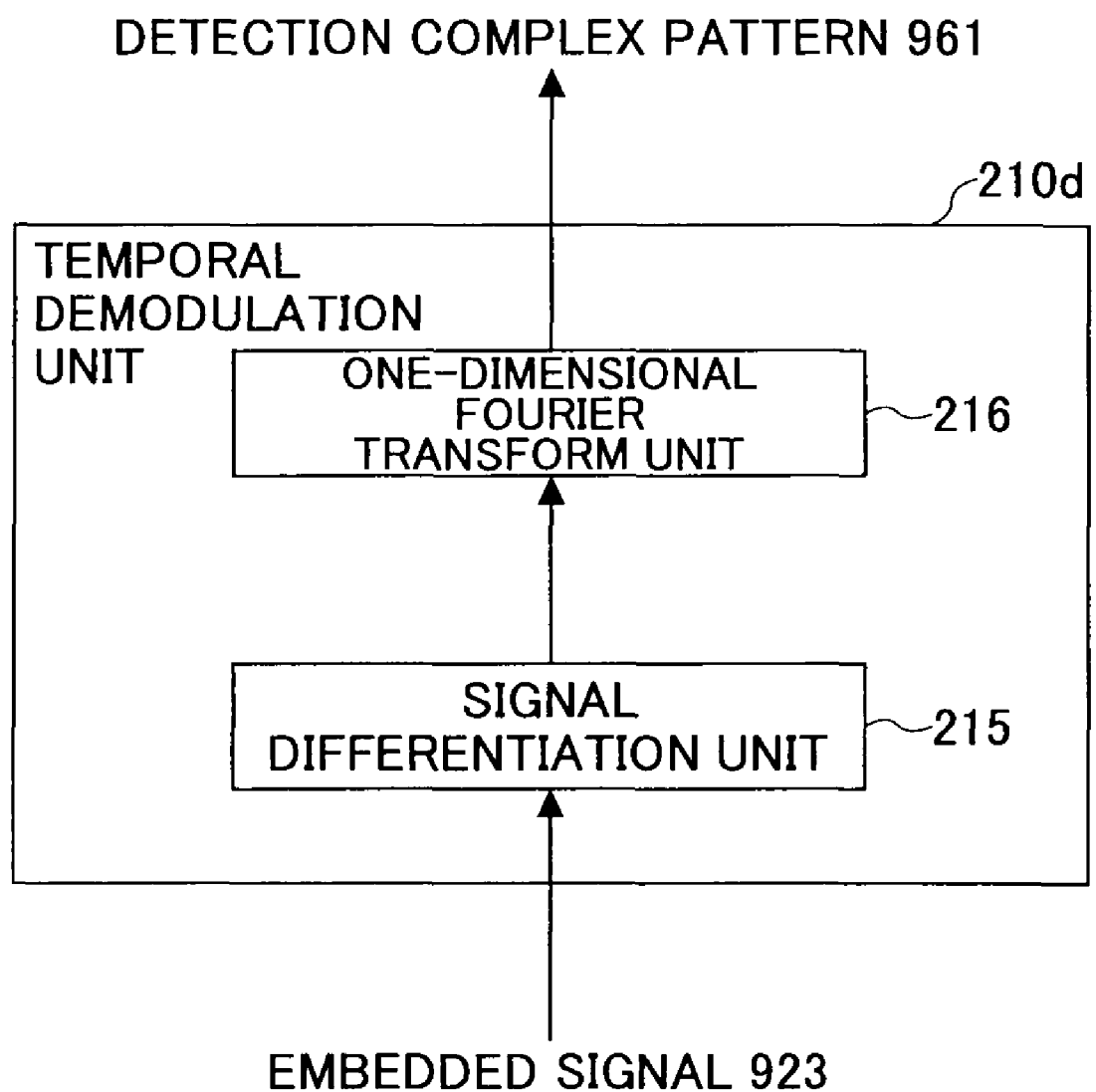
FIG. 35 is a configuration example using difference/differentiation in the second embodiment of the present invention.

A configuration example of the temporal demodulation unit 210 is shown in FIG. 35.

The temporal demodulation unit 210d of FIG. 35 has a configuration almost similar to that of the temporal demodulation unit 210c of FIG. 33, and it is different in that it is configured such that the embedded signal 923 is supplied to the one-dimensional Fourier transform unit 216 after once being supplied to the signal differentiation unit 215.

The signal differentiation unit 215 calculates difference or differentiation for the received embedded signal 923 in the N-th dimension axis direction, that is, in the t axis direction, and outputs the difference or the differentiation to the one-dimensional Fourier transform unit 216.

The effect of performing demodulation by performing one-dimensional discrete Fourier transform on the difference or the differentiation of the embedded signal 923 $I''(x_1, x_2, \ldots, x_{N-1}, t)$ in the t axis direction is the same as the effect of the temporal demodulation unit 210b shown in FIG. 27 in the first embodiment.

Characteristics of the Second Embodiment

Characteristics of the present invention are described.

The digital watermark embedding apparatus and the digital watermark detection apparatus of the present embodiment are examples in which the digital watermark embedding apparatus and the digital watermark detection apparatus of the first embodiment are realized using one-dimensional Fourier transform.

By using the one-dimensional Fourier transform, the digital watermark embedding apparatus and the digital watermark detection apparatus can be easily configured using an existing Fourier transform apparatus.

By the way, the digital watermark embedding apparatuses and the digital watermark detection apparatuses of the first embodiment and the present embodiment may be used by combining them. That is, the temporal modulation unit 130$b$ of the digital watermark embedding apparatus may be replaced with the temporal modulation unit 130$a$ of the first embodiment, and the temporal demodulation unit 210$c$ of the digital watermark detection apparatus may be replaced with the temporal demodulation unit 210$d$ of the present embodiment, so that they may be used by combining them, and the temporal modulation unit 130$a$ of the digital watermark embedding apparatus may be replaced with the temporal modulation unit 130$b$ of the present embodiment, and the temporal demodulation unit 210$c$ of the digital watermark detection apparatus may be replaced with the temporal demodulation unit 210$d$ of the present embodiment.

Third Embodiment

<Two-Dimensional FFT Coefficient Embedding>

In the following, a digital watermark embedding apparatus and a digital watermark detection apparatus in the third embodiment are described.

The present embodiment is an example in which digital watermark embedding is performed in orthogonal transform region in the digital watermark embedding apparatus and the digital watermark detection apparatus of the first embodiment.

The digital watermark embedding apparatus of the present embodiment has a configuration similar to that of the digital watermark embedding apparatus of the first embodiment, but only the complex pattern generation unit is different.

The digital watermark detection apparatus of the present embodiment has a configuration similar to that of the digital watermark detection apparatus of the first embodiment, but only the detection information extraction unit is different.

<Digital Watermark Embedding Apparatus—Complex Pattern Generation Unit>

In the following, the complex pattern generation unit in the present embodiment is described.

Figure 36:
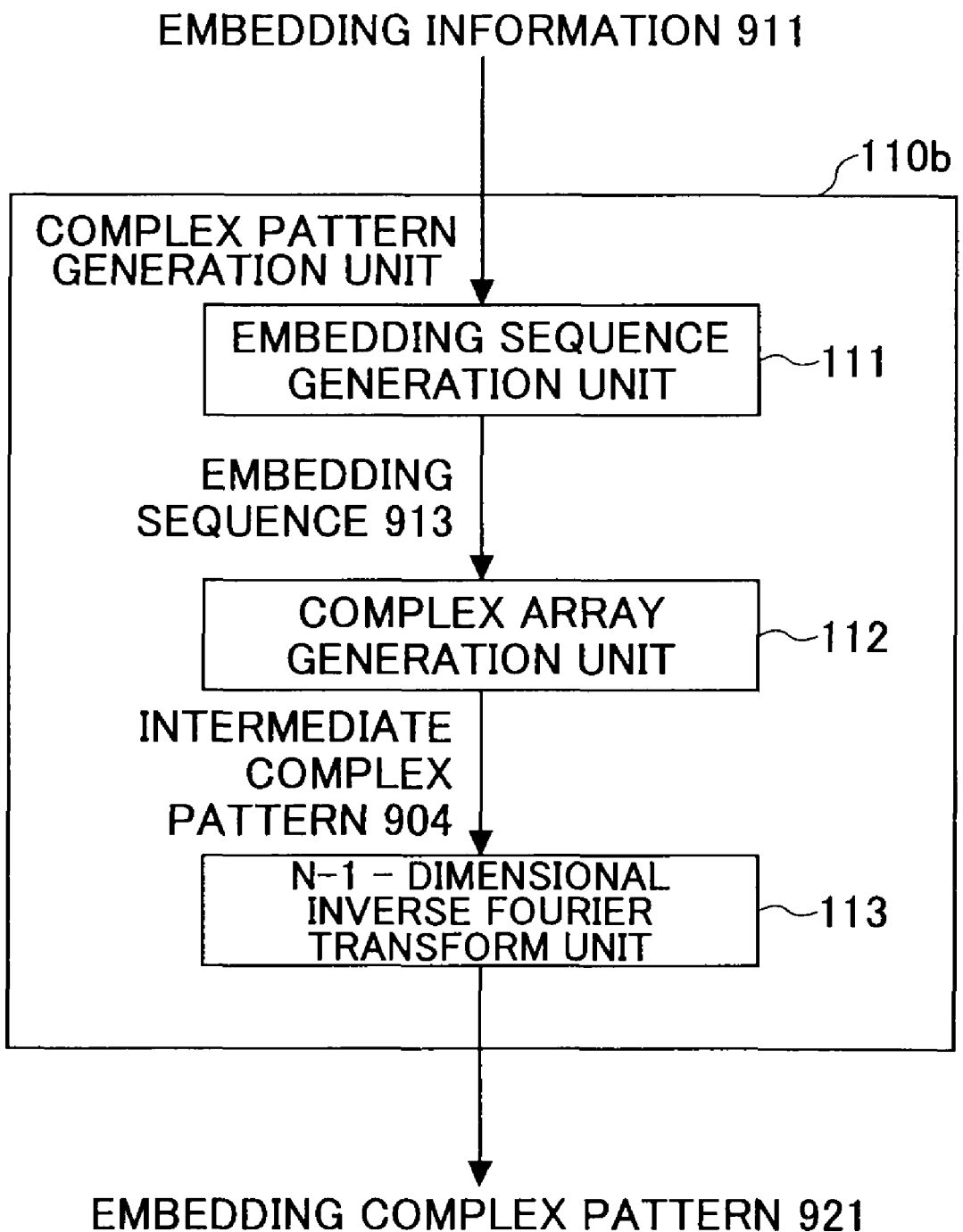
FIG. 36 is a configuration example of a complex pattern generation unit in a third embodiment of the present invention.

FIG. 36 shows the complex pattern generation unit of the third embodiment of the present invention.

The complex pattern generation unit 110$b$ shown in the figure includes an embedding sequence generation unit 111, a complex array generation unit 112, and an N−1-dimensional inverse Fourier transform unit 113, and has a configuration obtained by adding the N−1-dimensional inverse Fourier transform unit 113 to the configuration shown in FIG. 12. The complex pattern generation unit 110$b$ receives the embedding information 911 and outputs embedding complex pattern 921.

Processes for generating the embedding complex pattern by the complex pattern generation unit 110$b$ are performed according to the following procedure.

Figure 37:
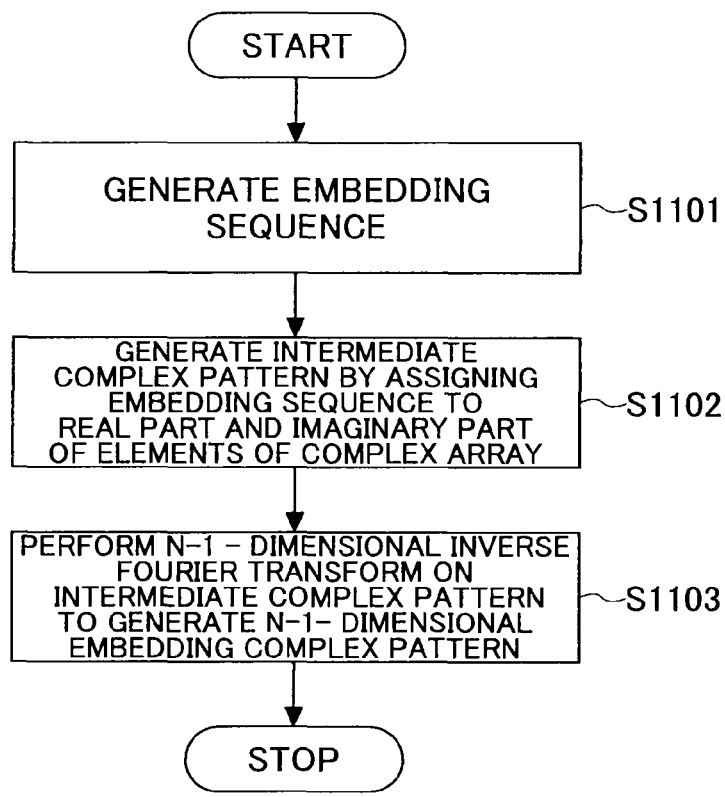
FIG. 37 is a flowchart of operation of the complex pattern generation unit in the third embodiment of the present invention.

FIG. 37 is a flowchart of operation of the complex pattern generation unit in the third embodiment of the present invention.

Step 1101) The embedding sequence generation unit 111 generates the embedding sequence 913 that is a sequence of number values indicating embedding information based on the received embedding information 911. Operation of the embedding sequence generation unit 111 is the same as that in the first embodiment.

Step 1102) The complex array generation unit 112 assigns the embedding sequence 913 generated in the embedding sequence generation unit 112 to the real part and the imaginary part of the elements of the N−1-dimensional complex array to generate an intermediate complex pattern 904.

Operation of the complex array generation unit 112 is described later.

Step 1103) The N−1 dimensional inverse Fourier transform unit 113 performs N−1-dimensional inverse Fourier transform on the intermediate complex pattern 904 generated in the complex array generation unit 112 to generate the N−1-dimensional embedding complex pattern 921 similarly. Details of operation of the N−1-dimensional inverse Fourier transform unit 113 are described later.

<Digital Watermark Embedding Apparatus—Complex Pattern Generation Unit—Complex Array Generation Unit>

Next, operation of the complex array generation unit 112 of the step 1102 is described in detail.

Although operation of the complex array generation unit 112 may be one same as that of the complex array generation unit of the first embodiment, following processes may be also adopted for more effective digital watermark embedding.

1) An N−1-dimensional complex array of a size of $M_1 \times M_2 \times \ldots \times M_{N-1}$ in which every element value is 0 is prepared, wherein $M_1, M_2, \ldots, M_{N-1}$ are predetermined number of elements.

2) A range of elements to which the embedding sequence 913 is assigned in the complex array is determined. An example of the range is described later.

3) Values are extracted from the embedding sequence 913 two by two in sequence, then, values are set in the array such that the values extracted in sequence becomes the real part and the imaginary part of the element value for elements in the range determined in 2) in the array of the 1).

4) The complex array generated in 3) is output to the N−1-dimensional inverse Fourier transform unit 113 as the intermediate complex pattern 904.

Like the complex array generation unit in the first embodiment, it is needless to say that the order of the embedding sequence 913 may be permuted to random order using a pseudo-random number before 3).

Such processes for generating complex array are similar to generation of the watermark coefficient matrix shown in the patent document 1. However, in the present invention, although the intermediate complex pattern 904 is inverse Fourier transformed by the N−1-dimensional inverse Fourier transform unit 113 later, it is not necessary that the result of the inverse Fourier transform becomes a real number value, and it may be a complex number. Thus, it is not necessary that the intermediate complex pattern 904 maintains symmetrical property of the Fourier transform coefficients. That is, embedding of the embedding sequence 913 can be performed using all elements in the range of 2), and it represents that two times longer embedding sequence 913 can be embedded compared with the patent document 1.

The range of the elements in 2) is described.

Figure 38A:
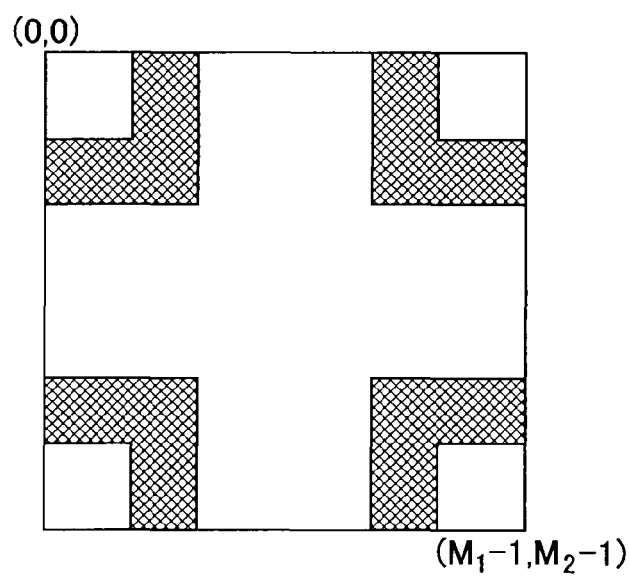
FIG. 38A is an example 1 of an element range of the complex array in the complex array generation unit in the third embodiment of the present invention.
Figure 38B:
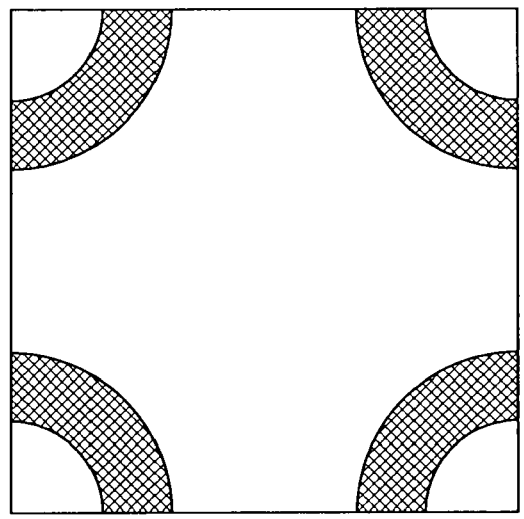
FIG. 38B is an example 2 of the element range of the complex array.

FIGS. 38A-38F show each example of the element range of the complex array in the complex array generation unit in the third embodiment of the present invention. FIGS. 38A, B and C show examples of the range of elements of the complex array in the complex array generation unit 112, and show examples in the case using two-dimensional complex array in N=3. In FIGS. 38A-38F, the rectangular part indicates the complex array, and the shaded region indicates the range of elements where assignment of the embedding sequence should be performed.

Since inverse Fourier transform is performed on the complex array in the N−1-dimensional Fourier transform unit 113 later, the complex array can be considered to be representation for the embedding pattern in the frequency domain.

Figure 38C:
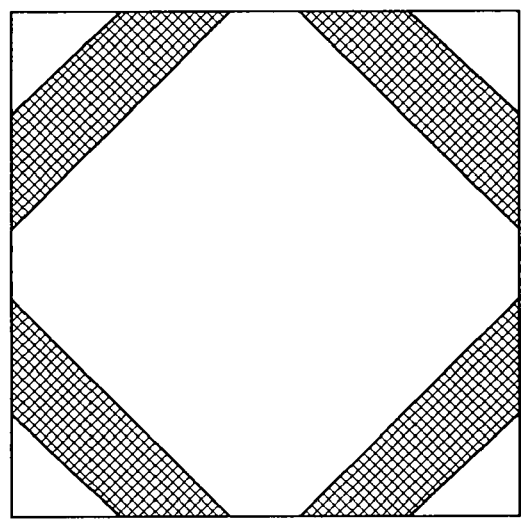
FIG. 38C is an example 3 of the element range of the complex array.
Figure 38D:
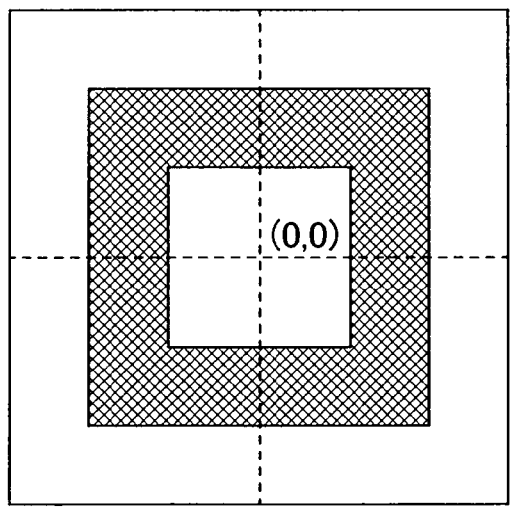
FIG. 38D is an example 4 of the element range of the complex array.

Since the element (0, 0) of the array indicates the DC component, by cyclically rewriting the complex array such that the element (0, 0) of the array becomes the center, it can be understood which frequency band is used for embedding the embedding sequence 913 as shown in FIGS. 38D, E and F.

Figure 38E:
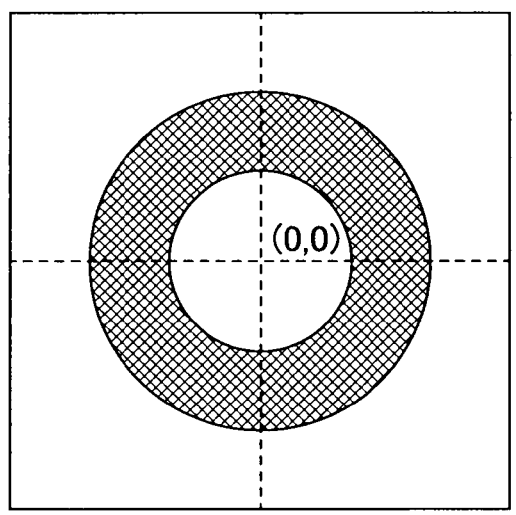
FIG. 38E is an example 5 of the element range of the complex array.
Figure 38F:
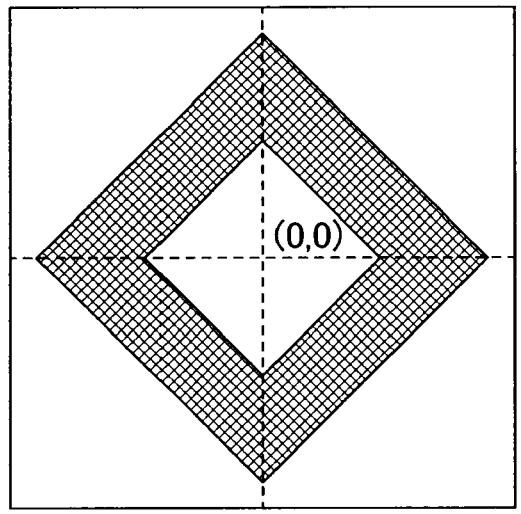
FIG. 38F is an example 6 of the element range of the complex array.
Figure 39A:
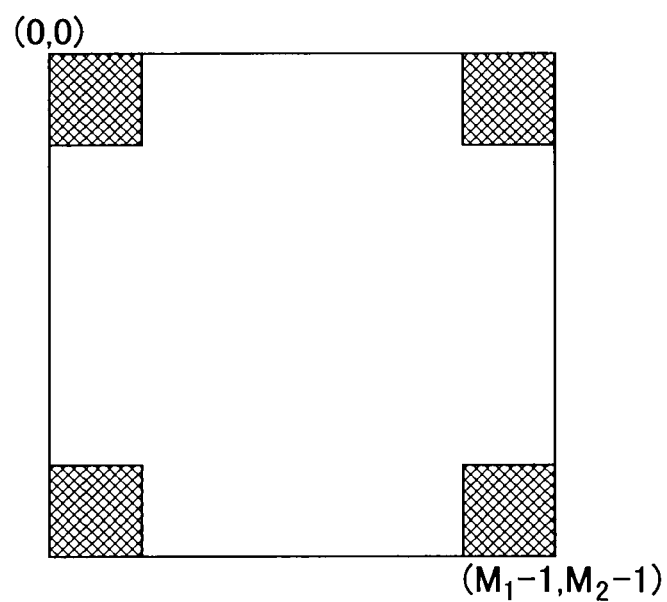
FIG. 39A is an example 7 of the element range of the complex array.
Figure 39B:
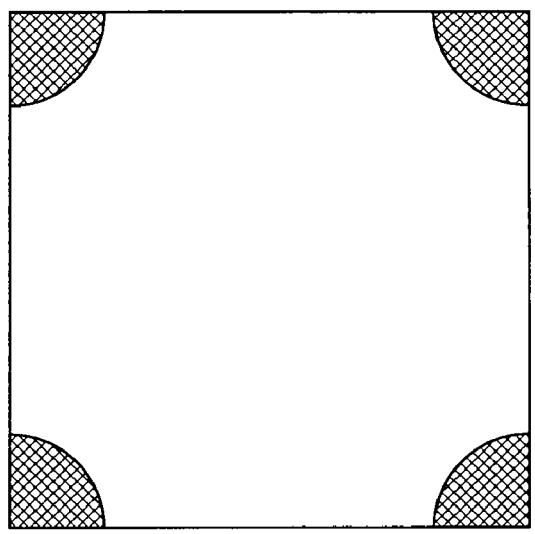
FIG. 39B is an example 8 of the element range of the complex array.
Figure 39C:
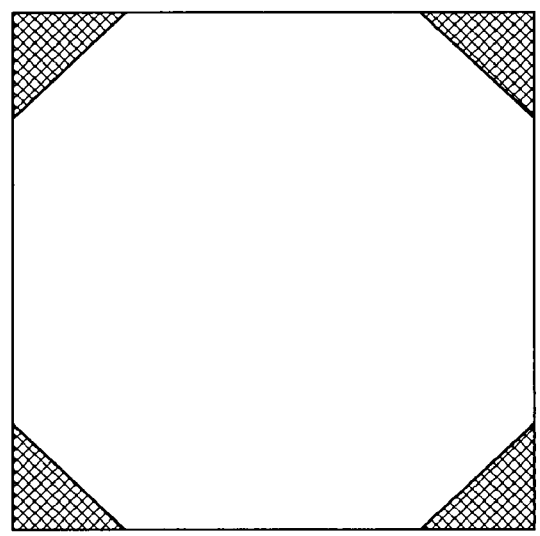
FIG. 39C is an example 9 of the element range of the complex array.
Figure 39D:
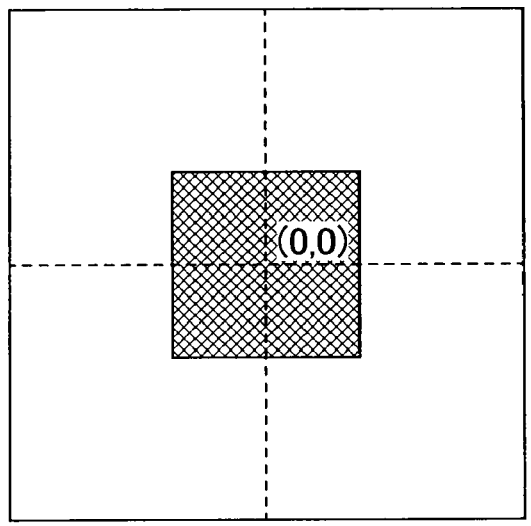
FIG. 39D is an example 10 of the element range of the complex array.
Figure 39E:
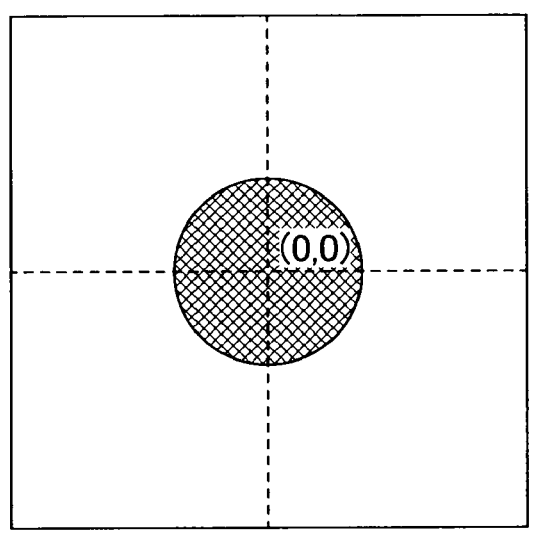
FIG. 39E is an example 11 of the element range of the complex array.
Figure 39F:
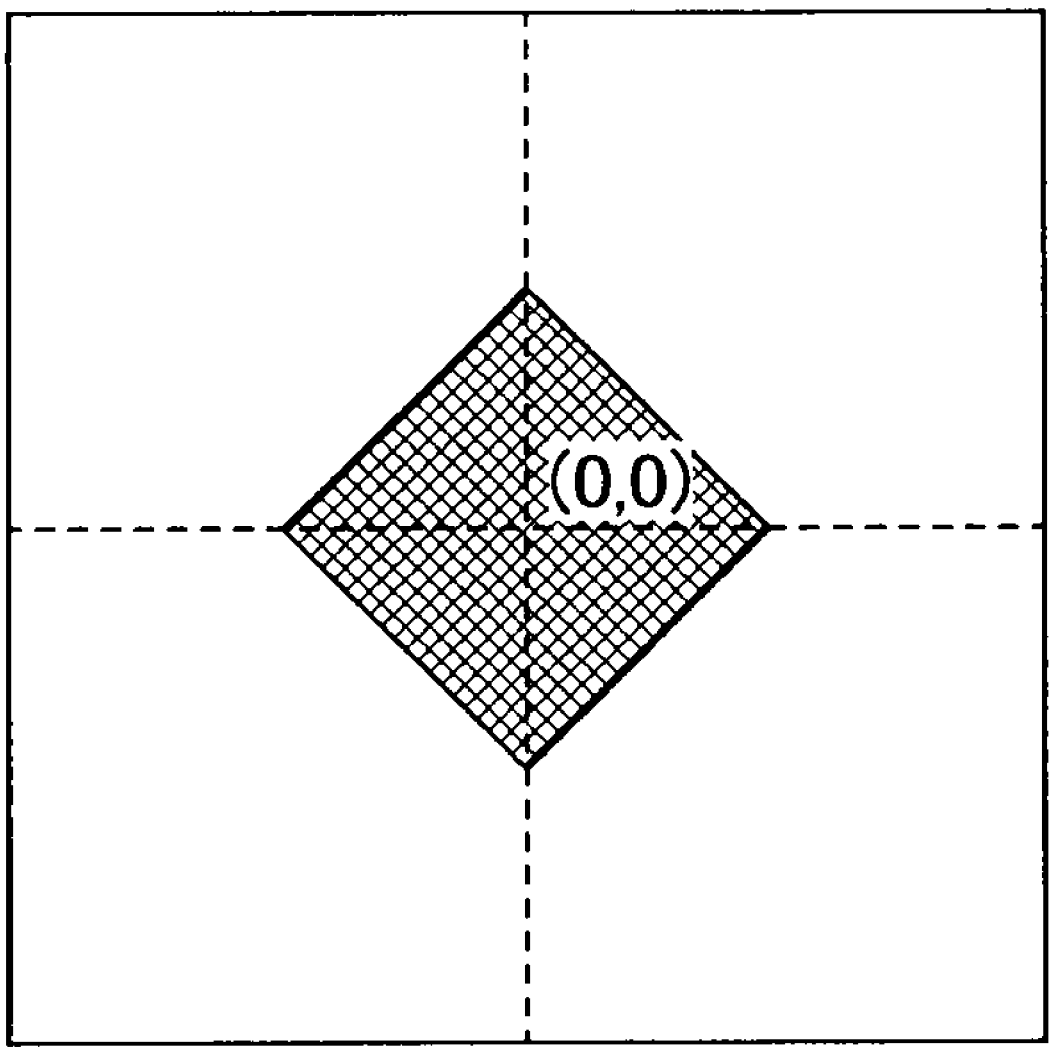
FIG. 39F is an example 12 of the element range of the complex array.

FIG. 38D shows a rectangular region, FIG. 38E shows a circle region, and FIG. 38F shows a rhombus region, and embedding is performed into an intermediate frequency band in each of them.

For example, considering digital watermark embedding into an image or a video, it can be considered that digital watermark embedded in a high frequency region is easily deleted due to video coding such as MPEG2 or H.264. On the other hand, since embedding into a low frequency region has large visual effect. Thus, embedding into intermediate frequency band is taken as an example.

In addition, from the viewpoint of human visual feature, it is known that, in high frequency region, visual sensitivity for diagonal direction frequency is lower than that for vertical and horizontal direction frequency (Makoto Miyahara, "Systematic image coding", Industrial Publishing & Consulting, Inc, 1990, pp. 87), so that the diagonal direction frequency has a feature in that it is indistinctive although it is embedded in low frequency band compared with the vertical and horizontal direction. In addition, for example, since a quantization step in the diagonal direction in image/video coding and the like such as JPEG and MPEG is set to be larger than the vertical and horizontal direction, there is a tendency that high frequency is decreased due to coding more easily in the diagonal direction compared with the vertical and horizontal direction. In spite of such a situation, by performing embedding in the rhombus region as shown in FIGS. 38C and F, digital watermark embedding can be performed in which image quality is high and robustness is high.

FIGS. 39A-39F show each example of the element region of the complex array in the complex array generation unit in the third embodiment of the present invention. In the case of digital watermark embedding into a video, when digital watermark detection of high detection performance is performed using a long term signal in the time direction like the present invention, that is, using many frames, the strength for embedding digital watermark can be made small. As a result, although embedding is performed into low frequency region as shown in FIGS. 39A-39F, visual effect can be decreased, and such embedding method can be adopted.

<Digital Watermark Embedding Apparatus—Complex Pattern Generation Unit—N−1-Dimensional Inverse Fourier Transform Unit>

Next, operation of the N−1-dimensional inverse Fourier transform unit 113 of the complex pattern generation unit 110b is described in detail.

Fourier transform in the N−1-dimensional inverse Fourier transform unit 113 is performed according to the following procedure.

1) Assuming that the N−1-dimensional intermediate complex pattern 904 generated by the complex array generation unit 112 is A [$x_1, x_2, \ldots, x_{N-1}$].

2) N−1-dimensional discrete inverse Fourier transform is performed on A($x_1, x_2, \ldots, x_{N-1}$) to obtain the embedding complex pattern P($x_1, x_2, \ldots, x_{N-1}$), $$P(x_1, x_2, \ldots, x_{N-1}) = \frac{1}{\sqrt{M_1 M_2 \ldots M_{N-1}}} \sum_{u_1=0}^{M_1-1} \sum_{u_2=0}^{M_2-1} \ldots \sum_{u_{N-1}=0}^{M_{N-1}-1} A[x_1, x_2, \ldots, x_{N-1}] e^{j2\pi\left(\frac{x_1 u_1}{M_1} + \frac{x_2 u_2}{M_2} + \ldots + \frac{x_{N-1} u_{N-1}}{M_{N-1}}\right)} \quad (86)$$

wherein $M_1, M_2, \ldots, M_{N-1}$ indicate sizes (number of elements of each dimension) of the N−1-dimensional intermediate complex pattern 904 generated in the complex array generation unit 112.

<Digital Watermark Detection Apparatus—Detection Information Extraction Unit>

Next, the detection information extraction unit 220b of the digital watermark detection apparatus 200 in the third embodiment is described.

Figure 40:
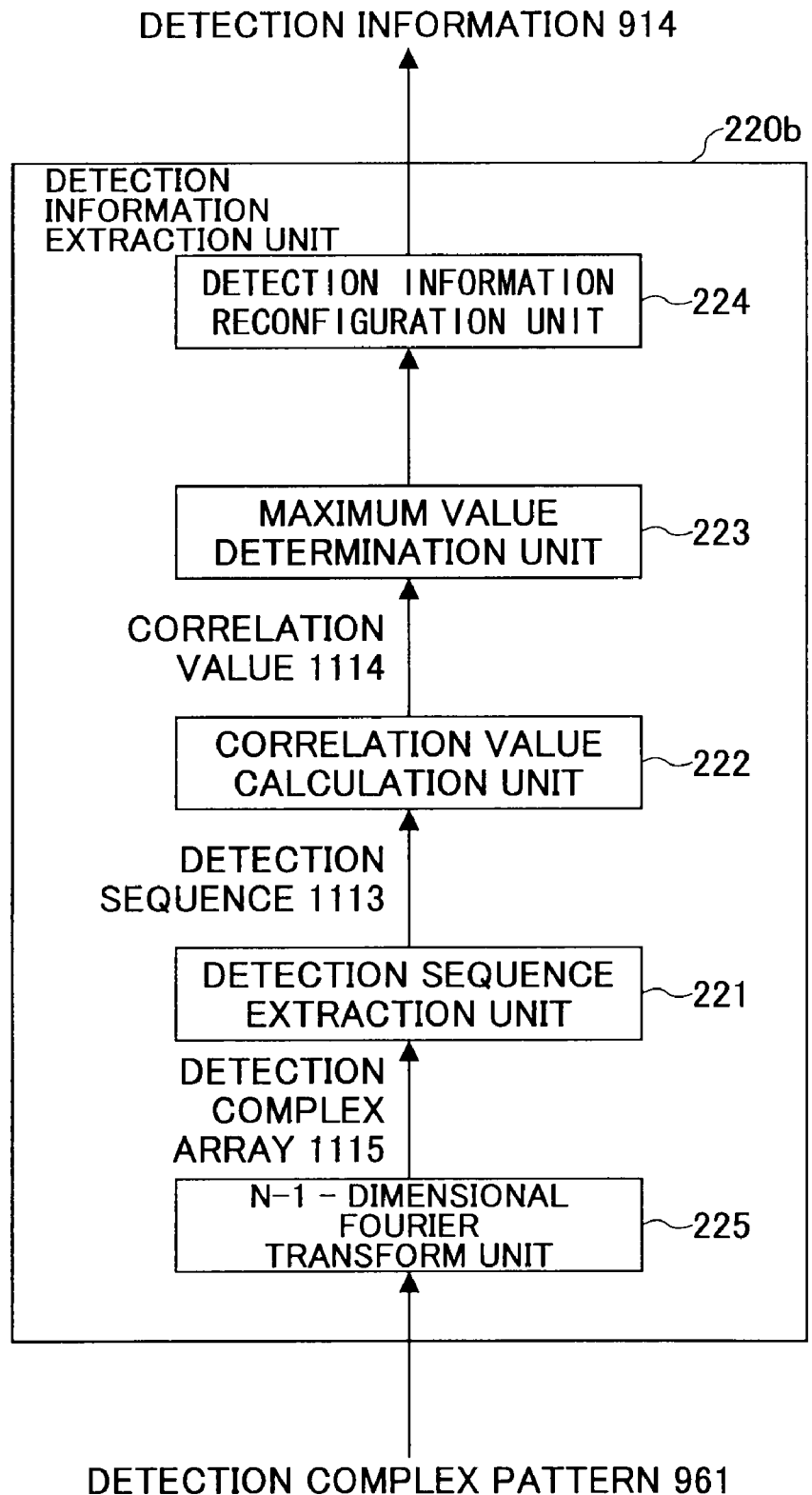
FIG. 40 is a configuration example of a detection information extraction unit in the third embodiment of the present invention.

FIG. 40 shows a configuration example of the detection information extraction unit in the third embodiment of the present invention.

The detection information process unit 220b shown in the figure includes a N−1-dimensional Fourier transform unit 225, a detection sequence extraction unit 221, a correlation value calculation unit 222, a maximum value determination unit 223, and a detection information reconfiguration unit 224, and the unit 220b receives the detection complex pattern 961 and outputs detection information 914.

By the way, in FIG. 40, please note that the configuration is shown such that information flows from the bottom to the top to facilitate understanding of correspondence to FIG. 36.

Detection information extraction processes by the detection information extraction unit 220b are performed in the following procedure.

Figure 41:
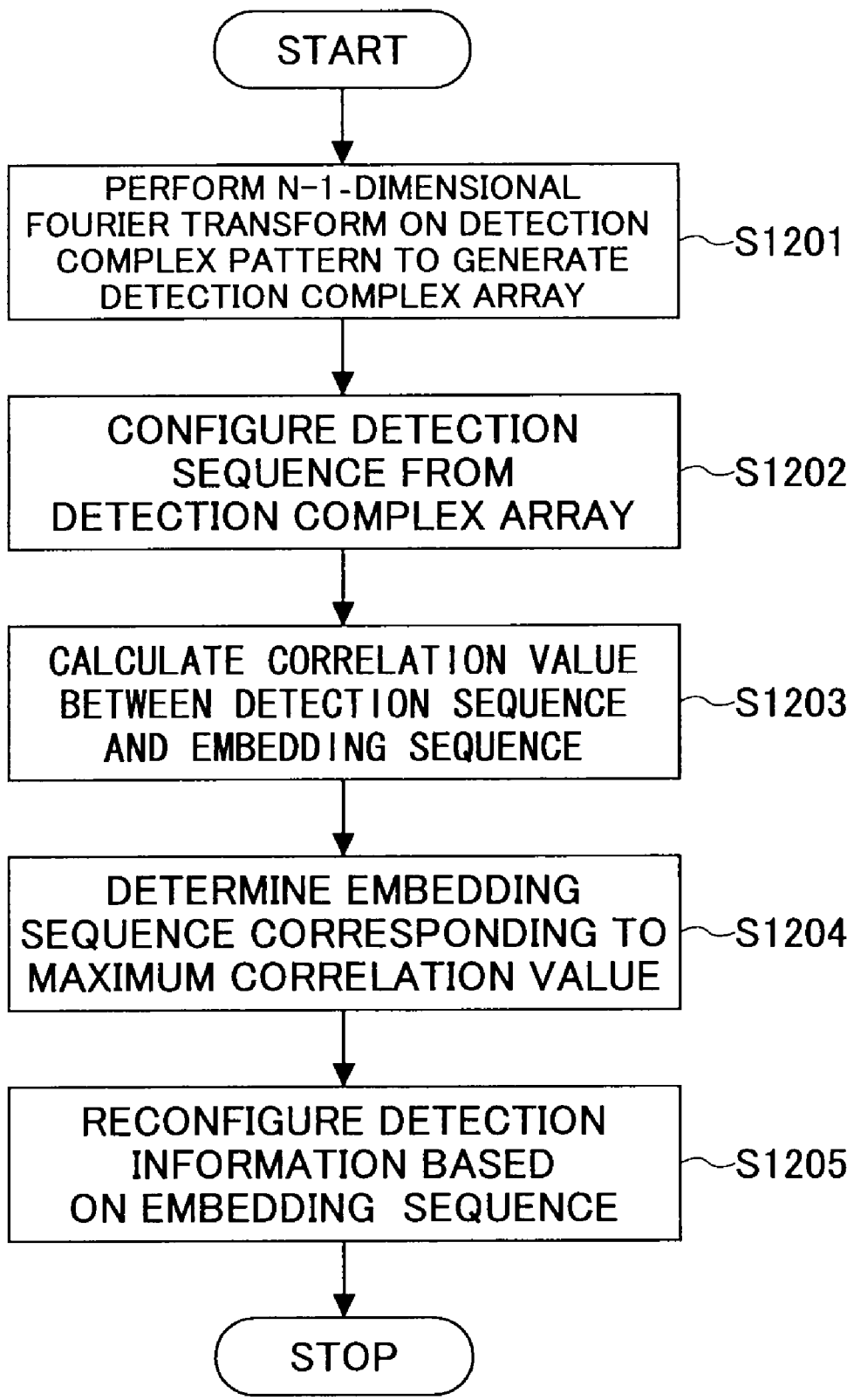
FIG. 41 is a flowchart of operation of the detection information extraction unit in the third embodiment of the present invention.

FIG. 41 is a flowchart of operation of the detection information extraction unit in the third embodiment of the present invention.

Step 1201) The N−1-dimensional Fourier transform unit 225 performs N−1-dimensional Fourier transform on the received detection complex pattern 961 to generate the N−1-dimensional detection complex array 1115 similarly.

Details of operation of the N−1-dimensional Fourier transform unit 225 are described later.

Step 1202) The detection sequence extraction unit 221 configures the detection sequence 1113 by extracting and arranging the values of the real part and the imaginary part of the element value from the detection complex array 1115 generated by the N−1-dimensional Fourier transform unit 225.

Details of operation of the detection sequence extraction unit 221 are described later.

Step 1203) The correlation value calculation unit 222 calculates correlation between the detection sequence 1113 configured by the detection sequence extraction unit 221 and embedding sequences configured based on assumed embedding sequences so as to obtain the correlation values 1114.

Operation of the correlation value calculation unit 222 is the same as that in the first embodiment.

Step 1204) The maximum value determination unit 223 finds a maximum correlation value in the correlation values 1114 obtained by the correlation value calculation unit 222 to determine an embedding sequence used for correlation calculation in the correlation value calculation unit 222 corresponding to the maximum correlation value 1114.

The operation of the maximum value determination unit 223 is the same as that in the first embodiment. Depending on the configuration method for the embedding sequence in the digital watermark embedding apparatus 100, it is needless to say that determination may be performed using other method instead of the maximum value determination by the maximum value determination unit 223.

Step 1205) The detection information reconfiguration unit 224 reconfigures detection information 914 that is determined to be actually embedded based on the embedding sequence determined by the maximum value determination unit 223.

The operation of the detection information reconfiguration unit 224 is the same as that in the first embodiment.

<Digital Watermark Detection Apparatus—Detection Information Extraction Unit—N−1-Dimensional Inverse Fourier Transform Unit>

Next, details of operation of the N−1-dimensional Fourier transform unit 225 of the detection information extraction unit 220b are described.

Fourier transform processes in the N−1-dimensional Fourier transform unit 225 are performed according to the following procedure.

1) N−1-dimensional complex array of the size of $M_1 \times M_2 \times \ldots \times M_{N-1}$ is configured from the received detection complex pattern 961, in which $M_1, M_2, \ldots, M_{N-1}$ are element numbers similar to those used in the complex array generation unit 112 of the digital watermark embedding apparatus 100.

When the detection complex pattern 961 is obtained as a discrete signal, it is regarded as the N−1-dimensional complex array as it is. When the detection complex pattern 961 is obtained as a continuous signal, data obtained by sampling the detection complex pattern 961 using arbitrary sampling means is used as the N−1-dimensional complex array.

2) Assuming that the complex array in 1) is $Q(x_1, x_2, \ldots, x_{N-1})$, N−1-dimensional discrete Fourier transform is performed on $Q(x_1, x_2, \ldots, x_{N-1})$ to obtain $A[u_1, u_2, \ldots, u_{N-1}]$.

$$A[u_1, u_2, \ldots, u_{N-1}] = \qquad (87)$$

$$\frac{1}{\sqrt{M_1 M_2 \ldots M_{N-1}}} \sum_{x_1=0}^{M_1-1} \sum_{x_2=0}^{M_2-1} \ldots \sum_{x_{N-1}=0}^{M_{N-1}-1} Q(x_1, x_2, \ldots, x_{N-1})$$

$$e^{-j2\pi\left(\frac{x_1 u_1}{M_1} + \frac{x_2 u_2}{M_2} + \ldots + \frac{x_{N-1} u_{N-1}}{M_{N-1}}\right)}$$

3) A $[u_1, u_2, \ldots, u_{N-1}]$ obtained in 2) is output to the detection sequence extraction unit 221 as the detection complex array 1115.

<Digital Watermark Detection Apparatus—Detection Information Extraction Unit—Detection Sequence Extraction Unit>

Next, details of operation of the detection sequence extraction unit 220b of the detection information extraction unit 221 are described.

Although the operation of the detection sequence extraction unit 221 is basically the same as that in the first embodiment, processes may be performed as follows in accordance with the operation of the complex array generation unit 112.

1) Elements within the range used in the complex array generation unit 112 of the digital watermark embedding apparatus 100 are extracted from the detection complex array 1115 obtained by the N−1-dimensional Fourier transform unit 225, and the real part and the imaginary part of the extracted complex number values are arranged by regarding each of the real part and the imaginary part as an independent real number value. This process is a symmetrical process with respect to generation of the complex array in the complex array generation unit 112 of the digital watermark embedding apparatus 100.

2) Assuming that the obtained sequence is $i''_1, i''_2, \ldots, i''_L$, and the sequence is output as the detection sequence 1113.

When order of the embedding sequence 913 or elements of the complex array has been permuted in the complex array generation unit 112 of the digital watermark embedding apparatus 100, the order is restored in the same way as the first embodiment.

Characteristics of the Third Embodiment

In the following, characteristics of the present embodiment are described.

According to the digital watermark embedding apparatus and the digital watermark detection apparatus of the present embodiment, like one shown in the patent document 1, for examine, since digital watermark can be embedded in a band in which the watermark easily remains even in coding or noise addition in a video signal and visual effect is small, digital watermark embedding in which robustness is high and image quality is high becomes possible.

Especially, by using the rhombus region as the region for embedding in the frequency domain, digital watermark embedding that is more robust for compression in video coding and the like becomes possible.

In addition, since the embedding pattern is spread over the whole signal, by adopting offset search method disclosed in the patent document 1, digital watermark detection becomes possible even from a signal that is partially cut from the embedded signal.

Further, in the present invention, different from the digital watermark scheme shown in the patent document 1, since the intermediate complex pattern 904 does not need to maintain symmetrical property of Fourier transform coefficients, an embedding sequence 913 two times longer can be embedded compared with a watermark coefficient matrix and the like described in paragraph number 0197 in the patent document 1. That is, a spectrum spread sequence length twice as long as the conventional one can be used.

As describe before, as the spectrum spread sequence length increases, detection with high reliability becomes possible. In addition, in the case of detection reliability similar to conventional techniques, the embedding information length can be doubled. In addition, in the case of detection reliability and information length both similar to conventional techniques, digital watermark embedding with less quality deterioration becomes possible. Thus, according to the present invention, digital watermark embedding becomes possible in which reliability is high, information length is long and quality deterioration is small.

In addition, the present embodiment and the temporal modulation unit 130b or the temporal demodulation unit 210b of the second embodiment can be combined and carried out.

When combining the present embodiment and the temporal modulation unit 130b or the temporal demodulation unit 210b of the second embodiment, N−1-dimensional inverse Fourier transform process of the N−1-dimensional inverse Fourier transform unit 113 and the one-dimensional inverse Fourier transform process of the temporal modulation unit 130 may be performed together as N-dimensional inverse Fourier transform process. In the same way, N−1-dimensional transform process of the N−1-dimensional Fourier transform unit 225 and the one-dimensional Fourier transform process of the temporal demodulation unit 210 may be performed together as N-dimensional Fourier transform process.

Fourth Embodiment

<Temporal Synchronization Unnecessary Detection>

In the following, a digital watermark embedding apparatus and a digital watermark detection apparatus of the fourth embodiment are described.

The present embodiment is an example in which, when digital watermark embedding is performed by using the digital watermark embedding apparatus 100 in the first embodiment, the digital watermark detection apparatus performs digital watermark detection without necessity to perform synchronization when signals desynchronized in the time axis (N-th dimension axis) direction are received.

The digital watermark detection apparatus of the present embodiment has a configuration similar to that of the digital watermark detection apparatus 200 of the first embodiment, and only the detection information extraction unit 220 has a different configuration.

As to the temporal demodulation unit 210, a temporal demodulation unit of other embodiments of the present invention may be used. For example, the temporal demodulation units 210*b* and 210*c* of the second embodiment may be used.

By the way, although the present embodiment is described by taking, as an example, the case where digital watermark embedding is performed by the digital watermark embedding apparatus 100 of the first embodiment, the present embodiment can be also applied to detection in the case when digital watermark embedding is performed using a digital watermark embedding apparatus in other embodiments by similarly combining. For example, digital watermark embedding may be performed by the digital watermark embedding apparatus in the third embodiment, and detection may be performed by combining the N−1-dimensional Fourier transform unit 225 of the digital watermark detection apparatus in the third embodiment. In these cases, although there is a case in which modification corresponding to individual procedures is necessary, it is needless to say that the necessary modifications are obvious based on descriptions of the present embodiment and descriptions of digital watermark embedding in the embodiments.

<Digital Watermark Detection Apparatus—Detection Information Extraction Unit>

In the following, operation of the detection information extraction unit in the digital watermark detection apparatus of the present embodiment is described.

Figure 42:
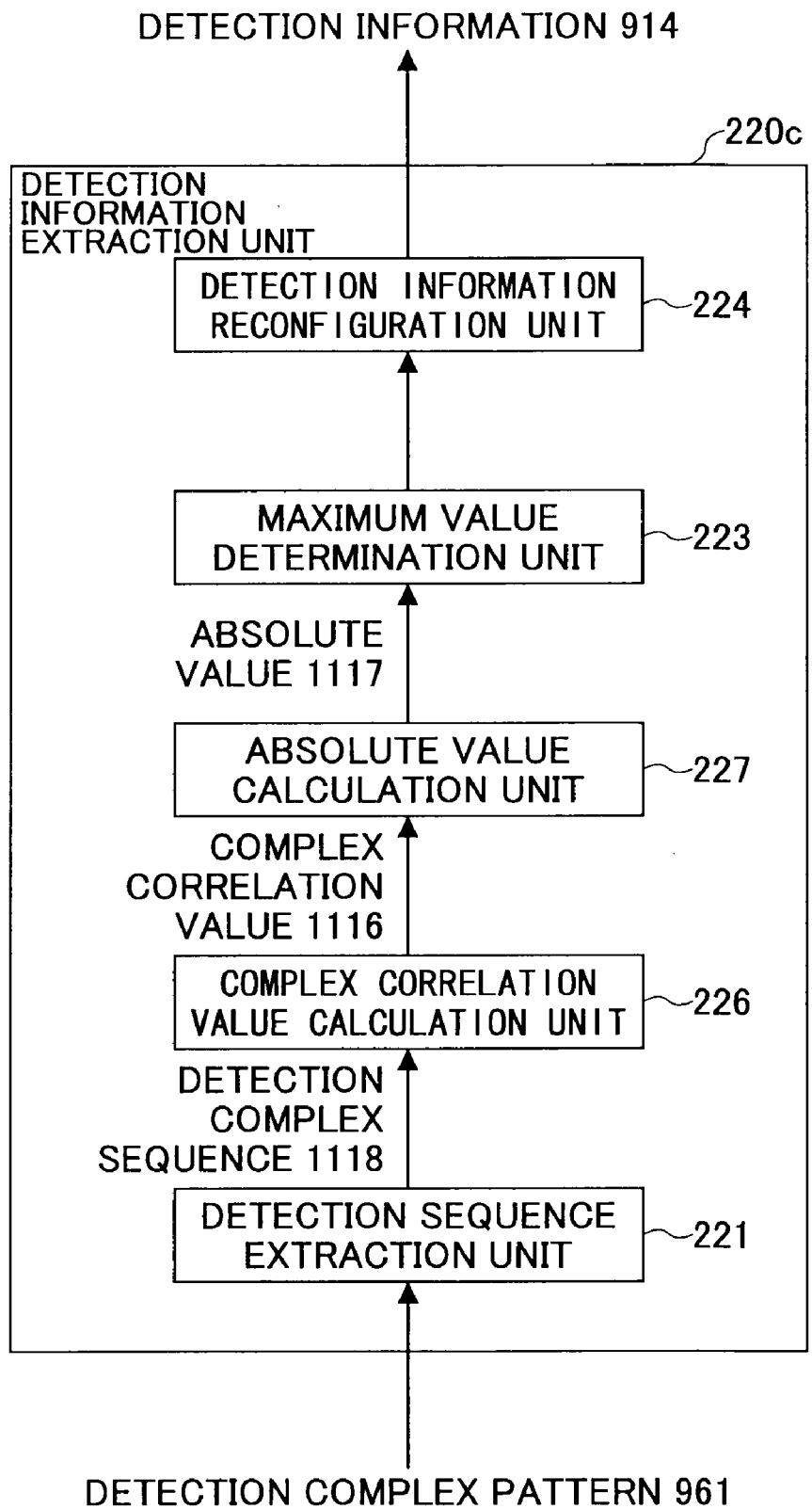
FIG. 42 is a configuration of a detection information extraction unit in a fourth embodiment of the present invention.

FIG. 42 shows a configuration of the detection information extraction unit in the fourth embodiment of the present invention. In the figure, same signs are provided for same configuration parts in FIGS. 28 and 40.

The detection information extraction unit 220C shown in the figure includes the detection sequence extraction unit 221, the complex correlation value calculation unit 226, an absolute value calculation unit 227, a maximum value determination unit 223, and the detection information reconfiguration unit 224, and the unit 220*c* receives the detection complex pattern 961 and outputs the detection information 914.

The detection information extraction processes by the detection information extraction unit 220*c* are performed according to the following procedure.

Figure 43:
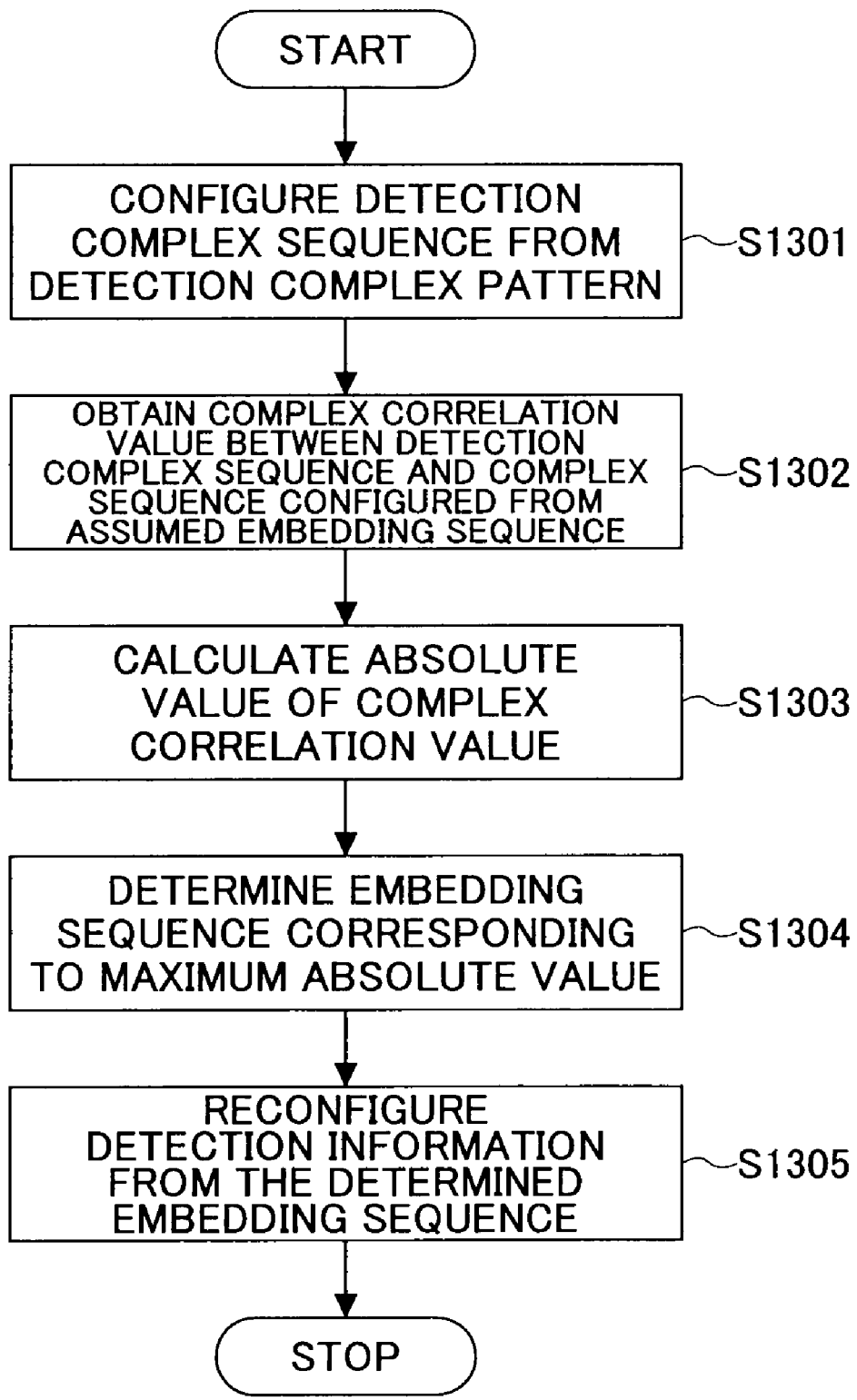
FIG. 43 is a flowchart of the operation of the detection information extraction unit in the fourth embodiment of the present invention.

FIG. 43 shows a flowchart of the operation of the detection information extraction unit in the fourth embodiment of the present invention.

Step 1301) The detection sequence extraction unit 221 configures the detection complex number sequence 1118 in which complex number values obtained from the received detection complex pattern 961 are arranged. Detailed operation of the detection sequence extraction unit 221 are described later.

Step 1302) The complex correlation value calculation unit 226 calculates complex correlation between the detection complex number sequence 1118 configured by the detection sequence extraction unit 221 and the complex number sequences configured based on assumed embedding sequences to obtain the complex correlation values 1116 represented by complex numbers.

When different values are embedded depending on the kind of embedding sequence, complex correlation is calculated for each of the plurality of complex number sequences configured based on a plurality of conceivable embedding sequences so as to obtain a corresponding complex correlation value 1116.

Details of the operation of the complex correlation value calculation unit 226 are described later.

Step 1303) The absolute value calculation unit 227 calculates absolute values 1117 of the complex correlation values 1116 obtained by the complex correlation value calculation unit 226. By calculating the absolute value, it becomes possible to determine an embedding sequence having high correlation with the detection complex number sequence irrespective of the amount of desynchronization even when desynchronized signal is received.

Step 1304) The maximum value determination unit 223 finds maximum one of the absolute values 1117 obtained by the absolute value calculation unit 227, and determines an embedding sequence used for correlation calculation in the complex correlation value calculation unit 226 corresponding to the maximum absolute value.

By the way, depending on the method for configuring the embedding sequence in the digital watermark embedding apparatus 100, determination may be performed using other method instead of the maximum value determination by the maximum value determination unit 223.

Details of operation of the maximum value determination unit 223, and details of alternative methods are described later.

Step 1305) The detection information reconfiguration unit 224 reconfigures the detection information 914 that is determined to be actually embedded based on the embedding sequence determined in the maximum value determination unit 223.

Operation of the detection information reconfiguration unit 224 is the same as that of the first embodiment.

By the way, when embedding of the digital watermark is performed using the digital watermark embedding apparatus 100 of the third embodiment, Fourier transform process is necessary like the N−1-dimensional Fourier transform unit 225 in the third embodiment before the detection sequence extraction unit 221.

In addition, after determining the embedding sequence by the maximum value determination unit 223, by using the embedding sequence, processes similar to the detection information extraction unit 220*a* in the first embodiment may be performed in a round-robin fashion using signals obtained by sequentially desynchronizing the input signal so as to measure the desynchronization amount and obtain a more accurate detection correlation evaluation value based on the correlation value obtained by the detection information extraction unit 220. It is needless to say that it becomes possible, by using this method, to perform detection at speed much higher than a case for searching all amounts pf desynchronization for conceivable all embedding sequences in a round-robin fashion.

<Digital Watermark Detection Apparatus—Detection Information Extraction Unit—Detection Sequence Extraction Unit>

Next, details of operation of the detection sequence extraction unit 221 of the detection information extraction unit 220c are described.

The detection sequence extraction unit 221 configures the detection complex number sequence from the complex number values obtained from the detection complex pattern 961.

Processes in the detection sequence extraction unit 221 are performed according to the following procedure.

1) A N–1-dimensional complex array of the size of $M_1 \times M_2 \times \ldots \times M_{N-1}$ are configured from the detection complex pattern 961. The method for configuring is the same as the process in step 801 shown in FIG. 30 in the before-mentioned first embodiment.

2) The complex number values are extracted one by one sequentially from the complex array obtained in 1) to be arranged as the detection complex number sequence 1118. That is, when the complex array is represented as A $[p_1, p_2, \ldots, p_{N-1}]$ ($p_n \geq 0$), and the detection complex number sequence 1118 is represented as $i''_1, i''_2, \ldots, i''_{N-1}$, $$i''_1 = A[0, 0, \ldots, 0] \qquad (88)$$
$$i''_2 = A[1, 0, \ldots, 0]$$
$$\vdots$$

3) The obtained sequence $i''_1, i''_2, \ldots, i''_L$ is output as the detection sequence 1115.

When order of the embedding sequence 913 or elements of the complex array has been permuted in the complex array generation unit 112 of the digital watermark embedding apparatus 100, the order is restored in the same way as the detection sequence extraction unit 221 in the first embodiment.

By the way, when the digital watermark embedding has been performed using the digital watermark embedding apparatus 100 of the third embodiment, complex number values of elements within the range that is used in the complex array generation unit 112 of the digital watermark embedding apparatus 100 in the third embodiment are extracted and arranged in the above-mentioned 2).

<Digital Watermark Detection Apparatus—Detection Information Extraction Unit—Complex Correlation Value Calculation Unit>

Next, details of operation of the complex correlation value calculation unit 226 of the detection information extraction unit 220c are described.

Complex correlation value calculation processes in the complex correlation value calculation unit 226 are performed according to the following procedure.

1) Conceivable embedding sequences $w^{(1)}, w^{(2)}, \ldots$ are generated by a procedure similar to that in the embedding sequence generation unit 111 of the digital watermark embedding apparatus 100. The method for generation is the same as that in the correlation value calculation unit 222 in the before-mentioned first embodiment.

2) From the embedding sequences $w^{(1)}, w^{(2)}, \ldots$ obtained from 1), values that are assigned to the real part and the imaginary part of a complex number value in the complex array generation unit 112 of the digital watermark embedding apparatus 100 are paired so that similar complex number sequence is configured as the embedding complex number sequence $\xi^{(1)}, \xi^{(2)}, \ldots$. That is, when the complex array is configured like FIG. 17, assuming $$w^{(k)} = \{w_1^{(k)}, w_2^{(k)}, \ldots, w_L^{(k)}\},$$
$$\xi^{(k)} = \{\xi_1^{(k)}, \xi_2^{(k)}, \ldots, \xi_{L'}^{(k)}\}$$
$$(L' = L/2)$$

$$\xi_1^{(k)} = w_1^{(k)} + jw_2^{(k)} \qquad (89)$$
$$\xi_2^{(k)} = w_3^{(k)} + jw_4^{(k)}$$
$$\vdots$$
$$\xi_{L'}^{(k)} = w_{L-1}^{(k)} + jw_L^{(k)}$$

The configuration method for the embedding complex number sequence is not limited to this example, and it is needless to say that any configuration method can be used as long as it is adapted to the configuration of the complex array in the complex array generation unit 112 of the digital watermark embedding apparatus 100.

3) Correlation between the detection sequence 1115 obtained in the detection sequence extraction unit 221 and each of embedding sequences $\xi^{(1)}, \xi^{(2)}$, obtained in 2) is calculated using complex correlation.

Correlation calculation is performed as follows. Assuming that $\rho^{(j)}$ is the complex correlation value 1116 desired to be obtained, $$\rho^{(j)} = i'' \cdot \xi^{(j)*} = \sum_{k=1}^{L'} i''_k \xi_k^{(j)*} \qquad (90)$$

wherein $\xi^{(j)*}$ indicates a number sequence including the conjugate complex number of the element of $\xi^{(j)}$, and $\xi_k^{(j)*}$ is a conjugate complex number of $\xi_k^{(j)}$. In addition, "·" indicates inner product operation when the number sequence is regarded as a vector. Here, $\rho^{(j)}$ becomes a complex number.

For aligning evaluation criteria of detection reliability described in the before-mentioned document—Takao Nakamura, Atsushi Katayama, Masashi Yamamuro, Noboru Sonehara, "Fast Watermark Detection Scheme from Analog Image for Camera-equipped Cellular Phone", IEICE Transactions D-II, Vol. j87-D-II, No. 12, pp. 2145-2155, 2004—, each element of i" and $w^{(j)}$ may be normalized beforehand such that the average becomes 0 and that the variance becomes 1 so that calculation may be performed by multiplying by a constant term in the correlation value calculation in the same way in the correlation value calculation unit 222 of the first embodiment.

In the following, it is described that, by such operation, digital watermark detection is possible for desynchronized inputs.

Assuming that a sequence embedded by the digital watermark embedding apparatus is $w = \{w_1, w_2, \ldots, w_L\}$, and that a sequence obtained by arranging was complex numbers is $\xi = \{\xi_1, \xi_2, \ldots, \xi_{L'}\}$.

When a complex sequence after a before-embedding signal and other noise signal are added by digital watermark embedding is $i' = \{i_1, i_2, \ldots, i_{L'}\}$, $$i' = i + \xi \qquad (91)$$

is obtained.

In addition, when assuming that a sequence obtained after desynchronization in the time direction is applied to i' is i'', $$i'' = i' e^{j\Delta\theta} \quad (92)$$

is obtained.

When correlation with $\xi$ is calculated using the above equation, $$\begin{aligned}
\rho &= i'' \cdot \xi^* \quad (93)\\
&= (i + \xi) e^{j\Delta\theta} \cdot \xi^* \\
&= e^{j\Delta\theta} (i \cdot \xi^* + \xi \cdot \xi) \\
&= e^{j\Delta\theta} \left( \sum_{k=1}^{L'} i_k \xi_k^* + \sum_{k=1}^{L'} \xi_k \xi_k^* \right) \\
&= e^{j\Delta\theta} \left( \sum_{k=1}^{L'} i_k \xi_k^* + \sum_{k=1}^{L'} |\xi_k|^2 \right)
\end{aligned}$$

is obtained. When i and $\xi$ are independent, and when L' is large enough, an expected value of $$\Sigma i_k \xi_k^*$$

is 0, and $$\rho \sim \left( \sum_{k=1}^{L'} |\xi_k|^2 \right) e^{j\Delta\theta} \quad (94)$$

is obtained, so that $$|\rho| \sim \sum_{k=1}^{L'} |\xi_k|^2 \quad (95)$$

is obtained.

On the other hand, when digital watermark is not embedded, $$\rho = \sum_{k=1}^{L'} i_k \xi_k^* \quad (96)$$

holds true, and since an expected value of this is 0, $|\rho|$ is sufficiently small compared with the expected value $$\sum_{k=1}^{L'} |\xi_k|^2$$

obtained when digital watermark is embedded, so that digital watermark detection becomes possible.

<Digital Watermark Detection Apparatus—Detection Information Extraction Unit—Maximum Value Determination Unit>

Next, the maximum value determination unit 223 of the detection information extraction unit 220c is described in detail.

Processes in the maximum value determination unit 223 are performed according to the following procedure.

1) The maximum value determination unit 227 finds an absolute value $|\rho^{(j)}|$ having a maximum value from absolute values 1117 $|\rho^{(1)}|, |\rho^{(2)}|, \ldots$ obtained by the absolute value calculation unit 227 as follows.

$$|\rho^{(max)}| = \text{MAX}(|\rho^{(1)}|, |\rho^{(2)}|, \ldots) \quad (97)$$

2) An embedding sequence $w^{(max)}$ corresponding to $|\rho^{(max)}|$ is obtained.

In addition, it may be determined whether the maximum correlation value $|\rho^{(j)}|$ exceeds a predetermined threshold, and when the maximum correlation value does not exceed the predetermined threshold, it may be determined that digital watermark is not embedded.

In the following, alternative operation of the maximum value determination unit 223 is described.

Instead of the maximum value determination by the maximum value determination unit 223, without calculating complex correlation for complex sequences corresponding to every embedding sequence $w^{(1)}, w^{(2)}, \ldots$ in the complex correlation value calculation unit 226, correlation may be calculated from the complex number sequence $\xi^{(1)}$ corresponding to the embedding sequence $w^{(1)}$ sequentially to perform determination based on whether the absolute value of the obtained complex correlation value exceeds a predetermined threshold, and to determine an embedding sequence by which the correlation value exceeds the threshold as $w^{(max)}$ and ends correlation calculation at that time.

In addition, when the embedding sequence in the digital embedding apparatus 100 is embedded by being configured only by one kind of embedding sequence like one shown in (example 1) of the embedding sequence generation unit 111, or for example, when it is embedded by being configured based on difference of plus and minus of one kind of embedding sequence like one shown in (example 2), (example 4) of the embedding sequence generation unit 111, maximum value determination by the maximum value determination unit 223 has no meaning since only one correlation value is calculated. Instead, determination may be performed based on whether the obtained correlation value exceeds the predetermined threshold.

In addition, reliability of the watermark detection may be evaluated based on the size of the absolute value of the complex correlation value.

When the embedding sequence in the digital watermark embedding apparatus 100 is configured and embedded so as to represent 0/1 of a bit value based on difference between plus and minus of the embedding sequence as shown in (example 2), (example 4) of the embedding sequence generation unit 111, a case in which a signal having a phase shifted by half wavelength due to desynchronization is received cannot be distinguished from a case in which information in which all bit values are reversed is embedded. In such a case, for example, the embedding sequence may be configured such that one bit in bit values always has 1 (or 0) as a bit for judgment so that bit reversal may be corrected using the bit value. In addition, the judgment may be made by performing coding using asymmetric error correcting code. In addition, determination may be performed using a digital watermark signal different from the digital watermark of the present invention. The method is not limited to these examples, and it is needless to say that correction of bit reversal may be performed by other method.

In addition, when spreading is performed based on polarity of plus and minus for each bit by using a partial sequence of the embedding sequence like (example 4) in the embedding sequence generation unit 111, more robust detection process can be performed as follows.

It is assumed that a partial complex sequence corresponding to a-th bit position in the detection complex number sequence 1118 is $$i''^{(a)} = (i''^{(a)}_1, i''^{(a)}_2, \ldots, i''^{(a)}_m).$$

In addition, it is assumed that a complex embedding sequence used for spreading for a bit value on the a-th bit position is $$\xi^{(a)} = (\xi^{(a)}_1, \xi^{(a)}_2, \ldots, \xi^{(a)}_m).$$

Then, a complex correlation value $\lambda^{(a)}$ is calculated for each bit position a as follows.

$$\lambda^{(a)} = i''^{(a)} \cdot \xi^{(a)*}$$
$$= \sum_{s=1}^{m} i''^{(a)}_s \xi^{(a)*}_s$$
$$(a = 1 \ldots n)$$

Next, directions of n complex correlation values $\lambda^{(a)}$ are aligned. More particularly, for example, $\lambda^{(a)}$ that satisfies $0 \leq \text{Arg}\lambda^{(a)} < \pi$ is not changed, and $\lambda^{(a)}$ that satisfies $\pi \leq \text{Arg}\lambda^{(a)} < 2\pi$ is multiplied by $e^{j\pi}$ so that the argument is rotated by 180 degrees. By this changing process, every $\lambda^{(a)}$ becomes a value within the first and second quadrants on the complex plane. By the way, the method for aligning directions is not limited to this example. For example, it is obvious that a method can be configured such that every $\lambda^{(a)}$ becomes a value within the first and fourth quadrants on the complex plane.

Next, a total sum $\lambda$ of the complex correlation values $\lambda^{(a)}$ on which the above-mentioned changing process has been performed is obtained as follows.

$$\lambda = \sum_{a=1}^{n} \lambda^{(a)}$$

Then, the complex plane is divided into two regions using a straight line that passes through an origin point and that is orthogonal to Arg$\lambda$ as a boundary line on the complex plane, and a detection bit value of the a-th bit position is determined based on a region $\lambda^{(a)}$ before the changing process belongs to between the two regions. Although this determining method also includes the above-mentioned uncertainty of bit reversal, the uncertainty can be solved by using one bit of bits values as a flag for determining bit reversal, for example.

Figure 44:
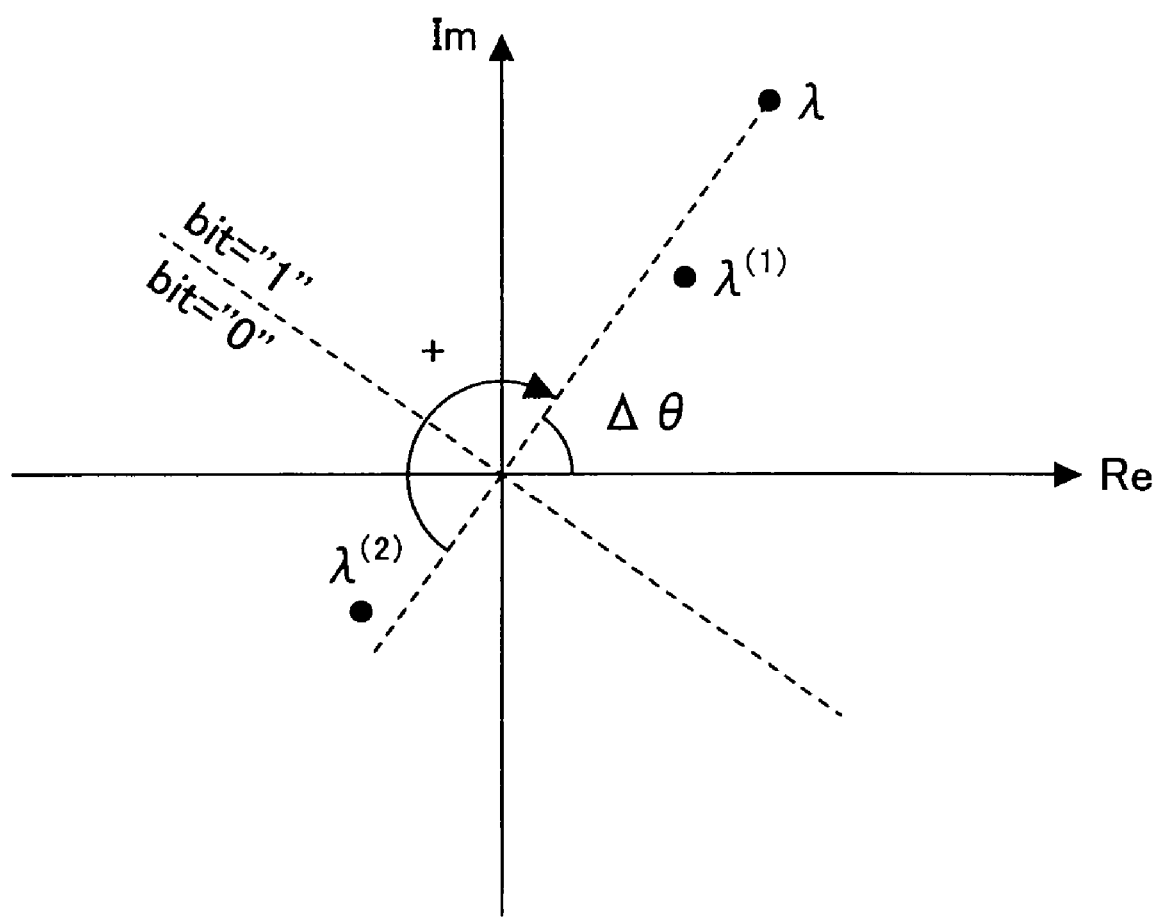
FIG. 44 is a diagram for explaining an example of a method for detecting a bit value in the fourth embodiment of the present invention.

For example, in the case when n=2, as shown in FIG. 44, since $0 \leq \text{Arg}\lambda^{(1)} < \pi$ is satisfied, $\lambda^{(1)}$ is not changed, and since $\pi \leq \text{Arg}\lambda^{(2)} < 2\pi$ is satisfied, $\lambda^{(2)}$ is multiplied by $e^{j\pi}$ so that the argument is rotated by 180 degrees. Then, the total sum $\lambda$ of these are obtained, and the complex plane is divided into two regions using a straight line that passes through the origin point and that is orthogonal to Arg$\lambda$ as a boundary line on the complex plane, and the bit value of one region is determined to be "1" and the bit value of another region is determined to be "0", so that a detection bit value of each bit position is determined based on which region $\lambda^{(1)}$ or $\lambda^{(2)}$ before changing process belongs to between the two regions.

The reason that the above-mentioned detection method works well is described below. When embedding, modulation is performed by multiplying the complex embedding sequence for each bit position by +1 or -1 according to the bit value. Thus, the complex correlation value $\lambda^{(a)}$ for each bit position has a value in which the phase is shifted by $\pi$ when the embedded bit value is different. However, by equating the phase shift of $\pi$, all of $\lambda^{(a)}$ align in the direction of phase shift amount $\Delta\theta$ of the input signal. It is obvious that the above-mentioned changing process can be performed as the method of equating.

In addition, the length m of the complex embedding sequence for each bit is shorter than the length L' of the whole of the complex embedding sequence. That is, since spreading ratio of the complex embedding sequence for each bit is low so that only a gain by the spreading ration m is obtained when a bit value of each bit is detected, robustness becomes low. However, by obtaining the total sum $\lambda$ after aligning the directions of all $\lambda^{(a)}$ by performing the change in which phase shifts of $\pi$ are equated as mentioned above, gain corresponding to the whole embedding sequence length L' can be obtained. Therefore, by evaluating again each $\lambda^{(a)}$ before change using the boundary line orthogonal to Arg$\lambda$ so as to detect detection bit value, bit determination error becomes smaller compared with the case in which detection is performed for each bit, so that higher robustness can be realized. By the way, the reliability of the digital watermark detection may be evaluated by the size of the absolute value of $\lambda$.

Characteristics of the Fourth Embodiment

Next, characteristics of the fourth embodiment are described.

According to the digital watermark detection apparatus of the present embodiment, in detection of digital watermark, even when the signal of the digital watermark detection target is desynchronized, detection of digital watermark can be performed. That is, by utilizing a fact that the embedding sequence that are spectrum spread in the N-1-dimensional space is commonly affected by desynchronization in a direction of N-th dimension, digital watermark detection in which synchronization is unnecessary can be performed by using the complex correlation value of the spread sequence in the N-1-dimensional space.

For example, in the case of video signals, digital watermark detection is possible without using a special synchronization method even when a frame for starting detection is shifted in the time direction. This is very effective in a use situation in which temporal synchronization is difficult, such as when detecting digital watermark from a video that was re-taken using a video camera and the like, and when detecting digital watermark from a video that is converted to analog data such as a video tape, for example.

When a video displayed on a screen or TV or the like is taken by a video camera or a camera of a cellular phone and the like, since the frame rate for reproduction is not synchronized with the frame rate for taking, there is a case in which re-sampling may occur in sub-frames. This indicates a state in which desynchronization occurs in sub-frame level (interval shorter than one frame) as a result. Even in such a situation, it is possible to measure the phase of the periodic signal in temporal demodulation, and as mentioned above, digital watermark detection in which synchronization is unnecessary becomes possible.

By the above-mentioned digital watermark detection, efficient detection is possible for desynchronized signals, and in addition to that, it is unnecessary to add a special synchronization signal. Thus, digital watermark detection becomes possible without signal deterioration due to the synchronization signal and without deterioration of detection performance of digital watermark in which quality is high and detection performance is high.

Fifth Embodiment

<Measurement of Amount of Desynchronization>

In the following, a digital watermark detection apparatus in the fifth embodiment is described.

This embodiment is an example in which, in the case when digital watermark embedding is performed using the digital watermark embedding apparatus 100 in the first embodiment of the present invention, when the digital watermark detection apparatus receives a signal that is desynchronized in the time axis (axis of N-th dimension), the digital watermark detection apparatus detects the amount of desynchronization to detect digital watermark.

By the way, in the present embodiment, although an example is described for the case when digital watermark embedding is performed using the digital watermark embedding apparatus 100 of the first embodiment, the present embodiment can be also combined and applied similarly to a case in which digital watermark embedding is performed using a digital watermark embedding apparatus of other embodiments. For example, it may be possible to perform embedding using the digital watermark embedding apparatus in the third embodiment and perform detection by combining the N−1-dimensional Fourier transform unit 225 in the digital watermark detection apparatus of the third embodiment. In these cases, although there may be a case in which modification corresponding to individual procedure is necessary, it is needless to say that these necessary modifications are obvious based on descriptions of the present embodiment and descriptions of the digital watermark embedding.

<Digital Watermark Detection Apparatus>

Configuration of the digital watermark detection apparatus of the present embodiment is described.

Figure 45:
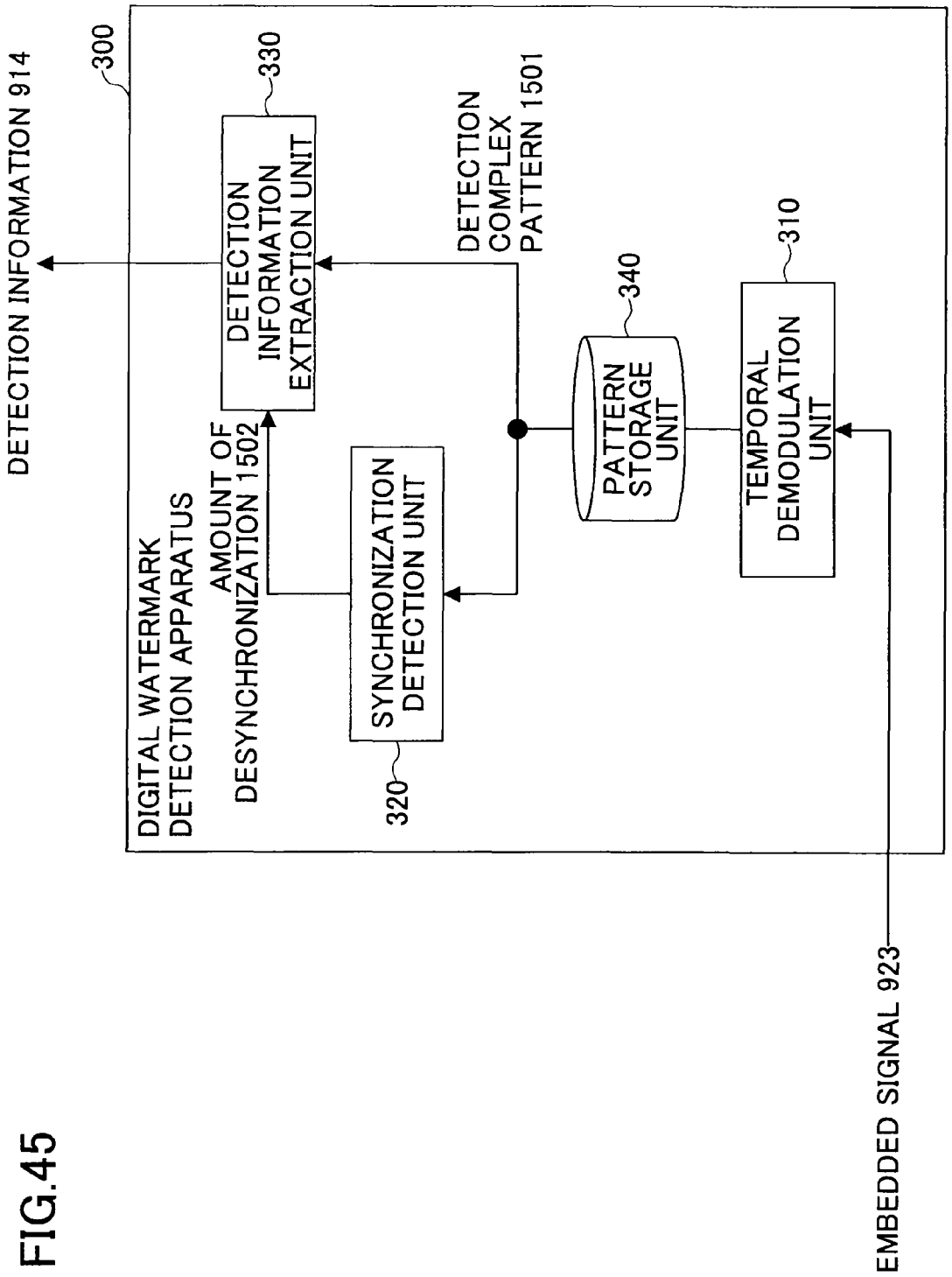
FIG. 45 is a configuration example of a digital watermark detection apparatus in a fifth embodiment of the present invention.

FIG. 45 shows a configuration example of the digital watermark detection apparatus in the fifth embodiment of the present invention.

The digital watermark detection apparatus 300 shown in the figure includes a temporal demodulation unit 310, a synchronization detection unit 320, a detection information extraction unit 330a, a pattern storage unit 340, and the digital watermark detection apparatus 300 receives the embedded signal 923 and outputs detection information 914.

The temporal demodulation unit 310 is the same as the temporal demodulation unit 210 in the first embodiment. In addition, temporal demodulation units of other embodiments may be used. For example, the temporal demodulation units 210c, 210d in the second embodiment may be used.

By the way, in FIG. 45, please note that the configuration is shown such that information flows from the bottom to the top to facilitate understanding of correspondence to FIG. 10.

Digital watermark detection processes by the digital watermark detection apparatus 300 are performed in the following procedure.

Figure 46:
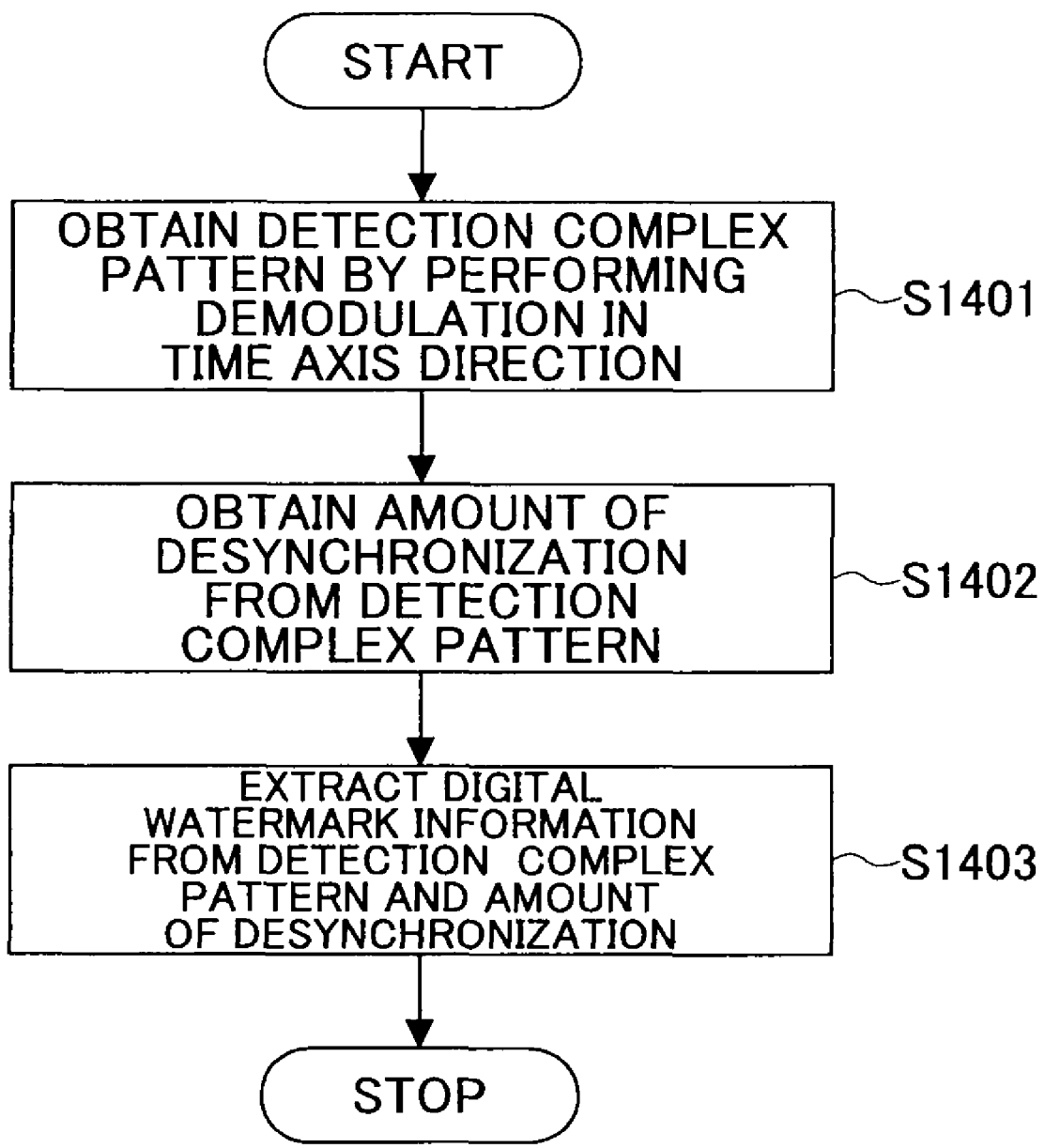
FIG. 46 is a flowchart showing operation of the digital watermark detection apparatus in the fifth embodiment of the present invention.

FIG. 46 is a flowchart showing operation of the digital watermark detection apparatus in the fifth embodiment of the present invention.

Step 1401) The temporal demodulation unit 310 performs demodulation in the time axis direction to obtain a detection complex pattern 1501 and stores it into the pattern storage unit 340. Content of the processes is the same as that in the temporal demodulation unit 210 of the digital watermark detection apparatus 200 of the first embodiment.

By the way, like the digital watermark detection apparatus 200 of the first embodiment, pre-process may be performed on the embedded signal 923 before temporal demodulation process by the temporal demodulation unit 310.

Step 1402) From the detection complex pattern 1501 that is obtained by the temporal demodulation unit 310 and that is stored in the pattern storage unit 340, the synchronization detection unit 320 detects the amount of desynchronization in the time axis (axis of N-th dimension) direction that is applied to the embedded signal 923 beforehand, so as to outputs it as the amount of desynchronization.

Details of operation of the synchronization detection unit 320 are described later.

Step 1403) The detection information extraction unit 330a analyzes the detection complex pattern that is obtained in the temporal demodulation unit 310 and that is stored in the pattern storage unit 340, and extracts digital watermark information, that is embedded in the digital watermark embedding apparatus 100, based on the amount of desynchronization 1502 obtained by the synchronization detection unit 320, and outputs it as the detection information 914.

Details of the operation of the detection information extraction unit 330a are described later.

<Digital Watermark Detection Apparatus—Synchronization Detection Unit>

Next, details of operation of the synchronization detection unit 320 are described.

Figure 47:
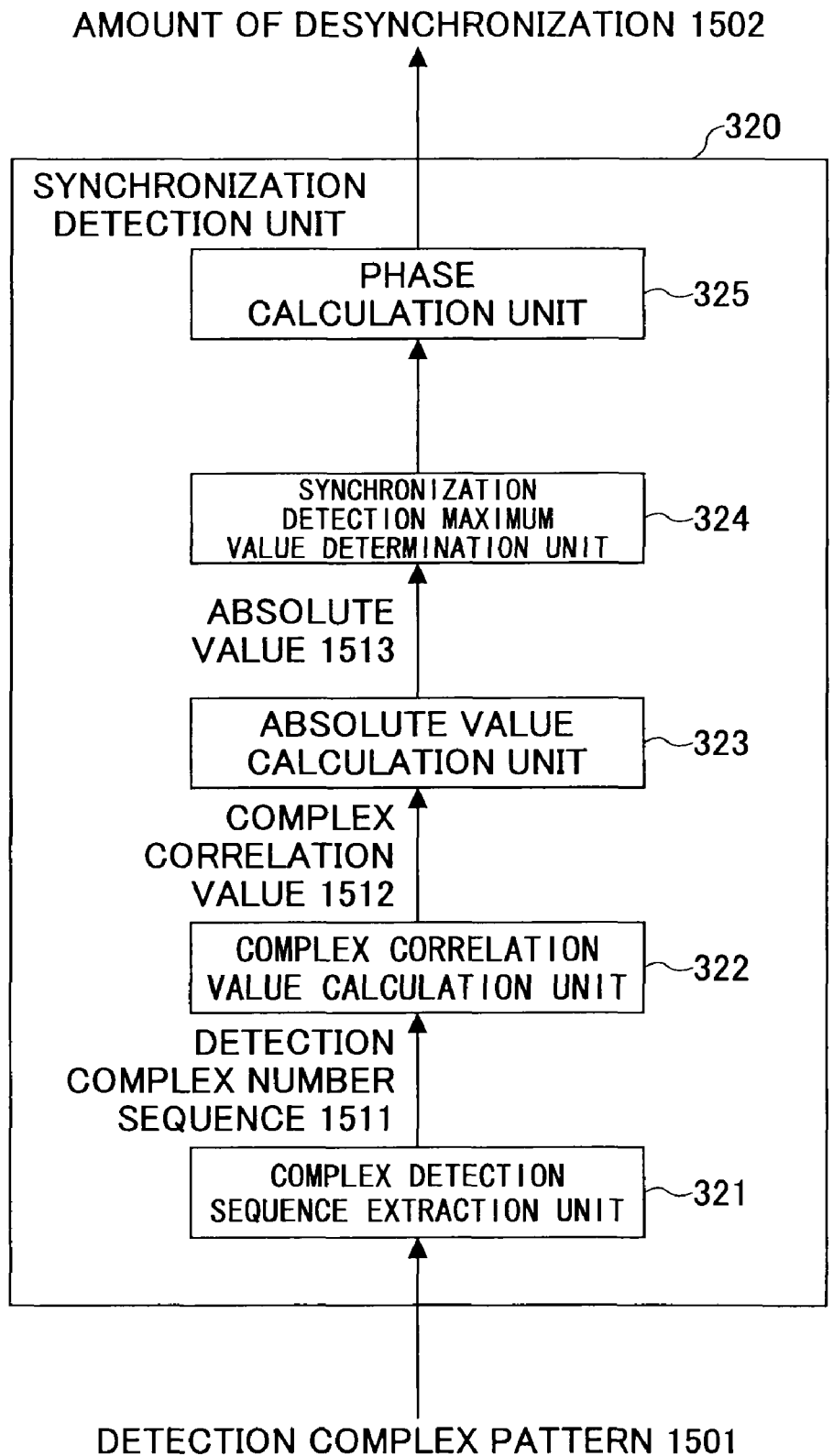
FIG. 47 is a configuration example of a synchronization detection unit in the fifth embodiment of the present invention.

FIG. 47 shows a configuration example of the synchronization detection unit in the fifth embodiment of the present invention.

The synchronization detection unit 320 includes a complex detection sequence extraction unit 321, a complex correlation value calculation unit 322, an absolute value calculation unit 323, a synchronization detection maximum value determination unit 324, a phase calculation unit 325, and the synchronization detection unit 320 reads the detection complex pattern 1501 from the pattern storage unit 340 and outputs the amount of desynchronization 1502.

By the way, in FIG. 47, please note that the configuration is shown such that information flows from the bottom to the top to facilitate understanding of correspondence to FIG. 45.

Synchronization detection processes by the synchronization detection unit 320 are performed according to the following procedure.

Figure 48:
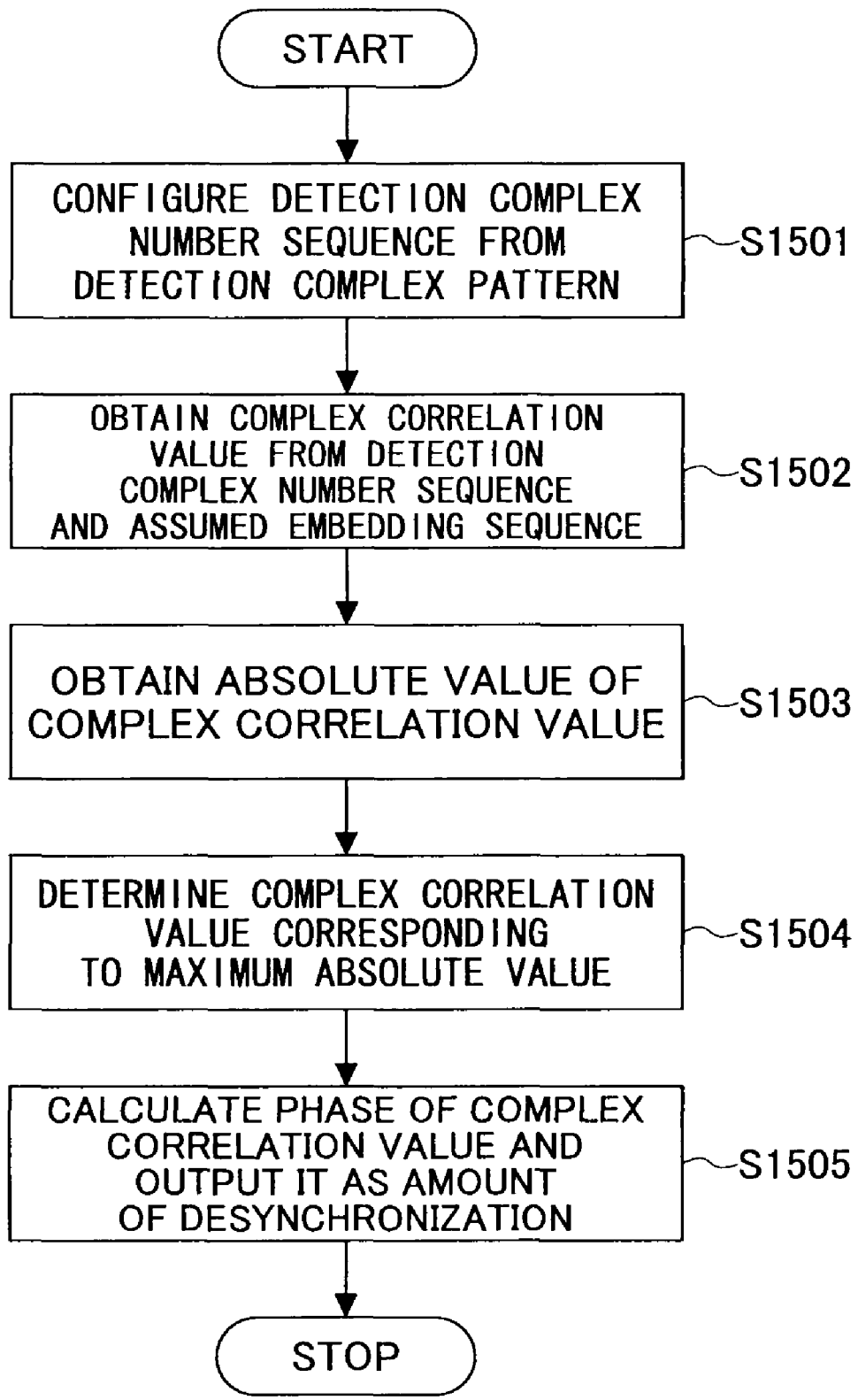
FIG. 48 is a flowchart of operation of the synchronization detection unit in the fifth embodiment of the present invention.

FIG. 48 is a flowchart of operation of the synchronization detection unit in the fifth embodiment of the present invention.

Step 1501) The complex detection sequence extraction unit 321 configures a detection complex number sequence 1511 obtained by arranging complex number values that are obtained from the received detection complex pattern 1501.

Operation of the complex detection sequence extraction unit 321 is the same as operation of the detection sequence extraction unit 221 in the digital watermark detection apparatus 200 of the fourth embodiment.

Step 1502) The complex correlation value calculation unit 322 calculates complex correlation between the detection complex number sequence 1511 configured by the detection sequence extraction unit 321 and the complex number sequences configured based on the assumed embedding sequences to obtain the complex correlation values 1512 that are represented by complex numbers.

In the case when different values are embedded according to the type of the embedding sequence, complex correlation is calculated for each of a plurality of complex number sequences configured based on a plurality of conceivable embedding sequences so as to obtain corresponding complex correlation values 1512.

In addition, in the case when the embedding sequence in the digital watermark embedding apparatus 100 is configured by a plurality of symbols or a plurality of bits like the case in (example 3) or (example 4) in the embedding sequence generation unit 111, for example, complex correlation may be calculated for a complex number sequence configured based on the embedding sequence corresponding to a part of the symbols or bits. That is, it corresponds to performing synchronization using a part of the plurality of symbols or bits.

Operation of the complex correlation value calculation unit 322 is the same as operation of the complex correlation value calculation unit 226 in the digital watermark detection apparatus 200 of the fourth embodiment.

Step 1503) The absolute value calculation unit 323 calculates absolute values 1513 of the complex correlation values 1512 obtained by the complex correlation value calculation unit 322.

Operation of the absolute value calculation unit 323 is the same as operation of the absolute value calculation unit 227 in the digital watermark detection apparatus 200 of the fourth embodiment.

Step 1504) The synchronization detection maximum value determination unit 324 finds one having the maximum absolute value 1513 obtained by the absolute value calculation unit 323 to determine a complex correlation value 1512 corresponding to the maximum absolute value 1513.

By the way, depending on a configuration method of the embedding sequence in the digital watermark embedding apparatus 100, determination may be performed using other methods instead of the maximum value determination by the synchronization detection maximum value determination unit 324.

Details of operation of the synchronization detection maximum value determination unit 324 are described later. Other methods that are alternative for the synchronization detection maximum value determination unit 324 are the same as those in the case of the maximum value determination unit 223 in the digital watermark detection apparatus 200 in the fourth embodiment.

Step 1505) The phase calculation unit 325 calculates the phase of the complex correlation value determined by the synchronization detection maximum value determination unit 324 so as to calculate the amount of desynchronization 1502 based on it and output the amount of desynchronization 1502 to the detection information extraction unit 330.

Details of operation of the phase calculation unit 325 are described later.

By the way, when the digital watermark embedding is performed using the digital watermark embedding apparatus 100 in the third embodiment, Fourier transform process same as the N−1-dimensional Fourier transform unit 225 in the third embodiment becomes necessary before the process of the complex detection sequence extraction unit 321.

<Digital Watermark Detection Apparatus—Synchronization Detection Unit—Synchronization Detection Maximum Value Determination Unit>

Next, details of operation of the synchronization detection maximum value determination unit 324 of the synchronization detection unit 320 are described.

Although operation of the synchronization detection maximum value determination unit 324 is almost the same as that of the maximum value determination unit 223 of the digital watermark detection apparatus 200 in the fourth embodiment, it is different in that a complex correlation value by which the absolute value becomes maximum is obtained instead of obtaining the embedding sequence as a result.

Processes in the synchronization detection maximum value determination unit 324 are performed according to the following procedure.

1) An absolute value $|\rho^{(j)}|$ having a maximum value is found from absolute values 1513 $|\rho^{(1)}|, |\rho^{(2)}|, \ldots$ obtained by the absolute value calculation unit 323 as follows, $$|\rho^{(max)}| = \text{MAX}(|\rho^{(1)}|, |\rho^{(2)}|, \ldots) \tag{98}$$

in which MAX ( ) is an operation for returning a maximum value.

2) The complex correlation value $\rho^{(max)}$ on which $|\rho^{(max)}|$ is based is output to the phase calculation unit 325.

In addition, the synchronization detection maximum value determination unit 324 may determine whether the maximum correlation value $|\rho^{(j)}|$ exceeds a predetermined threshold to determine that digital watermark is not embedded when it does not exceed the predetermined threshold.

<Digital Watermark Detection Apparatus—Synchronization Detection Unit—Phase Calculation Unit>

Next, details of operation of the phase calculation unit 325 of the synchronization detection unit 320 are described in detail.

Processes in the phase calculation unit 325 are performed according to the following procedure.

1) An argument $\Delta\theta$ of the complex correlation value $\rho^{(max)}$ obtained by the synchronization detection maximum value determination unit 324 is obtained as follows, $$\Delta\theta = \text{Arg}[\rho^{(max)}] \tag{99}$$

in which Arg[ ] is an operation for obtaining argument of a complex number.

2) Since $\Delta\theta$ indicates a shift amount of the phase, the amount of desynchronization 1502 $\Delta t$ is obtained as follows and is output.

$$\Delta t = \frac{\Delta\theta}{2\pi} T \tag{100}$$

T indicates a period of the periodic signal.

In the following, the point that $\Delta\theta$ indicates the shift amount of the phase is described.

The complex correlation value is obtained as shown in the following equation as described in the description on the complex correlation value calculation unit 226 in the digital watermark detection apparatus 200 in the fourth embodiment.

$$\rho \sim \left(\sum_{k=1}^{L'} |\xi_k|^2\right) e^{j\Delta\theta} \tag{101}$$

Therefore, $$\text{Arg}[\rho^{(max)}] = \Delta\theta \tag{102}$$

holds true, and this indicates the shift amount of the phase that is determined depending on the amount of desynchronization in the direction of the N-th dimension axis (time direction, for example) for the embedded signal 923.

By the way, when the embedding sequence in the digital watermark embedding apparatus 100 is configured and embedded such that the bit value of 0/1 is represented based on difference between plus and minus of the embedding sequence like the case shown in (example 2) and (example 4) of the embedding sequence generation unit 111, for example, a case in which a signal having a phase that is shifted by half wavelength due to desynchronization cannot be distinguished from a case where information in which all bit values are reversed is embedded. That is, it cannot be determined which is a correct amount of desynchronization between the amount of desynchronization Δt obtained in the above-mentioned way and $$\Delta t - \frac{T}{2}$$

in which phase is shifted by half wavelength.

In such a case, for example, by configuring the embedding sequence such that one bit in the bit values always takes 1 (or 0) as a bit for judgment, one by which the bit value becomes the correct value may be determined to be correct. In addition, the judgment can be made available by performing coding using asymmetric error correcting code. In addition, determination may be performed using a digital watermark signal different from the digital watermark of the present invention. In addition, one value may be provisionally determined as the amount of desynchronization, and bit reversal may be corrected according to the above-mentioned procedure in the process of the detection information extraction unit 330a. Correction is not limited to these examples, and it is needless to say that correction may be performed by other method.

In addition, when spreading is performed based on polarity of plus and minus for each bit by using a partial sequence of the embedding sequence like (example 4) in the embedding sequence generation unit 111, the argument Argλ of the total sum λ of complex correlation values $\lambda^{(a)}$ of each bit position calculated by the bit value detection method that is described in the last part of the fourth embodiment with reference to FIG. 44 is determined to be the amount of desynchronization Δθ, so that the amount of desynchronization can be measured more reliably and more accurately compared with the case for obtaining the amount of desynchronization based on the complex correlation value for each bit. By the way, although this determining method also includes the above-mentioned uncertainty of bit reversal, the uncertainty can be solved by using one bit in bit values as a flag for determining bit reversal, for example.

<Digital Watermark Detection Apparatus—Detection Information Extraction Unit>

Next, details of operation of the detection information extraction unit 330a are described.

Figure 49:
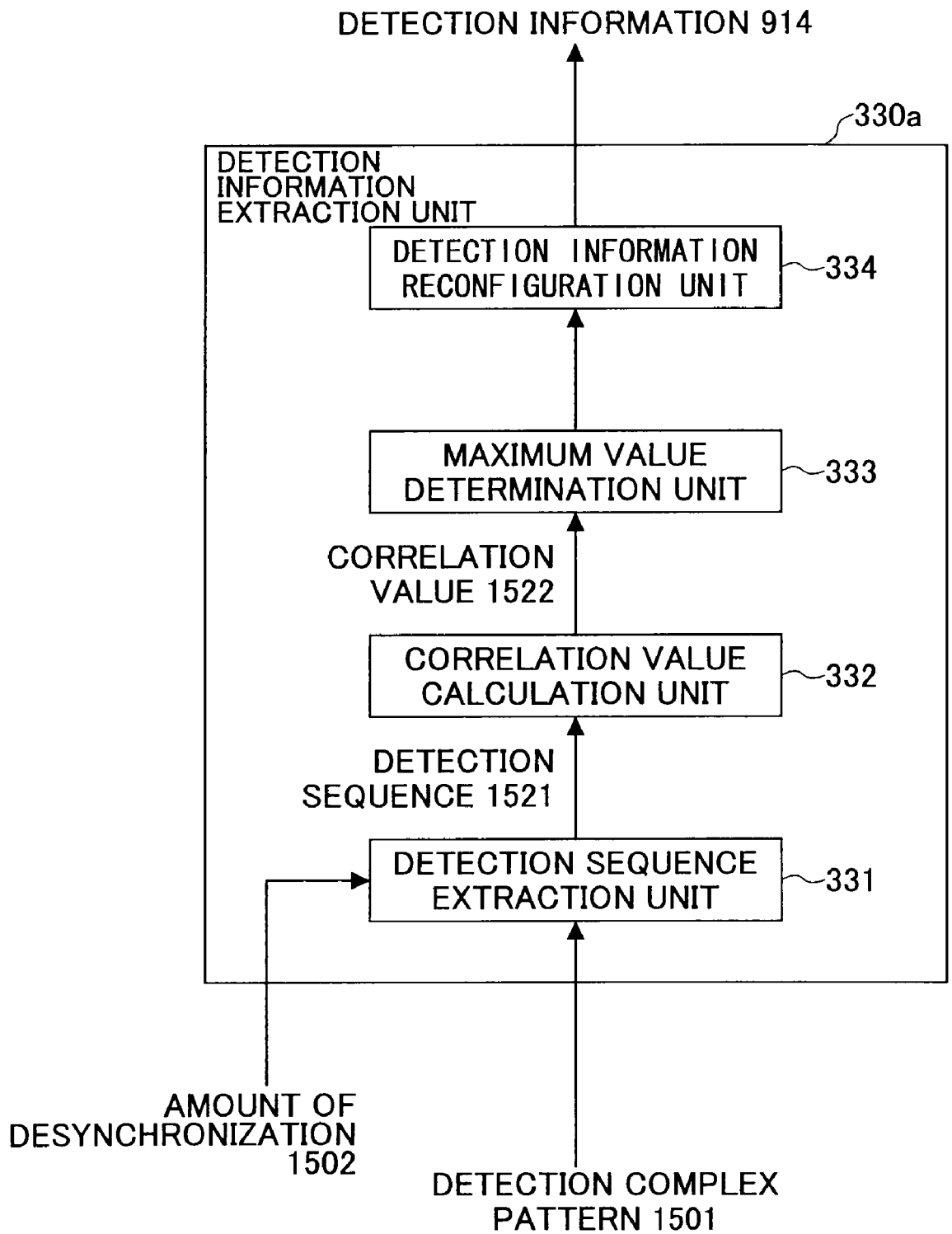
FIG. 49 is a configuration example of the detection information extraction unit in the fifth embodiment of the present invention.

FIG. 49 shows a configuration example of the detection information extraction unit in the fifth embodiment of the present invention.

The detection information extraction unit 330a has a configuration same as that of the detection information extraction unit 220 in the first embodiment, and includes a detection sequence extraction unit 331, a correlation value calculation unit 332, a maximum value determination unit 333, and a detection information reconfiguration unit 334, and it is different from the detection information extraction unit 220 of the first embodiment only in that it is configured to receive the amount of desynchronization 1502.

By the way, in FIG. 49, please note that the configuration is shown such that information flows from the bottom to the top to facilitate understanding of correspondence to FIG. 45.

The detection information extraction processes by the detection information extraction unit 330a are the same as the detection information extraction processes by the detection information extraction unit 220 of the first embodiment except for details of operation of the detection sequence extraction unit 331.

By the way, when digital watermark embedding is performed using the digital watermark embedding apparatus 100 in the third embodiment, Fourier transform process that is similar to the N−1-dimensional Fourier transform unit 225 in the third embodiment is necessary before the process of the detection sequence extraction unit 331.

<Digital Watermark Detection Apparatus—Detection Information Extraction Unit—Detection Sequence Extraction Unit>

In the following, details of operation of the detection sequence extraction unit 331 of the detection information extraction unit 330a are described.

Processes in the detection sequence extraction unit 331 are performed according to the following procedure.

1) N−1-dimensional complex array of the size of $M_1 \times M_2 \times \ldots \times M_{N-1}$ is configured from the detection complex pattern 1501. The method for configuring it is the same as the step 801) in the detection sequence extraction unit 221 in the before mentioned first embodiment.

2) A complex number sequence is obtained by extracting complex number values one by one in sequence from the complex array obtained in 1) and arranging them. That is, when the complex array is represented as A $[p_1, p_2, \ldots, p_{N-1}]$ ($p_n \geq 0$), $$c_1 = A[0, 0, \ldots, 0]$$
$$c_2 = A[1, 0, \ldots, 0]$$
$$\vdots$$

is obtained.

By the way, assuming the length of the embedding sequence 913 used when performing embedding in the digital watermark embedding apparatus 100 is L, L'=L/2.

3) Phase of each element of the complex number sequence obtained in 2) is displaced in a reverse direction based on the input amount of desynchronization 1502. That is, assuming that the amount of desynchronization 1502 is $$\Delta t = \frac{\Delta \theta}{2\pi} T, \tag{104}$$
$$c'_1 = c_1 e^{-j\Delta\theta}$$
$$c'_2 = c_2 e^{-j\Delta\theta}$$
$$\vdots$$

is obtained.

4) Complex number values are extracted one by one sequentially from the complex number sequence obtained in 3), so as to arrange the real part and the imaginary part of each extracted complex number value by regarding each of the real part and the imaginary part as an individual real value. That is, when detection sequence 1521 is represented as $i''_1, i''_2, \ldots, i''_L$, $$i''_1 = \Re[c_1']$$
$$i''_2 = \Im[c_1']$$
$$i''_3 = \Re[c_2']$$
$$i''_4 = \Im[c_2'] \tag{105}$$

is obtained, wherein $\Re, \Im$ is an operation for extracting the real part and the imaginary part of the complex number respectively.

5) The obtained $i''_1, i''_2, \ldots, i''_L$ are output to the correlation value calculation unit 332 as the detection sequence 1521.

In the case when order of the embedding sequence 913 or elements of the complex array is permuted in the complex array generation unit 112 of the digital embedding apparatus 100, the order is restored like the detection sequence extraction unit 221 in the first embodiment.

By the way, in the case when digital watermark embedding is performed using the digital watermark embedding apparatus 100 in the third embodiment, complex number values of elements within a range used by the complex array generation unit 112 of the digital watermark embedding apparatus in the third embodiment are extracted and arranged in the above-mentioned 2).

<Other Configuration Example of Detection Information Extraction Unit>

Without using the maximum value determination unit 333, the detection information extraction unit 330a may be configured only by the detection sequence extraction unit 331, the correlation value calculation unit 332, and the detection information reconfiguration unit 334, so that detection information may be extracted by performing the following processes. Such a configuration example is shown in FIG. 50.

Figure 50:
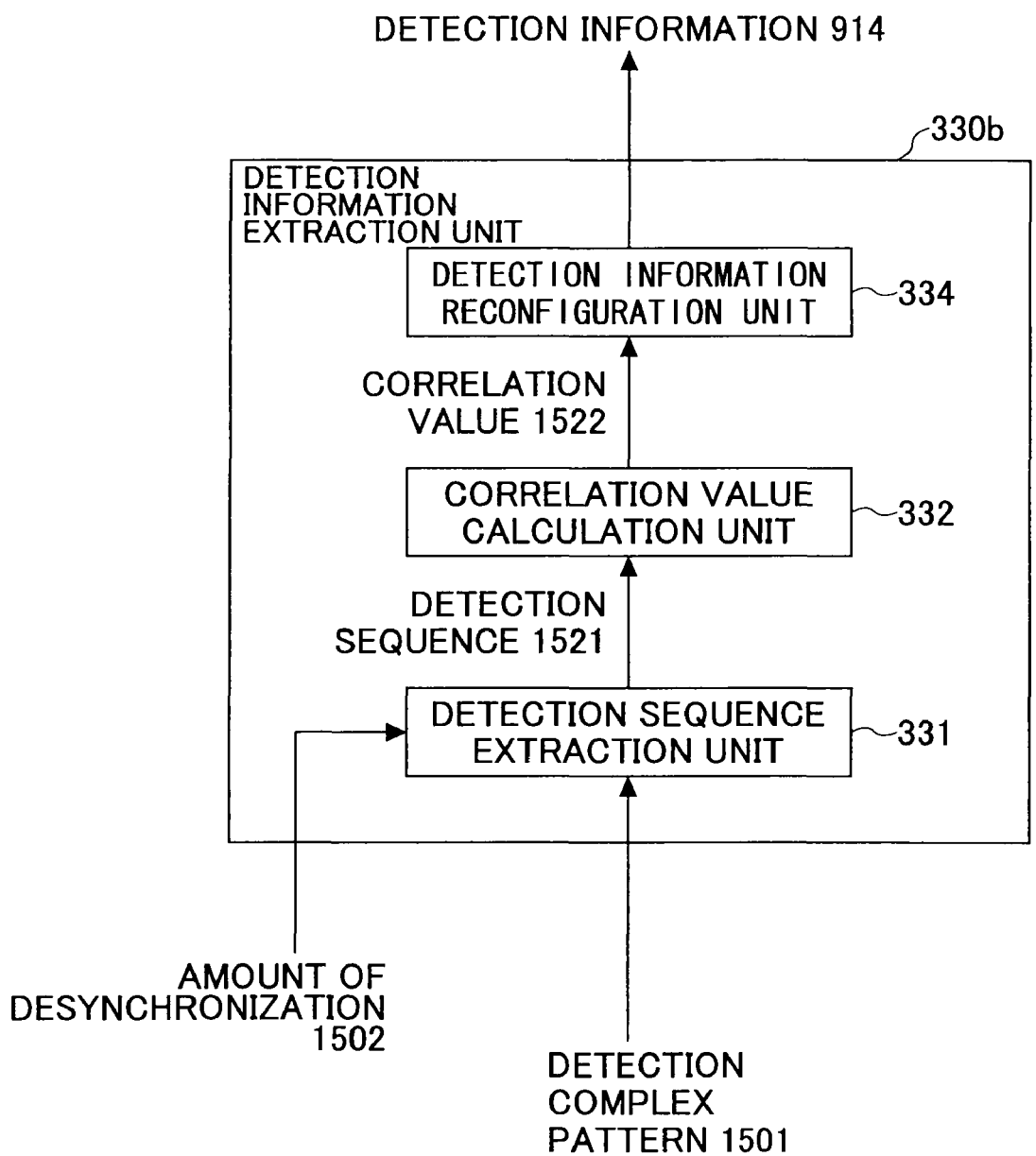
FIG. 50 is another configuration example of the detection information extraction unit in the fifth embodiment of the present invention.

The detection information extraction unit 330b shown in FIG. 50 re-configures detection information using the embedding sequence by which the maximum complex correlation value is obtained in the synchronization detection unit 320, and re-calculates a correlation value again for evaluating reliability of the detection information based on the amount of synchronization 1502 obtained by the synchronization detection unit 320. By doing this, digital watermark detection can be performed at higher speed.

1) Processes of the detection sequence extraction unit 331 are the same as the above-mentioned processes.

2) The correlation value calculation unit 332 is different from the correlation value calculation unit 222 of the first embodiment. Instead of calculating correlation values for all conceivable embedding sequences, the synchronization detection unit 320 stores, in a memory (not shown in the figure), an embedding sequence corresponding to a complex correlation value determined to have a maximum absolute value in the process of the synchronization detection maximum value determination unit 324, so that the correlation value calculation unit 322 calculates a correlation value only for the embedding sequence.

It is determined whether reliable digital watermark detection has been performed based on whether the correlation value is greater than a predetermined threshold.

3) The detection information reconfiguration unit 334 is similar to the detection information reconfiguration unit 224 of the first embodiment except for the point that reconfiguration of the detection information is performed using the embedding sequence using the above-mentioned 2).

Characteristics of the Fifth Embodiment

According to the digital watermark detection apparatus 300 of the present embodiment, in detection of digital watermark, even when the signal of the digital watermark detection target is desynchronized, the amount of desynchronization can be detected using the digital watermark signal itself. That is, by utilizing the point that embedding sequence that is spectrum spread in the N−1-dimensional space is commonly affected by desynchronization in the direction of N-th dimension, digital watermark detection in which synchronization can be performed easily and at high speed can be performed by using the complex correlation value of the spread sequence in the N−1-dimensional space.

For example, in the case of video signals, digital watermark detection is possible without using a special synchronization method even when a frame for starting detection is shifted in the time direction. This is very effective in a use situation in which temporal synchronization is difficult, such as when detecting digital watermark from a video that was re-taken using a video camera and the like, and when detecting digital watermark from a video that is converted to analog data such as a video tape, for example.

When a video displayed on a screen or TV or the like is taken by a video camera or a camera of a cellular phone and the like, since the frame rate for reproduction is not synchronized with the frame rate for video taking, there is a case in which re-sampling may occur in sub-frames. This indicates a state in which desynchronization occurs in sub-frame level (interval shorter than one frame) as a result. Even in such a situation, it is possible to measure the phase of the periodic signal in temporal demodulation, and as mentioned above, the amount of desynchronization can be detected.

Especially, according to the above-mentioned digital watermark detection apparatus, efficient and fast digital watermark detection becomes possible since the amount of desynchronization can be detected by calculation without using a round-robin method in which shifted amount is sequentially examined. In addition, it is not necessary to add a special synchronization signal, digital watermark detection of high quality and high detection performance becomes possible without signal deterioration due to the synchronization signal and without deterioration of detection performance of digital watermark.

Sixth Embodiment

<Phase Modulation>

In the following, a digital watermark embedding apparatus of the sixth embodiment of the present invention is described.

The present embodiment shows an example in which, in the digital watermark embedding apparatus 100 of the first embodiment, modulation process in the temporal modulation unit 130 is performed using a delay of the periodic signal.

Configuration of the digital watermark apparatus of the present embodiment is similar to that of the digital watermark embedding apparatus 100 in the first embodiment, and only the temporal modulation unit 130 is different.

By the way, although examples are shown based on the first embodiment in the present embodiment, configuration of other embodiments may be used except for the configuration of the temporal modulation unit 130. For example, the complex pattern generation unit 10b in the digital watermark embedding apparatus of the third embodiment may be used for the complex pattern generation unit 110.

<Digital Watermark Embedding Apparatus—Temporal Modulation Unit>

Figure 51:
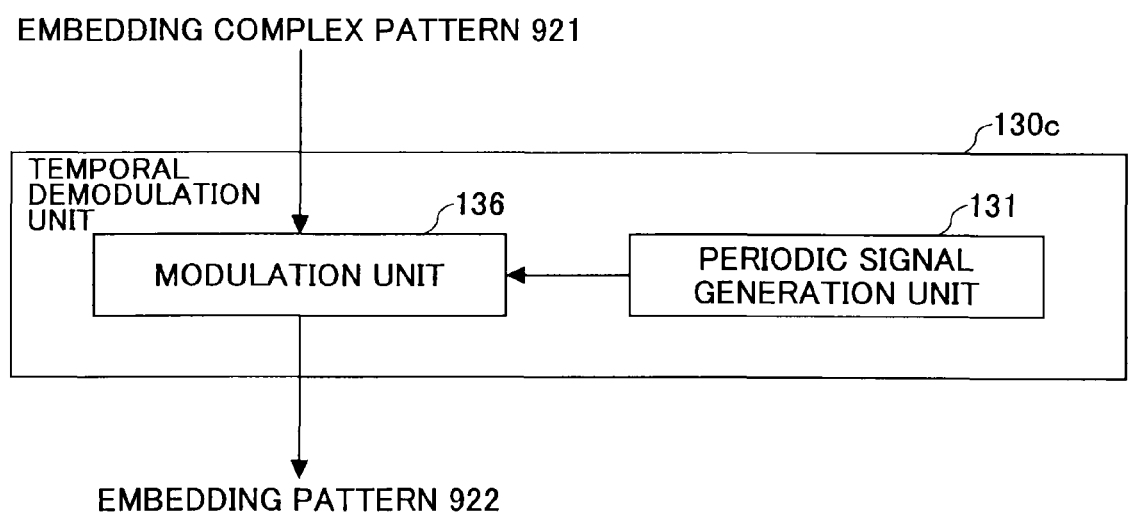
FIG. 51 is a configuration example of a temporal modulation unit in a sixth embodiment of the present invention.

FIG. 51 shows a configuration example of the temporal modulation unit in the sixth embodiment of the present invention.

The temporal modulation unit 130c shown in the figure includes a periodic signal generation unit 131 and a modulation unit 136, and receives the embedding complex pattern 921 and outputs the embedding pattern 922.

Generation processes of the embedding pattern 922 by the temporal modulation unit 130c are performed according to the following procedure.

1) The periodic signal generation unit 131 generates a periodic signal. The periodic signal to be generated is similar to the example of the periodic signal in the periodic signal generation unit 131 of the temporal modulation unit 130a in the first embodiment.

2) The modulation unit 136 modulates the periodic signal generated in the 1) according to the complex number value of the received embedding complex pattern as follows so as to obtain a N-dimensional embedding pattern 922.

determine amplitude of the periodic signal according to the absolute value of the complex number value.

delay the periodic signal according to argument of the complex number value, that is, change phase.

Next, a concrete example of the temporal modulation is described.

Modulation in the modulation unit 136 is performed by performing QAM (quadrature amplitude) modulation on the periodic signal, as a carrier wave, generated by the periodic signal generation unit 131 according to the complex number value of each position of the N−1-dimensional complex pattern 921 so as to change the periodic signal to the N-dimensional pattern.

However, the periodic signal that is the carrier is not necessarily a sine wave as mentioned before.

In addition, when all values of the embedding complex pattern 921 are configured only by real values, the phase of the periodic signal may be changed according to the real values while the amplitude of the periodic signal may be made constant.

More particularly, processes are performed as follows.

Now, assuming that the N−1-dimensional complex pattern is represented as $P(x_1, x_2, \ldots, x_{N-1})$. In addition, the real part and the imaginary part of P are represented as $P_r$ and $P_i$ respectively, and $$P(x_1,x_2,\ldots,x_{N-1})=B(x_1,x_2,\ldots,x_{N-1})e^{j\omega\tau(x_1,x_2,\ldots,x_{N-1})} \quad (106)$$

wherein j is the imaginary unit, and ω is the angular velocity of the basic frequency of the periodic signal.

It is assumed that the periodic signal generation unit 131 generates a periodic signal f(t).

N-dimensional pattern M is obtained as the following equation by modulating B and τ with f(t).

$$M(x_1,x_2,\ldots,x_{N-1},t)=B(x_1,x_2,\ldots,x_{N-1})f(t-\tau(x_1,x_2,\ldots,x_{N-1})) \quad (107)$$

Different from general QAM modulation, it should be noted that the baseband signal p changes, instead of time direction, in the direction of N−1 dimension (space direction in the case of video signal, for example) that is orthogonal to the time direction.

By such temporal modulation, the phase of the N-dimensional embedding pattern 922 is spread such that the phase is different according to the position on the N−1 dimensional space, so that the amount of noise component that appears due to the before-embedding signal 912 when detecting digital watermark becomes smaller.

Characteristics of Sixth Embodiment

The digital watermark embedding apparatus of the present embodiment shows a different configuration example of the temporal modulation unit 130a in the digital watermark embedding apparatus of the first embodiment, and the digital watermark embedding apparatus of the present embodiment has characteristics the same as those in digital watermark of the first embodiment.

Especially, the temporal modulation unit 130c modulates the N−1-dimensional embedding pattern that is spectrum spread on the N−1-dimensional space using the phase and the absolute value of the periodic signal in the N-th dimension direction that is orthogonal to the N−1-dimensional space, so that it has characteristics that the desynchronization applied in the N-th dimensional direction exerts common effects on the N−1-dimensional space.

In addition, in the time modulation unit 130c, by configuring the embedding pattern 922 such that the phase is different in the N−1-dimensional direction (for example, space direction in the case of video signal) that is orthogonal to the time direction, it can be prevented that every value of the embedding pattern becomes less that a minimum video signal quantization value so that a frame to which digital watermark embedding is not performed occurs in the case of video signal, for example. In addition, the video signal can be effectively used as transmission route of digital watermark, and robustness can be increased against an attack to aim at a frame having large digital watermark amplitude and change the frame.

In addition, since the phase of the embedding pattern is spread in the N−1-dimensional space, the size of the noise component that appears due to the before embedding signal becomes small in the result of the correlation calculation. As a result, digital watermark embedding and detection can be performed more reliably, and in addition, digital watermark embedding and detection can be performed with reliability similar to that in the conventional technique but with less quality deterioration.

Seventh Embodiment

<Plural Frequency Band Embedding in Time Axis>

In the following, a digital watermark embedding apparatus in the seventh embodiment of the present invention is described.

This embodiment is an example for performing digital watermark embedding of the digital watermark embedding apparatus 100 of the first embodiment a plurality of times simultaneously to embed embedding information using longer spectrum spread sequence.

Figure 52:
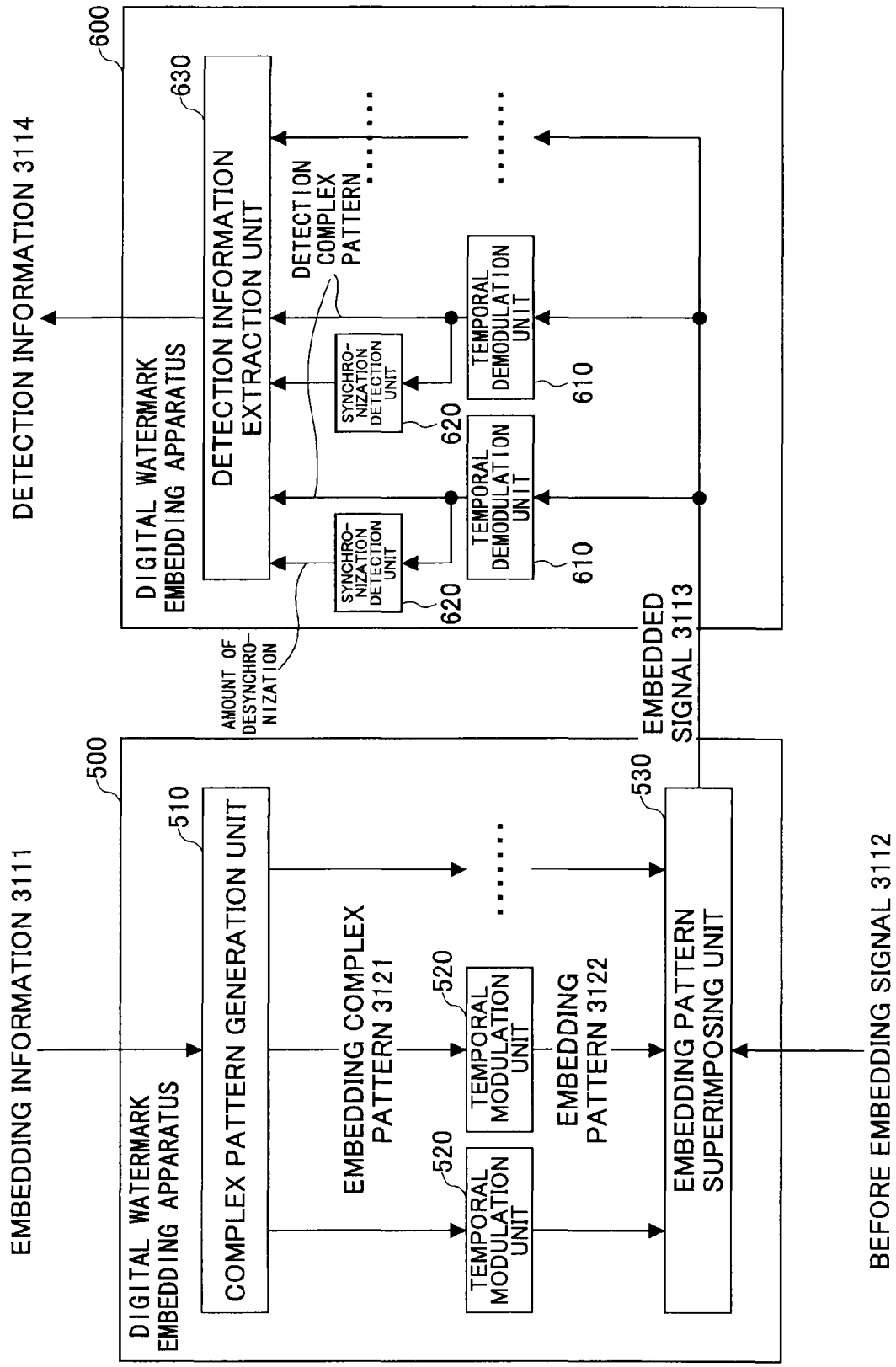
FIG. 52 is a configuration example of a digital watermark embedding apparatus and a digital watermark detection apparatus of the seventh embodiment of the present invention.

FIG. 52 shows a configuration example of the digital watermark embedding apparatus and a digital watermark detection apparatus of the seventh embodiment of the present invention.

<Digital Watermark Embedding Apparatus>

The digital watermark embedding apparatus 500 shown in FIG. 52 includes a complex pattern generation unit 510, a temporal modulation unit 520, and an embedding pattern superimposing unit 530, and the digital watermark embedding apparatus 500 receives embedding information 3111 and before embedding signal 3112 and outputs an embedded signal 3113.

Digital watermark embedding processes by the digital watermark embedding apparatus 500 are performed according to the following procedure.

Figure 53:
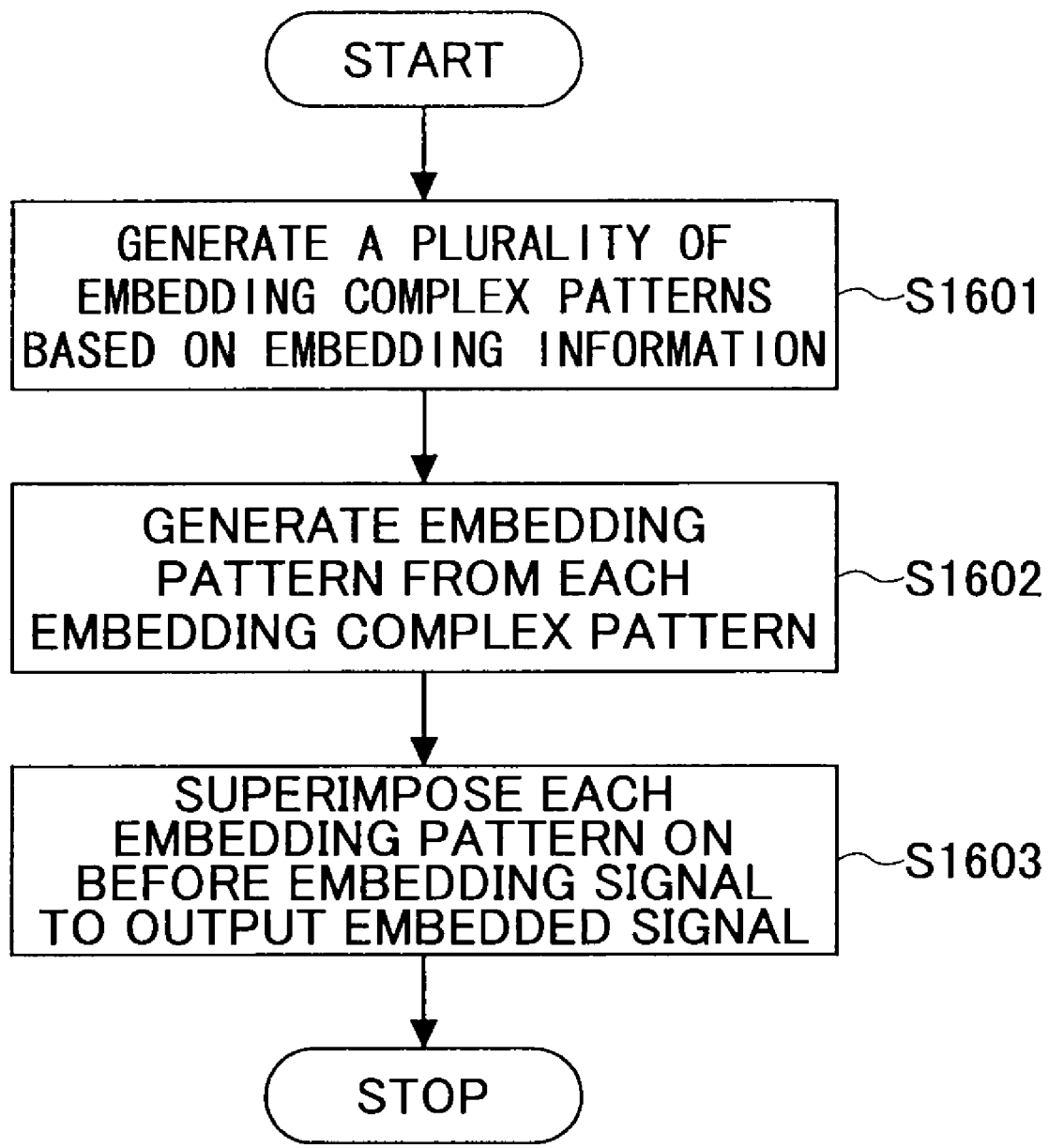
FIG. 53 is a flowchart of operation of the digital water is a flowchart of operation of the digital watermark embedding apparatus in a seventh embodiment of the present invention.

FIG. 53 is a flowchart of operation of the digital watermark embedding apparatus in the seventh embodiment of the present invention.

Step 1601) The complex pattern generation unit 510 generates a plurality of embedding complex patterns 3121 based on the received embedding information 3111.

Each embedding complex pattern 3121 is a N−1-dimensional pattern configured by complex numbers and indicates content of embedding information.

Details of operation of the complex pattern generation unit 510 are described later.

Step 1602) The temporal modulation unit 520 generates the embedding pattern 3122 based on each embedding complex pattern 3121 generated in the complex pattern generation unit 510.

The operation of the temporal modulation unit 520 is the same as that in the first embodiment. However, the periodic signals generated in each temporal modulation unit 520 are periodic functions that are orthogonal with each other. For example, they may be periodic functions each having a different basic frequency.

In addition, the temporal modulation unit shown in embodiments other than the first embodiment may be used as the temporal modulation unit 520. For example, the temporal modulation unit of the second embodiment or the sixth embodiment may be used.

When using the temporal modulation unit 130b of the second embodiment as the temporal modulation unit 520, processes of temporal modulation for a plurality of frequencies may be performed by one-time Fourier transform.

Step 1603) The embedding pattern superimposing unit 530 superimposes each embedding pattern 3122 generated in each temporal modulation unit 520 on the received before-embedding signal 3112 to output the embedded signal 3113. Details of operation of the embedding pattern superimposing unit 530 are described later.

<Digital Watermark Embedding Apparatus—Complex Pattern Generation Unit>

In the following, details of operation of the complex pattern generation unit 510 are described.

Figure 54:
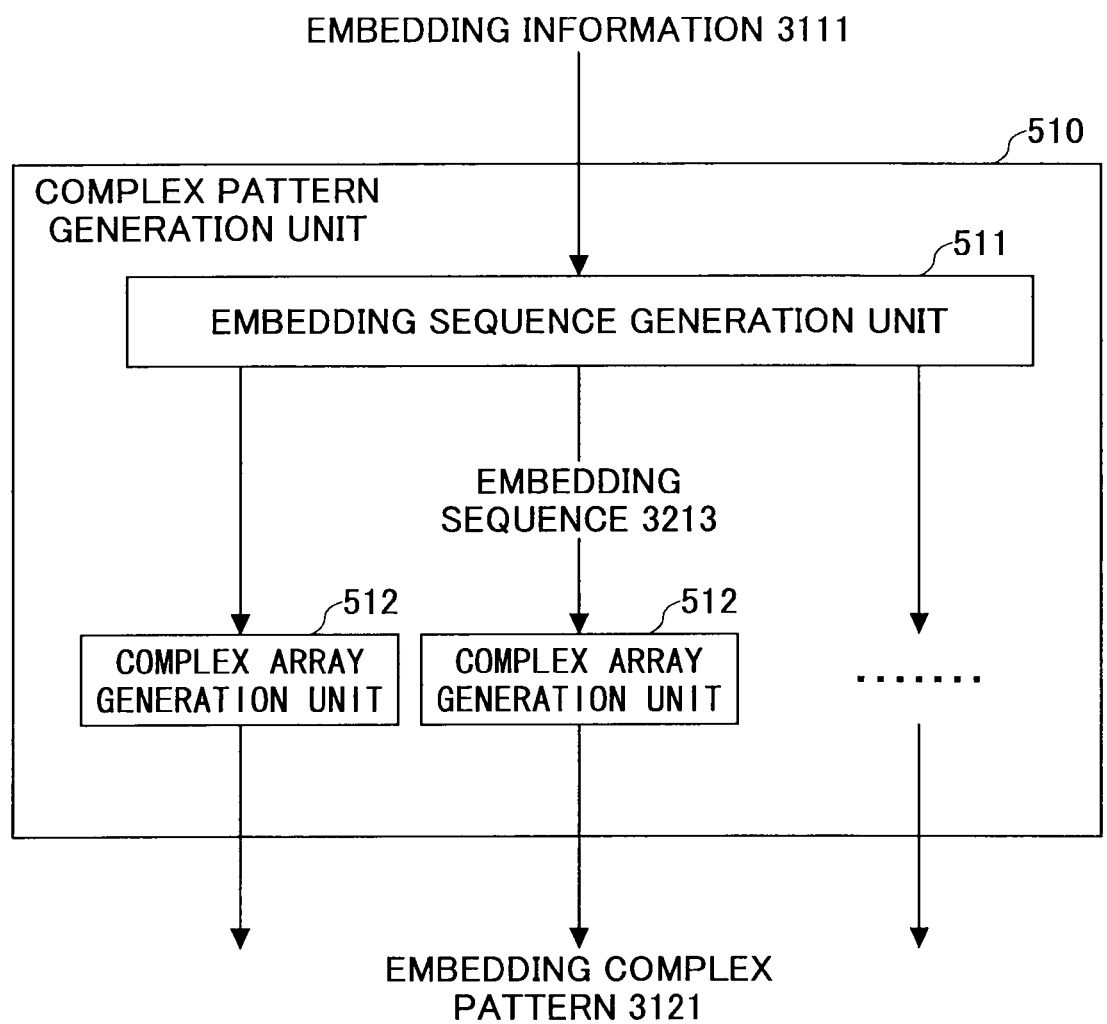
FIG. 54 is a configuration example of a complex pattern generation unit in the seventh embodiment of the present invention.

FIG. 54 shows a configuration example of the complex pattern generation unit in the seventh embodiment of the present invention.

The complex pattern generation unit 510 includes an embedding sequence generation unit 511 and a plurality of complex array generation units 512, and receives the embedding information 3111 and outputs the embedding complex pattern 3121.

Embedding complex pattern generation processes by the complex pattern generation unit 510 are performed according to the following procedure.

Figure 55:
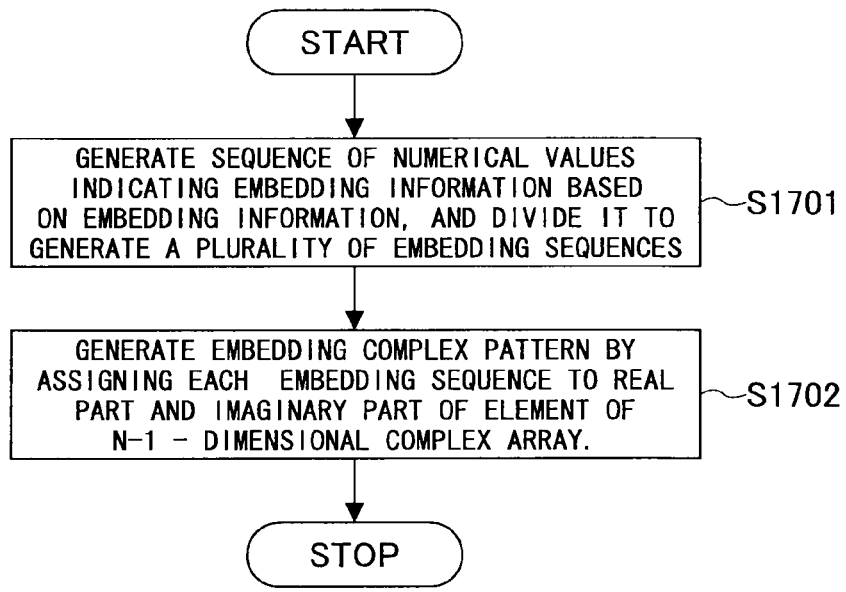
FIG. 55 is a flowchart of operation of the complex pattern generation unit in the seventh embodiment of the present invention.

FIG. 55 is a flowchart of operation of the complex pattern generation unit in the seventh embodiment of the present invention.

Step 1701) The embedding sequence generation unit 511 generates a sequence of numbers representing embedding information based on the received embedding information 3111, and divides the sequence to generate a plurality of embedding sequences 3211.

Details of operation of the embedding sequence generation unit 511 are described later.

Step 1702) The complex array generation unit 512 assigns each embedding sequence 3213 generated by the embedding sequence generation unit 511 to the real part and the imaginary part of elements of the N−1-dimensional complex array to generate the embedding complex pattern 3121.

Operation of each complex array generation unit 512 is the same as that of the complex array generation unit 112 in the first embodiment.

In addition, the complex pattern generation unit 510 may be configured based on the complex pattern generation unit 110b in the third embodiment. That is, the pattern obtained by the complex array generation unit 512 may be further Fourier transformed by a process similar to the N−1-dimensional inverse Fourier transform unit 113 of the third embodiment so as to regard the result as the embedding complex pattern 3121.

<Digital Watermark Embedding Apparatus—Complex Pattern Generation Unit—Embedding Sequence Generation Unit>

After generating the embedding sequence by a procedure similar to that in the embedding sequence generation unit 111 in the first embodiment, the embedding sequence generation unit 511 divides the embedding sequence into a plurality of parts. For example, when a sequence $w=\{w_1, w_2, \ldots, w_{nL}\}$ is generated by a procedure similar to that in the embedding sequence generation unit 111, for example, each of the embedding sequences $w^{[1]}, w^{[2]}, \ldots, w^{[n]}$ is generated as $$w^{[1]} = \{w_1, w_2, \ldots, w_L\} \qquad (108)$$
$$w^{[2]} = \{w_{L+1}, w_{L+2}, \ldots, w_{2L}\}$$
$$\vdots$$
$$w^{[N]} = \{w_{(n-1)L+1}, w_{(n-1)L+2}, \ldots, w_{nL}\}$$

wherein n is a total number of divisions.

By the way, although an example is shown in which the embedding sequence is divided in sequence by a predetermined number from the top, the sequence may be divided by any method as long as it is divided by a predetermined dividing method. For example, $$w^{[1]} = \{w_1, w_{n+1}, \ldots, w_{(L-1)n+1}\} \qquad (109)$$
$$w^{[2]} = \{w_2, w_{n+2}, \ldots, w_{(L-1)n+2}\}$$
$$\vdots$$
$$w^{[n]} = \{w_n, w_{2n}, \ldots, w_{nL}\}$$

may be adopted.

<Digital Watermark Embedding Apparatus—Embedding Pattern Superimposing Unit>

In the following, details of operation of the embedding pattern superimposing unit 530 are described.

Operation of the embedding pattern superimposing unit 530 is almost the same as that of the embedding pattern superimposing unit 140 in the first embodiment. But, only the following point is different.

The embedding pattern superimposing unit 530 adds, to superimpose, each N-dimensional embedding pattern 3122 generated in each temporal modulation unit 520 to the N-dimensional signal that is received as the before-embedding signal 3112, and outputs the N-dimensional signal that is the result of superimposing as the embedded signal 3113. In this process, all of the plurality of embedding patterns 3122 are added and superimposed. In addition, each embedding pattern 3122 may be enhanced by different embedding strength for superimposing. For example, in the case when deterioration characteristics with respect to frequency band are different for each embedding pattern 3122 for embedding, different embedding strength may be used for each embedding pattern such that detection for each embedding pattern can be performed with same accuracy.

<Digital Watermark Detection Apparatus>

The digital watermark detection apparatus 600 in the present embodiment includes a plurality of synchronization detection units 620, and a detection information extraction unit 630, and the digital watermark detection apparatus 600 receives the embedded signal 3113 and outputs the detection information 3114.

Digital watermark detection processes by the digital watermark detection apparatus 600 are performed according to the following procedure.

Figure 56:
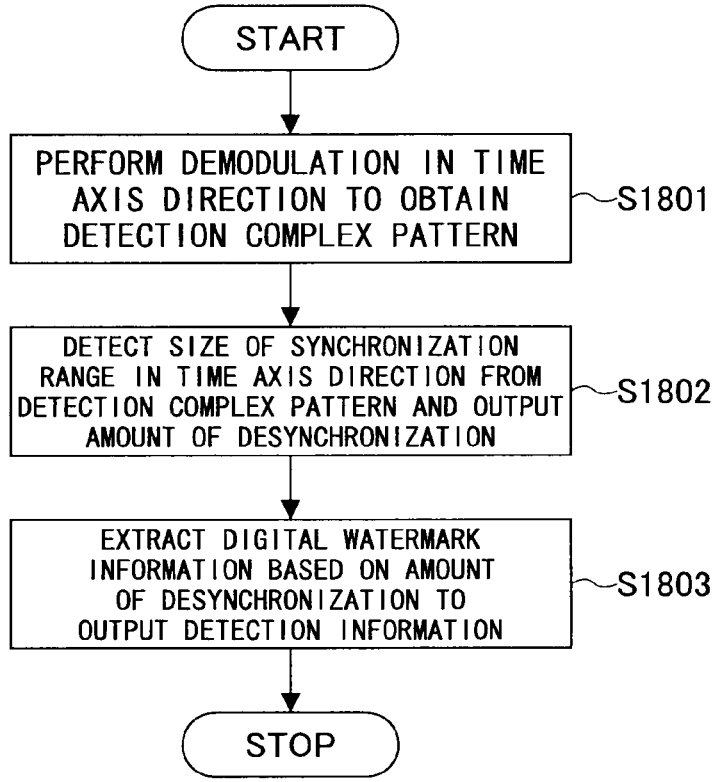
FIG. 56 is a flowchart of operation of the digital watermark detection apparatus in the seventh embodiment of the present invention.

FIG. 56 is a flowchart of operation of the digital watermark detection apparatus in the seventh embodiment of the present invention.

Step 1801) Each temporal demodulation unit 610 performs demodulation in the time axis direction to obtain the detection complex pattern 3161. Although content of processes in each temporal demodulation unit 610 is similar to that in the temporal demodulation unit 210 in the digital watermark detection apparatus 200 in the first embodiment, each of the periodic functions used in the temporal modulation units 520 of the digital watermark embedding apparatus 500 is used for each temporal demodulation unit 610.

By the way, like the digital watermark detection apparatus 200 of the first embodiment, pre-processing may be performed on the embedded signal 3113 before performing temporal demodulation process by the temporal demodulation unit 610.

In addition, the temporal demodulation unit shown in embodiments other than the first embodiment can be used as the temporal demodulation unit 610. For example, the temporal demodulation unit 210c in the second embodiment may be used.

When using the temporal demodulation unit 210c in the second embodiment as the temporal demodulation unit 610, processes of temporal demodulation for a plurality of frequencies may be performed by one-time Fourier transform.

Step 1802) Each synchronization detection unit 620 detects the amount of desynchronization, in a time axis (N-th dimension axis) direction, that was applied beforehand to the embedded signal 3113 from each detection complex pattern 3161 obtained by each the temporal demodulation unit 610, and outputs it as the amount of desynchronization 3162.

Operation of the synchronization detection unit 620 is the same as that of the synchronization detection unit 320 of the digital watermark detection apparatus 300 in the fifth embodiment.

Step 1803) The detection information extraction unit 630 extracts digital watermark information embedded by the digital watermark embedding apparatus 500 based on each amount of desynchronization 3162 obtained by the temporal demodulation units 610, and outputs the digital watermark information as the detection information 3114.

Details of operation of the detection information extraction unit 630 are described later.

<Digital Watermark Detection Apparatus—Detection Information Extraction Unit>

In the following, details of operation of the detection information extraction unit are described.

Figure 57:
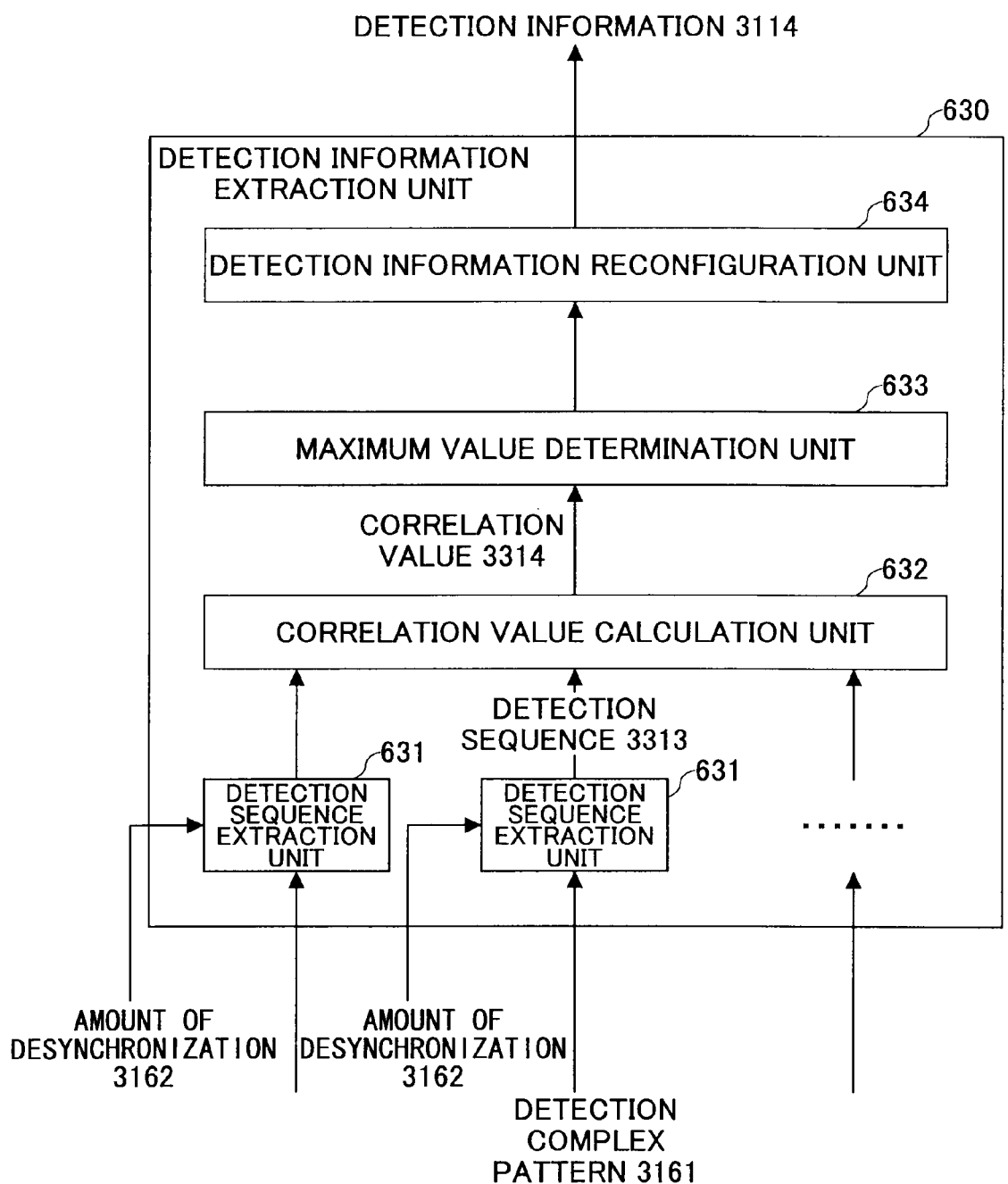
FIG. 57 is a configuration example of the detection information extraction unit in the seventh embodiment of the present invention.

FIG. 57 shows configuration of the detection information extraction unit in the seventh embodiment of the present invention.

The detection information extraction unit 630 shown in the figure is similar to that of the detection information extraction unit 330 of the fifth embodiment, but it is different in that the detection sequence extraction unit 631 is provided for each received detection complex pattern 3161 and each amount of desynchronization 3162.

By the way, in FIG. 57, please note that the configuration is shown such that information flows from the bottom to the top to facilitate understanding of correspondence to FIG. 54.

The detection information extraction process by the detection information extraction unit 630 is similar to the detection information extraction process in the detection information extraction unit 330 in the fifth embodiment except for a point that each of a plurality of detection sequence extraction unit 631 extracts the detection sequence 3313 based on the received detection complex pattern 3161 and the amount of desynchronization 3162 and for details of operation of the correlation value calculation unit 632.

In addition, like the other configuration example of the detection information extraction unit 330 described in the fifth embodiment, without using the maximum value determination unit 633, the detection information may be re-configured using the detection information by which maximum complex correlation value is obtained in the synchronization detection unit 320, and, in addition to that, correlation value for evaluating the reliability of the detection information may be calculated again based on the amount of desynchronization obtained by the synchronization detection unit 320.

<Digital Watermark Detection Apparatus—Detection Information Extraction Unit—Correlation Value Calculation Unit>

In the following, operation of the correlation value calculation unit 632 is described in detail.

Processes in the correlation value calculation unit 632 are performed according to the following procedure.

1) The detection sequences 3313 $i''^{[1]}, i''^{[2]}, \ldots$ each obtained by the detection sequence extraction unit 631 are integrated so as to obtain the sequence $i''$ as follows, when $$i''^{[k]} = \{i''_1{}^{[k]}, i''_2{}^{[k]}, \ldots, i''_L{}^{[k]}\}$$

$$i'' = \{i''_1{}^{[1]}, i''_2{}^{[1]}, \ldots, i''_L{}^{[1]}, i''_1{}^{[2]}, i''_2{}^{[2]}, \ldots, i''_L{}^{[2]}, \ldots$$
$$i''_1{}^{[n]}, i''_2{}^{[n]}, \ldots, i''_L{}^{[n]}\} \quad (110)$$

wherein [k] described on the shoulder of $i''$ represents that $i''$ is a detection sequence obtained from a k-th detection complex pattern 3161 by the k-th detection sequence extraction unit 631. In the equation, n indicates a total number of the received detection complex patterns 3161. By the way, although an example is shown in which each detection sequence is simply concatenated here, the sequences may be connected by extracting values from each detection sequence in predetermined order as long as it corresponds to the method for dividing embedding sequence in the embedding sequence generation unit 511 of the digital watermark embedding apparatus 500. For example, they may connected as follows.

$$i''' = \{i''_1{}^{[1]}, i''_1{}^{[2]}, \ldots, i''_1{}^{[n]}, i''_2{}^{[1]}, i''_2{}^{[2]}, \ldots,$$
$$i''_1{}^{[2]}, \ldots, i''_L{}^{[1]}, i''_L{}^{[2]}, \ldots, i_L''[n]\} \quad (111)$$

2) the correlation value 3314 is obtained based on the sequence $i''$ obtained in the above-mentioned 1) by performing processes similar to those of the correlation value calculation unit 332 of the digital watermark detection apparatus 300 of the fifth embodiment. But, it should be noted that the conceivable embedding sequence that is the subject for correlation calculation is a sequence $w = \{w_1, w_2, \ldots, w_{nL}\}$ that is generated in the embedding sequence generation unit 511 of the digital watermark embedding apparatus 500 and that is one before being divided.

<Improvement of Accuracy by Integrating the Amounts of Desynchronization>

The synchronization detection unit 620 may obtain the amount of desynchronization with higher accuracy according to the following procedure based on the amount of desynchronization 3162 obtained for each detection complex pattern 3161.

1) Assuming that each amount of desynchronization is $$\Delta t_1 = \frac{\Delta \theta_1}{2\pi} T_1, \Delta t_2 = \frac{\Delta \theta_2}{2\pi} T_2, \ldots$$

wherein $T_1, T_2, \ldots$ are periods of the periodic signal of each temporal demodulation unit 610.

2) A maximum one is selected from $\Delta t_1, \Delta t_2, \ldots$ as $\Delta t_{max}$. Alternatively, $\Delta t_i$ corresponding to a periodic signal having the maximum period may be selected.

3) A following equation is considered based on $\Delta t_i$, $T_i$, $\Delta t_{max}$ for each i to obtain $n_i$.

$$\Delta t_1 + n_1 T_1 = \Delta t_{max} \tag{112}$$

4) Assuming that each integer value closest to each $n_i$ is $n'_i$.

5) Following $\Delta t'_i$ is obtained using $n'_i$.

$$\Delta t_1' = \Delta t_1 + n_1' T_1 \tag{113}$$

This means obtaining a shift amount, as $\Delta t'_i$, in the N-th dimension axis direction at the position of the $n'_i$-th period according to the position of $\Delta t_{max}$ for each periodic signal.

Figure 58:
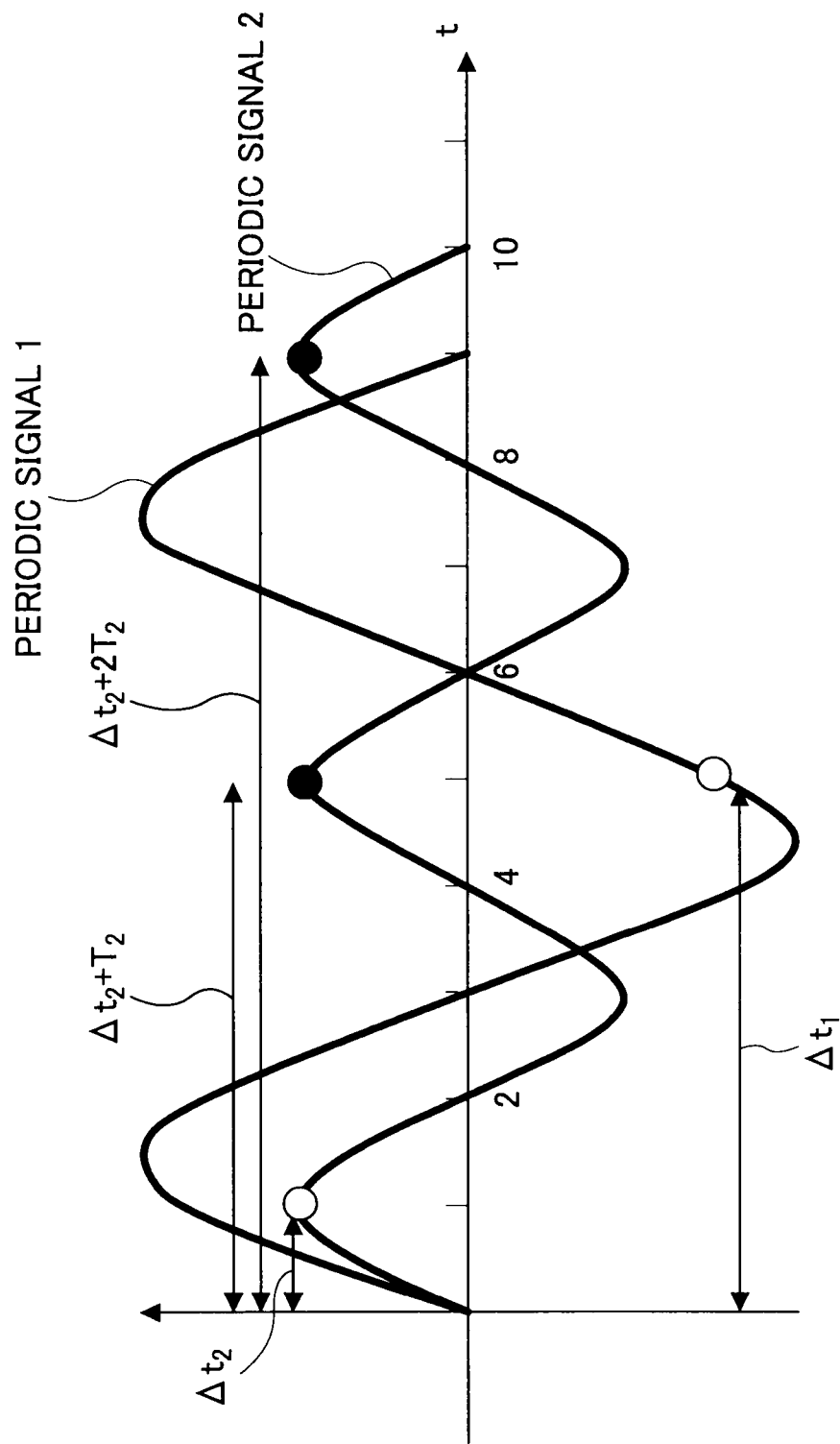
FIG. 58 is an example for connecting synchronization displacement amounts in the seventh embodiment of the present invention.

FIG. 58 shows a manner of the above-mentioned calculation using the two periodic signals. In the figure, $\Delta \theta_1 = 5\pi/3$ is obtained for the periodic signal 1 of a period 6, and $\Delta \theta_2 = \pi/2$ is obtained for the periodic signal 2 of a period 4, and they are shown as white circles. In this case, $\Delta t_1 = 5$, $\Delta t_2 = 1$. In addition, the positions of $\Delta t_2 + T_2$ and $\Delta t_2 + 2T_2$ are shown by black circles. $\Delta t_1$ is selected as $\Delta t_{max}$ so that $n'_2 = 1$ is obtained by the above procedures 3) and 4). This indicates that points of the phases $\Delta \theta_1$ and $\Delta \theta_2$ of the two periodic signal overlap with each other at the position of the left side black circle among the two black circles. As a result, $\Delta t'_2 = \Delta t_2 + n'_2 T_2 = 5$ is obtained.

By the way, as to i corresponding to the periodic signal selected as $\Delta t_{max}$, $n'_i = 1$ holds true.

6) An average value of $\Delta t'_i$ obtained in the above-mentioned way is obtained so as to regard it as the shift amount $\Delta t$ for the whole as follows.

$$\Delta t = \frac{1}{k} \sum_{i=1}^{k} \Delta t_i' \tag{114}$$

In the equation, k indicates a number of periodic signals.

In the example of FIG. 58, an example of a case in which there is no error in detection of each amount of desynchronization is shown. But, when there is an error in detection of each amount of desynchronization, there is a possibility in that $n_i$ does not become an integer. By obtaining $n'_i$ as an integer in the above-mentioned procedure 4) and by finally obtaining the average of $\Delta t'_i$, maximum likelihood value of the amount of desynchronization on the N-th dimension axis is obtained in consideration of an error.

In addition, when obtaining the average value of $\Delta t'_i$, a shift amount that is obviously position-displaced may be disregarded, for example. According to this method, for example, a case in which an attack is applied to a frequency corresponding to a specific frequency signal so that detection of the amount of desynchronization obtained from a detection complex pattern 3161 is failed can be removed.

7) Since $\Delta t$ is a value of the shift amount in the N-th dimension direction that is actually obtained accurately, the amount of desynchronization of each frequency signal $$\Delta \tilde{t}_i = \frac{\Delta \tilde{\theta}_i}{2\pi} T_i$$

is re-obtained from this as follows.

$$\Delta \tilde{t}_1 = \begin{array}{l} \Delta t - n_1' T_1 \text{ (When } \Delta t \geq n_1' T_1\text{)} \\ \Delta t - (n_1' - 1) T_1 \text{ (When } \Delta t < n_1' T_1\text{)} \end{array} \tag{115}$$

By obtaining the shift amount in the N-th dimension direction accurately based on the amount of desynchronization 3162 obtained for each detection complex pattern 3161 in the above-mentioned way, and by re-obtaining the amount of desynchronization using this, it becomes possible to calculate a more accurate amount of desynchronization. As a result, detection accuracy of the digital watermark can be improved.

Characteristics of Seventh Embodiment

According to the digital watermark embedding apparatus and the digital watermark detection apparatus of the present embodiment, embedding information of a longer information length can be embedded as digital watermark by using a plurality of frequency bands.

In addition, by finally calculating a correlation value as a whole for detection sequences that are results of performing synchronization individually and separately so as to evaluate reliability of detection, reliability of the whole detection result can be made clear more accurately compared with the case in which digital watermark is embedded and detected individually and separately.

In addition, the spectrum spread sequence length can be increased, so that digital watermark can be embedded with higher reliability. This is described as follows.

According to the before-mentioned document—Susumu Yamamoto, Takao Nakamura, Youichi Takashima, Atsushi Katayama, Ryo Kitahara, Takashi Miyatake, "Consideration on evaluation of detectability for frame-based video watermarking", Forum on information technology, FIT2005, J-029, 2005—, in the case of digital watermarking using spectrum spreading and correlation calculation, the detection evaluation value indicating reliability of detection in the sense of false positive of digital watermark increases in proportion to the square root of the sequence length of the spectrum spreading. On the other hand, when digital watermark is embedded by superimposing it on a plurality of frequency bands like the present embodiment, it is necessary to decrease energy of watermark signal for each frequency band for suppressing the whole signal deterioration. That is, when performing multiplexing on n frequency bands without changing the degree of signal deterioration (for example, without changing the value of PSNR), the energy of each watermark signal becomes 1/n and the amplitude becomes $1/\sqrt{n}$ compared with the case when embedding on a single frequency band. This equals to that individual embedding strength becomes $1/\sqrt{n}$.

According to the before-mentioned document—Susumu Yamamoto, Takao Nakamura, Youichi Takashima, Atsushi Katayama, Ryo Kitahara, Takashi Miyatake, "Consideration on evaluation of detectability for frame-based video watermarking", Forum on information technology, FIT2005, J-029, 2005—, when the embedding strength becomes $1/\sqrt{n}$, if the original image component that becomes noise for watermark is small enough, the detection evaluation value of the digital watermark becomes constant irrespective of embedding strength (in FIG. 1 in the document, when α becomes a maximum limit, that is, when the embedding strength becomes large enough compared with the original image component, E[ρ] asymptotically comes closer to $\sqrt{1}$). In addition, when the original image component that becomes noise for watermark is large enough, detection evaluation value of digital watermark becomes $1/\sqrt{n}$ (in FIG. 1 in the document, when α becomes a minimum limit, that is, when the embedding strength becomes small enough compared with the original image component, E[ρ] comes closer to a straight line that passes though the origin point).

As a result, compared with the case in which watermark is embedded in a single frequency band, when performing multiplexing onto n frequency bands, if the original image component that becomes noise for watermark is small enough, the detection evaluation value of the digital watermark becomes large in proportion to the square root of sequence length of spectrum spreading, even when the original component image that becomes noise for watermark is large enough, detection evaluation value of digital watermark does not change at worst, so that the detection evaluation value becomes large as a whole, and as a result, detection of higher reliability becomes possible.

In addition, by using the method for obtaining the shift amount in the N-th dimension direction accurately based on the amount of desynchronization 3162 obtained for each detection complex pattern 3161 to re-obtain, using this, the amount of desynchronization, the amount of desynchronization can be obtained more accurately, and detection accuracy of digital watermark can be improved, and reversely, embedding strength of digital watermark can be made week for the same level of detection accuracy, so that digital watermark of small quality deterioration can be realized.

In addition, when using the temporal modulation unit 130b and the temporal demodulation units 210c and 210d as the temporal modulation unit 520 and the temporal demodulation unit 610, processes of temporal modulation and temporal demodulation for a plurality of frequencies can be performed by one-time Fourier transform, so that processes can be performed at higher speeds.

Eighth Embodiment

<Time Multiplexing Embedding>

In the following, a digital watermark embedding apparatus and a digital watermark detection apparatus of the eighth embodiment of the present invention are described.

This embodiment is an example for using the digital watermark embedding apparatus and the digital watermark detection apparatus of the fifth embodiment to embed, into a before-input signal, a synchronization pattern and a following embedding pattern that is based on a plurality of pieces of embedding information and detect the amount of desynchronization so as to perform embedding and detection efficiently for large amount of embedding information.

<Digital Watermark Embedding Apparatus>

The digital watermark embedding apparatus of the present embodiment has a configuration similar to that of the digital watermark embedding apparatus 100 of the first embodiment, but a part of operation of the complex pattern generation unit 110 is different.

Embedding processes of digital watermark by the digital watermark embedding apparatus 100 of the present embodiment are performed according to the following procedure.

Figure 59:
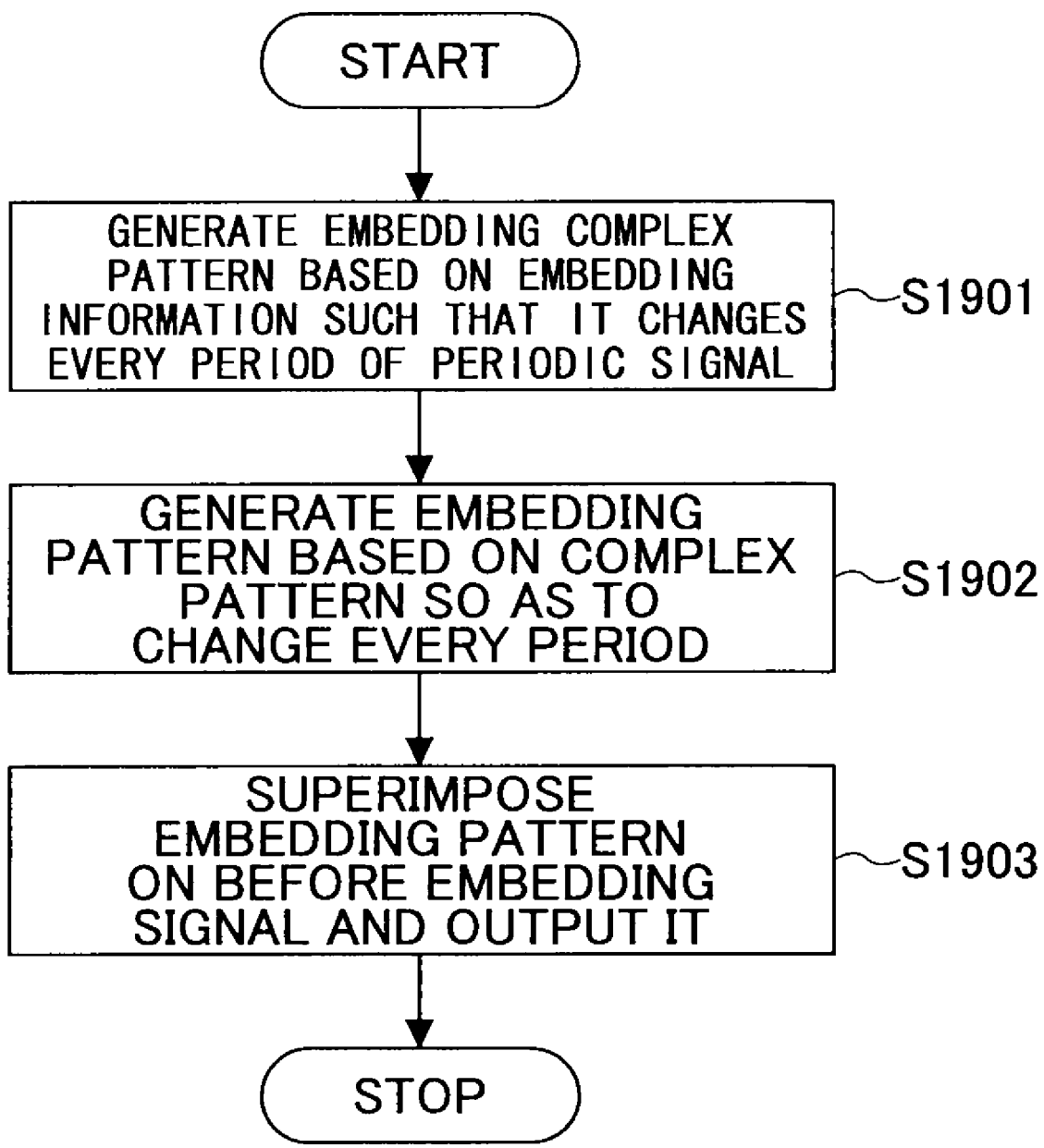
FIG. 59 is a flowchart of operation of the digital watermark embedding apparatus in the eighth embodiment of the present invention.

FIG. 59 is a flowchart showing operation of the digital watermark embedding apparatus in the eighth embodiment of the present invention.

Step 1901) The complex pattern generation unit 110 generates an embedding complex pattern 921 based on the received embedding information 911. In this process, the embedding complex pattern 921 is generated such that the embedding complex pattern 921 changes based on embedding information for each one period of the periodic signal generated by the periodic signal generation unit 131 of the temporal modulation unit 130.

Details of operation of the complex pattern generation unit 110 are described later.

Step 1902) The temporal modulation unit 130 generates an embedding pattern 922 based on the complex pattern 921 that is generated by the complex pattern generation unit 110 and that is stored in the first storage 150 to store the embedding pattern 922 into the second storage 160.

Operation of the temporal modulation unit 130 is the same as that of the temporal modulation unit 130 in the first embodiment except for a point that the embedding pattern 922 changes for each period according to the embedding complex pattern 921 generated by the complex pattern generation unit 110.

By the way, as to the temporal modulation unit 130, temporal modulation units of other embodiments may be used. For example, the temporal modulation unit 130b of the second embodiment may be used, and the temporal modulation unit 130c of the sixth embodiment may be used, for example.

Step 1903) The embedding pattern superimposing unit 140 superimposes, on the received before-embedding signal 912, the embedding pattern 922 that is generated by the temporal modulation unit 130 and that is stored in the second storage unit 160 to output the embedded signal 923.

Operation of the embedding pattern superimposing unit 140 is the same as that of the first embodiment.

<Digital Watermark Embedding Apparatus—Complex Pattern Generation Unit>

In the following, derails of operation of the complex pattern generation unit 110c are described.

Figure 60:
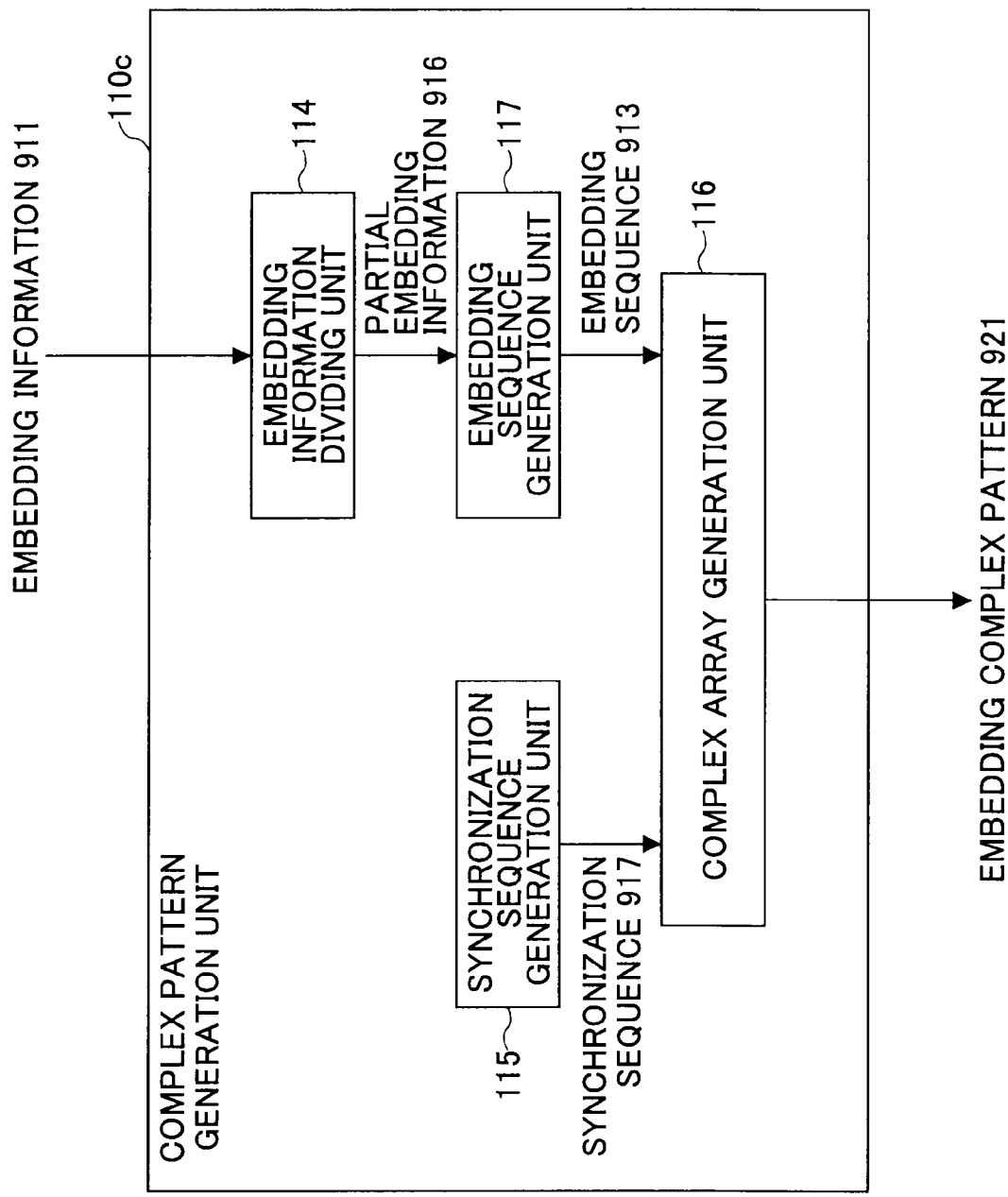
FIG. 60 is a configuration example of the complex pattern generation unit in the eighth embodiment of the present invention.

FIG. 60 shows a configuration example of the complex pattern generation unit in the eighth embodiment of the present invention.

The complex pattern generation unit 110c includes an embedding sequence generation unit 117, a complex array generation unit 116, an embedding information dividing unit 114, and a synchronization sequence generation unit 115, and the complex pattern generation unit 110c receives the embedding information 911 and outputs the embedding complex pattern 921.

Embedding complex pattern generation processes by the complex pattern generation unit 110c are performed according to the following procedure.

Figure 61:
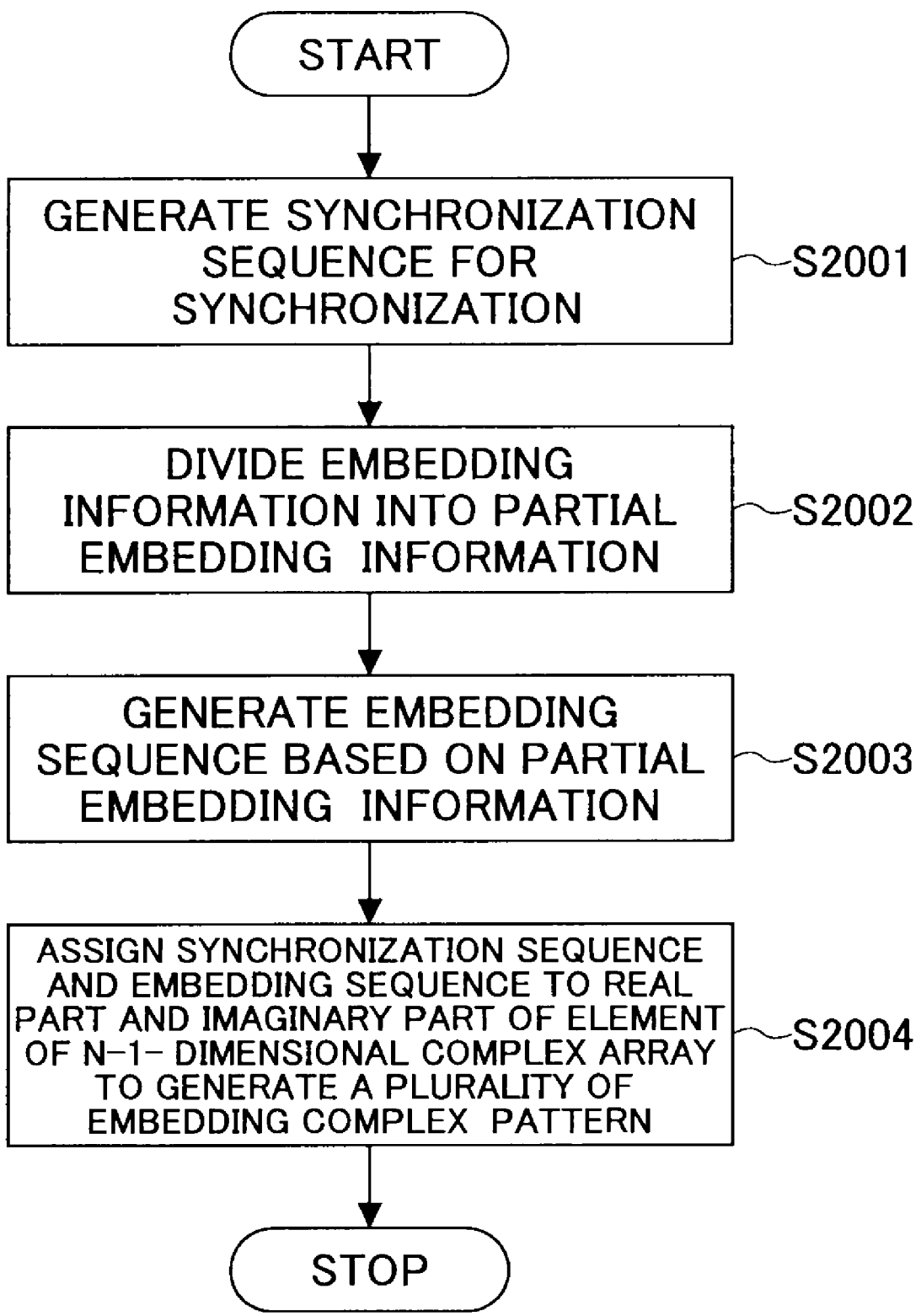
FIG. 61 is a flowchart of operation of the complex pattern generation unit in the eighth embodiment of the present invention.

FIG. 61 is a flowchart of operation of the complex pattern generation unit in the eighth embodiment of the present invention.

Step 2001) The synchronization sequence generation unit 115 generates a synchronization sequence 917 that is a predetermined sequence of numbers for synchronization.

Details of operation of the synchronization sequence generation unit 115 are described later.

Step 2002) The embedding information dividing unit 114 divides the received embedding information 911 into a plurality of pieces of partial embedding information 916. Any method can be used for the division. For example, the embedding information 911 may be divided by k bits in sequence from the top.

Step 2003) The embedding sequence generation unit 117 generates the embedding sequence 913 that is a sequence of numbers representing embedding information.

Operation of the embedding sequence generation unit 117 is the same as that of the embedding sequence generation unit 111 of the first embodiment except for a point that the embedding sequence 913 is generated for each of the plurality of pieces of partial embedding information 916.

Step 2004) The complex array generation unit 116 assigns each of the synchronization sequence 917 generated by the synchronization sequence generation unit 115 and each embedding sequence 913 generated by the embedding sequence generation unit 117 into the real part and the imaginary part of elements on the N−1-dimensional complex array.

Details of operation of the complex array generation unit 116 are described later.

<Digital Watermark Embedding Apparatus—Complex Pattern Generation Unit—Synchronization Sequence Generation Unit>

The synchronization sequence generation unit 115 generates the synchronization sequence 115 by the following processes.

The synchronization sequence 115 is a sequence of values used for synchronization in the digital watermark detection apparatus and is generated using a pseudo-random number sequence such that the synchronization sequence does not overlap with other embedding sequence. That is, assuming that the pseudo-random number sequence is $SPN=\{SPN_1, SPN_2, \ldots, SPN_L\}$ (L is a length of the sequence), the synchronization sequence $s=\{s_1, s_2, \ldots s_L\}$ may be determined as follows.

$$s = SPN = \{SPN_1, SPN_2, \ldots, SPN_L\} \quad (116)$$

Digital Watermark Embedding Apparatus—Complex Pattern Generation Unit—Complex Array Generation Unit>

Operation of the complex array generation unit 116 is similar to that of the complex array generation unit 112 in the digital watermark embedding apparatus of the first embodiment, but it is different in that the complex array generation unit 116 configures complex arrays for each of the synchronization sequence 917 and the plurality of embedding sequences 913 and generates the complex arrays such that the embedding complex pattern 921 is successively switched for each one period of the periodic signal generated by the periodic signal generation unit 131 of the temporal modulation unit 130.

The complex array generation unit 116 generates the embedding complex pattern 921 by the following processes.

1) By a procedure similar to that of the complex array generation unit 112 in the digital watermark embedding apparatus 100 of the first embodiment, an embedding complex pattern SP based on the synchronization sequence 917 generated by the synchronization sequence generation unit 115 is generated.

2) By a procedure similar to that of the complex array generation unit 112 in the digital watermark embedding apparatus 100 in the first embodiment, the embedding complex pattern $A_1, A_2, \ldots, A_k$ is generated based on each embedding sequence 913 generated by the embedding sequence generation unit 117, in which k indicates a number of embedding sequences 913 generated in the embedding sequence generation unit 117, that is, k is a number of divisions of information in the information dividing unit 114.

3) For each one period of the periodic signal generated by the periodic signal generation unit 131 of the temporal modulation unit 130, the embedding complex pattern is output repeatedly in the following sequence.

$$SP, SP, A_1, A_2, \ldots, A_k, SP, SP, A_1, A_2, \ldots, A_k, \quad (117)$$

The . . . at the end indicates that the whole is similarly repeated.

In this example, although the embedding complex pattern SP based on the synchronization sequence 917 is repeated two times and output, it may be repeated equal to or more than three times. In such a case, it is needless to say that digital watermark detection is performed in the digital watermark detection apparatus assuming that it is repeated a plurality of times.

The embedding pattern is generated based on the embedding complex pattern 921 generated in the above-mentioned way, and the pattern is superimposed on the before-embedding signal, so that the embedding information is embedded in a time division manner.

Figure 62:
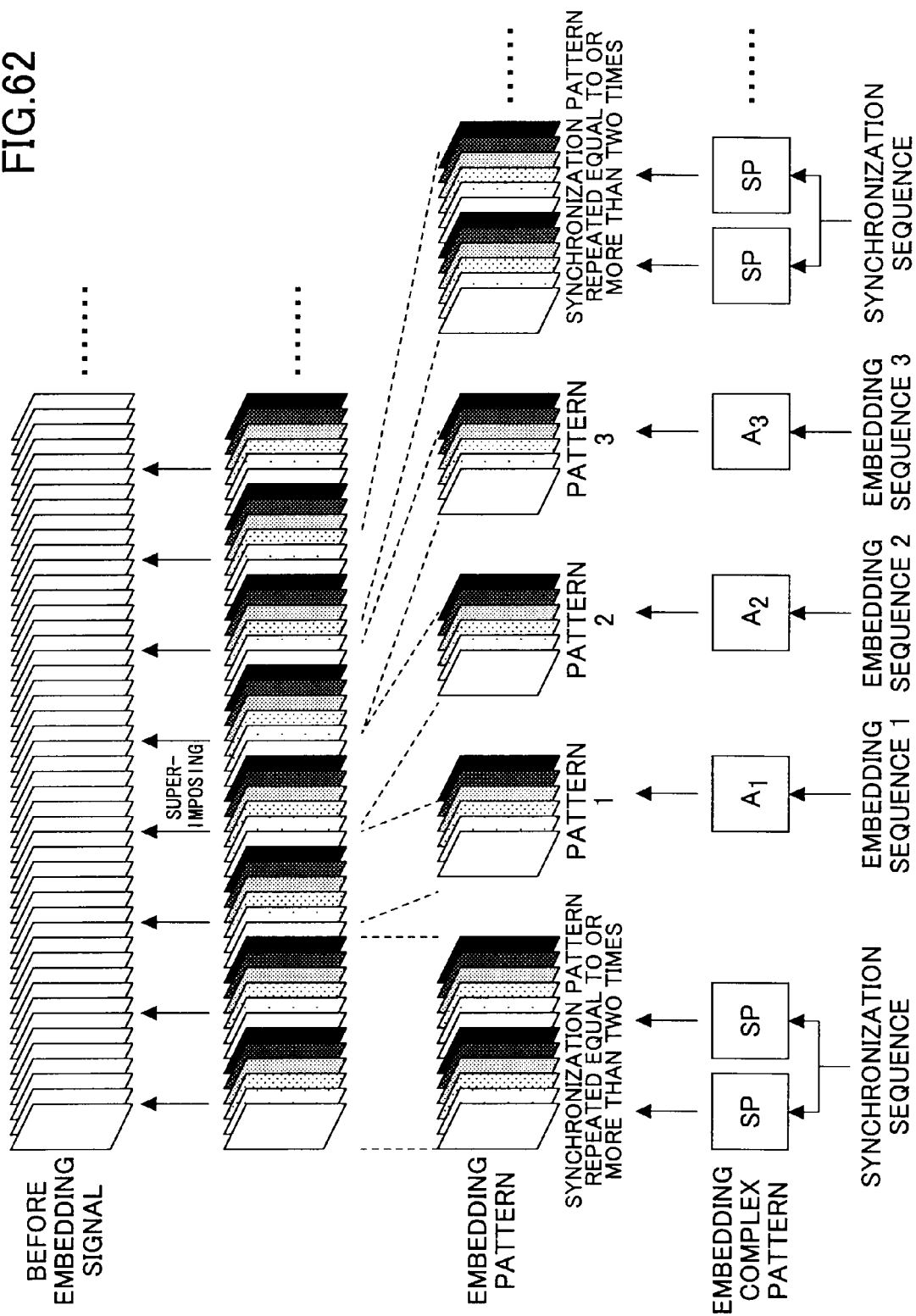
FIG. 62 is an example for embedding a plurality of pieces of information continuously in a time division manner in the eighth embodiment of the present invention.

FIG. 62 shows an example for embedding a plurality of pieces of information continuously in a time division manner. As shown in the figure, embedding patterns generated from each embedding complex pattern are connected so as to be superimposed on the before-embedding signal.

<Digital Watermark Detection Apparatus>

Figure 63:
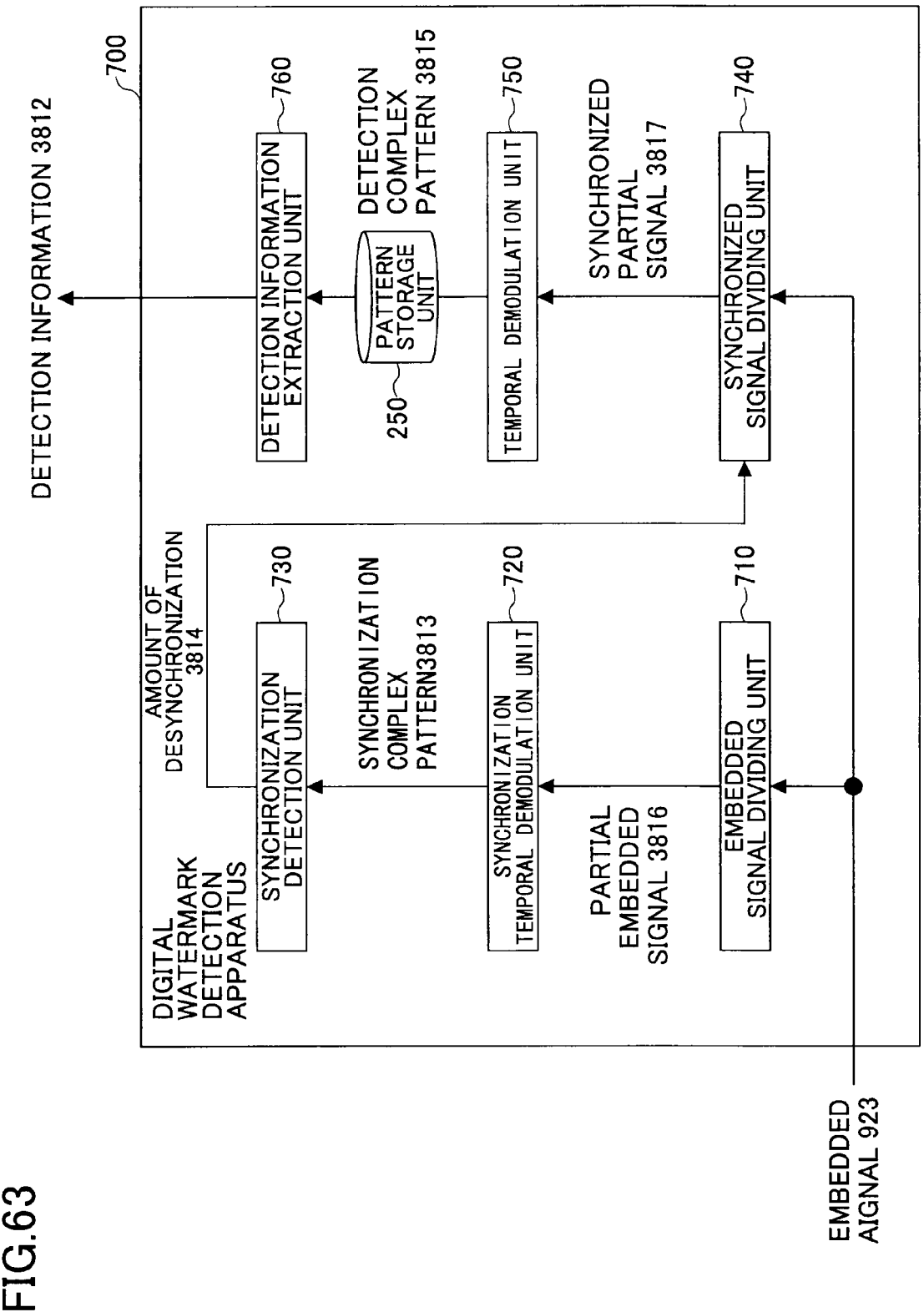
FIG. 63 is a configuration example of the digital watermark detection apparatus in the eighth embodiment of the present invention.

FIG. 63 shows a configuration example of the digital watermark detection apparatus in the eighth embodiment of the present invention.

The digital watermark detection apparatus 700 shown in the figure includes an embedded signal dividing unit 710, a synchronization temporal demodulation unit 720, a synchronization detection unit 730, a synchronized signal dividing unit 740, a temporal demodulation unit 750, a detection information extraction unit 760, and a pattern storage 770, and the digital watermark detection apparatus 700 receives the embedded signal 923 and outputs detection information 3812.

By the way, in FIG. 63, please note that the configuration is shown such that information flows from the bottom to the top to facilitate understanding of correspondence to FIG. 10.

Digital watermark detection processes by the digital watermark detection apparatus 700 are performed according to the following procedure.

Figure 64:
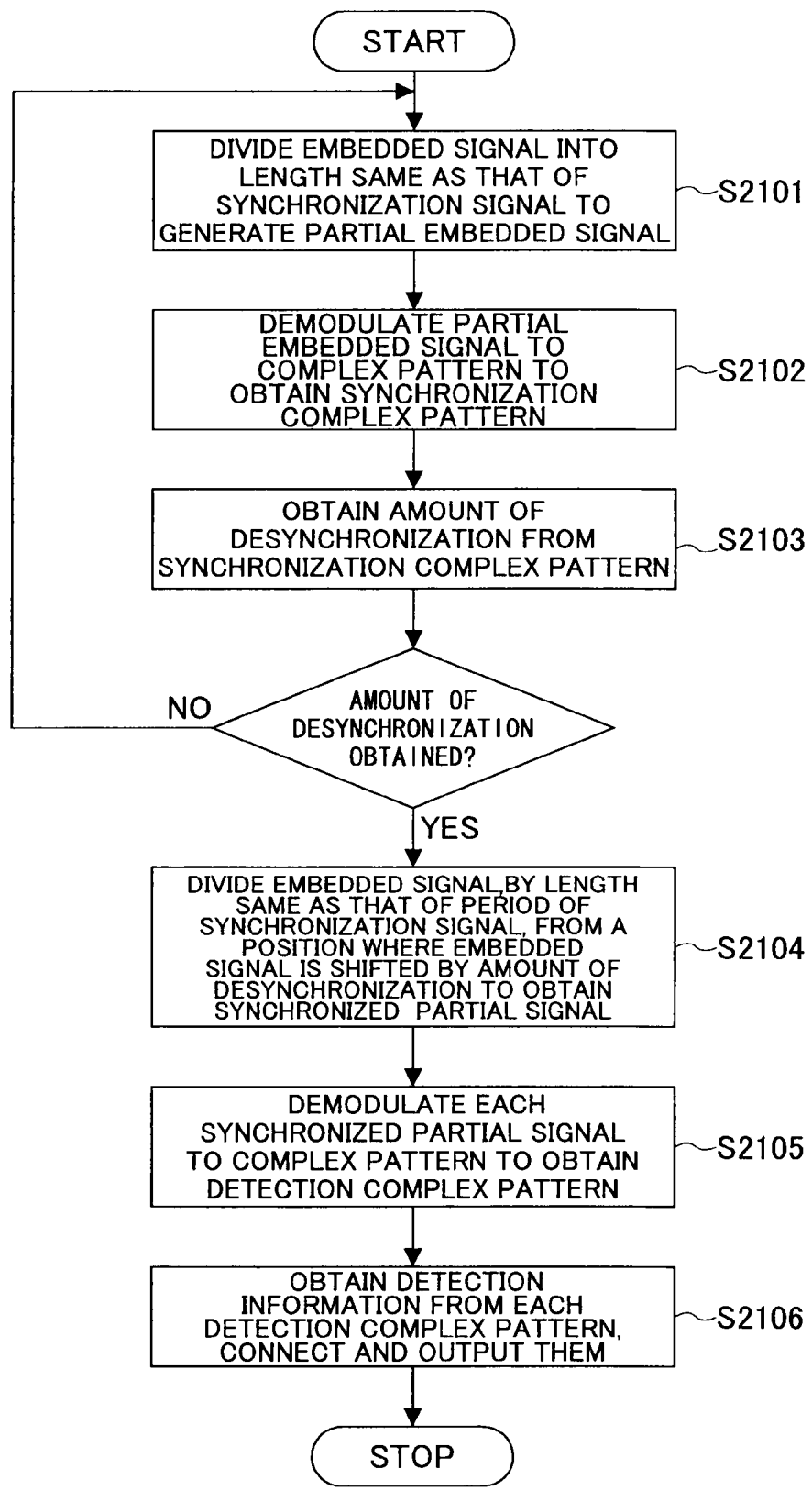
FIG. 64 is a flowchart of operation of the digital watermark detection apparatus in the eighth embodiment of the present invention.

FIG. 64 is a flowchart of operation of the digital watermark detection apparatus in the eighth embodiment of the present invention.

Step 2101) A portion of the embedded signal 923 of a length same as the period of the periodic signal in the temporal modulation unit 130 of the digital watermark embedding apparatus 100 is supplied to the embedded signal dividing unit 710 so as to obtain a partial embedded signal 3816.

Step 2102) The synchronization temporal demodulation unit 720 performs demodulation on the partial embedded signal 3816 divided in step 2101 by a procedure similar to that of the temporal demodulation unit 210 of the digital watermark detection apparatus in the first embodiment to obtain a complex pattern as the synchronization complex pattern 3813.

By the way, the synchronization temporal demodulation unit 720 may be configured to operate similarly to the temporal demodulation unit in other embodiments of the present invention. For example, it may operate similarly to the temporal demodulation unit 210c of the second embodiment.

Step 2103) The synchronization detection unit 730 obtains the amount of desynchronization 3814 for the synchronization complex pattern 3813 that is obtained in step 2102 by a procedure similar to the synchronization detection unit 320 of the digital watermark detection apparatus 300 in the fifth embodiment.

If the amount of desynchronization cannot be obtained in the synchronization detection unit 730, the process returns to step 2101 so that processes are repeated for an embedded signal one period after.

Details of operation of the synchronization detection unit 730 are described later.

Step 2104) The synchronized signal dividing unit 740 divides the embedded signal 923, from a position shifted by the amount of desynchronization 3814 obtained in step 2103, by a length the same as the period of the periodic signal in the temporal modulation unit 130 of the digital watermark embedding apparatus 100, so as to obtain synchronized partial signals 3817 the number of which is the same as the number of the pieces of the embedding information divided by the embedding information dividing unit 114 of the digital watermark embedding apparatus 100.

Details of operation of the synchronized signal dividing unit 740 are described later.

Step 2105) The temporal demodulation unit 750 demodulates each of the synchronized partial signals 3817 divided in step 2104 into a complex pattern by a procedure similar to the temporal demodulation unit 210 of the digital watermark detection apparatus 200 in the first embodiment, and the complex pattern is stored in the pattern storage unit 770 as a detection complex pattern 3815.

By the way, the temporal demodulation unit 750 may be configured to operate similarly to the temporal demodulation unit in other embodiments of the present invention. For example, it may be configured to operate similarly to the temporal demodulation unit 210c of the second embodiment.

Step 2106) The detection information extraction unit 760 obtains detection information for each of the detection complex patterns 3815 obtained in step 2105 by a procedure similar to the detection information extraction unit 220 of the digital watermark detection apparatus 200 in the first embodiment, and in addition to that, the detection information extraction unit 760 connects each detection information to output the whole detection information 3812.

Details of operation of the detection information extraction unit 760 are described later.

<Digital Watermark Detection Apparatus—Synchronization Detection Unit>

In the following, details of operation of the synchronization detection unit 730 are described.

Operation of the synchronization detection unit 730 is similar to that of the synchronization detection unit 320 of the digital watermark detection apparatus 300 in the fifth embodiment, but, it is different in the following point.

The complex correlation value calculation unit 322 in the fifth embodiment calculates complex correlation for the complex number sequence configured based on the assumed embedding sequence. In contrast, the complex correlation value calculation unit 322 in the present embodiment calculates complex correlation for complex number sequence configured based on the synchronization sequence 917 generated by the synchronization sequence generation unit 115 of the digital watermark embedding apparatus 110c.

In addition, when the value of the absolute value 1513 does not exceed a predetermined threshold, the synchronization detection maximum value determination unit 324 determines that the synchronization could not be detected so that it does not output the amount of desynchronization 1502.

As mentioned before, processes are performed repeatedly, until the amount of desynchronization 3814 is obtained, on the embedded signal is successively cut out by a length of one period in the embedded signal dividing unit 710, so that the embedded signal is successively scanned until the synchronization sequence is found.

In this case, as shown in FIG. 62, the embedding pattern ("synchronization pattern" in FIG. 62) configured from the synchronization sequence is repeated twice. Thus, even though the process is started from any timing that is not synchronized beforehand, only by performing the process period by period, a cyclically shifted synchronization pattern of one period is found sooner or later, so that a synchronization pattern can be detected.

For example, in the case of video signal and the like, it is not necessary to search for a synchronization pattern while shifting frame by frame. Thus, the process can be performed on a period by period basis, search for the synchronization pattern can be performed efficiently.

Figure 65:
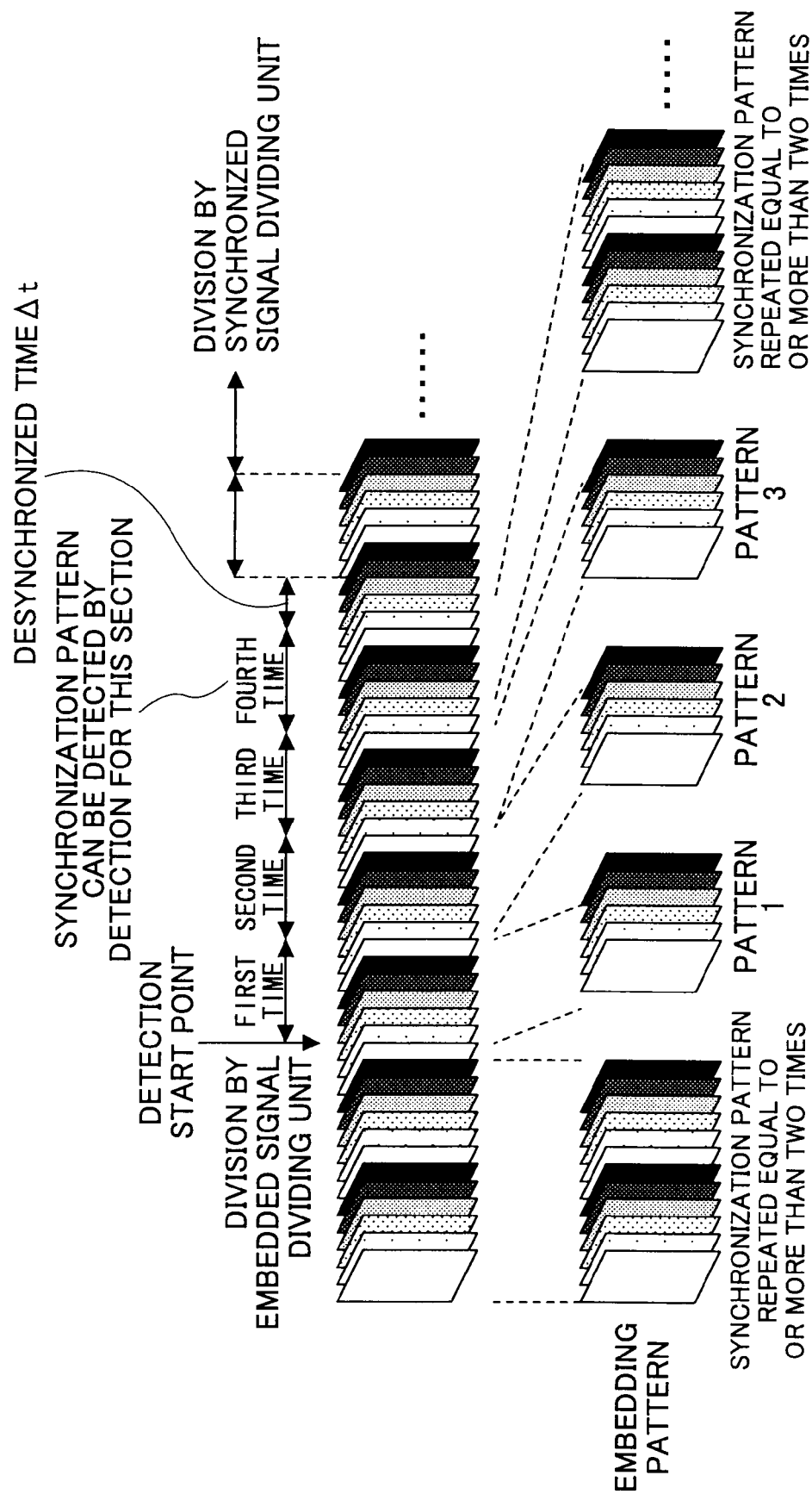
FIG. 65 is an example for detecting a synchronization pattern from a desynchronized position in the eighth embodiment of the present invention.

This manner is shown in FIG. 65.

<Digital Watermark Detection Apparatus—Synchronized Signal Dividing Unit>

In the following, details of operation of the synchronized signal dividing unit 740 are described.

The synchronized signal dividing unit 740 divides the embedded signal 923 by one period from a synchronized position based on the amount of desynchronization 3814 obtained by the synchronization detection unit 730. That is, the synchronized signal dividing unit 740 performs dividing by skipping the embedded signal 923 by the amount of desynchronization 3814

$$\Delta t = \frac{T \Delta \theta}{2\pi}$$

or going back by T−Δt on the embedded signal 923, so that it can be cut out by one period while being synchronized with the embedding pattern.

By the way, depending on detection timing of the synchronization pattern, there may be a case in which a top synchronized partial signal 3817 divided by the synchronized signal dividing unit 740 is a section where the synchronization sequence is embedded, and a case in which the top synchronized partial signal 3817 is a section where a first embedding sequence is embedded. This can be easily determined by trying, again, detection of synchronization sequence or corresponding embedding sequence for each section.

By doing this, each section corresponding to each embedding sequence is cut out as the synchronized partial signal 3817.

<Digital Watermark Detection Apparatus—Detection Information Extraction Unit>

In the following, a configuration example of the detection information extraction unit 760 is shown.

Figure 66:
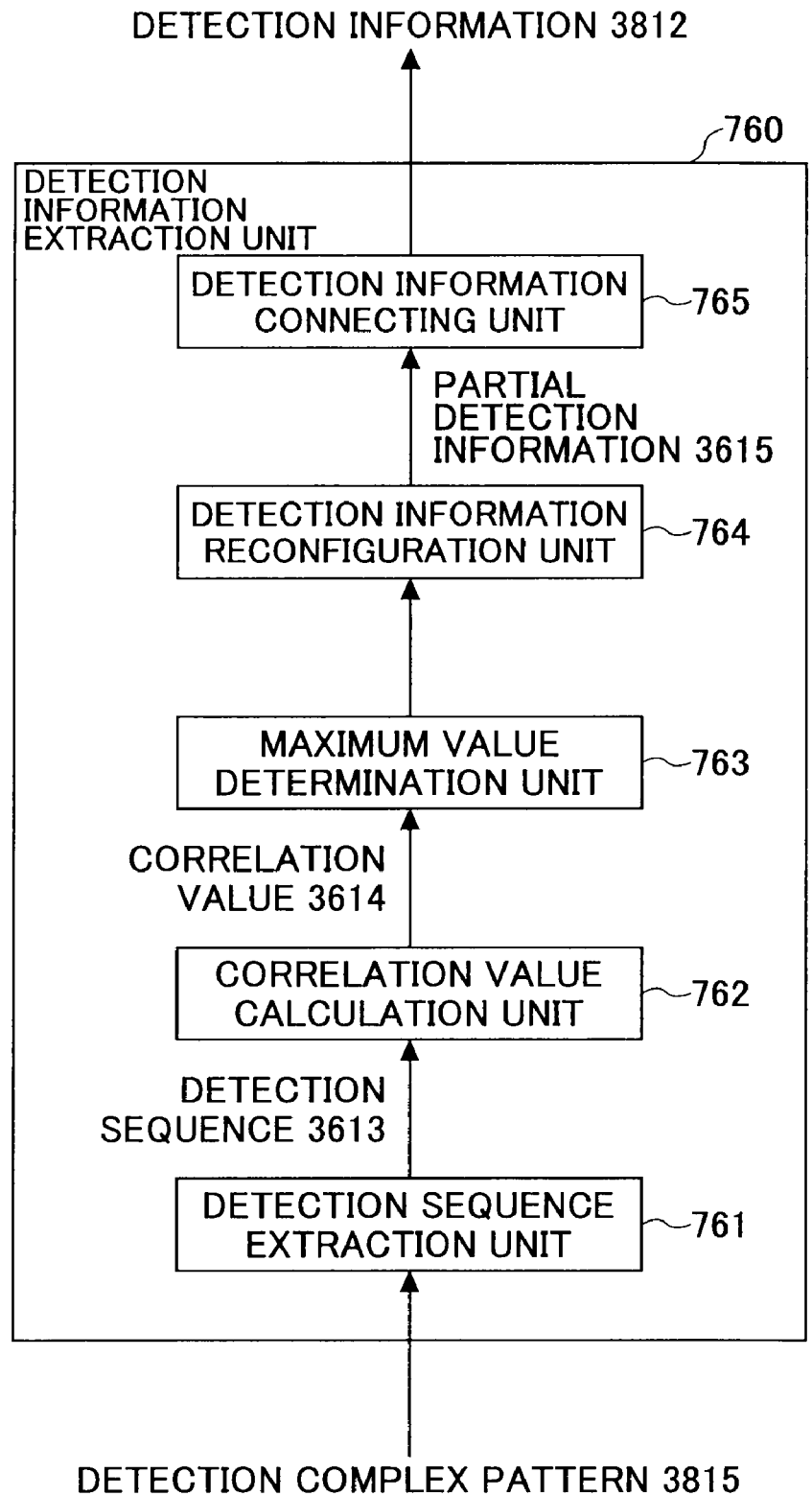
FIG. 66 is a configuration example of the detection information extraction unit in the eighth embodiment of the present invention.

FIG. 66 is a configuration example of the detection information extraction unit in the eighth embodiment of the present invention.

The detection information extraction unit 760 includes a detection sequence extraction unit 761, a correlation value calculation unit 762, a maximum value determination unit 763, a detection information re-configuration unit 764, and a detection information connecting unit 765, and the detection information extraction unit 760 receives the detection complex pattern 3815 and outputs the detection information 3812.

By the way, in FIG. 66, please note that the configuration is shown such that information flows from the bottom to the top to facilitate understanding of correspondence to FIG. 60.

Detection information extraction processes by the detection information extraction unit 760 are performed by the following procedure.

Figure 67:
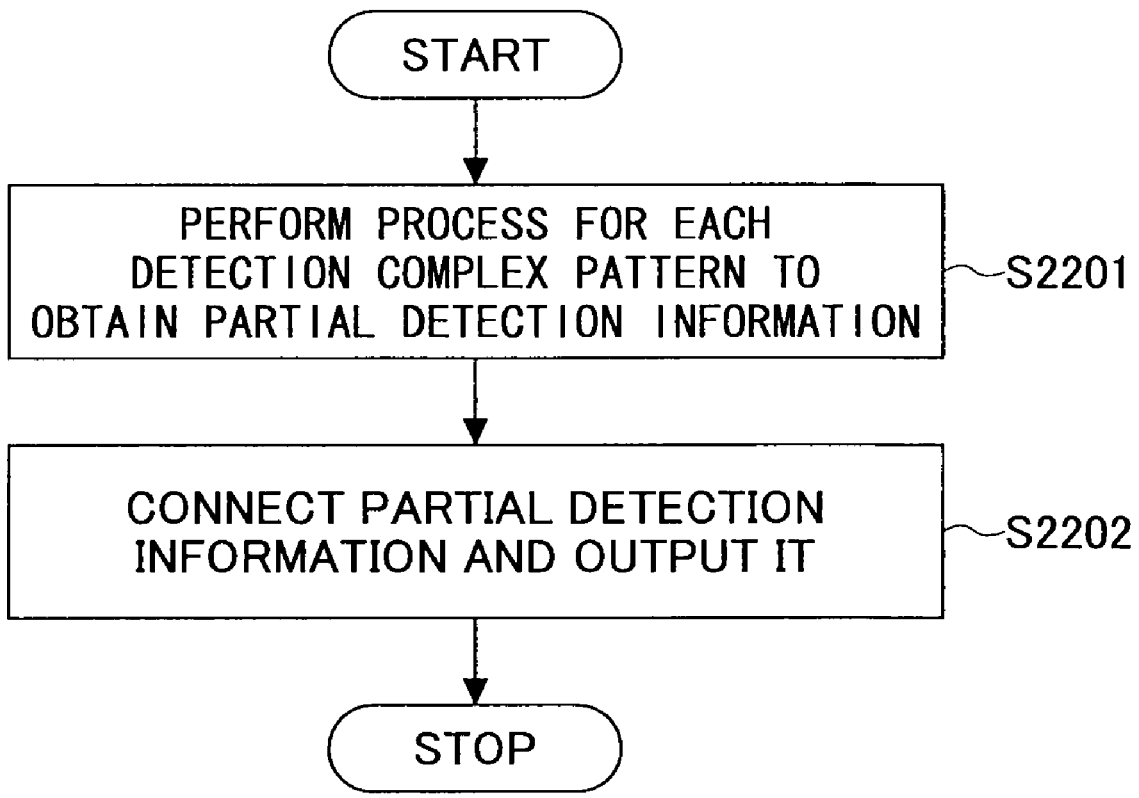
FIG. 67 is a flowchart of operation of the detection information extraction unit in the eighth embodiment of the present invention.

FIG. 67 is a flowchart of operation of the detection information extraction unit in the eighth embodiment of the present invention.

Step 2201) In each of the detection sequence extraction unit 761, the correlation value calculation unit 762, the maximum value determination unit 763 and the detection information re-configuration unit 764, the partial detection information 3615 is obtained by performing processes similar to operation of each corresponding unit of the detection information extraction unit 220 in the digital watermark detection apparatus 200 of the first embodiment.

But, they are different in that processes are performed for each of input detection complex pattern 3815, and the detection information re-configuration unit 764 outputs a plurality of pieces of partial detection information 3615.

Step 2202) The detection information connecting unit 765 connects the plurality of pieces of partial detection information 3615 obtained by the detection information re-configuration unit 764 so as to configure and output the detection information 3812.

Connecting of the plurality of pieces of partial detection information 3615 is a reverse process of dividing process in the embedding information dividing unit 114 of the digital watermark embedding apparatus. For example, when it is divided into groups of K bits in sequence from the front part of the embedding information 911 in the embedding information dividing unit 114, the pieces of partial detection information may be connected in sequence.

<Other Configuration Example of the Digital Watermark Detection Apparatus>

In the above example, although an example is shown in which the synchronized signal dividing unit 740 divides the embedded information by a length of one period, when the complex array generation unit 116 of the digital watermark embedding apparatus 100 embeds the embedding complex pattern corresponding to the synchronization sequence such that it repeats equal to or more than four times, the synchronized signal dividing unit 740 may divides the embedded signal by a length of a plurality of periods.

In the above example, although an example is shown in which the embedded signal dividing unit 710 divides the embedded signal 923 by one period, the embedded signal dividing unit 710 may divide the embedded signal by a length of a plurality of periods after determining a head position in the repetition when the complex array generation unit 116 of the digital watermark embedding apparatus 100 generates the embedding complex patterns corresponding to each embedding sequence such that the embedding complex patterns continuously repeat by a length of a plurality of times as shown in the following example.

$$SP, SP, SP, SP, A_1, A_1, A_2, A_2, \ldots, A_k, A_k, SP, SP, \quad (118)$$

For determining the head position in the repetition, since a start point of one period is already obvious based on the amount of desynchronization 3814, it can be easily determined by trying to detect the synchronization sequence or corresponding embedding sequence for each section that is cut apart as one period length.

Characteristics of Eighth Embodiment

According to the digital watermark embedding apparatus and the digital watermark detection apparatus of the present embodiment, by embedding partial embedding information that is different for each section of the signal in a time division manner, much amount of embedding information can be embedded into the signal.

In digital watermark detection, since synchronization for a start point of one period can be performed easily, synchronization can be performed efficiently and at high speed so as to detect digital watermark without using a round robin method for trying each shift amount successively, that is, for example, in the case of video signal, a method for searching for the synchronization signal by performing matching every one frame shift.

In addition, as a modified example of the digital watermark embedding apparatus of the present embodiment, the synchronization sequence may be embedded such that the synchronization sequence is superimposed on each embedding sequence. That is, the embedding pattern generated from the synchronization sequence is added to the embedding pattern generated from each embedding sequence so as to perform embedding as follows.

$$SP+A_1, SP+A_2, SP+A_3, \ldots, SP+A_k, SP+A_1,$$

When embedding is performed like this, in step 2101 when detecting the synchronization sequence, the synchronization sequence can be detected accurately using a sufficient amount of the embedded signal for detecting the synchronization sequence without dividing the embedded signal 923 into a length the same as the period of the periodic signal. Like examples already explained, each embedding sequence can be detected by dividing the embedded signal based on the amount of desynchronization obtained from the synchronization sequence.

Ninth Embodiment

<Orthogonal Transform Region Embedding>

In the following, a digital watermark embedding apparatus in the ninth embodiment is described.

The present embodiment shows another configuration example of the digital watermark embedding apparatus in the first embodiment.

<Digital Watermark Embedding Apparatus>

Figure 68:
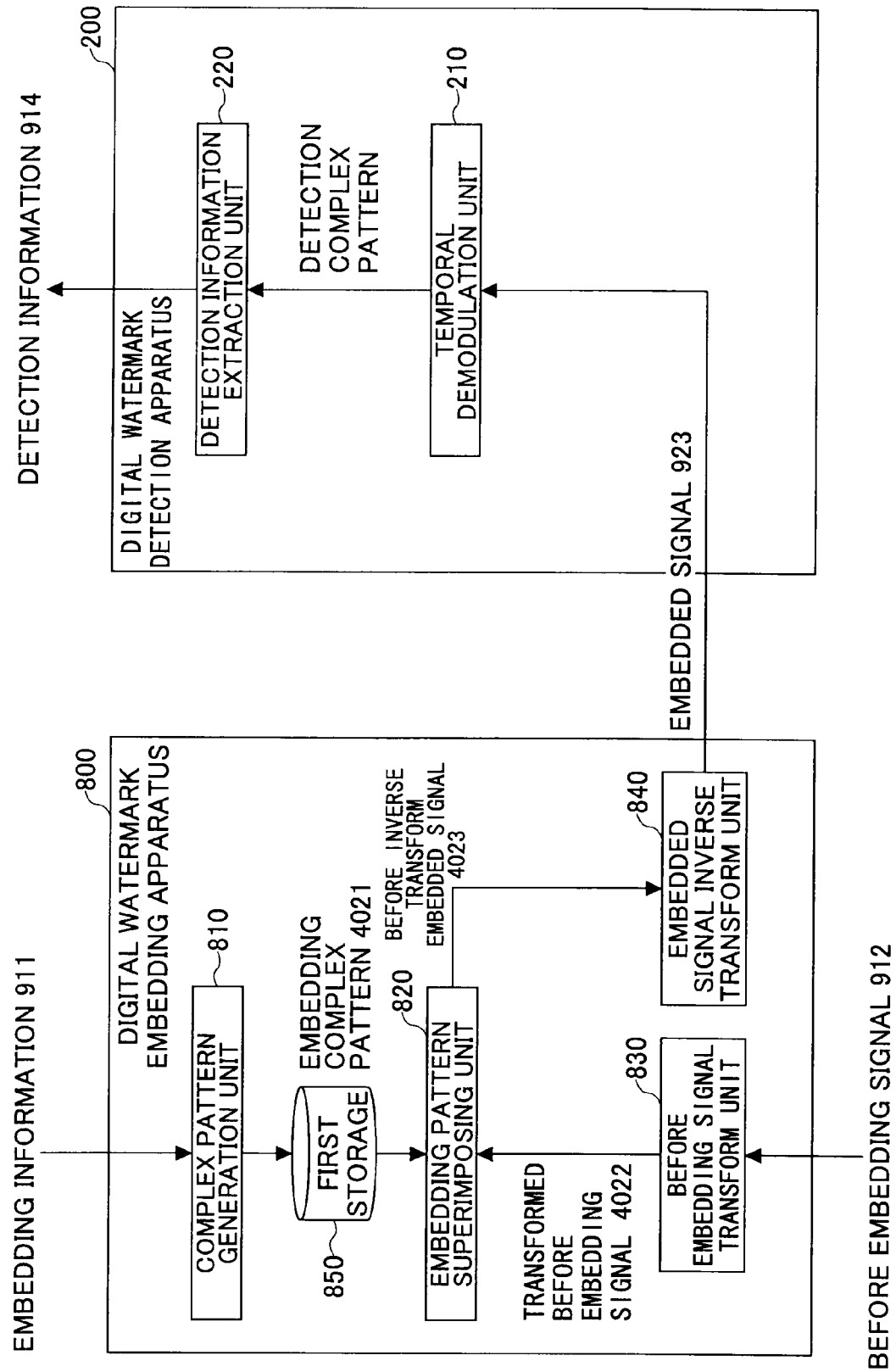
FIG. 68 shows a configuration example of a digital watermark embedding apparatus and a digital watermark detection apparatus in a ninth embodiment of the present invention.

FIG. 68 shows a configuration example of the digital watermark embedding apparatus and the digital watermark detection apparatus in the ninth embodiment of the present invention.

The digital watermark embedding apparatus 800 in the present embodiment includes a complex pattern generation unit 810, an embedding pattern superimposing unit 820, a before-embedding signal transform unit 830, an embedded signal inverse transform unit 840, and a first storage unit 850, and the digital watermark embedding apparatus 800 receives the embedding information 911 and the before-embedding signal 912 and outputs the embedded signal 923.

In the following, operation of the digital watermark embedding apparatus 800 is described.

Digital watermark embedding processes by the digital watermark embedding apparatus 800 are performed by the following procedure.

Figure 69:
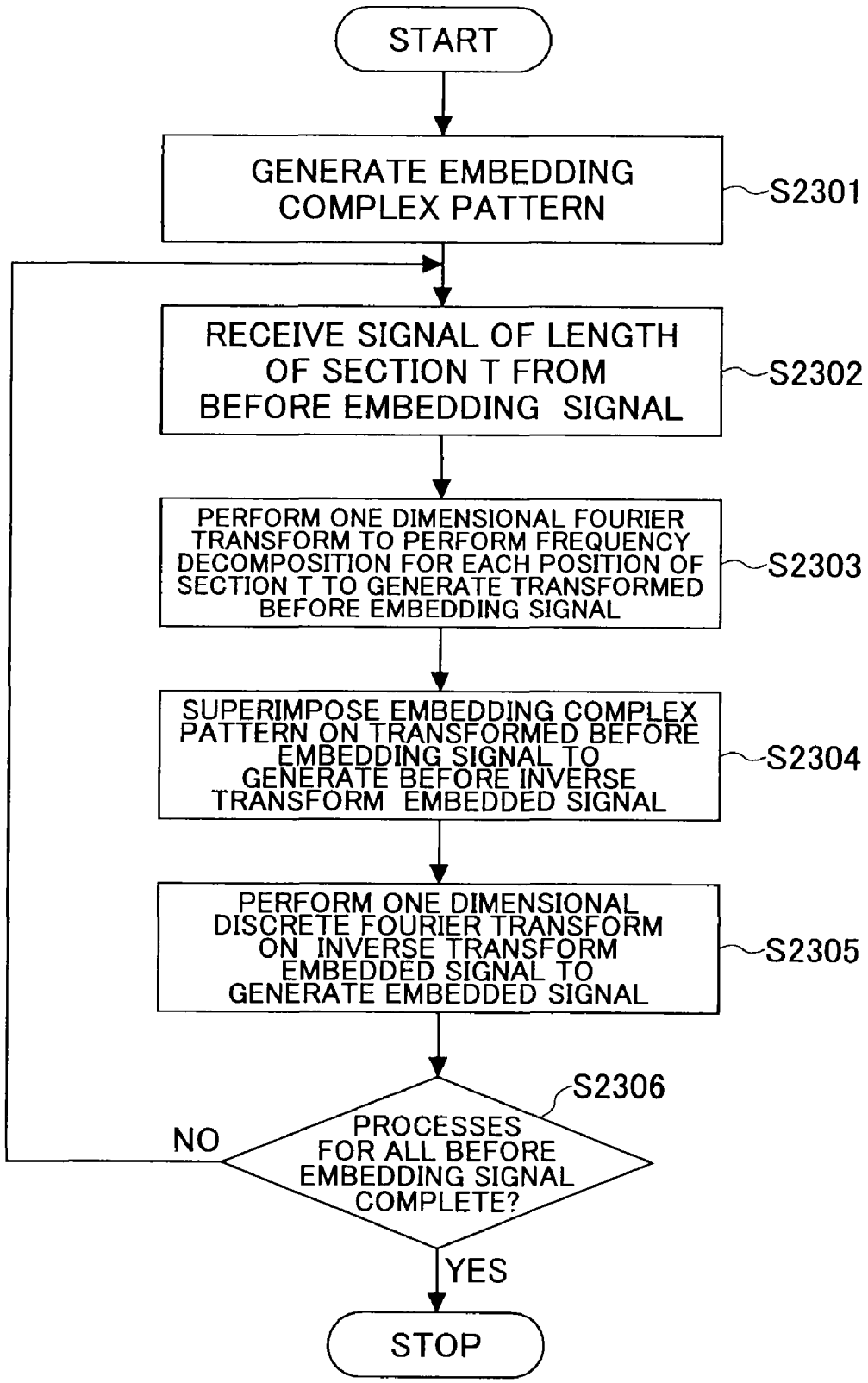
FIG. 69 is a flowchart of operation of the digital watermark embedding apparatus in the ninth embodiment of the present invention.

FIG. 69 is a flowchart of operation of the digital watermark embedding apparatus in the ninth embodiment of the present invention.

Step 2301) The complex pattern generation unit 810 generates an embedding complex pattern 4021 based on the received embedding information 911 to store it in the first storage unit 850.

Processes of the complex pattern generation unit 810 are the same as those of the complex pattern generation unit 110 in the digital watermark embedding apparatus of the first embodiment.

Step 2302) A signal of a length of a predetermined section T is received from the before-embedding signal 912.

Step 2303) The before-embedding signal transform unit 830 performs one dimensional discrete Fourier transform for each position $(x_1, x_2, \ldots, x_{N-1})$ of the section obtained in step 2302 to perform frequency decomposition to obtain a transformed before embedding signal 4022.

Details of operation of the before-embedding signal transform unit 830 are described later.

Step 2304) The embedding pattern superimposing unit 820 superimposes the embedding complex pattern 4021 obtained in step 2301 on the transformed before-embedding signal 4022 obtained in step 2303 to obtain before inverse transform embedded signal 4023.

Details of operation of the embedding pattern superimposing unit 820 are described later.

Step 2305) The embedded signal inverse transform unit 840 performs one dimensional discrete inverse Fourier transform for each position $(x_1, x_2, \ldots, x_{N-1})$ for the before inverse transform embedded signal 4023 obtained in step 2304.

Details of operation of the embedded signal inverse transform unit 840 are described later.

Step 2306) Steps 2303-2305 are repeated until the before-embedding signal 912 is all processed.

<Digital Watermark Embedding Apparatus—Before-Embedding Signal Transform Unit>

In the following, details of operation of the before-embedding signal transform unit 830 are described.

The before embedding signal transform unit 830 performs one dimensional discrete Fourier transform on the signal of the section T extracted from the before embedding signal 912 to perform frequency decomposition.

In the following, it is described more particularly using equations.

Assuming that the before-embedding signal 912 is $I(x_1, x_2, \ldots, x_{N-1}, t)$.

$I(x_1, x_2, \ldots, x_{N-1}, t)$ is one-dimensional discrete Fourier transformed as follows to obtain $\eta(x_1, x_2, \ldots, x_{N-1}, u)$, $$\eta(x_1, x_2, \ldots, x_{N-1}, u) = \frac{1}{\sqrt{T}} \sum_{t=0}^{T-1} I(x_1, x_2, \ldots, x_{N-1}, t) e^{-j\frac{2\pi}{T}ut} \qquad (119)$$

wherein T is a predetermined number of samples.

The $\eta(x_1, x_2, \ldots, x_{N-1}, u)$ is output as the transformed before embedding signal 4022.

<Digital Watermark Embedding Apparatus—Embedding Pattern Superimposing Unit>

In the following, details of operation of the embedding pattern superimposing unit 820 are described.

The embedding pattern superimposing unit 820 adds N−1-dimensional embedding complex pattern 4021 generated by the complex pattern generation unit 810 to a N−1 dimensional plane part, corresponding to a specific frequency, of the N-dimensional transformed before embedding signal 4022 obtained by the before-embedding signal transform unit 830 so that they are superimposed, and the embedding pattern superimposing unit 820 outputs, as the before inverse transform embedded signal 4023, the whole N-dimensional signal including the frequency of the result of superimposing.

It is described concretely in the following using an equation.

Assuming that the transformed before embedding signal 4022 obtained by the before embedding signal transform unit 830 is $\eta(x_1, x_2, \ldots, x_{N-1}, u)$, and that the embedding complex pattern 4021 obtained by the complex pattern generation unit 810 is $P(x_1, x_2, \ldots, x_{N-1})$, and that the before inverse transform embedded signal 4023 is $\eta'(x_1, x_2, \ldots, x_{N-1}, u)$.

$$\eta'(x_1, x_2, \ldots, x_{N-1}, u) = \begin{cases} \eta(x_1, x_2, \ldots, x_{N-1}, u) + aP(x_1, x_2, \ldots, x_{N-1}) & (\text{When } u = u_0) \\ \eta(x_1, x_2, \ldots, x_{N-1}, u) + aP*(x_1, x_2, \ldots, x_{N-1}) & (\text{When } u = U - u_0) \\ \eta(x, x, \ldots, x, u) & (\text{When } u \neq u_0) \end{cases} \qquad (120)$$

In the equation, * represents complex conjugate, $u_0$ is a predetermined frequency, and U is a number of frequency samples. That is, here, $u=u_0$ and $u=U-u_0$ are selected as the N−1 dimensional plane corresponding to the frequency $u_0$. By the way, the reason for providing conjugate complex number of P by $u=u_0$ and $u=U-u_0$ is that the signal obtained as a result of discrete inverse Fourier transform becomes a real value.

In addition, similarly to the case of the embedding pattern superimposing unit 140 of the first embodiment, α is a strength parameter, and may be configured to be changed according to a characteristics amount calculated from the whole or a part of the before-embedding signal 912.

In addition, also similarly to the case of the embedding pattern superimposing unit 140 of the first embodiment, when the size of the before embedding signal 912 is greater than that of the embedding complex pattern 4021, the embedding complex pattern 4021 may be added such that the embedding complex pattern 4021 is repeated.

In addition, also similarly to the case of the embedding pattern superimposing unit 140 of the first embodiment, before superimposing the embedding complex pattern, the embedding complex pattern 4021 may be enlarged by a plurality of times or may be enlarged such that the size matches the size of the before embedding signal 912.

In addition, before superimposing the embedding complex pattern, a part of the transformed embedding signal 4022 that becomes $u=u_0$ and $u=u-u_0$ for which superimposing is actually performed may be transformed by N−1-dimensional discrete Fourier transform and after that superimposing may be performed, further, it may be inverse transformed by N−1 dimensional discrete inverse Fourier transform.

When performing N−1-dimensional discrete Fourier transform, the process may be performed as one time N-dimensional discrete Fourier transform together with the one dimensional discrete Fourier transform in the before embedding signal transform unit 830. In addition, in the same way, the N−1-dimensional discrete inverse Fourier transform may be performed as one time N-dimensional discrete inverse Fourier transform together with one-dimensional discrete inverse Fourier transform in the after-mentioned embedded signal inverse transform unit 840. However, by performing the one-dimensional discrete Fourier transform and the N−1-dimensional discrete Fourier transform separately, and performing the one-dimensional discrete Fourier inverse transform and the N−1-dimensional discrete Fourier inverse transform separately, there is an advantage that processes can be performed at high speed since it is only necessary to perform the N−1-dimensional discrete Fourier transform and discrete inverse Fourier transform only on the N−1-dimensional plane of $u=u_0$ and $u=U-u_0$ for which superimposing is performed actually.

<Embedded Signal Inverse Transform Unit>

In the following, details of operation of the embedded signal inverse transform unit 840 are described.

The embedded signal inverse transform unit 840 performs one-dimensional inverse Fourier transform on the before inverse transform embedded signal 4023 for each position $(x_1, x_2, \ldots, x_{N-1})$ to obtain the embedded signal 923.

It is described concretely using an equation in the following.

Assuming that the before inverse transform embedded signal 4023 is $\eta'(x_1, x_2, \ldots, x_{N-1}, u)$.

By performing one-dimensional discrete inverse Fourier transform on $\eta'(x_1, x_2, \ldots, x_{N-1}, u)$ as follows to obtain $I'(x_1, x_2, \ldots, x_{N-1}, t)$.

$$I'(x_1, x, \ldots, x_{N-1}, t) = \frac{1}{\sqrt{U}} \sum_{u=0}^{U-1} \eta'(x_1, x_2, \ldots, x_{N-1}, u) e^{j\frac{2\pi}{U}ut} \quad (121)$$

Characteristics of Ninth Embodiment

According to the digital watermark embedding apparatus of the present embodiment, digital watermark that has characteristic similar to that of the digital watermark embedding apparatus of the first embodiment can be embedded.

In addition, in the same way as the seventh embodiment, the complex pattern generation unit 810 may generate a plurality of complex patterns, and the embedding pattern superimposing unit 820 may add each complex pattern to parts of N−1 dimensional plane corresponding to a plurality of frequencies of the transformed before embedding signal 4022, so that digital watermark having characteristics similar to those of the digital watermark embedding apparatus of the seventh embodiment can be embedded.

Other Embodiments

In the following, as other embodiments of the present invention, a configuration example with which each embodiment can be combined is shown.

<Using Pre-Filter when Performing Detection>

In each of first to eighth embodiments, when using the sine wave as the periodic signal, digital watermark is embedded in a single frequency in the N-th dimension direction (time direction in the case of video signal, for example). Also when using other periodic signals, the basic frequency is most important. Before performing detection by the digital watermark detection apparatus, filter processing may be performed for enhancing the corresponding frequency for the embedded signal so as to be able to detect digital watermark more accurately.

As an example of the filter, a bandpass type filter for enhancing specific frequency band may be configured using digital filter such as FIR filter and IIR filter. In addition, by using a clipping filter for suppressing a signal value that exceeds or does not exceed a predetermined threshold to the threshold, or by using non-linear filter such as ϵ filter and the like that regards the signal value exceeding a predetermined threshold or being less than the threshold as 0, filter processing may be performed such that digital watermark component remains while efficiently removing noise component for digital watermark such as original image component and the like.

In addition, in the seventh embodiment of the present invention, although digital watermark is embedded by using a plurality of frequency bands using a plurality of periodic signals, filter processing may be performed using respective filter having characteristics for each periodic signal before performing temporal demodulation processing for each periodic signal.

Especially, in the present embodiment, since digital watermark embedding is performed using a single frequency in the N-th dimension direction, there is no effect to detection performance even by using a filter of bad phase characteristics with no linear phase characteristics. Therefore, it becomes possible to use a filter, like the IIR filter, that has sharp frequency characteristics with small number of TAPs and that can perform processing at high speed even though phase characteristics is bad, so that accurate digital watermark detection process can be performed at high speed.

<Processes for Embedded Signal>

In each embodiment of the present invention, in FIGS. 10, 52 and 68, for example, although they are shown such that the embedded signal output from the digital watermark embedding apparatus is directly supplied to the digital watermark detection apparatus, it is needless to say that the embedded signal may be supplied to the digital watermark detection apparatus after compressing, coding, distributing, editing, modifying, and the are performed on the embedded signal. In addition, it is needless to say that the embedded signal may be once recorded in a magnetic medium (VTR, DVD, floppy disk, CD, HDD and the like) and other medium (film and the line), the embedded signal may be transmitted through a network, and the embedded signal may be re-taken using taking means such as a video camera, a camera of a cellular phone, and a camera using a film and the like wherein this embedded signal is one reproduced using an optical device (projecting on a screen as a movie, displaying using a CRT, or liquid crystal or plasma display, and the like).

<Temporal Modulation Process>

In each embodiment of the present invention, although "temporal modulation unit" and "temporal demodulation unit" are called like these as a matter of convenience, it is not necessary to perform modulation in the time axis direction, and it may be modulation in a different dimension direction as long as the dimension is orthogonal to N−1 dimension.

For example, it is needless to say that, when embedding digital watermark into an image signal configured by a two-dimensional signal, one dimensional complex array defined in a lateral direction of the image may be configured as the N−1 dimensional embedding complex pattern, so that two-dimensional embedding pattern may be obtained by modulating the embedding complex pattern in a vertical direction. It is needless to say that vertical and lateral may be switched.

In addition, for example, when embedding digital watermark into three dimensional video signal that is a sum of two dimensions of space direction (X, Y) and one dimension of time direction, two-dimensional complex array defined by a lateral direction of image and a time direction may be configured as the N−1-dimensional embedding complex pattern, so that three-dimensional embedding pattern may be obtained by modulating the N−1-dimensional embedding complex pattern in the vertical direction. It is needless to say that vertical and lateral may be switched.

In addition, in each embodiment of the present invention, an example is described in which the before-embedding signal that is an input signal is a N-dimensional signal, an example may be configured such that N-dimensional embedding is repeated for M (>N) dimensional input signal.

For example, as to input of a three dimensional video signal that is a sum of two dimension of space direction (X, Y) and one dimension of time direction, each frame image of the video may be regarded as a two dimensional signal, so that embedding may be performed by configuring two dimensional embedding pattern by modulating one dimensional complex array of the lateral direction in the vertical direction, and, by repeating this for all frames, digital watermark embedding may be performed. When detecting digital watermark, processes may be performed for each frame, or processes may be performed for a signal on which each frame image is superimposed.

<Use of Error Correction Coding and the Like>

In each embodiment of the present invention, before performing processes for embedding information in the embedding sequence generation unit, the embedding information may be coded using error correction code, and inversely, before outputting detection information, the error correction code may be decoded.

<N−1-Dimensional Orthogonal Transform>

Although the third embodiment of the present invention is described using discrete Fourier transform as an example of orthogonal transform for the N−1-dimensional complex pattern in the N−1-dimensional inverse Fourier transform unit 113 and the N−1-dimensional Fourier transform unit 225, an orthogonal transform method, other than the discrete Fourier transform, for performing transform from complex numbers to complex numbers may be used.

By the way, for correctly processing desynchronization in N-th dimension direction in an orthogonal transformed region, it is only necessary that the coefficient $e^{j\Delta\theta}$ that occurs due to desynchronization in N-th dimension direction is preserved in the transform. Since orthogonal transform is linear transform, the condition is already satisfied as the transform is orthogonal transform.

<One Dimensional Linear Transform>

In addition, in the second embodiment, although discrete Fourier transform is used as one dimensional transform in the temporal modulation unit 130$b$, any linear transform method, other than discrete Fourier transform, that performs transform from complex numbers to complex numbers may be used as long as the linear transform method has a periodic function, as a base, satisfying the following conditions and has an inverse transform.

In addition, in the same way, in the ninth embodiment of the present invention, although one-dimensional discrete Fourier transform and one-dimensional discrete inverse Fourier transform are used as an example of one dimensional transform in the before embedding signal transform unit 830 and the embedded signal inverse transform unit 840, any linear transform method, other than discrete Fourier transform, that performs transform from complex numbers to complex numbers may be used as long as the linear transform method has a periodic function, as a base, satisfying the following conditions and has an inverse transform.

Conditions:
1) A result obtained by performing integration for one period becomes 0.
2) Autocorrelation function does not have sharp peak.

Details of these conditions are already described as an example of periodic signal.

For example, a following linear transform may be used. Considering linear transform of from vector $\vec{x} \in \vec{C}^n$ to vector $\vec{y} \in \vec{C}^n$ and assuming that transform matrix indicating the transform is A, wherein C indicates a set of the whole of the complex numbers. In addition, $$\vec{y} = A\vec{x} \tag{122}$$

in which $$\vec{x} = (x_1 x_2 \ldots x_n) \tag{123}$$

$$\vec{y} = (y_1 y_2 \ldots y_n) \tag{124}$$

$$A = \begin{pmatrix} a_{0,0} & a_{0,1} & \cdots & a_{0,n-1} \\ \vdots & & & \\ a_{i,0} & a_{i,1} & \cdots & a_{i,n-1} \\ \vdots & & & \\ a_{n-1,0} & a_{n-1,1} & \cdots & a_{n-1,n-1} \end{pmatrix} \tag{125}$$

Assuming that f(t) is a periodic function having a period n that satisfies the above conditions, linear transform represented by the transform matrix A may be used wherein $$a_{ik} = f(ik) + jf\left(ik - \frac{n}{4i}\right) \tag{126}$$

in which j is the imaginary unit.

The f(t) may be (FIG. 4A) (a) sine wave, (FIG. 4B)(b) triangular wave, or (FIG. 4C) (C) rectangular wave shown in FIG. 4A-C.

<Use as Synchronization Signal>

In the fifth embodiment of the present invention, although a method is described for detecting the amount of desynchronization in the time direction using the embedding pattern itself representing embedding information, the method for detecting the amount of desynchronization of the present invention may be combined and used with arbitrary digital watermark methods. That is, a digital watermark embedding apparatus may be configured so as to embed a specific synchronization signal using the digital watermark embedding method of the present invention together with digital watermark embedding by using arbitrary digital watermarking method, and, then, a digital watermark detection apparatus may be configured so as to perform synchronization from the synchronization signal using the detection method of the amount of desynchronization of the present invention, and after that, to detect and output embedding information using arbitrary digital watermark detection method.

In addition, the period of the periodic signal for embedding the synchronization sequence may be configured to be an integral multiple of the period of the periodic signal for embedding the embedding sequence.

<Others>

Configurations shown in each embodiment of the present invention may be used by combining them as necessary.

In addition, operation of each configuration element of the digital watermark embedding apparatus and the digital watermark detection apparatus in each embodiment may be constructed as a program, and the program may be installed in a computer to execute it or the program can be distributed via a network.

In addition, the constructed program may be stored in a movable storage medium such as a hard disk, a flexible disk, CD-ROM and the like, so that the program may be installed in a computer, or may be distributed.

As described above, according to an embodiment of the present invention, a digital watermark embedding apparatus for embedding embedding information, as digital watermark, into an input signal having dimensions equal to or greater than N (N is an integer equal to or greater than 2) such that it is imperceptible to human senses, including: embedding sequence generation means configured to generate an embedding sequence based on the embedding information to store it in first storage means; array generation means configured to generate a N−1-dimensional pattern based on the embedding sequence in the first storage means; modulation means configured to modulate a periodic signal according to a value on the N−1-dimensional pattern to generate a N-dimensional embedding pattern and store it in second storage means; and embedding pattern superimposing means configured to obtain the N-dimensional embedding pattern stored in the second storage means to superimpose the embedding pattern on the input signal so as to embed it, is provided.

According to this digital watermark embedding apparatus, by modulating the N−1-dimensional pattern in the N-th dimension direction and embedding it, because of redundancy obtained by spreading embedding information of the N−1-dimensional pattern into the N-dimensional space, information having long information length can be embedded as digital watermark in which there is sufficient tolerance for modification such as high compression and re-taking, for example, and quality deterioration can be suppressed.

In addition, by using the embedding sequence that is spectrum spread in the N−1-dimensional space, digital watermark that does not require synchronization or that makes it possible to perform synchronization easily and rapidly can be embedded irrespective of the amount of desynchronization in the N-th dimension direction.

The modulation means may be configured to generate the N-dimensional embedding pattern such that phases in a direction of a N-th dimension are different with each other according to a position on the N−1-dimensional pattern. According to this configuration, by embedding digital watermark by using the phase of the periodic signal, modulation can be performed for the N−1-dimensional pattern easily and at high speed in the N-th dimension direction. In addition to that, by using phase shift of the periodic signal, digital watermark that does not require synchronization or that makes it possible to perform synchronization easily and at high speed can be embedded irrespective of the amount of desynchronization in the N-th dimension direction. In addition, it can be prevented to produce a frame in which digital watermark becomes less than the minimum video signal quantization value so that digital watermark embedding is not performed actually, and the video signal as a transmission route of digital watermark can be used effectively and robustness can be increased for the attack for aiming and changing a frame in which amplitude of digital watermark is large.

In addition, since the phase is spread on the N−1-dimensional space of the embedding pattern, the size of the noise component that appears due to the before-embedding signal in the result of the correlation calculation becomes smaller, and as a result, digital watermark embedding and detection becomes possible with higher reliability, and digital watermark embedding and detection becomes possible with reliability similar to conventional one and with less quality deterioration.

In addition, by embedding digital watermark by using the sum of two periodic signals that have same basic frequency and that are orthogonal, modulation can be performed for the N−1-dimensional pattern easily and at high speed in the N-th dimension direction. In addition to that, by using phase shift of the periodic signal, digital watermark that does not require synchronization or that makes it possible to perform synchronization easily and at high speed can be embedded irrespective of the amount of desynchronization in the N-th dimension direction.

In addition, by using a periodic function, such as a rectangular wave and a triangular wave as a periodic signal, that has characteristic in which autocorrelation function does not have sharp peak, and by which calculation can be easily performed compared with a sine wave, digital watermark embedding process can be realized at higher speed even in an environment in which computational resources are limited.

In addition, by using linear transform such as discrete Fourier transform for modulation, modulation can be performed for the N−1-dimensional pattern easily and at high speed in the N-th dimension direction by using fast Fourier transform, for example. In addition to that, by using linear transform coefficient such as discrete Fourier transform coefficient, digital watermark that does not require synchronization or that makes it possible to perform synchronization easily and at high speed can be embedded irrespective of desynchronization in the N-th dimension direction.

In the digital watermark embedding apparatus, the N−1-dimensional pattern is a complex number pattern, and the array generation means may generate the N−1-dimensional pattern such that a part of the embedding sequence becomes the real part and a part of the embedding sequence becomes the imaginary part.

According to this configuration, embedding is performed using the real part and the imaginary part of the complex number, there is no restriction on symmetry property of the pattern, embedding can be performed using the whole N−1-dimensional space, the length of spectrum spread sequence can be made longer, reliability for detection is high, and information having longer embedding information length can be embedded as digital watermark with reliability similar to conventional one, and digital watermark with less quality deterioration can be embedded with reliability and information length similar to conventional one.

In the digital watermark embedding, the N−1-dimensional pattern is a complex number pattern, and the modulation means may modulate the periodic signal such that an argument of a complex number on the N−1-dimensional pattern becomes a phase of the modulation signal, and an absolute value of the complex number becomes the size of the modulation signal.

According to this configuration, digital watermark that does not require synchronization or that makes it possible to perform synchronization easily and rapidly can be embedded irrespective of the amount of desynchronization in the N-th dimension direction. In addition, since the argument of the complex number becomes the phase of the modulation signal in a direction of the axis of the N-th dimension, it can be prevented to produce a frame in which digital watermark becomes less than the minimum video signal quantization value so that digital watermark embedding is not performed actually, and the video signal as a transmission route of digital watermark can be used effectively and robustness can be increased for the attack for aiming and changing a frame in which amplitude of digital watermark is large.

In addition, the digital watermark embedding apparatus may be configured such that, the embedding sequence generation means divides the generated embedding sequence to generate a plurality of embedding sequences to store them in the first storage means; the array generation means generates N−1-dimensional patterns corresponding to each of the plurality of embedding sequences stored in the first storage; the modulation means generates N-dimensional embedding patterns each corresponding to the N−1-dimensional pattern to store the N-dimensional embedding patterns in the second storage means; and the embedding pattern superimposing means adds all of the embedding patterns stored in the second storage means, and after that, superimposes it on the input signal.

According to this configuration, by embedding information using a plurality of periodic signals, embedding information of longer information length can be embedded as digital watermark, and reliability of detection result can be made clear more accurately, and in addition to that, the length of spectrum spread sequence can be made longer, so that digital watermark embedding with higher reliability can be performed.

In addition, according to an embodiment of the present invention, a digital watermark embedding apparatus for embedding embedding information, as digital watermark, into an input signal having dimensions equal to or greater than N (N is an integer equal to or greater than 2) such that it is imperceptible to human senses, including: embedding sequence generation means configured to generate an embedding sequence based on the embedding information to store it in first storage means; array generation means configured to generate a N−1-dimensional pattern based on the embedding sequence stored in the first storage means; transform means configured to orthogonal transform the input signal to obtain a transformed signal; embedding pattern superimposing means configured to superimpose the N−1-dimensional pattern stored in the second storage means on a N−1 dimensional plane that is a part of the transformed signal to obtain a before-inverse transform signal; and inverse transform means configured to orthogonal inverse transform the before inverse transform signal to obtain an embedded signal, is provided.

According to this digital watermark embedding apparatus, by performing embedding by superimposing the N−1-dimensional pattern on the before-embedding signal as a signal in the N-th dimension direction, because of redundancy obtained by spreading embedding information of the N−1-dimensional pattern into the N-dimensional space, information having long information length can be embedded as digital watermark in which there is sufficient tolerance for modification such as high compression and re-taking, for example, and quality deterioration can be suppressed. In addition, there is no restriction on symmetry property of the pattern, embedding can be performed using the whole N−1-dimensional space, the length of spectrum spread sequence can be made longer, reliability for detection is high, and information having longer embedding information length can be embedded as digital watermark with reliability similar to conventional one, and digital watermark with less quality deterioration can be embedded with reliability and information length similar to conventional one. In addition, by using the embedding sequence that is spectrum spread in the N−1-dimensional space, digital watermark that does not require synchronization or that makes it possible to perform synchronization easily and rapidly can be embedded irrespective of the amount of desynchronization in the N-th dimension direction. In addition, it can be prevented to produce a frame in which digital watermark becomes less than the minimum video signal quantization value so that digital watermark embedding is not performed actually, and the video signal as a transmission route of digital watermark can be used effectively and robustness can be increased for the attack for aiming and changing a frame in which amplitude of digital watermark is large.

The digital watermark embedding apparatus may be configured such that, the embedding sequence generation means generates a plurality of embedding sequences to store them in the first storage means; the array generation means generates N−1-dimensional patterns each corresponding to one of the plurality of embedding sequences stored in the first storage means to store them in the second storage means; and the embedding pattern superimposing means superimposes the N−1-dimensional patterns stored in the second storage means on a plurality of N−1-dimensional planes of the transformed signal respectively.

According to this configuration, by superimposing the N−1-dimensional pattern on the plurality of N−1-dimensional plane of the transformed signal, embedding information of longer information length can be embedded as digital watermark, and reliability of detection result can be made clear more accurately, and in addition to that, the length of spectrum spread sequence can be made longer, so that digital watermark embedding with higher reliability can be performed.

In addition, according to an embodiment of the present invention, a digital watermark detection apparatus for detecting digital watermark that is embedded beforehand into an input signal having dimensions equal to or greater than N (N is an integer equal to or greater than 2) such that it is imperceptible to human senses, including: demodulation means configured to measure a component of a predetermined periodic signal in a direction of a dimension in the input signal to obtain a N−1-dimensional pattern; detection sequence extraction means configured to obtain a detection sequence from values of the N−1-dimensional pattern to store the detection sequence in storage means; and correlation value calculation means configured to detect the embedded digital watermark based on a size of a correlation value between the detection sequence stored in the storage means and an embedding sequence, is provided.

According to this digital watermark detection apparatus, because of redundancy obtained by spreading embedding information of the N−1-dimensional pattern into the N-dimensional space, information having long information length can be detected as digital watermark in which there is sufficient tolerance for modification such as high compression and re-taking, for example, and quality deterioration can be suppressed. In addition, by using the embedding sequence that is spectrum spread in the N−1-dimensional space, digital watermark that does not require synchronization or that makes it possible to perform synchronization easily and rapidly can be detected irrespective of the amount of desynchronization in the N-th dimension direction.

In addition, by using linear transform such as discrete Fourier transform for demodulation, the N−1-dimensional pattern can be demodulated easily and at high speed from the N-dimensional signal by using fast Fourier transform and the like, for example. In addition to that, by using linear transform coefficient such as discrete Fourier transform coefficient, digital watermark that does not require synchronization or that makes it possible to perform synchronization easily and at high speed can be detected irrespective of desynchronization in the N-th dimension direction.

The demodulation means may be configured to generate two periodic signals that have a same frequency and that are orthogonal with each other to obtain the N−1-dimensional pattern based on correlation between the input signal and the periodic signals.

According to this configuration, the N−1-dimensional pattern can be demodulated easily and at high speed in the N-th dimension direction. In addition to that, by using phase shift of the periodic signal, digital watermark detection that does not require synchronization or that makes it possible to perform synchronization easily and at high speed can be performed irrespective of the amount of desynchronization in the N-th dimension direction.

In addition, by using a periodic function, such as a rectangular wave and a triangular wave as a periodic signal, that has characteristic in which autocorrelation function does not have sharp peak, and by which calculation can be easily performed compared with a sine wave, digital watermark detection process can be realized at higher speed even in an environment in which computational resources are limited.

In addition, the demodulation means may be configured to demodulate the input signal based on a difference or differentiation value in a direction of N-th dimension.

According to this configuration, by performing demodulation by the periodic signal using difference or differentiation of the signal, digital watermark detection with high detection accuracy becomes possible, and a digital watermark scheme with smaller signal deterioration becomes possible with detection performance of similar extent.

In the digital watermark detection apparatus, the N−1-dimensional pattern is a complex number pattern, and the detection sequence extraction means may obtain the detection sequence based on values of the real part and the imaginary part of the N−1-dimensional pattern to store them in the storage means.

According to this configuration, because of detection of digital watermark embedded using the real part and the imaginary part of the complex number, there is no restriction on symmetry property of the pattern, and embedding is performed using the whole N−1-dimensional space, thus, the length of spectrum spread sequence can be made longer, reliability for detection is high, and longer embedding information can be detected as digital watermark with reliability similar to conventional one, and digital watermark detection with less quality deterioration can be performed with reliability and information length similar to conventional one.

In addition, in the digital watermark detection apparatus, the N−1-dimensional pattern is a complex number pattern, and the correlation value calculation means may obtain complex correlation values for each bit, aligns directions of the complex correlation values for each bit, and after that, calculates a total sum of the complex correlation values to detect embedded digital watermark based on the total sum. According to this configuration, bit determination error becomes smaller compared with detection for each bit, so that higher robustness can be realized.

In addition, in the digital watermark detection apparatus, the N−1-dimensional pattern is a complex number pattern, and the correlation value calculation means may detect embedded digital watermark based on the absolute value of the complex correlation value.

According to this configuration, by performing detection using the absolute value of the complex correlation value, correlation to the embedding sequence can be obtained even for an input signal desynchronized in the N-th dimension direction, so that digital watermark detection in which synchronization is unnecessary can be performed.

In addition, in the digital watermark embedding apparatus, the N−1-dimensional pattern is a complex number pattern, and the correlation value calculation means may obtain complex correlation values for each bit, align directions of the complex correlation values for each bit, and after that, calculate a total sum of the complex correlation values, and the digital watermark detection apparatus may include synchronization means configured to obtain an amount of desynchronization of the input signal based on an argument of the total sum. By this configuration, the amount of desynchronization can be measured, so that digital watermark detection by easy and fast synchronization becomes possible. In addition, by obtaining the amount of desynchronization based on the complex correlation value for each bit, the amount of desynchronization can be measure with higher reliability and more accurately.

In the digital watermark detection apparatus, the N−1-dimensional pattern is a complex number pattern, and the digital watermark detection apparatus may include synchronization means configured to obtain the amount of desynchronization of the input signal based on an argument of a complex correlation value between the detection sequence and the embedding sequence.

By performing detection using the argument of the complex correlation value, correlation to the embedding sequence can be obtained even for an input signal desynchronized in the N-th dimension direction, so that the amount of desynchronization can be measured, and digital watermark detection by easy and fast synchronization becomes possible.

The digital watermark detection apparatus may be configured such that the demodulation means measures phases of a plurality of periodic signals to obtain a plurality of N−1-dimensional patterns; the synchronization means obtains an amount of desynchronization for each of the plurality of N−1-dimensional patterns; the detection sequence extraction means obtains detection sequences from each of the plurality of N−1-dimensional patterns by correcting synchronization based on corresponding one of the amount of desynchronization so as to store the detection sequences in the storage means; and the correlation value calculation means calculates a correlation value between a sequence obtained by connecting the detection sequences stored in the storage means obtained for each of the plurality of N−1-dimensional patterns and the embedding sequence.

According to this configuration, by detecting digital watermark embedded using a plurality of periodic signals, embedding information of longer information length can be detected as digital watermark, and reliability of detection result can be made clear more accurately, and in addition to that, the length of spectrum spread sequence can be made longer, so that digital watermark detection with higher reliability can be performed.

The synchronization means may obtain a whole shift amount in an axis direction of a N-th dimension based on the amounts of desynchronization obtained for each of the plurality of N−1-dimensional patterns. According to this configuration, the amount of desynchronization of each detection complex pattern can be obtained accurately, so that, digital watermark detection with high detection accuracy becomes possible, and digital watermark detection with smaller signal deterioration becomes possible with detection performance of similar extent.

In addition, the synchronization means may detect a synchronization sequence that is embedded beforehand, performs synchronization, re-divides the input signal according to the amount of desynchronization, and includes detection means configured to detect plurality of remaining pieces of embedding information. According to this configuration, by detecting embedding information divided in the time direction, longer embedding information can be embedded in a signal, so that applications applied to digital watermarking can be enlarged.

In addition, according to an embodiment of the present invention, a digital watermark embedding program for embedding embedding information, as digital watermark, into an input signal having dimensions equal to or greater than N (N is an integer equal to or greater than 2) such that it is imperceptible to human senses, the digital watermark embedding program causing a computer to function as embedding sequence generation means configured to generate an embedding sequence based on the embedding information to store it in first storage means; array generation means configured to generate a N–1-dimensional pattern based on the embedding sequence in the first storage means; modulation means configured to modulate a periodic signal according to a value on the N–1-dimensional pattern to generate a N-dimensional embedding pattern and store it in second storage means; and embedding pattern superimposing means configured to obtain the N-dimensional embedding pattern stored in the second storage means to superimpose the embedding pattern on the input signal so as to embed it, is provided.

In addition, according to an embodiment of the present invention, a digital watermark embedding program for embedding embedding information, as digital watermark, into an input signal having dimensions equal to or greater than N (N is an integer equal to or greater than 2) such that it is imperceptible to human senses, the digital watermark embedding program causing a computer to function as embedding sequence generation means configured to generate an embedding sequence based on the embedding information to store it in first storage means; array generation means configured to generate a N–1-dimensional pattern based on the embedding sequence stored in the first storage means; transform means configured to orthogonal transform the input signal to obtain a transformed signal; embedding pattern superimposing means configured to superimpose the N–1-dimensional pattern stored in the second storage means on a N–1 dimensional plane that is a part of the transformed signal to obtain a before-inverse transform signal; and inverse transform means configured to orthogonal inverse transform the before inverse transform signal to obtain an embedded signal, is provided.

In addition, according to an embodiment of the present invention, a digital watermark detection program for detecting digital watermark that is embedded beforehand into an input signal having dimensions equal to or greater than N (N is an integer equal to or greater than 2) such that it is imperceptible to human senses, the digital watermark detection program causing a computer to function as demodulation means configured to measure a component of a predetermined periodic signal in a direction of a dimension in the input signal to obtain a N–1-dimensional pattern; detection sequence extraction means configured to obtain a detection sequence from values of the N–1-dimensional pattern to store the detection sequence in storage means; and correlation value calculation means configured to detect the embedded digital watermark based on a size of a correlation value between the detection sequence stored in the storage means and an embedding sequence.

INDUSTRIAL APPLICABILITY

The present invention can be applied to a technique for embedding digital watermark into a still image and a moving image, and applied to a technique for detecting the digital watermark.

By the way, the present invention is not limited to the specifically disclosed embodiments, and variations and modifications may be made without departing from the scope of the present invention.

The present international application claims priority based on Japanese patent application No. 2006-061745, filed in the JPO on Mar. 7, 2006, and the entire contents of the application are incorporated herein by reference.

The invention claimed is:

1. A digital watermark embedding method for embedding embedding information, as digital watermark, into an input signal having dimensions equal to or greater than N that is an integer equal to or greater than 2 such that it is imperceptible to human senses in a digital watermark embedding apparatus including embedding sequence generation means, array generation means, modulation means, storage means, and embedding pattern superimposing means, wherein, the embedding sequence generation means generates an embedding sequence based on the embedding information to store it in first storage means;

the array generation means generates a N–1-dimensional pattern based on the embedding sequence in the first storage means;

the modulation means modulates a periodic signal according to a value on the N—1-dimensional pattern to generate a N-dimensional embedding pattern and store it in a second storage means; and the embedding pattern superimposing means obtains the N-dimensional embedding pattern stored in the second storage means to superimpose the embedding pattern on the input signal so as to embed it.

2. The digital watermark embedding method as claimed in claim 1, wherein the modulation means generates the N-dimensional embedding pattern such that phases in a direction of a N-th dimension are different with each other according to a position on the N—1-dimensional pattern.

3. The digital watermark embedding method as claimed in claim 1 or 2, wherein the N–1-dimensional pattern is a complex number pattern or a pattern of a two-dimensional vector, and the array generation means generates the N–1-dimensional pattern such that a part of the embedding sequence becomes the real part or an element of the two-dimensional vector and a part of the embedding sequence becomes the imaginary part or another element of the two-dimensional vector.

4. The digital watermark embedding method as claimed in claim 1 or 2, wherein the N–1-dimensional pattern is a complex number pattern or a pattern of a two-dimensional vector, and the modulation means modulates the periodic signal such that an argument of a complex number or a direction of the two-dimensional vector on the N–1-dimensional pattern becomes a phase of the modulation signal, and an absolute value of the complex number or a size of the two-dimensional vector becomes the size of the modulation signal.

5. The digital watermark embedding method as claimed in claim 1 or 2, wherein the embedding sequence generation means divides the generated embedding sequence to generate a plurality of embedding sequences to store them in the first storage means;

the array generation means generates N–1-dimensional patterns corresponding to each of the plurality of embedding sequences stored in the first storage means;

the modulation means generates N-dimensional embedding patterns each corresponding to the N–1-dimensional patterns to store the N-dimensional embedding patterns in the second storage means; and the embedding pattern superimposing means adds all of the embedding patterns stored in the second storage means, and after that, superimposes it on the input signal.

6. A digital watermark embedding apparatus for embedding embedding information, as digital watermark, into an input signal having dimensions equal to or greater than N that is an integer equal to or greater than 2 such that it is imperceptible to human senses, comprising:

embedding sequence generation means configured to generate an embedding sequence based on the embedding information to store it in first storage means;

array generation means configured to generate a N−1-dimensional pattern based on the embedding sequence in the first storage means;

modulation means configured to modulate a periodic signal according to a value on the N−1-dimensional pattern to generate a N-dimensional embedding pattern and store it in second storage means; and embedding pattern superimposing means configured to obtain the N-dimensional embedding pattern stored in the second storage means to superimpose the embedding pattern on the input signal so as to embed it.

7. The digital watermark embedding apparatus as claimed in claim 6, wherein the modulation means generates the N-dimensional embedding pattern such that phases in a direction of a N-th dimension are different with each other according to a position on the N−1-dimensional pattern.

8. The digital watermark embedding apparatus as claimed in claim 6 or 7, wherein the N−1-dimensional pattern is a complex number pattern or a pattern of a two-dimensional vector, and the array generation means generates the N−1-dimensional pattern such that a part of the embedding sequence becomes the real part or an element of the two-dimensional vector and a part of the embedding sequence becomes the imaginary part or another element of the two-dimensional vector.

9. The digital watermark embedding apparatus as claimed claim 6 or 7, wherein the N−1-dimensional pattern is a complex number pattern or a pattern of a two-dimensional vector, and the modulation means modulates the periodic signal such that an argument of a complex number or a direction of the two dimensional vector on the N−1-dimensional pattern becomes a phase of the modulation signal, and an absolute value of the complex number of a size of the two-dimensional vector becomes the size of the modulation signal.

10. The digital watermark embedding apparatus as claimed in claim 6 or 7, wherein the embedding sequence generation means divides the generated embedding sequence to generate a plurality of embedding sequences to store them in the first storage means;

the array generation means generates N−1-dimensional patterns corresponding to each of the plurality of embedding sequences stored in the first storage means;

the modulation means generates N-dimensional embedding patterns each corresponding to the N−1-dimensional patterns to store the N-dimensional embedding patterns in the second storage means; and the embedding pattern superimposing means adds all of the embedding patterns stored in the second storage means, and after that, superimposes it on the input signal.

11. A non-transitory computer-readable storage medium that stores a digital watermark embedding program for embedding embedding information, as digital watermark, into an input signal having dimensions equal to or greater than N that is an integer equal to or greater than 2 such that it is imperceptible to human senses, the digital watermark embedding program causing a computer to function as the digital watermark embedding apparatus as claimed in claim 6 or 7.

* * * * *